US009941707B1

(12) United States Patent
Leabman

(10) Patent No.: US 9,941,707 B1
(45) Date of Patent: Apr. 10, 2018

(54) HOME BASE STATION FOR MULTIPLE ROOM COVERAGE WITH MULTIPLE TRANSMITTERS

(71) Applicant: ENERGOUS CORPORATION, San Jose, CA (US)

(72) Inventor: Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 277 days.

(21) Appl. No.: 14/584,449

(22) Filed: Dec. 29, 2014

Related U.S. Application Data

(63) Continuation-in-part of application No. 13/946,065, filed on Jul. 19, 2013, now abandoned.

(51) Int. Cl.
*H02J 5/00* (2016.01)

(52) U.S. Cl.
CPC .................... *H02J 5/005* (2013.01)

(58) Field of Classification Search
CPC .. H02J 17/00; H02J 7/007; H02J 7/025; H02J 5/005; H02J 50/20; H02J 50/23; H02J 50/40; H02J 50/80; H04B 5/0037; H01F 38/14; Y02T 90/122
See application file for complete search history.

(56) References Cited

U.S. PATENT DOCUMENTS

| 787,412 A | 4/1905 | Tesla |
| 3,434,678 A | 5/1965 | Brown et al. |
| 3,696,384 A | 10/1972 | Lester |

(Continued)

FOREIGN PATENT DOCUMENTS

| CN | 203826555 U | 9/2014 |
| CN | 104090265 A | 10/2014 |

(Continued)

OTHER PUBLICATIONS

International Search Report dated Nov. 6, 2014, corresponding to International Patent Application No. PCT/US2014/046941, 3 pages.

(Continued)

*Primary Examiner* — Ronald W. Leja
*Assistant Examiner* — David M Stables
(74) *Attorney, Agent, or Firm* — Morgan, Lewis & Bockius LLP

(57) ABSTRACT

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. The transmitter can locate the at least one receiver in a three-dimensional space using a communication medium (e.g., Bluetooth technology). The transmitter generates a waveform to create a pocket of energy around each of the at least one receiver. The transmitter uses an algorithm to direct, focus, and control the waveform in three dimensions. The receiver can convert the transmission signals (e.g., RF signals) into electricity for powering an electronic device. Accordingly, the embodiments for wireless power transmission can allow powering and charging a plurality of electrical devices without wires.

20 Claims, 65 Drawing Sheets

(56) References Cited

U.S. PATENT DOCUMENTS

| | | |
|---|---|---|
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,664,920 B1 | 12/2003 | Mott et al. |
| 6,798,716 B1 | 9/2004 | Charych |
| 6,803,744 B1 * | 10/2004 | Sabo ............... H02J 7/025 307/104 |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,451,839 B2 | 11/2008 | Perlman |
| 7,463,201 B2 | 12/2008 | Chiang et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,925,308 B2 | 4/2011 | Greene et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,264,101 B2 | 9/2012 | Hyde et al. |
| 8,264,291 B2 | 9/2012 | Morita |
| 8,278,784 B2 | 10/2012 | Cook et al. |
| 8,284,101 B2 | 10/2012 | Fusco |
| 8,310,201 B1 | 11/2012 | Wright |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,552,597 B2 | 10/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Ungari et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Willis et al. |
| 8,729,737 B2 | 5/2014 | Schatz et al. |
| 8,736,228 B1 | 5/2014 | Freed et al. |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,854,176 B2 | 10/2014 | Zeine |
| 8,860,364 B2 | 10/2014 | Low et al. |
| 8,897,770 B1 | 11/2014 | Frolov et al. |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,401,977 B1 | 7/2016 | Gaw |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |

(56) References Cited

U.S. PATENT DOCUMENTS

| | | |
|---|---|---|
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,590,444 B2 | 3/2017 | Walley |
| 9,620,996 B2 | 4/2017 | Zeine |
| 2002/0001307 A1 | 1/2002 | Nguyen et al. |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brien et al. |
| 2004/0036657 A1 | 2/2004 | Forster et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0116683 A1 | 6/2005 | Cheng |
| 2005/0117660 A1 | 6/2005 | Vialle et al. |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakeyama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0273486 A1 | 11/2007 | Shiotsu |
| 2007/0298846 A1 | 12/2007 | Greene et al. |
| 2008/0014897 A1 | 1/2008 | Cook et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0248758 A1 | 10/2008 | Schedelbeck et al. |
| 2008/0248846 A1 | 10/2008 | Stronach et al. |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0041453 A1 | 2/2010 | Grimm, Jr. |
| 2010/0044123 A1 | 2/2010 | Perlman et al. |

(56) References Cited

U.S. PATENT DOCUMENTS

| | | |
|---|---|---|
| 2010/0054200 A1 | 3/2010 | Tsai |
| 2010/0060534 A1 | 3/2010 | Oodachi |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0151808 A1 | 6/2010 | Toncich et al. |
| 2010/0156721 A1 | 6/2010 | Alamouti et al. |
| 2010/0164433 A1 | 7/2010 | Janefalkar et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0237709 A1* | 9/2010 | Hall ............... B60L 11/182 307/104 |
| 2010/0244576 A1 | 9/2010 | Hillan et al. |
| 2010/0256831 A1 | 10/2010 | Abramo et al. |
| 2010/0259110 A1* | 10/2010 | Kurs ............... B60L 11/182 307/104 |
| 2010/0259447 A1 | 10/2010 | Crouch |
| 2010/0264747 A1* | 10/2010 | Hall ............... B60L 11/182 307/104 |
| 2010/0277003 A1 | 11/2010 | Von Novak et al. |
| 2010/0277121 A1 | 11/2010 | Hall et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig |
| 2011/0121660 A1 | 5/2011 | Azancot et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto et al. |
| 2011/0254377 A1 | 10/2011 | Wildmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2012/0013196 A1 | 1/2012 | Kim |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0074891 A1 | 3/2012 | Anderson et al. |
| 2012/0080957 A1 | 4/2012 | Cooper et al. |
| 2012/0086284 A1 | 4/2012 | Capanella et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clay |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. et al. |
| 2012/0132647 A1 | 5/2012 | Beverly et al. |
| 2012/0133214 A1 | 5/2012 | Yun et al. |
| 2012/0146426 A1* | 6/2012 | Sabo ............... H02J 7/025 307/104 |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |

(56) References Cited

U.S. PATENT DOCUMENTS

| | | |
|---|---|---|
| 2012/0181973 A1 | 7/2012 | Lyden |
| 2012/0182427 A1 | 7/2012 | Marshall |
| 2012/0187851 A1 | 7/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0212072 A1 | 8/2012 | Miyabayashi et al. |
| 2012/0214536 A1 | 8/2012 | Kim et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1* | 10/2012 | Kesler ............... H03H 7/40 307/104 |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1* | 12/2012 | Kurs ............... B60L 11/007 307/104 |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0049471 A1 | 2/2013 | Oleynik et al. |
| 2013/0049475 A1 | 2/2013 | Kim |
| 2013/0057078 A1 | 3/2013 | Lee |
| 2013/0057205 A1 | 3/2013 | Lee et al. |
| 2013/0057210 A1 | 3/2013 | Nergaard et al. |
| 2013/0057364 A1* | 3/2013 | Kesler ............... B60L 11/182 333/219.2 |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Miroshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0178253 A1 | 7/2013 | Karaoguz |
| 2013/0181881 A1 | 7/2013 | Christie et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0049422 A1 | 2/2014 | Von Novak et al. |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0086125 A1 | 3/2014 | Polo et al. |
| 2014/0091756 A1 | 4/2014 | Ofstein et al. |
| 2014/0091968 A1 | 4/2014 | Harel et al. |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0152117 A1 | 6/2014 | Sankar |

(56) References Cited

U.S. PATENT DOCUMENTS

| | | |
|---|---|---|
| 2014/0159652 A1* | 6/2014 | Hall .................. H02J 5/005 320/108 |
| 2014/0159662 A1 | 6/2014 | Furui et al. |
| 2014/0159667 A1 | 6/2014 | Kim et al. |
| 2014/0175893 A1 | 6/2014 | Sengupta et al. |
| 2014/0176054 A1 | 6/2014 | Porat et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wynne et al. |
| 2014/0206384 A1 | 7/2014 | Kim et al. |
| 2014/0210281 A1 | 7/2014 | Ito et al. |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0239733 A1 | 8/2014 | Mach et al. |
| 2014/0239734 A1* | 8/2014 | Masaoka .................. H02J 17/00 307/104 |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0028688 A1 | 1/2015 | Masaoka |
| 2015/0028694 A1 | 1/2015 | Leabman et al. |
| 2015/0028697 A1 | 1/2015 | Makino et al. |
| 2015/0029397 A1 | 1/2015 | Leabman et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0108848 A1 | 4/2015 | Joehren |
| 2015/0115877 A1 | 4/2015 | Arai et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0188352 A1 | 7/2015 | Peek et al. |
| 2015/0199665 A1 | 7/2015 | Chu |
| 2015/0222126 A1 | 8/2015 | Leabman et al. |
| 2015/0236520 A1 | 8/2015 | Baarman |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper et al. |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |

(56) References Cited

U.S. PATENT DOCUMENTS

| | | |
|---|---|---|
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Bell et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Bell et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005516 A9 | 1/2017 | Leabman et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0085120 A1 | 3/2017 | Leabman et al. |
| 2017/0085437 A1 | 3/2017 | Condeixa et al. |
| 2017/0092115 A1 | 3/2017 | Sloo et al. |

FOREIGN PATENT DOCUMENTS

| | | | |
|---|---|---|---|
| EP | 1028482 A2 | 8/2000 | |
| EP | 1081506 A1 | 3/2001 | |
| EP | 2397973 A1 | 6/2010 | |
| EP | 2346136 A1 | 7/2011 | |
| EP | 2545635 A2 | 1/2013 | |
| JP | 2006157586 A | 6/2006 | |
| JP | 2007043432 A | 2/2007 | |
| JP | 2008167017 A | 7/2008 | |
| KR | 20060061776 A | 6/2006 | |
| KR | 20070044302 A | 4/2007 | |
| KR | 100755144 B1 | 9/2007 | |
| KR | 20110132059 A | 12/2011 | |
| KR | 20110135540 A1 | 12/2011 | |
| KR | 20120009843 A | 2/2012 | |
| KR | 20120108759 A | 10/2012 | |
| KR | 1020130026977 A | 3/2013 | |
| WO | 9952173 A2 | 10/1999 | |
| WO | WO 0111716 A1 | 2/2001 | |
| WO | 2003091943 A1 | 11/2003 | |
| WO | 2004077550 A1 | 9/2004 | |
| WO | WO 2006122783 | 11/2006 | |
| WO | 2008156571 A2 | 12/2008 | |
| WO | 2010022181 A1 | 2/2010 | |
| WO | WO 2010039246 A1 | 4/2010 | |
| WO | WO 2010138994 A1 | 12/2010 | |
| WO | 2011112022 A2 | 9/2011 | |
| WO | 2013035190 A1 | 3/2013 | |
| WO | WO 2013031988 A1 | 3/2013 | |
| WO | WO 2013035190 A1 * | 3/2013 | ............ H02J 17/00 |
| WO | WO 2013042399 A1 | 3/2013 | |
| WO | WO 2013052950 A1 | 4/2013 | |
| WO | WO 2013105920 A2 | 7/2013 | |
| WO | WO 2014075103 A1 | 5/2014 | |
| WO | WO 2014132258 A1 | 9/2014 | |
| WO | WO 2014182788 A2 | 11/2014 | |
| WO | WO 2014182788 A3 | 11/2014 | |
| WO | WO 2014197472 A1 | 12/2014 | |
| WO | WO 2014209587 A1 | 12/2014 | |
| WO | WO 2015038773 A1 | 3/2015 | |
| WO | WO 2015097809 A1 | 7/2015 | |
| WO | WO 2015161323 A1 | 10/2015 | |
| WO | WO 2016048512 A1 | 3/2016 | |
| WO | WO 2016187357 A1 | 11/2016 | |

OTHER PUBLICATIONS

Written Opinion of the International Searching Authority dated Nov. 6, 2014, corresponding to International Patent Application No. PCT/US2014/046941, 8 pages.
International Search Report dated Sep. 12, 2014 corresponding to International Patent Application No. PCT/US2014/037072, 3 pages.
International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Witten Opinion of the International Searching Authority dated Nov. 12, 2014 corresponding to International Patent Application No. PCT/US2014/046956, 6 pages.
Energous Corp., Written Opinion, PCT/US2014/037170, dated Sep. 15, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2014/041534, dated Dec, 29, 2015, 7 pgs.
Energous Corp., IPRP, PCT/US2014/046956, dated Jan. 19, 2016, 7 pgs.
Energous Corp., Written Opinion, PCT/US2014/037072, daated Sep. 12, 2014, 5 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/67287, dated Feb. 2, 2016, 9 pgs.
Encrtous Corp., ISRWO, PCT/US2015/067291, dated Mar. 4, 2016, 10 pgs.
Energous Corp., ISRWO, PCT/US2015/067242, dated Mar. 16, 2016, 9 pgs.
Energous Corp., ISRWO, PCT/US2015/067243, dated Mar. 10, 2016, 11 pgs.
Energous Corp., ISRWO, PCT/US2014/037109, dated Apr. 8, 2016. 12 pgs.
Energous Corp., IPRP, PCT/US2014/037109, dated Apr. 12, 2016, 9 pgs.
Energous Corp., ISRWO, PCT/US2015/67275, dated Mar. 3, 2016, 8 pgs.
Energous Corp., ISRWO, PCT/US2015/067245, dated Mar. 17, 2016, 8 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp., ISRWO, PCT/US2015/067325, dated Mar. 10, 2016, 9 pgs.

(56) References Cited

OTHER PUBLICATIONS

Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 11 pgs.
Energous Corp., ISRWO, PCT/US2015/067246, dated May 11, 2016, 12 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 2, 2015, 8 pgs.
Energous Corp., ISRWO, PCT/US2014/048002, dated Nov. 13, 2014, 11 pgs.
Energous Corp., IPRP, PCT/US2014/048002, dated Jan. 26, 2016, 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp.. ISRWO, PCT/US2014/041342, dated Jan. 27, 2015, 10 pgs.
Energous Corp., IPRP, PCT/US2014/041342, dated Dec. 15, 2015, 8 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP, PCT/US2014/045237, dated Jan. 12, 2016, 12 pgs.
Energous Corp., ISRWO , PCT/US2014/054897, dated Feb. 17, 2015, 10 pgs.
Energous Corp., IPRP, PCT/US2014/054897, dated Mar. 15, 2016, 8 pgs.
Energous Corp., ISRWO, PCT/US2015/067334, dated Mar. 3, 2016, 6 pgs.
Encrgous Corp., ISRWO , PCT/US2014/047963, dated Nov. 7, 2014, 13 pgs.
Energous Corp., IPRP, PCT/US2014/047963, dated Jan. 26, 2016, 10 pgs.
Energous Corp., ISRWO , PCT/US2014/054891, dated Dec. 18, 2014, 12 pgs.
Energous Corp., IPRP, PCT/US2014/054891, dated Mar. 15, 2016, 10 pgs.
Energous Corp., ISRWO , PCT/US2014/054953, dated Dec. 4, 2014, 7 pgs.
Energous Corp., IPRP, PCT/US2014/054953, dated Mar. 22, 2016, 5 pgs.
Energous Corp.,ISRWO, PCT/US2015/067294, dated Mar. 29, 2016, 7 pgs.
Energous Corp.,ISRWO, PCT/US2014/062672 dated Jan. 26, 2015, 11 pgs.
Energous Corp., IPRP, PCT/US2014/062672 dated May 10, 2016, 8 pgs.
Energous Corp.,ISRWO, PCT/US2014/044810 dated Oct. 21, 2014, 12 pgs.
Energous Corp., IPRP, PCT/US2014/044810, dated Jan. 5, 2016, 10 pgs.
Energous Corp., ISRWO, PCT/US2015/067271, dated Mar. 11, 2016, 6 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Encrgous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Encrgous Corp., ISRWO, PCT/US2016/068987, dated May 8, 2017, 10 pgs.

(56) References Cited

OTHER PUBLICATIONS

Encrgous Corp., ISRWO, PCT/US2016/069316, dated Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
L.H. Hsieh et al. Development of a Retrodirective Wireless Microwave Power Transmission System, IEEE, 2003 pp. 393-396.
B.D. Van Veen et al., Beamfonning: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybermetics vol. 43, No. 5. pp. 1318-1334.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA dated Jun. 19-24, 1994. Abstract.
Paolo Nenzi et al; "U-Helix: On-chip short conical antenna", 2013 7th European Conference on Antennas and Propagation (EUCAP), ISBN:978-1-4673-2187-7, IEEE, dated Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.

\* cited by examiner

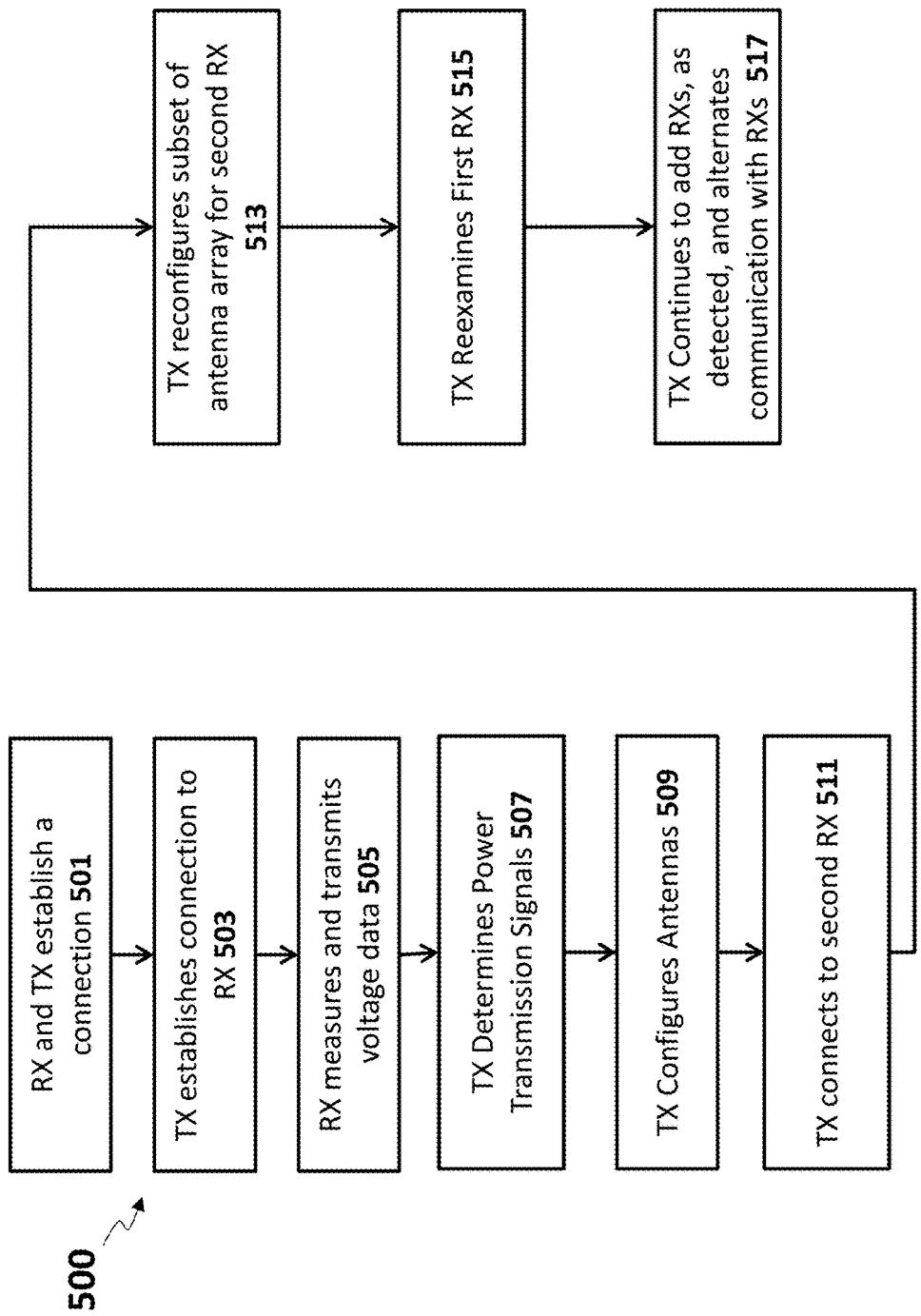

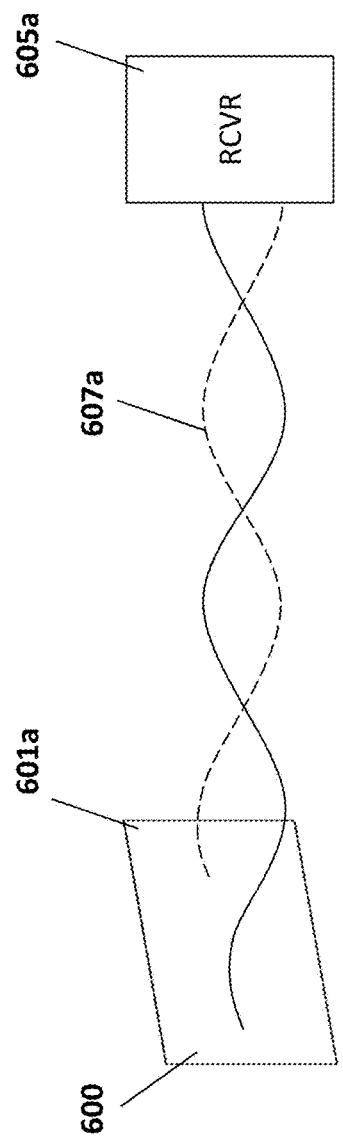
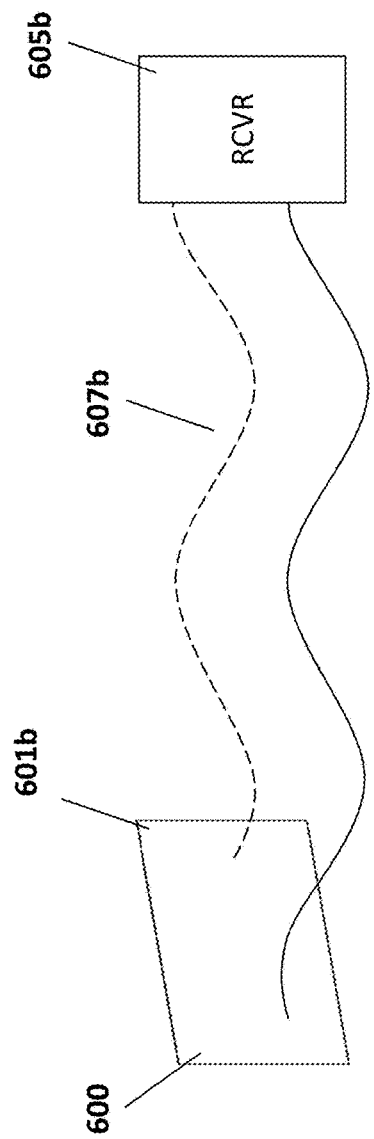

HOME BASE STATION FOR MULTIPLE ROOM COVERAGE WITH MULTIPLE TRANSMITTERS

CROSS-REFERENCE TO RELATED APPLICATIONS

This application is a continuation-in-part application of U.S. Non-Provisional patent application Ser. No. 13/946,065, filed Jul. 19, 2013, entitled "Home Base Station for Multiple Room Coverage with Multiple Transmitters," which is hereby incorporated by reference in its entirety.

This application relates to U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming," all of which are incorporated herein by reference in their entirety.

TECHNICAL FIELD

The present disclosure relates generally to wireless power transmission.

BACKGROUND

Portable electronic devices such as smart phones, tablets, notebooks and other electronic devices have become an everyday need in the way we communicate and interact with others. The frequent use of these devices may require a significant amount of power, which may easily deplete the batteries attached to these devices. Therefore, a user is frequently needed to plug in the device to a power source, and recharge such device. This may require having to charge electronic equipment at least once a day, or in high-demand electronic devices more than once a day.

Such an activity may be tedious and may represent a burden to users. For example, a user may be required to carry chargers in case his electronic equipment is lacking power. In addition, users have to find available power sources to connect to. Lastly, users must plugin to a wall or other power supply to be able to charge his or her electronic device. However, such an activity may render electronic devices inoperable during charging.

Current solutions to this problem may include devices having rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows charging of a device without physically connecting a plug of the device to an electrical outlet, by using electromagnetic signals. In this case, the device still requires to be placed in a certain location for a period of time in order to be charged. Assuming a single source power transmission of electromagnetic (EM) signal, an EM signal power gets reduced by a factor proportional to $1/r^2$ over a distance r, in other words, it is attenuated proportional to the square of the distance. Thus, the received power at a large distance from the EM transmitter is a small fraction of the power transmitted. To increase the power of the received signal, the transmission power would have to be boosted. Assuming that the transmitted signal has an efficient reception at three centimeters from the EM transmitter, receiving the same signal power over a useful distance of three meters would entail boosting the transmitted power by 10,000 times. Such power transmission is wasteful, as most of the energy would be transmitted and not received by the intended devices, it could be hazardous to living tissue, it would most likely interfere with most electronic devices in the immediate vicinity, and it may be dissipated as heat.

In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving device. In addition, in many use cases the device is not stationary, which is an added difficulty.

SUMMARY

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. The transmitter can locate the at least one receiver in a three-dimensional space using a communication medium (e.g., Bluetooth technology). The transmitter generates a waveform to create a pocket of energy around each of the at least one receiver. The transmitter uses an algorithm to direct, focus, and control the waveform in three dimensions. The receiver can convert the transmission signals (e.g., RF signals) into electricity for powering an electronic device and/or for charging a battery. Accordingly, the embodiments for wireless power transmission can allow powering and charging a plurality of electrical devices without wires.

In one embodiment, a base station for wireless power transmission may comprise: a micro-controller connected to a power source; and a plurality of transmitters connected to the base station, wherein the transmitters are configured to generate power transmission waves forming a pocket of energy to power an electronic device within range of at least one of the transmitters.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 5 illustrates steps of powering a plurality of receiver devices, according to an exemplary embodiment.

FIG. 6A illustrates waveforms for wireless power transmission with selective range, which may get unified in single waveform.

FIG. 6B illustrates waveforms for wireless power transmission with selective range, which may get unified in single waveform.

DETAILED DESCRIPTION

Figure 1:
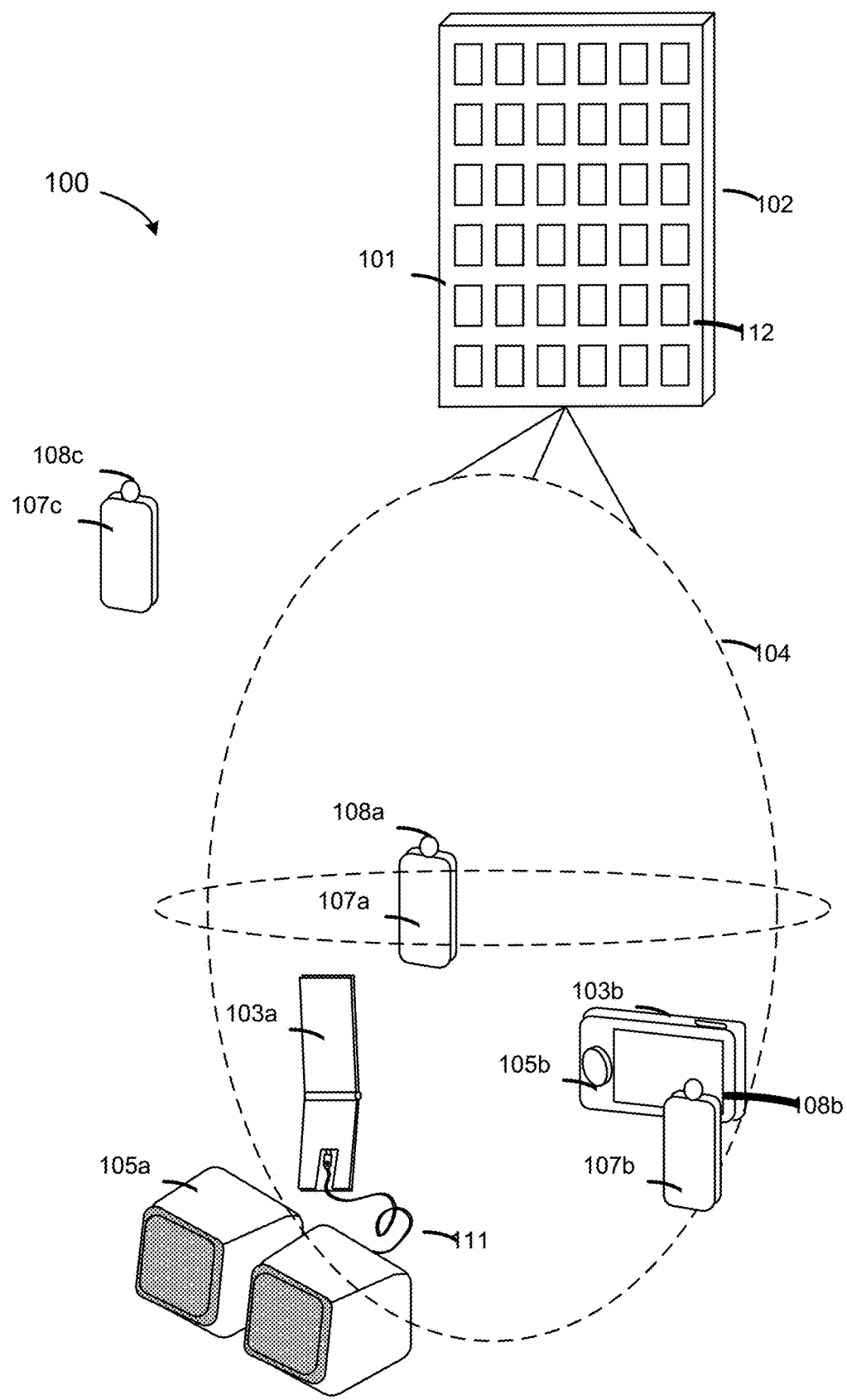
FIG. 1 illustrates a system overview, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, embodiments described herewithin can be combined to form additional embodiments without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

I. Systems and Methods for Wireless Power Transmissions

A. Components of System Embodiment

FIG. 1 shows a system 100 for wireless power transmission by forming pockets of energy 104. The system 100 may comprise transmitters 101, receivers 103, client devices 105, and pocket detectors 107. Transmitters 101 may transmit power transmission signals comprising power transmission waves, which may be captured by receivers 103. The receivers 103 may comprise antennas, antenna elements, and other circuitry (detailed later), which may convert the captured waves into a useable source of electrical energy on behalf of client devices 105 associated with the receivers 103. In some embodiments, transmitters 101 may transmit power transmission signals, made up of power transmission waves, in one or more trajectories by manipulating the phase, gain, and/or other waveform features of the power transmission waves, and/or by selecting different transmit antennas. In such embodiments, the transmitters 101 may manipulate the trajectories of the power transmission signals so that the underlying power transmission waves converge at a location in space, resulting in certain forms of interference. One type of interference generated at the convergence of the power transmission waves, "constructive interference," may be a field of energy caused by the convergence of the power transmission waves such that they add together and strengthen the energy concentrated at that location—in contrast to adding together in a way to subtract from each other and diminish the energy concentrated at that location, which is called "destructive interference". The accumulation of sufficient energy at the constructive interference may establish a field of energy, or "pocket of energy" 104, which may be harvested by the antennas of a receiver 103, provided the antennas are configured to operate on the frequency of the power transmission signals. Accordingly, the power transmission waves establish pockets of energy 104 at the location in space where the receivers 103 may receive, harvest, and convert the power transmission waves into useable electrical energy, which may power or charge associated electrical client devices 105. Detectors 107 may be devices comprising a receiver 103 that are capable of producing a notification or alert in response to receiving power transmission signals. As an example, a user searching for the optimal placement of a receiver 103 to charge the user's client device 105 may use a detector 107 that comprises an LED light 108, which may brighten when the detector 107 captures the power transmission signals from a single beam or a pocket of energy 104.

1. Transmitters

The transmitter 101 may transmit or broadcast power transmission signals to a receiver 103 associated with a device 105. Although several of the embodiments mentioned below describe the power transmission signals as radio frequency (RF) waves, it should be appreciated that the power transmission signals may be physical media that is capable of being propagated through space, and that is capable of being converted into a source of electrical energy 103. The transmitter 101 may transmit the power transmission signals as a single beam directed at the receivers 103. In some cases, one or more transmitters 101 may transmit a plurality of power transmission signals that are propagated in a multiple directions and may deflect off of physical obstructions (e.g., walls). The plurality of power transmission signals may converge at a location in a three-dimensional space, forming a pocket of energy 104. Receivers 103 within the boundaries of an energy pocket 104 may capture and covert the power transmission signals into a useable source of energy. The transmitter 101 may control pocket-forming based on phase and/or relative amplitude adjustments of power transmission signals, to form constructive interference patterns.

Although the exemplary embodiment recites the use of RF wave transmission techniques, the wireless charging techniques should not be limited to RF wave transmission techniques. Rather, it should be appreciated that possible wireless charging techniques may include any number of alternative or additional techniques for transmitting energy to a receiver converting the transmitted energy to electrical power. Non-limiting exemplary transmission techniques for energy that can be converted by a receiving device into electrical power may include: ultrasound, microwave, resonant and inductive magnetic fields, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. In addition, although the exemplary transmitter 101 is shown as a single unit comprising potentially multiple transmitters (transmit array), both for RF transmission of power and for other power transmission methods mentioned in this paragraph, the transmit arrays can comprise multiple transmitters that are physically spread around a room rather than being in a compact regular structure.

The transmitter includes an antenna array where the antennas are used for sending the power transmission signal. Each antenna sends power transmission waves where the transmitter applies a different phase and amplitude to the signal transmitted from different antennas. Similar to the formation of pockets of energy, the transmitter can form a phased array of delayed versions of the signal to be transmitted, then applies different amplitudes to the delayed versions of the signal, and then sends the signals from appropriate antennas. For a sinusoidal waveform, such as an RF signal, ultrasound, microwave, or others, delaying the signal is similar to applying a phase shift to the signal.

2. Pockets of Energy

A pocket of energy 104 may be formed at locations of constructive interference patterns of power transmission signals transmitted by the transmitter 101. The pockets of energy 104 may manifest as a three-dimensional field where energy may be harvested by receivers 103 located within the pocket of energy 104. The pocket of energy 104 produced by transmitters 101 during pocket-forming may be harvested by a receiver 103, converted to an electrical charge, and then provided to electronic client device 105 associated with the receiver 103 (e.g., laptop computer, smartphone, rechargeable battery). In some embodiments, there may be multiple transmitters 101 and/or multiple receivers 103 powering various client devices 105. In some embodiments, adaptive pocket-forming may adjust transmission of the power transmission signals in order to regulate power levels and/or identify movement of the devices 105.

3. Receivers

A receiver 103 may be used for powering or charging an associated client device 105, which may be an electrical device coupled to or integrated with the receiver 103. The receiver 103 may receive power transmission waves from one or more power transmission signals originating from one or more transmitters 101. The receiver 103 may receive the power transmission signals as a single beam produced by the transmitter 101, or the receiver 103 may harvest power transmission waves from a pocket of energy 104, which may be a three-dimensional field in space resulting from the convergence of a plurality of power transmission waves produced by one or more transmitters 101. The receiver 103 may comprise an array of antennas 112 configured to receive power transmission waves from a power transmission signal and harvest the energy from the power transmission signals of the single beam or pocket of energy 104. The receiver 103 may comprise circuitry that then converts the energy of the power transmission signals (e.g., the radio frequency electromagnetic radiation) to electrical energy. A rectifier of the receiver 103 may translate the electrical energy from AC to DC. Other types of conditioning may be applied, as well. For example, a voltage conditioning circuit may increase or decrease the voltage of the electrical energy as required by the client device 105. An electrical relay may then convey the electrical energy from the receiver 103 to the client device 105.

In some embodiments, the receiver 103 may comprise a communications component that transmits control signals to the transmitter 101 in order to exchange data in real-time or near real-time. The control signals may contain status information about the client device 105, the receiver 103, or the power transmission signals. Status information may include, for example, present location information of the device 105, amount of charge received, amount of charged used, and user account information, among other types of information. Further, in some applications, the receiver 103 including the rectifier that it contains may be integrated into the client device 105. For practical purposes, the receiver 103, wire 111, and client device 105 may be a single unit contained in a single packaging.

4. Control Signals

In some embodiments, control signals may serve as data inputs used by the various antenna elements responsible for controlling production of power transmission signals and/or pocket-forming. Control signals may be produced by the receiver 103 or the transmitter 101 using an external power supply (not shown) and a local oscillator chip (not shown), which in some cases may include using a piezoelectric material. Control signals may be RF waves or any other communication medium or protocol capable of communicating data between processors, such as Bluetooth®, RFID, infrared, near-field communication (NFC). As detailed later, control signals may be used to convey information between the transmitter 101 and the receiver 103 used to adjust the power transmission signals, as well as contain information related to status, efficiency, user data, power consumption, billing, geo-location, and other types of information.

5. Detectors

A detector 107 may comprise hardware similar to receivers 103, which may allow the detector 107 to receive power transmission signals originating from one or more transmitters 101. The detector 107 may be used by users to identify the location of pockets of energy 104, so that users may determine the preferable placement of a receiver 103. In some embodiments, the detector 107 may comprise an indicator light 108 that indicates when the detector is placed within the pocket of energy 104. As an example, in FIG. 1, detectors 107a, 107b are located within the pocket of energy 104 generated by the transmitter 101, which may trigger the detectors 107a, 107b to turn on their respective indicator lights 108a, 108b, because the detectors 107a, 107b are receiving power transmission signals of the pocket of energy 104; whereas, the indicator light 108c of a third detector 107c located outside of the pockets of energy 104, is turned off, because the third detector 107c is not receiving the power transmission signals from the transmitter 101. It should be appreciated that the functions of a detector, such as the indicator light, may be integrated into a receiver or into a client device in alternative embodiments as well.

6. Client Device

A client device 105 may be any electrical device that requires continuous electrical energy or that requires power from a battery. Non-limiting examples of client devices 105 may include laptops, mobile phones, smartphones, tablets, music players, toys, batteries, flashlights, lamps, electronic watches, cameras, gaming consoles, appliances, GPS devices, and wearable devices or so-called "wearables" (e.g., fitness bracelets, pedometers, smartwatch), among other types of electrical devices.

In some embodiments, the client device 105a may be a physical device distinct from the receiver 103a associated with the client device 105a. In such embodiments, the client device 105a may be connected to the receiver over a wire 111 that conveys converted electrical energy from the receiver 103a to the client device 105a. In some cases, other types of data may be transported over the wire 111, such as power consumption status, power usage metrics, device identifiers, and other types of data.

In some embodiments, the client device 105b may be permanently integrated or detachably coupled to the receiver 103b, thereby forming a single integrated product or unit. As an example, the client device 105b may be placed into a sleeve that has embedded receivers 103b and that may detachably couple to the device's 105b power supply input, which may be typically used to charge the device's 105b battery. In this example, the device 105b may be decoupled from the receiver, but may remain in the sleeve regardless of whether or not the device 105b requires an electrical charge or is being used. In another example, in lieu of having a battery that holds a charge for the device 105b, the device 105b may comprise an integrated receiver 105b, which may be permanently integrated into the device 105b so as to form an indistinct product, device, or unit. In this example, the device 105b may rely almost entirely on the integrated receiver 103b to produce electrical energy by harvesting pockets of energy 104. It should be clear to someone skilled in the art that the connection between the receiver 103 and the client device 105 may be a wire 111 or may be an electrical connection on a circuit board or an integrated circuit, or even a wireless connection, such as inductive or magnetic.

B. Method of Wireless Power Transmission

Figure 2:
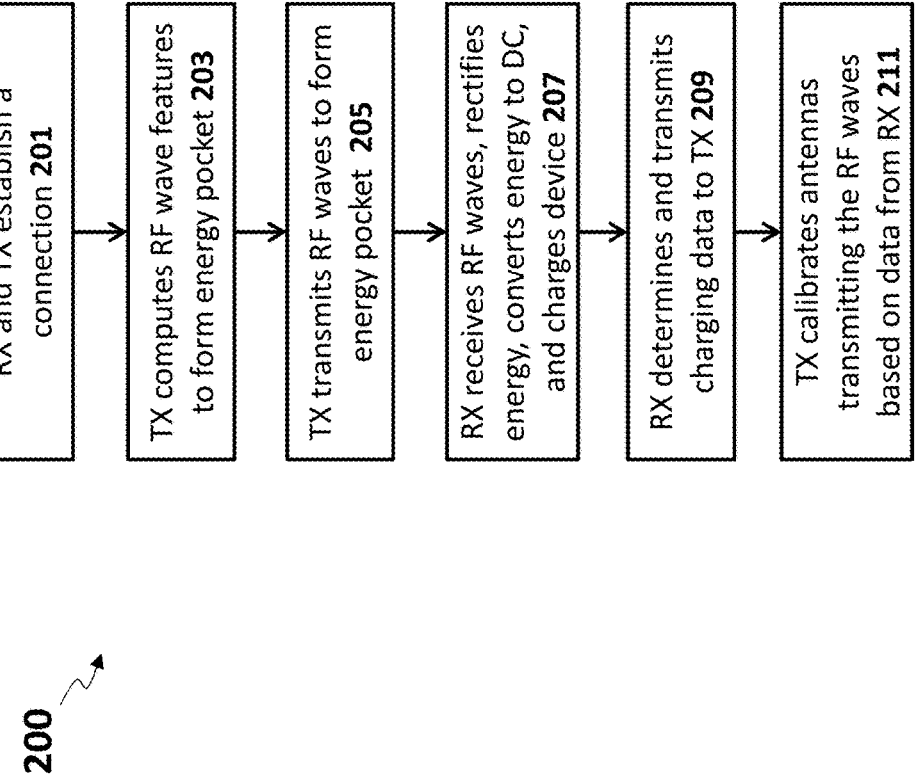
FIG. 2 illustrates steps of wireless power transmission, according to an exemplary embodiment.

FIG. 2 shows steps of wireless power transmission, according to an exemplary method 200 embodiment.

In a first step 201, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., Bluetooth®, Bluetooth Low Energy (BLE), Wi-Fi, NFC, ZigBee®). For example, in embodiments implementing Bluetooth® or Bluetooth® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described herein, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

In a next step 203, the transmitter may use the advertisement signal to determine a set of power transmission signal features for transmitting the power transmission signals, to then establish the pockets of energy. Non-limiting examples of features of power transmission signals may include phase, gain, amplitude, magnitude, and direction among others. The transmitter may use information contained in the receiver's advertisement signal, or in subsequent control signals received from the receiver, to determine how to produce and transmit the power transmission signals so that the receiver may receive the power transmission signals. In some cases, the transmitter may transmit power transmission signals in a way that establishes a pocket of energy, from which the receiver may harvest electrical energy. In some embodiments, the transmitter may comprise a processor executing software modules capable of automatically identifying the power transmission signal features needed to establish a pocket of energy based on information received from the receiver, such as the voltage of the electrical energy harvested by the receiver from the power transmission signals. It should be appreciated that the functions of the processor and the software modules may instead be implemented in an Application Specific Integrated Circuit (ASIC) also.

Additionally or alternatively, in some embodiments, the advertisement signal or subsequent signal transmitted by the receiver over a second communications channel may indicate one or more power transmission signals features, which the transmitter may then use to produce and transmit power transmission signals to establish a pocket of energy. For example, in some cases the transmitter may automatically identify the phase and gain necessary for transmitting the power transmission signals based on the location of the device and the type of device or receiver; and, in some cases, the receiver may inform the transmitter the phase and gain for effectively transmitting the power transmission signals.

In a next step 205, after the transmitter determines the appropriate features to use when transmitting the power transmission signals, the transmitter may begin transmitting power transmission signals, over a separate channel from the control signals. Power transmission signals may be transmitted to establish a pocket of energy. The transmitter's antenna elements may transmit the power transmission signals such that the power transmission signals converge in a two-dimensional or three-dimensional space around the receiver. The resulting field around the receiver forms a pocket of energy from which the receiver may harvest electrical energy. One antenna element may be used to transmit power transmission signals to establish two-dimensional energy transmissions; and in some cases, a second or additional antenna element may be used to transmit power transmission signals in order to establish a three-dimensional pocket of energy. In some cases plurality of antenna elements may be used to transmit power transmission signals in order to establish the pocket of energy; and in some cases the plurality of antennas may include all of the antennas in the transmitter; and in some cases the plurality of antennas may include only one or more of the antennas in the transmitter, but not all.

As previously mentioned, the transmitter may produce and transmit power transmission signals, according to a determined set of power transmission signal features, which may be produced and transmitted using an external power source and a local oscillator chip comprising a piezoelectric material. The transmitter may comprise an RFIC that controls production and transmission of the power transmission signals based on information related to power transmission and pocket-forming received from the receiver. This control data may be communicated over a different channel from the power transmission signals, using wireless communications protocols, such as BLE, NFC, or ZigBee®. The RFIC of the transmitter may automatically adjust the phase and/or relative magnitudes of the power transmission signals as needed. Pocket-forming is accomplished by the transmitter transmitting the power transmission signals in a manner that forms constructive interference patterns.

Antenna elements of the transmitter may use concepts of wave interference to determine certain power transmission signals features (e.g., direction of transmission, phase of power transmission signal wave), when transmitting the power transmission signals during pocket-forming. The antenna elements may also use concepts of constructive interference to generate a pocket of energy, but may also utilize concepts of deconstructive interference to generate a transmission null in a particular physical location.

In some embodiments, the transmitter may provide power to a plurality of receivers using pocket-forming, which may require the transmitter to execute a procedure for multiple pocket-forming. A transmitter comprising a plurality of antenna elements may accomplish multiple pocket-forming by automatically computing the phase and gain of power transmission signal waves, for each antenna element of the transmitter tasked with transmitting power transmission signals the respective receivers. The transmitter may compute the phase and gains independently, because multiple wave paths for each power transmission signal may be generated by the transmitter's antenna elements to transmit the power transmission signals to the respective antenna elements of the receiver.

As an example of the computation of phase/gain adjustments for two antenna elements of the transmitter transmitting two signals, say X and Y where Y is 180 degree phase shifted version of $X(Y=-X)$. At a physical location where the cumulative received waveform is X−Y, a receiver receives $X-Y=X+X=2X$, whereas at a physical location where the cumulative received waveform is X+Y, a receiver receives $X+Y=X-X=0$.

In a next step 207, the receiver may harvest or otherwise receive electrical energy from power transmission signals of a single beam or a pocket of energy. The receiver may comprise a rectifier and AC/DC converter, which may convert the electrical energy from AC current to DC current, and a rectifier of the receiver may then rectify the electrical energy, resulting in useable electrical energy for a client device associated with the receiver, such as a laptop computer, smartphone, battery, toy, or other electrical device. The receiver may utilize the pocket of energy produced by the transmitter during pocket-forming to charge or otherwise power the electronic device.

In next step 209, the receiver may generate control data containing information indicating the effectiveness of the single beam or energy pockets providing the receiver power transmission signals. The receiver may then transmit control signals containing the control data, to the transmitter. The control signals may be transmitted intermittently, depending on whether the transmitter and receiver are communicating synchronously (i.e., the transmitter is expecting to receive control data from the receiver). Additionally, the transmitter may continuously transmit the power transmission signals to the receiver, irrespective of whether the transmitter and receiver are communicating control signals. The control data may contain information related to transmitting power transmission signals and/or establishing effective pockets of energy. Some of the information in the control data may inform the transmitter how to effectively produce and transmit, and in some cases adjust, the features of the power transmission signals. Control signals may be transmitted and received over a second channel, independent from the power transmission signals, using a wireless protocol capable of transmitting control data related to power transmission signals and/or pocket-forming, such as BLE, NFC, Wi-Fi, or the like.

As mentioned, the control data may contain information indicating the effectiveness of the power transmission signals of the single beam or establishing the pocket of energy. The control data may be generated by a processor of the receiver monitoring various aspects of receiver and/or the client device associated with the receiver. The control data may be based on various types of information, such as the voltage of electrical energy received from the power transmission signals, the quality of the power transmission signals reception, the quality of the battery charge or quality of the power reception, and location or motion of the receiver, among other types of information useful for adjusting the power transmission signals and/or pocket-forming.

In some embodiments, a receiver may determine the amount of power being received from power transmission signals transmitted from the transmitter and may then indicate that the transmitter should "split" or segment the power transmission signals into less-powerful power transmission signals. The less-powerful power transmission signals may be bounced off objects or walls nearby the device, thereby reducing the amount of power being transmitted directly from the transmitter to the receiver.

In a next step 211, the transmitter may calibrate the antennas transmitting the power transmission signals, so that the antennas transmit power transmission signals having a more effective set of feature (e.g., direction, phase, gain, amplitude). In some embodiments, a processor of the transmitter may automatically determine more effective features for producing and transmitting the power transmission signals based on a control signal received from the receiver. The control signal may contain control data, and may be transmitted by the receiver using any number of wireless communication protocols (e.g., BLE, Wi-Fi, ZigBee®). The control data may contain information expressly indicating the more effective features for the power transmission waves; or the transmitter may automatically determine the more effective features based on the waveform features of the control signal (e.g., shape, frequency, amplitude). The transmitter may then automatically reconfigure the antennas to transmit recalibrated power transmission signals according to the newly determined more-effective features. For example, the processor of the transmitter may adjust gain and/or phase of the power transmission signals, among other features of power transmission feature, to adjust for a change in location of the receiver, after a user moved the receiver outside of the three-dimensional space where the pocket of energy is established.

C. System Architecture of Power Transmission System

Figure 3:
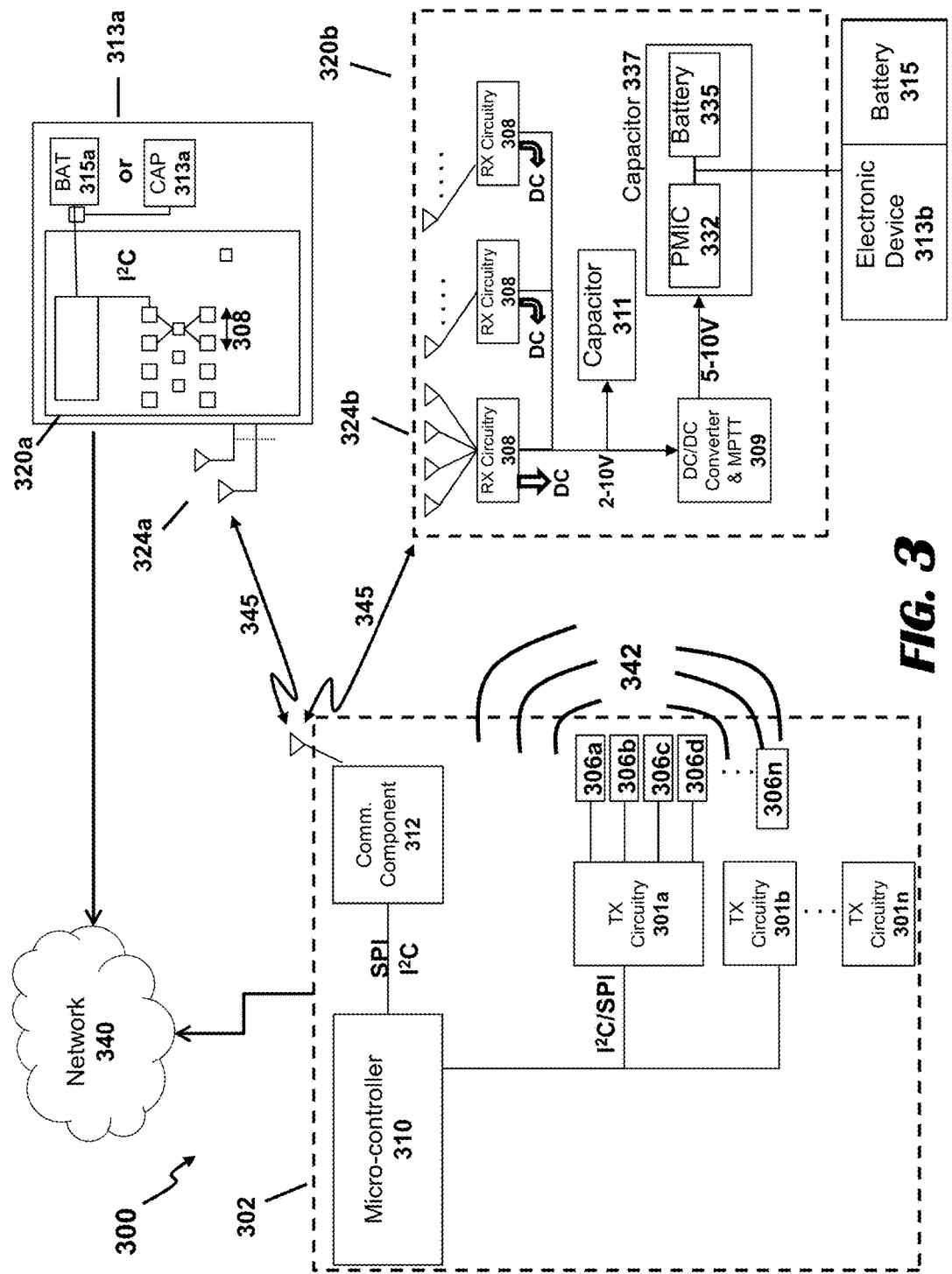
FIG. 3 illustrates an architecture for wireless power transmission, according to an exemplary embodiment.

FIG. 3 illustrates an architecture 300 for wireless power transmission using pocket-forming, according to an exemplary embodiment. "Pocket-forming" may refer to generating two or more power transmission waves 342 that converge at a location in three-dimensional space, resulting in constructive interference patterns at that location. A transmitter 302 may transmit and/or broadcast controlled power transmission waves 342 (e.g., microwaves, radio waves, ultrasound waves) that may converge in three-dimensional space. These power transmission waves 342 may be controlled through phase and/or relative amplitude adjustments to form constructive interference patterns (pocket-forming) in locations where a pocket of energy is intended. It should be understood also that the transmitter can use the same principles to create destructive interference in a location thereby creating a transmission null—a location where transmitted power transmission waves cancel each other out substantially and no significant energy can be collected by a receiver. In typical use cases the aiming of a power transmission signal at the location of the receiver is the objective; and in other cases it may be desirable to specifically avoid power transmission to a particular location; and in other cases it may be desirable to aim power transmission signal at a location while specifically avoiding transmission to a second location at the same time. The transmitter takes the use case into account when calibrating antennas for power transmission.

Antenna elements 306 of the transmitter 302 may operate in single array, pair array, quad array, or any other suitable arrangement that may be designed in accordance with the desired application. Pockets of energy may be formed at constructive interference patterns where the power transmission waves 342 accumulate to form a three-dimensional field of energy, around which one or more corresponding transmission null in a particular physical location may be generated by destructive interference patterns. Transmission null in a particular physical location-may refer to areas or regions of space where pockets of energy do not form because of destructive interference patterns of power transmission waves 342.

A receiver 320 may then utilize power transmission waves 342 emitted by the transmitter 302 to establish a pocket of energy, for charging or powering an electronic device 313, thus effectively providing wireless power transmission. Pockets of energy may refer to areas or regions of space where energy or power may accumulate in the form of constructive interference patterns of power transmission waves 342. In other situations there can be multiple transmitters 302 and/or multiple receivers 320 for powering various electronic equipment for example smartphones, tablets, music players, toys and others at the same time. In other embodiments, adaptive pocket-forming may be used to regulate power on electronic devices. Adaptive pocket-forming may refer to dynamically adjusting pocket-forming to regulate power on one or more targeted receivers.

Receiver 320 may communicate with transmitter 302 by generating a short signal through antenna elements 324 in order to indicate its position with respect to the transmitter 302. In some embodiments, receiver 320 may additionally utilize a network interface card (not shown) or similar computer networking component to communicate through a network 340 with other devices or components of the system 300, such as a cloud computing service that manages several collections of transmitters 302. The receiver 320 may comprise circuitry 308 for converting the power transmission signals 342 captured by the antenna elements 324, into electrical energy that may be provided to and electric device 313 and/or a battery of the device 315. In some embodiments, the circuitry may provide electrical energy to a battery of receiver 335, which may store energy without the electrical device 313 being communicatively coupled to the receiver 320.

Communications components 324 may enable receiver 320 to communicate with the transmitter 302 by transmitting control signals 345 over a wireless protocol. The wireless protocol can be a proprietary protocol or use a conventional wireless protocol, such as Bluetooth®, BLE, Wi-Fi, NFC, ZigBee, and the like. Communications component 324 may then be used to transfer information, such as an identifier for the electronic device 313, as well as battery level information, geographic location data, or other information that may be of use for transmitter 302 in determining when to send power to receiver 320, as well as the location to deliver power transmission waves 342 creating pockets of energy. In other embodiments, adaptive pocket-forming may be used to regulate power provided to electronic devices 313. In such embodiments, the communications components 324 of the receiver may transmit voltage data indicating the amount of power received at the receiver 320, and/or the amount of voltage provided to an electronic device 313b or battery 315.

Once transmitter 302 identifies and locates receiver 320, a channel or path for the control signals 345 can be established, through which the transmitter 302 may know the gain and phases of the control signals 345 coming from receiver 320. Antenna elements 306 of the transmitter 302 may start to transmit or broadcast controlled power transmission waves 342 (e.g., radio frequency waves, ultrasound waves), which may converge in three-dimensional space by using at least two antenna elements 306 to manipulate the power transmission waves 342 emitted from the respective antenna element 306. These power transmission waves 342 may be produced by using an external power source and a local oscillator chip using a suitable piezoelectric material. The power transmission waves 342 may be controlled by transmitter circuitry 301, which may include a proprietary chip for adjusting phase and/or relative magnitudes of power transmission waves 342. The phase, gain, amplitude, and other waveform features of the power transmission waves 342 may serve as inputs for antenna element 306 to form constructive interference patterns (pocket-forming). In some implementations, a micro-controller 310 or other circuit of the transmitter 302 may produce a power transmission signal, which comprises power transmission waves 342, and that may be may split into multiple outputs by transmitter circuitry 301, depending on the number of antenna elements 306 connected to the transmitter circuitry 301. For example, if four antenna elements 306a-d are connected to one transmitter circuit 301a, the power transmission signal will be split into four different outputs each output going to an antenna element 306 to be transmitted as power transmission waves 342 originating from the respective antenna elements 306.

Pocket-forming may take advantage of interference to change the directionality of the antenna element 306 where constructive interference generates a pocket of energy and destructive interference generates a transmission null. Receiver 320 may then utilize pocket of energy produced by pocket-forming for charging or powering an electronic device and therefore effectively providing wireless power transmission.

Multiple pocket-forming may be achieved by computing the phase and gain from each antenna 306 of transmitter 302 to each receiver 320.

Figure 35:
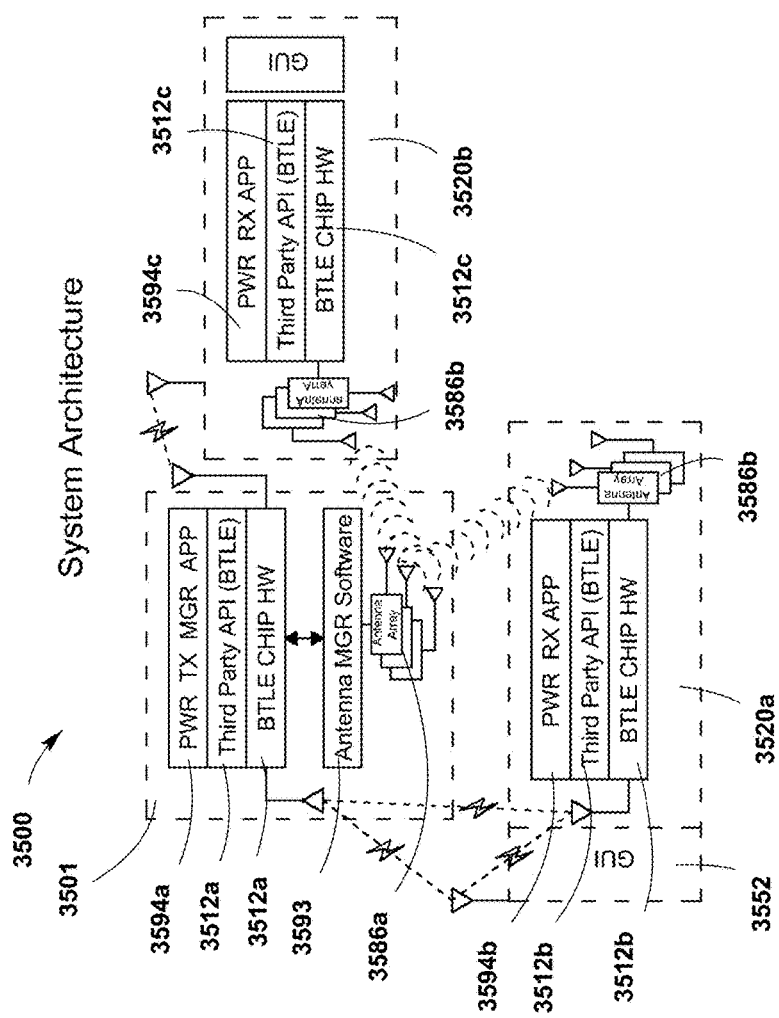
FIG. 35 illustrates a system architecture diagram, according an exemplary embodiment.

FIG. 35 shows a wireless charging system architecture 3500, according to an exemplary embodiment. System architecture 3500 may include one or more wireless power transmitters 3501, and one or more wireless power receivers 3520a 3530b. In some embodiments, wireless charging system architecture 3500 may include one or more electronic devices 3552, where electronic devices 3552 may not have a built-in wireless power receiver 3520a. In other embodiments, wireless charging system architecture 3500 may include electronic devices 3552 with a built-in power receiver 3520a. Pairing may refer to the association, within the wireless power transmission system's distributed system database, of a single electronic client device with a single power receiver, so that, for example, when a user, or automatic system process, commands a client device to be charged, the system can determine from said association which power receiver to transmit power to, to charge said client device. System database may refer to an exact copy of the system database of an installed product, or an exact copy of a subset of said database, stored within and accessible by any system computer.

Power transmitters 3501 may transmit controlled Radio Frequency (RF) waves which may converge in 3-D space. These RF waves may be controlled through phase and/or relative amplitude adjustments to form constructive interference patterns (pocket-forming). Pocket-forming may refer to generating two or more RF waves which converge in 3-D space, forming controlled constructive interference patterns. Pockets of energy may form at constructive interference patterns that may be 3-dimensional in shape whereas transmission null in a particular physical location may be generated at destructive interference patterns. Pockets of energy may refer to areas or regions of space where energy or power may accumulate in the form of constructive interference patterns of RF waves. Transmission null in a particular physical location may refer to areas or regions of space where pockets of energy do not form because of destructive interference patterns of RF waves. Adaptive pocket-forming may refer to dynamically adjusting pocket-forming to regulate power on one or more targeted receivers. Power may refer to electrical energy, where "wireless power transmission" may be synonymous of "wireless energy transmission", and "wireless power transmission" may be synonymous of "wireless energy transmission".

According to exemplary embodiments, power transmitters 3501 may include a power transmitter manager application 3594a, a third party BTLE API 3512a, a BTLE chip 3512b, an antenna manager software 3593 and an antenna array 3586a among other components. Power transmitter manager application 3594a may be an executable program loaded into a non-volatile memory within a power transmitter 3501. Power transmitter manager application 3594a may control the behavior of power transmitter 3501, monitor the state of charge of electronic devices 3552, and power receivers 3520a, may keep track of the location of power receivers 3520a and may execute power schedules, amongst others. In some embodiments, power transmitters 3501 may include a database (not shown in figure) for storing information related to power receivers 3520a, electronic devices 3552, power status, power schedules, IDs, pairing and any information necessary for running the system. BTLE, or BLE, may refer to Bluetooth Low Energy communication hardware and/or software. Database may refer to a database may be a SQL file, or a file of a different format or any format, or an array of data structures within a computer's volatile or non-volatile memory but, that is used to organize, store, and retrieve data within the computer of the database. Third party BTLE API 3512a may enable the effective interaction between power transmitter manager application 3594a and BTLE chip 3512b. Antenna manager software 3593 may process orders from power transmitter manager application 3594a and may control antenna array 3586a.

Antenna arrays 3586a that may be included in power transmitters 3501 may include a number of antenna elements capable of transmitting power. In some embodiments, antenna array 3586a may include from 64 to 256 antenna elements which may be distributed in an equally spaced grid. In one embodiment, antenna array 3586a may have an 8×8 grid to have a total of 64 antenna elements. In another embodiment, antenna array 3586a may have a 16×16 grid to have a total of 256 antenna elements. However, the number of antenna elements may vary in relation with the desired range and power transmission capacity of power transmitter 3501. Generally, with more antenna elements, a wider range and higher power transmission capacity may be achieved. Alternate configurations may also be possible including circular patterns or polygon arrangements, amongst others. The antenna elements of antenna array 3586a may include antenna types for operating in frequency bands such as 900 MHz, 2.5 GHz, 5.250 GHz, or 5.8 GHz, antenna elements may operate in independent frequencies, allowing a multi-channel operation of pocket-forming.

Power transmitter 3501 may additionally include other communications methods such as Wi-Fi, ZigBee and LAN amongst others. Power receivers 3520a may include a power receiver application 3594b, a third party BTLE API 3512a, a BTLE chip 3512b, and an antenna array 3586b. Power receivers 3520a may be capable of utilizing pockets of energy produced by power transmitter 3501 for charging or powering electronic devices 3552a and electronic devices 3520b. Power receiver application 3594b may be an executable program loaded into a non-volatile memory within a power receiver 3520a. Third party BTLE API 3512a may enable the effective interaction between power receiver application 3594b and BTLE chip 3512b. Antenna array 3586b may be capable of harvesting power from pockets of energy.

Electronic devices 3552 and electronic devices 3520a may include a GUI for managing their interactions within wireless charging system architecture 3500. The GUI may be associated with an executable program loaded into a non-volatile memory. In some embodiments, electronic devices 3552 and electronic devices 3520a may include a database (not shown in figure) for storing information related to power receivers 3520a, power status, power schedules, IDs, pairing and any information necessary for running the system. System management GUI may refer to a software application program that runs on a computer in the wireless power transmission system or runs on a remote server that may be in the Internet cloud. Said system management GUI is the Graphic User Interface between system users or operators and the software within the wireless power transmission system, and used for configuration, monitoring, command, control, reporting, and any other system management functionality.

In some embodiments, wireless charging system architecture 3500 may include multiple power transmitters 3501 and/or multiple power receivers 3520a for charging a plurality of electronic devices 3552. In systems including multiple power transmitters 3501, the two or more power transmitters may be in constant communication using any communication channel available, including Bluetooth, BTLE, Wi-Fi, ZigBee, LAN, LTE and LTE direct amongst others.

Figure 36:
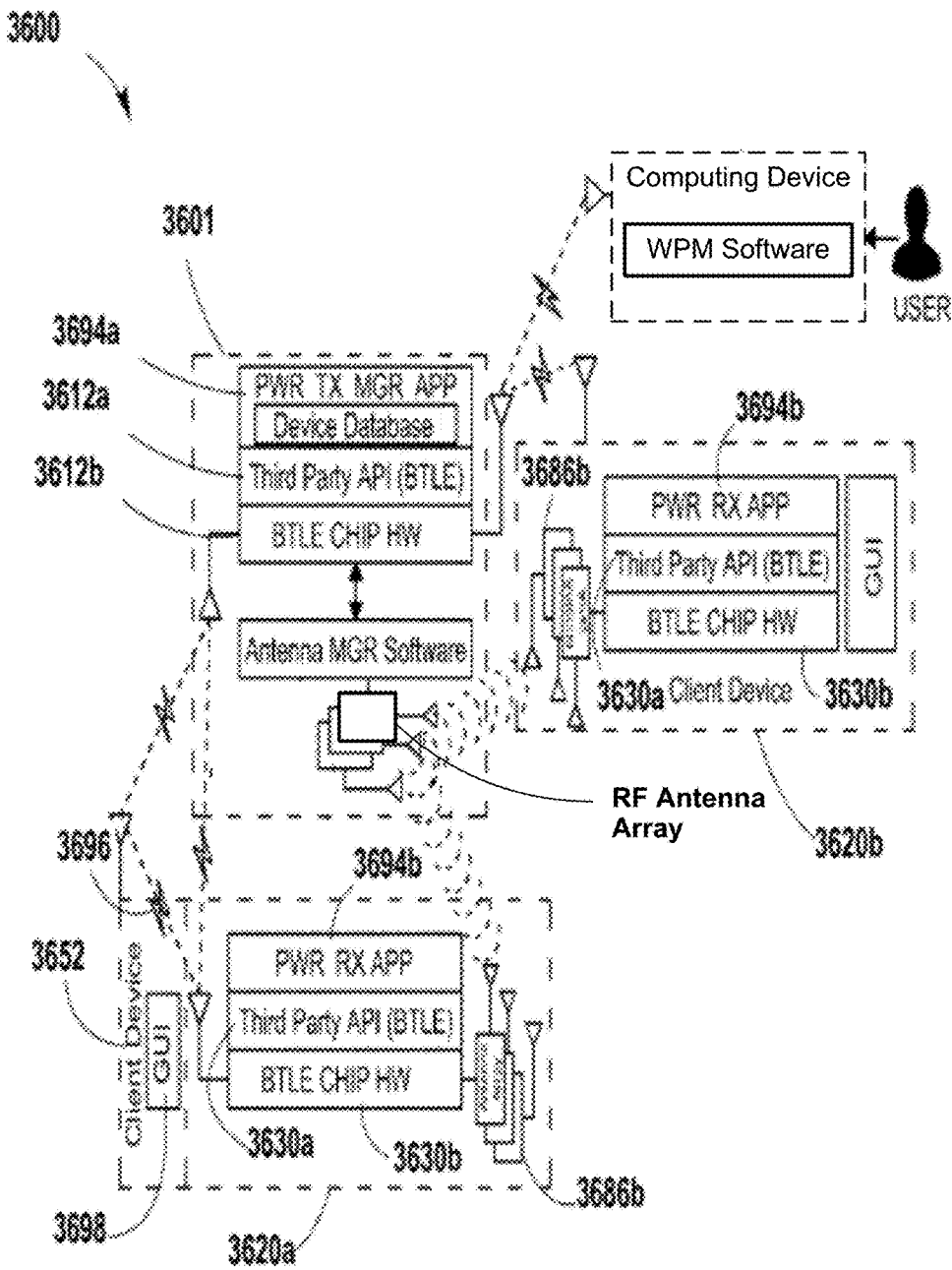
FIG. 36 illustrates an exemplary embodiment of a wireless power network including a transmitter and wireless receivers, according to an exemplary embodiment.

FIG. 36 shows an exemplary embodiment of a wireless power transmission system 3600 (WPTS) in which one or more embodiments of the present disclosure may operate. Wireless power transmission system 3600 may include communication between one or more wireless power transmitters 3601 and one or more wireless powered receivers 3620a and within client device 3620b. Client device 3652 may be paired with an adaptable paired receiver 3620a that may enable wireless power transmission to the client device 3652. In another embodiment, a client device 3620b may include a wireless power receiver built in as part of the hardware of the device. Client device 3652 may be any device which uses an energy power source, such as, laptop computers, stationary computers, mobile phones, tablets, mobile gaming devices, televisions, radios and/or any set of appliances that may require or benefit from an electrical power source.

In one embodiment, one or more wireless power transmitters 3601 may include a microprocessor that integrates a power transmitter manager app 3694a (PWR TX MGR APP) as embedded software, and a third party application programming interface 3612a (Third Party API) for a Bluetooth Low Energy chip 3612b (BTLE CHIP HW). App may refer to a software application that is run on a mobile, laptop, desktop, or server computer. Bluetooth Low Energy chip 3612b may enable communication between wireless power transmitter 3601 and other devices, including power receiver 3620a, client device 3652 and 3620b, and others. Wireless power transmitter 3601 may also include an antenna manager software (Antenna MGR Software) to control an RF antenna array that may be used to form controlled RF waves which may converge in 3-D space and create pockets of energy on wireless powered receivers. In some embodiments, one or more Bluetooth Low Energy chips 3612b may utilize other wireless communication protocols, including Wi-Fi, Bluetooth, LTE direct, or the like.

Power transmitter manager app 3694a may call third party application programming interface 3612a for running a plurality of functions, including the establishing of a connection, ending a connection, and sending data, among others. Third party application programming interface 3612a may issue commands to Bluetooth Low Energy chip 3612b according to the functions called by power transmitter manager app 3694a.

Power transmitter manager app 3694a may also include a distributed system database, which may store relevant information associated with client device 3652, such as their identifiers for a client device 3652, voltage ranges for power receiver 3620a, location of a client device 3652, signal strength and/or any other relevant information associated with a client device 3652. Database may also store information relevant to the wireless power network, including receiver ID's, transmitter ID's, end-user handheld devices, system management servers, charging schedules, charging priorities and/or any other data relevant to a wireless power network.

Third party application programming interface 3612a at the same time may call power transmitter manager app 3694a through a callback function which may be registered in the power transmitter manager app 3694a at boot time. Third party application programming interface 3612a may have a timer callback that may go for ten times a second, and may send callbacks every time a connection begins, a connection ends, a connection is attempted, or a message is received.

Client device 3620b may include a power receiver app 3694b (PWR RX APP), a third party application programming interface 3650a (Third party API) for a Bluetooth Low Energy chip 3630b (BTLE CHIP HW), and an RF antenna array 3686b which may be used to receive and utilize the pockets of energy sent from wireless power transmitter 3601.

Power receiver app 3694b may call third party application programming interface 3650a for running a plurality of functions, including establishing a connection, ending a connection, and sending data, among others. Third party application programming interface 3650a may have a timer callback that may go for ten times a second, and may send callbacks every time a connection begins, a connection ends, a connection is attempted, or message is received.

Client device 3652 may be paired to an adaptable power receiver 3620a via a BTLE connection 3696. A graphical user interface (GUI 3698) may be used to manage the wireless power network from a client device 3652. GUI 3698 may be a software module that may be downloaded from any application store and may run on any operating system, including iOS and Android, amongst others. Client device 3652 may also communicate with wireless power transmitter 3601 via a BTLE connection 3696 to send important data, such as an identifier for the device, battery level information, geographic location data, or any other information that may be of use for wireless power transmitter 3601.

A wireless power manager software may be used in order to manage wireless power transmission system 3600. Wireless power manager may be a software module hosted in memory and executed by a processor inside a computing device. The wireless power manager may include a local application GUI, or host a web page GUI, from where a user may see options and statuses, as well as execute commands to manage the wireless power transmission system 3600. The computing device, which may be cloud-based, may be connected to the wireless power transmitter 3601 through standard communication protocols, including Bluetooth, Bluetooth Low Energy, Wi-Fi, or ZigBee, amongst others. Power transmitter manager app 3694a may exchange information with wireless power manager in order to control access by and power transmission to client devices 3652. Functions controlled by wireless power manager may include scheduling power transmission for individual devices, prioritizing between different client devices, accessing credentials for each client, tracking physical locations of power receivers relative to power transmitter areas, broadcasting messages, and/or any functions required to manage the wireless power transmission system 3600.

Computing device may be connected to wireless power transmitter 3601 through network connections. Network connections may refer to any connection between computers including intranets, local area networks (LAN), virtual private networks (VPN), wireless area networks (WAN), Bluetooth, Bluetooth Low Energy, Wi-Fi, and ZigBee, among others. Power transmitter manager app 3694a may exchange information with wireless power manager in order to control access to power transmission by devices. Functions controlled by wireless power manager may include scheduling power transmission for individual devices, number of antennas assigned to client devices, priorities between different client devices, access credentials for each client, physical location, broadcasting messages, and/or any functions required to manage components within wireless power transmission system 3600.

One or more wireless power transmitters 3601 may automatically transmit power to any single wireless power receiver that is close enough for wireless power transmitters 3601 to establish a communication with. The wireless power receiver may then power or charge electrically connected electronics devices such as client device 3652. A single wireless power transmitter 3601 may power multiple wireless power receivers simultaneously. Alternatively, components within wireless power transmission system 3600 may be configured through wireless power manager graphical user interface to automatically only transmit power to specific wireless power receivers depending on specific system criteria and/or conditions such as time of the day for automated time-based scheduled power transmission, power receiver physical location, and owner of the client device, among others.

Wireless power receivers may take energy transmitted from wireless power transmitters 3601, into the wireless power receiver's antenna, rectify it, condition it, and sending the resulting electrical energy to the electrically connected device to power or charge the device. If any wireless power receiver moves to a different spatial location, wireless power transmitter 3601 may change number of assigned antennas, the phase, and amplitude of the transmitted RF so that the resulting energy beam stays aimed at the receiver.

Figure 37:
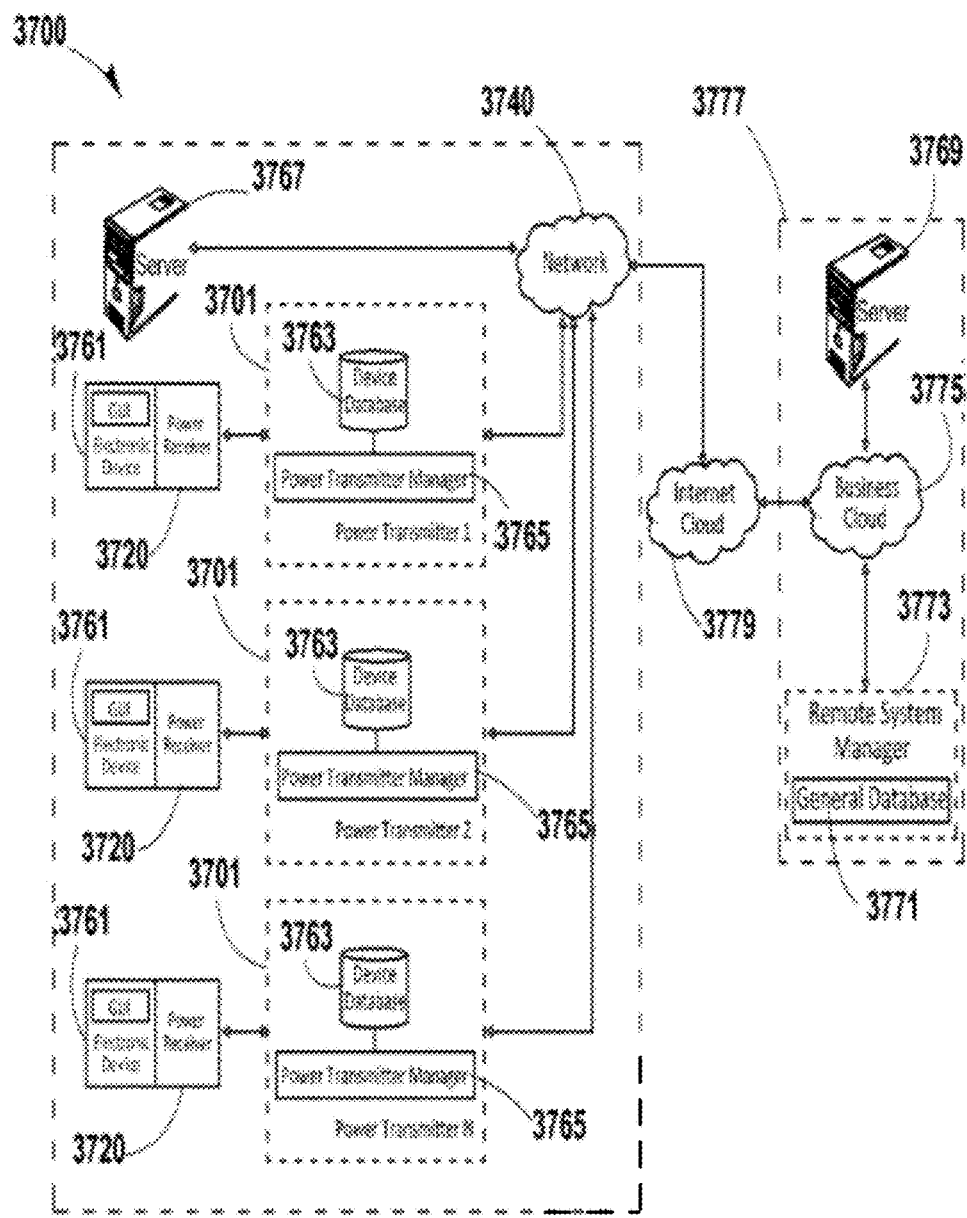
FIG. 37 illustrates a wireless power transmission system network, according to an embodiment.

FIG. 37 illustrates a wireless power transmission system network, according to an embodiment. According to some embodiments, wireless power transmission system network 3700 may include multiple wireless power transmission systems capable of communicating with a remote information service 3777 through internet cloud 3769.

In some embodiments, wireless power transmission system may include one or more wireless power transmitters 3701, one or more power receivers 3720, one or more optional back-up servers 3767 and a local network 3740. According to some embodiments, each power transmitter 3701 may include wireless power transmitter manager 3765 software and a distributed wireless power transmission system database 3763. Each power transmitter 3701 may be capable of managing and transmitting power to one or more power receivers 3720, where each power receiver 3720 may be capable of charging or providing power to one or more electronic devices 3761.

Power transmitter managers 3765 may control the behavior of power transmitters 3701, monitor the state of charge of electronic devices 3761, and control power receivers 3720, keep track of the location of power receivers 3720, execute power schedules, run system check-ups, and keep track of the energy provided to each of the different electronic devices 3761, amongst others.

According to some embodiments, database 3763 may store relevant information from electronic devices 3761 such as, identifiers for electronic devices 3761, voltage ranges for measurements from power receivers 3720, location, signal strength and/or any relevant information from electronic devices 3761. Database 3763 may also store information relevant to the wireless power transmission system such as, receiver ID's, transmitter ID's, end-user handheld device names or ID's, system management server ID's, charging schedules, charging priorities and/or any data relevant to a wireless power transmission system network 3700. Additionally, in some embodiments, database 3763 may store data of past and present system status.

The past system status data may include details such as the amount of power delivered to an electronic device 3761, the amount of energy that was transferred to a group of electronic devices 3761 associated with a user, the amount of time an electronic device 3761 has been associated to a wireless power transmitter 3701, pairing records, activities within the system, any action or event of any wireless power device in the system, errors, faults, and configuration problems, among others. Past system status data may also include power schedules, names, customer sign-in names, authorization and authentication credentials, encrypted information, physical areas of system operation, details for running the system, and any other system or user-related information.

Present system status data stored in database 3763 may include the locations and/or movements in the system, configuration, pairing, errors, faults, alarms, problems, messages sent between the wireless power devices, and tracking information, among others.

According to some exemplary embodiments, databases 3763 within power transmitters 3701 may further store future system status information, where the future status of the system may be forecasted or evaluated according to historical data from past system status data and present system status data.

In some embodiments, records from all device databases 3763 in a wireless power transmission system may also be stored and periodically updated in server 3767. In some embodiments, wireless power transmission system network 3700 may include two or more servers 3767. In other embodiments, wireless power transmission system network 3700 may not include any servers 3767.

In another exemplary embodiment, wireless power transmitters 3701 may further be capable of detecting failures in the wireless power transmission system. Examples of failures in power transmission system 502 may include overheating of any component, malfunction, and overload, among others. If a failure is detected by any of wireless power transmitters 3701 within the system, then the failure may be analyzed by any wireless power transmitter manager 3765 in the system. After the analysis is completed, a recommendation or an alert may be generated and reported to owner of the power transmission system or to a remote cloud-based information service, for distribution to system owner or manufacturer or supplier.

In some embodiments, power transmitters 3701 may use network 3740 to send and receive information. Network 3740 may be a local area network, or any communication system between the components of the wireless power transmission system. Network 3740 may enable communication between power transmitters, system management servers 3767 (if any), and other power transmission systems (if any), amongst others. According to some embodiments, network 3740 may facilitate data communication between power transmission system and remote information service 3777 through internet cloud 3779.

Remote information service 3777 may be operated by the owner of the system, the manufacturer or supplier of the system, or a service provider. Remote management system may include business cloud 3775, remote manager 3773 software, and backend server 3769, where the remote manager 3773 may further include a general database 3771. Functionality of backend server 3769 and remote manager 3773 can be combined into a single physical or virtual server.

General database 3771 may store additional backups of the information stored in the device databases 3763. Additionally, general database 3771 may store marketing information, customer billing, customer configuration, customer authentication, and customer support information, among others. In some embodiments, general database 3771 may also store information, such as less popular features, errors in the system, problems report, statistics, and quality control, among others. Each wireless power transmitter 3701 may periodically establish a TCP communication connection with remote manager 3773 for authentication, problem report purposes or reporting of status or usage details, among others.

Figure 38:
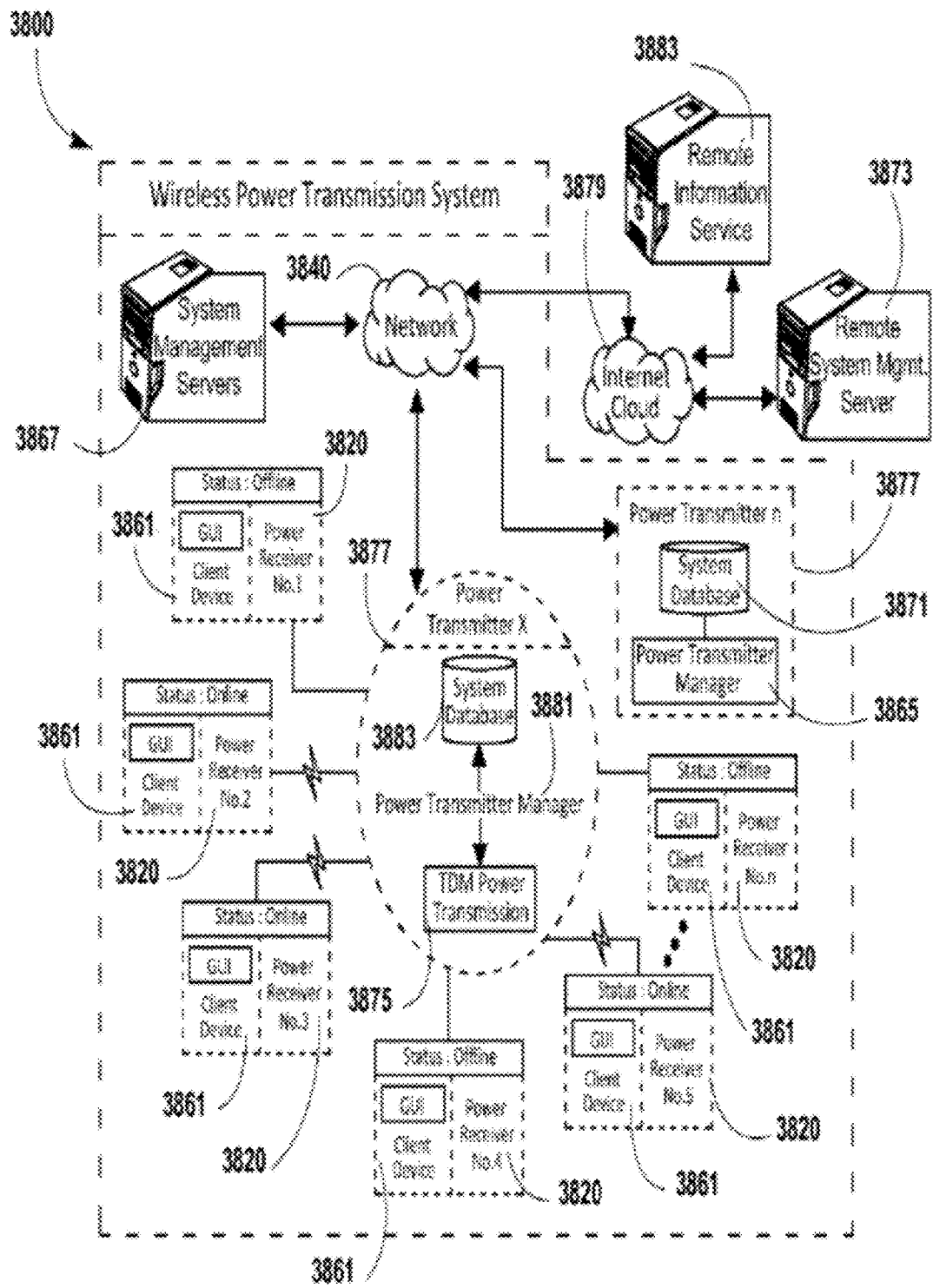
FIG. 38 illustrates a wireless power transmission system architecture, according to an exemplary embodiment.

FIG. 38 illustrates a wireless power transmission system architecture 3800, according to an exemplary embodiment. Wireless power transmission system architecture 3800 may include a wireless power transmission system, internet cloud 3879, and a remote information service 3883. The disclosed wireless power transmission system may include one or more wireless power transmitters 3877, one or more wireless power receivers 3820 that may be coupled with or built into any client device 3861, one or more local system management servers 3867 or cloud-based remote system management server 3873 (e.g., back-end servers), and a local network 3840. Network 3840 connections may refer to any connection between computers such as intranets, local area networks (LAN), virtual private networks (VPN), wireless area networks (WAN), and the internet, among others.

According to some embodiments, each wireless power transmitter 3877 may include wireless power transmitter manager software 3865, a distributed system database 3883, and a TDM power transmission 3875 software module. Each wireless power transmitter 3877 may be able to manage and transmit power to one or more wireless power receivers 3820, and each wireless power receiver 3820 may be able to charge or provide power to one or more client devices 3861. Examples of client devices 3861 may include smartphones, tablets, music players, and toys, amongst others. Some kind of client device 3861 may run a system management GUI app. This app may be available at, downloaded, and installed from a public software app store or digital application distribution platform, such as Apple iTunes, Android Play Store and/or amazon.

According to a further embodiment, wireless power transmission system may include a system management GUI application in, run at, or run from a local system management servers 3867 or cloud-bases remote system management server 3873, which may be used to control transmission of wireless power to specific wireless power receivers 3820 depending on system criteria or operating conditions, such as power transmission schedule, and physical location of the client device 3861, among others.

Each wireless power transmitter manager software 3865 may be able to control the behavior of wireless power transmitters 3877, monitoring different aspects, such as the time at which power transmission started, the unique system identification of both wireless power transmitter 3877 and wireless power receiver 3820, the number of devices connected, the direction angle of the antennas used, the voltage at the power receiver antennas of wireless power receiver 3820, and the real-time communication connection between wireless power transmitter 508 and wireless power receiver 3820, which may be used for tracking information from wireless power receiver 3820 no matter where it is located or moved, among others. Additionally, power transmitter manager software 3865 may control the usage of TDM power transmission 3875, which may be able to put wireless power transmission system in TDM power transmission 3875 mode or not. Specifically, TDM power transmission 3875 mode may control the antennas arrays of wireless power transmitter 3877 by re-assigning to antenna groups, where each group may be used to transmit power at regular intervals of time to only those client devices 3861 that are in an online mode, while the remaining client device 3861 in an offline mode are waiting to be powered by wireless power transmitter 3877.

Wireless power transmitter 3877 through TDM power transmission 3875 mode may turn to online a certain group of client devices 3861 coupled with wireless power receiver 3820 and may turn offline another certain group of client devices 3861 and vice versa, until all client devices 3861 that are sufficiently close to wireless power transmitter 3877 receive enough power. This TDM power transmission cycle may continue while there are too many client devices 3861 for wireless power transmitter 3877 to power all at the same time.

According to some embodiments, distributed system database 3883 may record relevant information from wireless power receivers 3820 within client devices 3861, wireless power transmitter 3877, and local system management servers 3867. Information may include but is not limited to identifiers for client devices 3861, voltage measurements of power circuits within wireless power receivers 3820, location, signal strength, wireless power receiver 3820 ID's, wireless power transmitter 3877 ID's, end-user handheld device names ID's, system management server ID's, charging schedules, charging priorities, and/or any data relevant to wireless power transmission system. Additionally, wireless power transmitters 3877, wireless power receiver 3820 powering client devices 3861 and local system management server 3867 may operate as system information generator.

Distributed system database 3871 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

In some embodiments, wireless power transmitters 3877 may use network 3840 to send and receive information. Network 3840 may be a local area network, WIFI, or any communication system between the components of the wireless power transmission system. Network 3840 may enable communication between two or more wireless power transmitters 3877, the communication of wireless power transmitters 3877 with system management servers 3867, and may facilitate the communication between wireless power transmission system and remote information service 3883 through internet cloud 3879, amongst others.

Remote information service 3883 may be operated by the owner of the system, the manufacturer, supplier of the system, or a service provider. Remote information service 3883 may include different components, such as a back-end server, a remote information service manager, and a general remote information service database.

Figure 39:
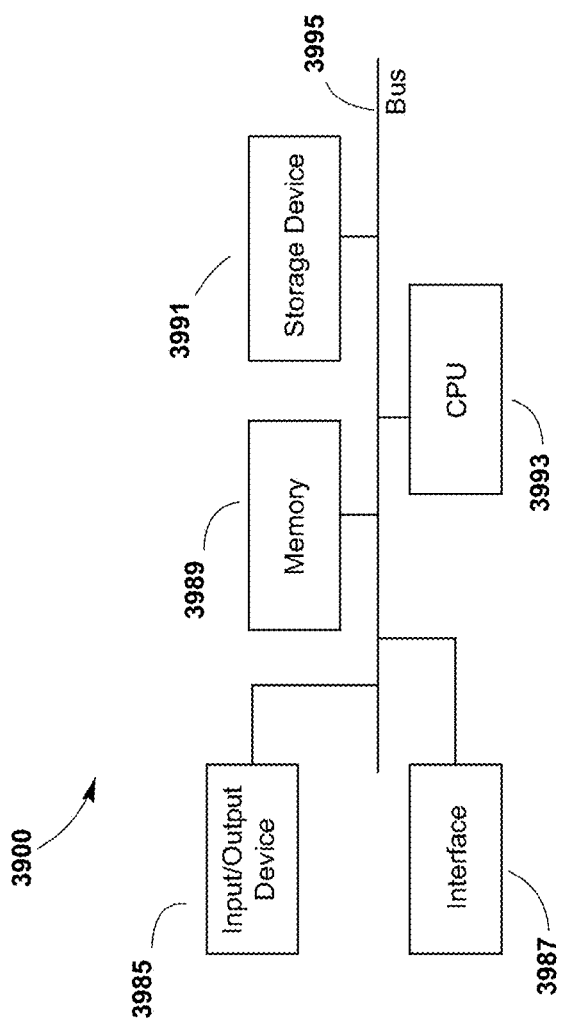
FIG. 39 illustrates an exemplary computing device in which one or more embodiments of the implementation may operate, according to an exemplary embodiment.

FIG. 39 is an exemplary computing device 3900 in which one or more embodiments of the implementation may operate, according to an embodiment. In one embodiment, computing device 3900 includes bus 3995, input/output (I/O) device 3985, communication interface 3987, memory 3989, storage device 3991 and central processing unit 3993. In another embodiment, computing device 3900 includes additional, fewer, different, or differently arranged components than those illustrated in FIG. 39.

In FIG. 39, bus 3995 is in physical communication with (I/O) device 3985, communication interface 3987, memory 3989, storage device 3991, and central processing unit 3993. Bus 3995 includes a path that permits components within computing device 3900 to communicate with each other. Examples of (I/O) device 3985 include peripherals and/or other mechanism that may enable an examiner or candidate to input information to computing device 3900, including a keyboard, computer mice, buttons, touch screens, touch-pad, voice recognition, biometric mechanisms, and the like. (I/O) device 3985 also includes a mechanism that outputs information to a user of computing device 3900, such as, for example a display, a microphone, a light emitting diode (LED), a printer, a speaker, orientation sensors and the like. Said orientation sensors include one or more accelerometers, one or more gyroscopes, one or more compasses, and the like. The accelerometer provides a respective change of a respective angle about a respective axis. The gyroscope provides a respective rate of change of a respective angle about a respective axis and the compass provides a compass heading.

Examples of communication interface 3987 include mechanisms that enable computing device 3900 to communicate with other computing devices and/or systems through network connections. Examples of memory 3989 include random access memory (RAM), read-only memory (ROM), flash memory, and the like. Examples of storage device 3991 include magnetic and/or optical recording medium, ferro-electric RAM (F-RAM) hard disks, solid-state drives, floppy disks, optical discs, and the like. In one embodiment, memory 3989 and storage device 3991 store information and instructions for execution by central processing unit 3993. In another embodiment, central processing unit 3993 includes a microprocessor, an application specific integrated circuit (ASIC), or a field programmable object array (FPOA), and the like. In this embodiment, central processing unit 3993 interprets and executes instructions retrieved from memory 3989 and storage device 3991.

Examples of these implementations include servers, authorized computing devices, smartphones, desktop computers, laptop computers, tablet computers, a PDAs, another type of processor-controlled device that may receive, process, transmit digital data, and the like. Additionally, computing device 3900 may perform certain operations that are required for the proper operation of the system architecture. Suitable computing devices 3900 may perform these operations in response to central processing unit 3993 executing software instructions contained in a computer-readable medium, such as memory 3989.

In one embodiment, the software instructions of system are read into memory 3989 from another memory location, such as storage device 3991, or from another computing device 3900 (e.g., first client device, second client device, computing device, and the like) via communication interface 3987. In this embodiment, the software instructions contained within memory 3989 cause central processing unit 3993 to perform processes.

Figure 40:
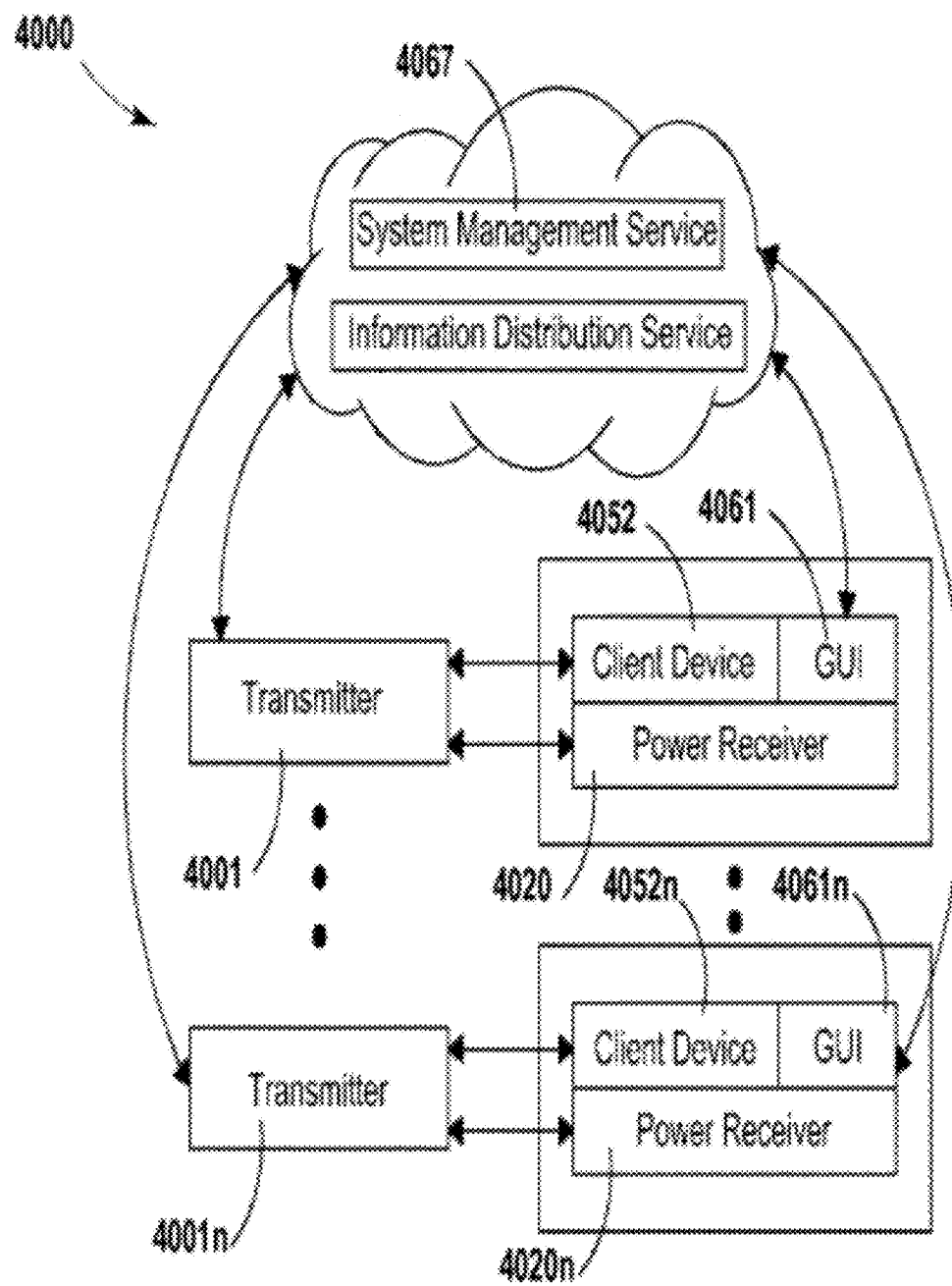
FIG. 40 illustrates a wireless energy transmission system for transmitting wireless energy using adaptive 3-D pocket-forming techniques, according to an exemplary embodiment.

FIG. 40 is a functional block diagram illustrating wireless energy transmission system 4000 for transmitting wireless energy using adaptive 3-D pocket-forming techniques. In some embodiments, wireless energy transmission system 4000 includes cloud service provider, any number of suitable wireless power transmitters 4001-4001n, and any number of suitable wirelessly charged devices. In other embodiments, wireless energy transmission system 4000 includes additional, fewer, different, or differently arranged components than those illustrated in FIG. 40.

In FIG. 40, cloud service provider includes system management service 4067 and information distribution service.

wirelessly charged devices each include as associated receiver 4020-4020n, client device 4052-4052n, and GUI 4061-4061n. In some embodiments, there can be additional wirelessly charged devices (e.g., up to n) that each include a receiver, client device, and GUI.

In some implementations, cloud service provider, wireless power transmitters 4001, and wirelessly charged devices are in wired/wireless communication with one or more of each other. In these embodiments, wireless power transmitters 4001 wirelessly couple and communicate with wirelessly charged devices via any suitable wireless protocol. Examples of suitable wireless protocols include Bluetooth, Bluetooth Low Energy, Wi-Fi, ZigBee, and the like.

In some embodiments, cloud service provider is implemented as computer hardware and software including any number of components required for running a desired set of applications, including any number of processors, random access memory modules, physical storage drives, wired communication ports, wireless communication ports, and the like. In an example, cloud service provider is implemented using one or more components of computing device. In these embodiments, cloud service provider executes any software required to host system management service 4067, including software able to manage user credentials, device identification, device authentication, usage and payments associated with one or more users, handle service requests, information requests, store and read data related to one or more users, and the like. In other embodiments, cloud service provider additionally includes databases for storing user data, device data, payment data, and the like.

In some embodiments, system management service 4067 is configured to manage power transmission from one or more wireless power transmitters to one or more receivers, credentials associated with mobile device users, billing associated with wireless power transmissions, and the like. In these embodiments, system management service 4067 is hardware and software configured to issue commands to one or more wireless power transmitters 4001, including commands to begin, pause, or stop transmitting power to one or more wireless power receivers, and the like. In an example, cloud service provider functions substantially similar to computing device. In another example, system management service 4067 functions substantially similar to wireless power manager.

In some embodiments, cloud service provider executes any software required to host information distribution service. Examples of such software include software able to store and read data related to one or more users, perform analytics on data, and the like. In other embodiments, information distribution service is hardware and software configured to collect usage data, billing data, demographic data, and the like from system management service 4067, wireless power transmitter 4001, receiver 4020, and/or client device 4052. Examples of data include total time spent charging, total energy transmitted to a device, average amount of energy delivered monthly to a device, locations where energy has been transmitted to a mobile device, mobile device user demographic descriptors, and the like In other embodiments, wireless power transmitters 4001 are implemented as computer hardware and software including any number of components required for running a desired set of applications, including any number of processors, random access memory modules, physical storage drives, wired communication ports, wireless communication interfaces allowing coupling to antennas, and the like. In an example, wireless power transmitters 4001 are implemented using one or more components of computing device. In some embodiments, wireless power transmitters 4001 are implemented as transmitters able to transmit power to wirelessly charged devices (including a wireless power receiver) and wireless power receivers (coupled to one or more electrical devices) using adaptive 3-D pocket-forming techniques. In these embodiments, one or more wireless power transmitters 4001 communicate with one or more receivers 4020 (either as part of wirelessly charged devices or coupled to one or more electrical devices), locate the one or more receivers 4020 in 3-D space, and transmit power signals to form pockets of energy at the one or more receivers 4020.

In some embodiments, wirelessly charged devices are implemented as computer hardware and software including any number of components required for running a desired set of applications, including any number of processors, random access memory modules, physical storage drives, wired communication ports, wireless communication interfaces allowing coupling to antennas, and the like. In some embodiments, wirelessly charged devices are implemented as computing devices coupled to and in communication with a suitable wireless power receiver. Examples of wirelessly charged devices include mobile phones, laptops, portable video game systems, video game controllers, and the like. In an example, wirelessly charged devices are implemented using one or more components of computing device. In some embodiments, wirelessly charged devices are implemented including receivers (e.g., receiver 4020) operable to receive power from wireless power transmitters employing adaptive 3-D pocket-forming techniques. In these embodiments, the receiver portion (e.g., receiver 4020) included in one or more wirelessly charged devices communicates with one or more wireless power transmitters 4001 and receives energy from pockets of energy formed at the location of the receiver associated with the one or more wirelessly charged devices wirelessly charged devices may include an inherent receiver (e.g., receiver 4020) or may be coupled and in electrical communication with a separate wireless receiver.

In operation, wireless power transmitters 4001 broadcast an identifier associated with the individual transmitters using a suitable wireless communication protocol, including Bluetooth, Bluetooth Low Energy, Zigbee, and the like. Examples of suitable identifiers include MAC addresses, IMEIs, serial numbers, an ID string, and the like. In other embodiments, suitable identifiers additionally include information about the version of the software used in wireless power transmitters 4001. In some embodiments, client devices 4052 within wirelessly charged devices are configured to detect one or more identifiers broadcast by one or more wireless power transmitters 4001 and display one or more graphical representations of the wireless power transmitters 4001 to a mobile device user through GUI 4061. In other embodiments, client devices 4052 determine the version of the software running on wireless power transmitter 4001 and use the version information to determine the location and format of the identifier associated with wireless power transmitter 4001 within the information broadcast by wireless power transmitters 4001.

In some embodiments, client devices 4052 are able to communicate user requests to system management service 4067, including requests to initiate charging, pause charging, end charging, authorize payment transactions, and the like. In other embodiments, cloud service provider is in communication with one or more wireless power transmitters 4001 and manages the distribution of power signals from the one or more wireless power transmitters 4001, wireless power transmitter 4001 is in wireless communication with receiver 4020 and is configured to transmit power signals from wireless power transmitter 4001 to receiver 4020 employing adaptive 3-D pocket-forming techniques.

Figure 41:
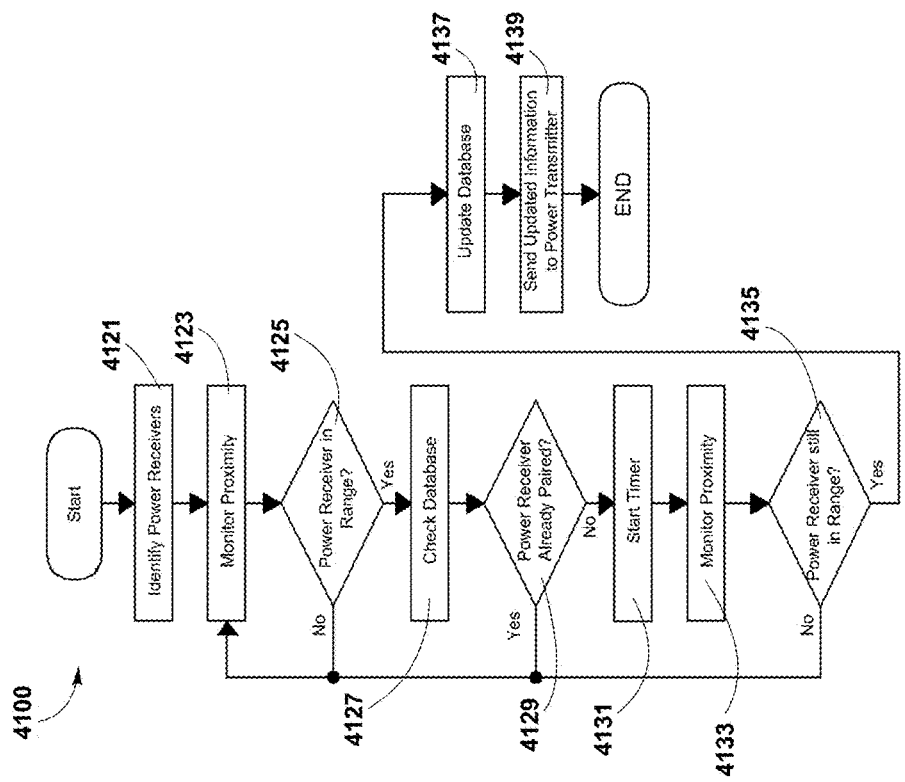
FIG. 41 illustrates a flowchart of a pairing process, according to an exemplary embodiment.

FIG. 41 is a flowchart of a pairing process 4100, according to an exemplary embodiment. Pairing process 4100 may start when an electronic device identifies 4121 available power receivers in a system. Then, using the signal strength the electronic device may be capable of monitoring 4123 the proximity of each of the available power receivers. The electronic device may constantly check 4125 if one of the power receivers is within a range of proximity to perform the pairing. If none of the power receivers is within the range, the electronic device may continue to monitor the proximity of the power receivers. If one of the power receivers is within range the electronic device may proceed to check the database 4127 to determine if the power receiver is already paired 4129. If the power receiver is associated with another electronic device, the electronic device may continue to scan for power receivers and track their proximity. If the power receiver has no associations, the electronic device may commence the pairing protocol, and may start 4131 a timer and continuously monitor the proximity of the power receiver. After a time lapse the electronic device may check 4135 if the power receiver is still within the range. If the power receiver is not within the proximity range the electronic device may continue to track the proximity of the power receivers. If the power receiver is still within a proximity range the electronic device may update 4137 the database, associating its ID with the ID of the power receiver.

In some embodiments, the GUI in the electronic device may analyze several signal strength measurements (RSSI) over the predetermined time lapse before updating the database. In some embodiments, the GUI may compute and average of the signal strength measurements and compare it with predefined reference values. After updating the information in an internal database, the electronic device may send 4139 a copy of the updated database to the power transmitter and pairing process 4100 may end.

Figure 42:
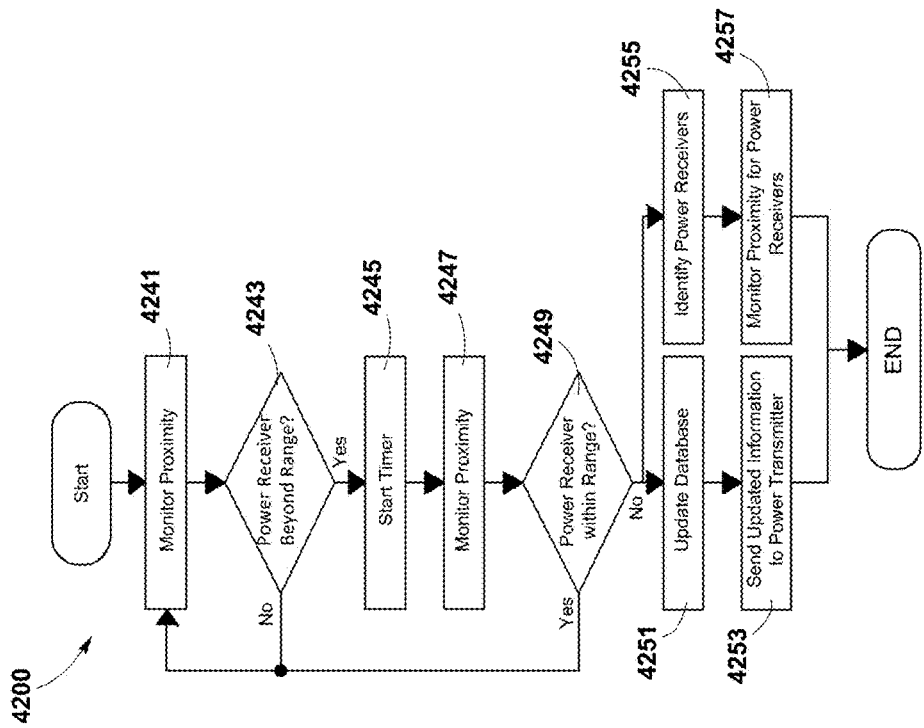
FIG. 42 illustrates a flowchart of an un-pairing process, according to an exemplary embodiment.

FIG. 42 is a flowchart of an un-pairing process 4200, according to an exemplary embodiment. Un-pairing process 4200 may start when an electronic device that is paired to a power receiver is constantly monitoring 4241 the proximity of the power receiver to check 4243 if the power receiver is beyond pairing range. If there is no change, the electronic device may continue to monitor 4241 the proximity of the paired power receiver. If there is a change, the electronic device may start 4245 a timer. After a time lapse the electronic device may check the signal strength of the ads broadcasted by the power receiver to determine 4249 if the power receiver is still within a range. This may be done by the GUI in the electronic device. The GUI may analyze several signal strength measurements (RSSI) over the predetermined time lapse. In some embodiments, the GUI may compute and average of the signal strength measurements and compare it with predefined reference values.

If the electronic device determines that the power receiver is still within the proximity range it may continue to normally monitor the proximity of the power receiver. If the electronic device determines that the power receiver is not within the proximity range any more the electronic device may proceed to update 4251 the internal database and subsequently send 4253 the updated version of the data base to the power transmitter. In a parallel process, the electronic device may start to scan and identify 4255 available power receivers and continuously monitor the proximity of the available power receivers and the un-pairing process 4200 may end.

In an exemplary embodiment, a smartphone including a GUI for interacting with a wireless charging system is paired with a power receiver embedded in a cellphone cover. At a first moment, the smartphone communicates with the power transmitter, is authenticated, receives the power receivers' database and starts scanning for power receiver devices. After scanning, the smartphone finds 3 available power receivers. It tracks the proximity of the power devices based on signal strength. At a second moment, one of the power receivers is placed near the smartphone. The smartphone determines that the power receiver is within the range and starts the pairing process. After a few seconds it checks the signal strength again and it determines that the power receiver is still within an acceptable distance for pairing. Then, the smartphone updates its internal database and sends a copy of the updated database to the power transmitter. At a third moment, the smartphone sends a power request to the power transmitter. The power transmitter searches the database to determine which power receiver is associated with the smartphone, then it directs the antenna array towards the power receiver that is associated with the smartphone, and starts transmitting power.

D. Components of Systems Forming Pockets of Energy

Figure 4:
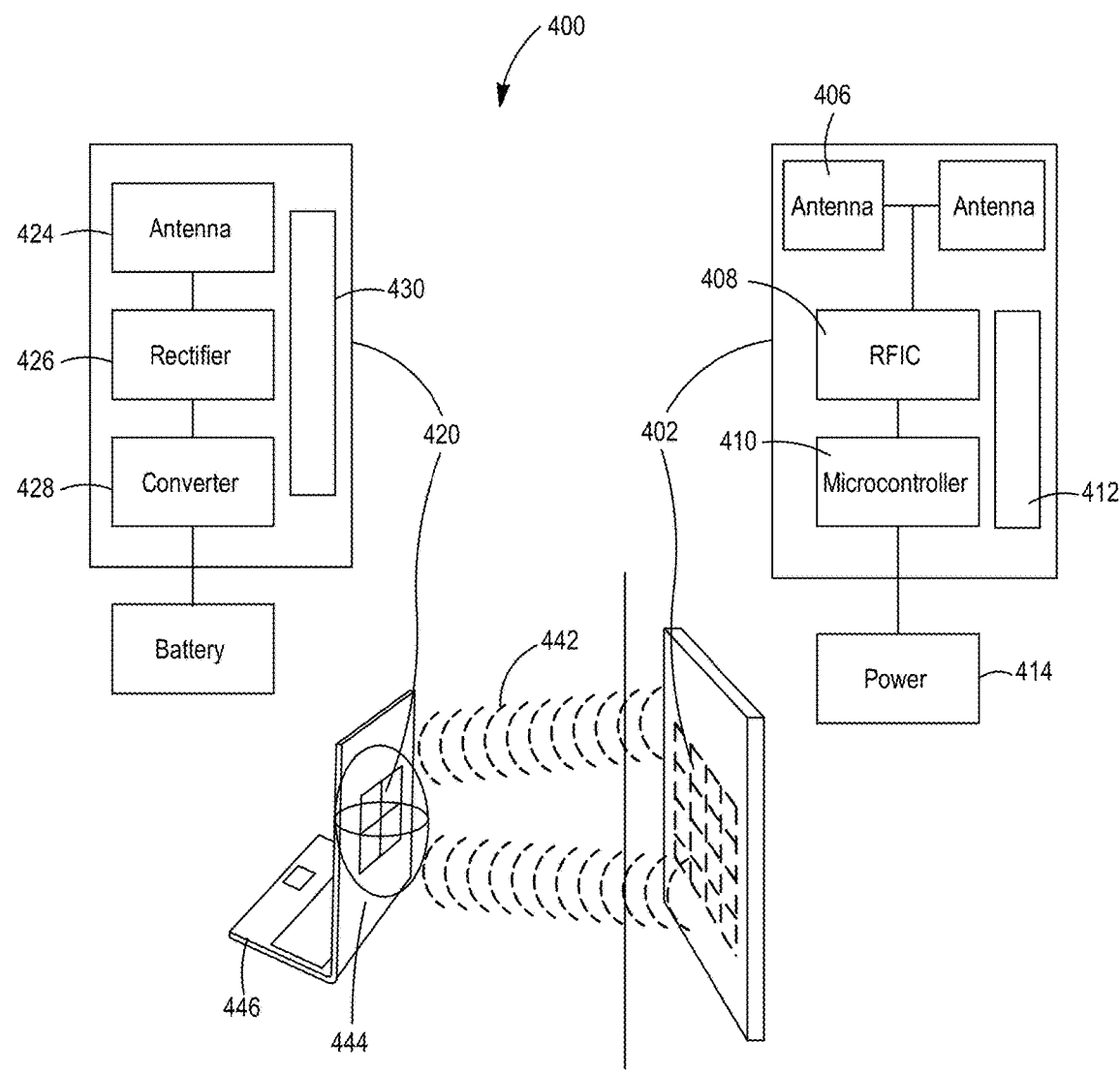
FIG. 4 illustrates components of a system of wireless power transmission using pocket-forming procedures, according to an exemplary embodiment.

FIG. 4 shows components of an exemplary system 400 of wireless power transmission using pocket-forming procedures. The system 400 may comprise one or more transmitters 402, one or more receivers 420, and one or more client devices 446.

1. Transmitters

Transmitters 402 may be any device capable of broadcasting wireless power transmission signals, which may be RF waves 442, for wireless power transmission, as described herein. Transmitters 402 may be responsible for performing tasks related to transmitting power transmission signals, which may include pocket-forming, adaptive pocket-forming, and multiple pocket-forming. In some implementations, transmitters 402 may transmit wireless power transmissions to receivers 420 in the form of RF waves, which may include any radio signal having any frequency or wavelength. A transmitter 402 may include one or more antenna elements 406, one or more RFICs 408, one or more microcontrollers 410, one or more communication components 412, a power source 414, and a housing that may allocate all the requested components for the transmitter 402. The various components of transmitters 402 may comprise, and/or may be manufactured using, meta-materials, micro-printing of circuits, nano-materials, and the like.

In the exemplary system 400, the transmitter 402 may transmit or otherwise broadcast controlled RF waves 442 that converge at a location in three-dimensional space, thereby forming a pocket of energy 444. These RF waves may be controlled through phase and/or relative amplitude adjustments to form constructive or destructive interference patterns (i.e., pocket-forming). Pockets of energy 444 may be fields formed at constructive interference patterns and may be three-dimensional in shape; whereas transmission null in a particular physical location may be generated at destructive interference patterns. Receivers 420 may harvest electrical energy from the pockets of energy 444 produced by pocket-forming for charging or powering an electronic client device 446 (e.g., a laptop computer, a cell phone). In some embodiments, the system 400 may comprise multiple transmitters 402 and/or multiple receivers 420, for powering various electronic equipment. Non-limiting examples of client devices 446 may include: smartphones, tablets, music players, toys and others at the same time. In some embodiments, adaptive pocket-forming may be used to regulate power on electronic devices.

2. Receivers

Receivers 420 may include a housing where at least one antenna element 424, one rectifier 426, one power converter 428, and a communications component 430 may be included. Housing of the receiver 420 can be made of any material capable of facilitating signal or wave transmission and/or reception, for example plastic or hard rubber. Housing may be an external hardware that may be added to different electronic equipment, for example in the form of cases, or can be embedded within electronic equipment as well.

3. Antenna Elements

Antenna elements 424 of the receiver 420 may comprise any type of antenna capable of transmitting and/or receiving signals in frequency bands used by the transmitter 402A. Antenna elements 424 may include vertical or horizontal polarization, right hand or left hand polarization, elliptical polarization, or other polarizations, as well as any number of polarization combinations. Using multiple polarizations can be beneficial in devices where there may not be a preferred orientation during usage or whose orientation may vary continuously through time, for example a smartphone or portable gaming system. For devices having a well-defined expected orientation (e.g., a two-handed video game controller), there might be a preferred polarization for antennas, which may dictate a ratio for the number of antennas of a given polarization. Types of antennas in antenna elements 424 of the receiver 420, may include patch antennas, which may have heights from about $1/8$ inch to about 6 inches and widths from about $1/8$ inch to about 6 inches. Patch antennas may preferably have polarization that depends upon connectivity, i.e., the polarization may vary depending on from which side the patch is fed. In some embodiments, the type of antenna may be any type of antenna, such as patch antennas, capable of dynamically varying the antenna polarization to optimize wireless power transmission.

4. Rectifier

Rectifiers 426 of the receiver 420 may include diodes, resistors, inductors, and/or capacitors to rectify alternating current (AC) voltage generated by antenna elements 424 to direct current (DC) voltage. Rectifiers 426 may be placed as close as is technically possible to antenna elements A24B to minimize losses in electrical energy gathered from power transmission signals. After rectifying AC voltage, the resulting DC voltage may be regulated using power converters 428. Power converters 428 can be a DC-to-DC converter that may help provide a constant voltage output, regardless of input, to an electronic device, or as in this exemplary system 400, to a battery. Typical voltage outputs can be from about 5 volts to about 10 volts. In some embodiments, power converter may include electronic switched mode DC-DC converters, which can provide high efficiency. In such embodiments, the receiver 420 may comprise a capacitor (not shown) that is situated to receive the electrical energy before power converters 428. The capacitor may ensure sufficient current is provided to an electronic switching device (e.g., switch mode DC-DC converter), so it may operate effectively. When charging an electronic device, for example a phone or laptop computer, initial high-currents that can exceed the minimum voltage needed to activate operation of an electronic switched mode DC-DC converter, may be required. In such a case, a capacitor (not shown) may be added at the output of receivers 420 to provide the extra energy required. Afterwards, lower power can be provided. For example, $1/80$ of the total initial power that may be used while having the phone or laptop still build-up charge.

5. Communications Component

A communications component 430 of a receiver 420 may communicate with one or more other devices of the system 400, such as other receivers 420, client devices, and/or transmitters 402. Different antenna, rectifier or power converter arrangements are possible for a receiver as will be explained in following embodiments.

E. Methods of Pocket Forming for a Plurality of Devices

1. Primary Configuration

FIG. 5 shows steps of powering a plurality of receiver devices, according to an exemplary embodiment. In a first step 501, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., Bluetooth®, BLE, Wi-Fi, NFC, ZigBee®). For example, in embodiments implement Bluetooth® or Bluetooth® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described later, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission waves. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

As an example, when a receiver comprising a Bluetooth® processor is powered-up or is brought within a detection range of the transmitter, the Bluetooth processor may begin advertising the receiver according to Bluetooth® standards. The transmitter may recognize the advertisement and begin establishing connection for communicating control signals and power transmission signals. In some embodiments, the advertisement signal may contain unique identifiers so that the transmitter may distinguish that advertisement and ultimately that receiver from all the other Bluetooth® devices nearby within range.

In a next step 503, when the transmitter detects the advertisement signal, the transmitter may automatically form a communication connection with that receiver, which may allow the transmitter and receiver to communicate control signals and power transmission signals. The transmitter may then command that receiver to begin transmitting real-time sample data or control data. The transmitter may also begin transmitting power transmission signals from antennas of the transmitter's antenna array.

In a next step 505, the receiver may then measure the voltage, among other metrics related to effectiveness of the power transmission signals, based on the electrical energy received by the receiver's antennas. The receiver may generate control data containing the measured information, and then transmit control signals containing the control data to the transmitter. For example, the receiver may sample the voltage measurements of received electrical energy, for example, at a rate of 100 times per second. The receiver may transmit the voltage sample measurement back to the transmitter, 100 times a second, in the form of control signals.

In a next step 507, the transmitter may execute one or more software modules monitoring the metrics, such as voltage measurements, received from the receiver. Algorithms may vary production and transmission of power transmission signals by the transmitter's antennas, to maximize the effectiveness of the pockets of energy around the receiver. For example, the transmitter may adjust the phase at which the transmitter's antenna transmit the power transmission signals, until that power received by the receiver indicates an effectively established pocket energy around the receiver. When an optimal configuration for the antennas is identified, memory of the transmitter may store the configurations to keep the transmitter broadcasting at that highest level.

In a next step 509, algorithms of the transmitter may determine when it is necessary to adjust the power transmission signals and may also vary the configuration of the transmit antennas, in response to determining such adjustments are necessary. For example, the transmitter may determine the power received at a receiver is less than maximal, based on the data received from the receiver. The transmitter may then automatically adjust the phase of the power transmission signals, but may also simultaneously continues to receive and monitor the voltage being reported back from receiver.

In a next step 511, after a determined period of time for communicating with a particular receiver, the transmitter may scan and/or automatically detect advertisements from other receivers that may be in range of the transmitter. The transmitters may establish a connection to the second receiver responsive to Bluetooth® advertisements from a second receiver.

In a next step 513, after establishing a second communication connection with the second receiver, the transmitter may proceed to adjust one or more antennas in the transmitter's antenna array. In some embodiments, the transmitter may identify a subset of antennas to service the second receiver, thereby parsing the array into subsets of arrays that are associated with a receiver. In some embodiments, the entire antenna array may service a first receiver for a given period of time, and then the entire array may service the second receiver for that period of time.

Manual or automated processes performed by the transmitter may select a subset of arrays to service the second receiver. In this example, the transmitter's array may be split in half, forming two subsets. As a result, half of the antennas may be configured to transmit power transmission signals to the first receiver, and half of the antennas may be configured for the second receiver. In the current step 513, the transmitter may apply similar techniques discussed above to configure or optimize the subset of antennas for the second receiver. While selecting a subset of an array for transmitting power transmission signals, the transmitter and second receiver may be communicating control data. As a result, by the time that the transmitter alternates back to communicating with the first receiver and/or scan for new receivers, the transmitter has already received a sufficient amount of sample data to adjust the phases of the waves transmitted by second subset of the transmitter's antenna array, to transmit power transmission waves to the second receiver effectively.

In a next step 515, after adjusting the second subset to transmit power transmission signals to the second receiver, the transmitter may alternate back to communicating control data with the first receiver, or scanning for additional receivers. The transmitter may reconfigure the antennas of the first subset, and then alternate between the first and second receivers at a predetermined interval.

In a next step 517, the transmitter may continue to alternate between receivers and scanning for new receivers, at a predetermined interval. As each new receiver is detected, the transmitter may establish a connection and begin transmitting power transmission signals, accordingly.

In one exemplary embodiment, the receiver may be electrically connected to a device like a smart phone. The transmitter's processor would scan for any Bluetooth devices. The receiver may begin advertising that it's a Bluetooth device through the Bluetooth chip. Inside the advertisement, there may be unique identifiers so that the transmitter, when it scanned that advertisement, could distinguish that advertisement and ultimately that receiver from all the other Bluetooth devices nearby within range. When the transmitter detects that advertisement and notices it is a receiver, then the transmitter may immediately form a communication connection with that receiver and command that receiver to begin sending real time sample data.

The receiver would then measure the voltage at its receiving antennas, send that voltage sample measurement back to the transmitter (e.g., 100 times a second). The transmitter may start to vary the configuration of the transmit antennas by adjusting the phase. As the transmitter adjusts the phase, the transmitter monitors the voltage being sent back from the receiver. In some implementations, the higher the voltage, the more energy may be in the pocket. The antenna phases may be altered until the voltage is at the highest level and there is a maximum pocket of energy around the receiver. The transmitter may keep the antennas at the particular phase so the voltage is at the highest level.

The transmitter may vary each individual antenna, one at a time. For example, if there are 32 antennas in the transmitter, and each antenna has 8 phases, the transmitter may begin with the first antenna and would step the first antenna through all 8 phases. The receiver may then send back the power level for each of the 8 phases of the first antenna. The transmitter may then store the highest phase for the first antenna. The transmitter may repeat this process for the second antenna, and step it through 8 phases. The receiver may again send back the power levels from each phase, and the transmitter may store the highest level. Next the transmitter may repeat the process for the third antenna and continue to repeat the process until all 32 antennas have stepped through the 8 phases. At the end of the process, the transmitter may transmit the maximum voltage in the most efficient manner to the receiver.

In another exemplary embodiment, the transmitter may detect a second receiver's advertisement and form a communication connection with the second receiver. When the transmitter forms the communication with the second receiver, the transmitter may aim the original 32 antennas towards the second receiver and repeat the phase process for each of the 32 antennas aimed at the second receiver. Once the process is completed, the second receiver may getting as much power as possible from the transmitter. The transmitter may communicate with the second receiver for a second, and then alternate back to the first receiver for a predetermined period of time (e.g., a second), and the transmitter may continue to alternate back and forth between the first receiver and the second receiver at the predetermined time intervals.

In yet another implementation, the transmitter may detect a second receiver's advertisement and form a communication connection with the second receiver. First, the transmitter may communicate with the first receiver and re-assign half of the exemplary 32 the antennas aimed at the first receiver, dedicating only 16 towards the first receiver. The transmitter may then assign the second half of the antennas to the second receiver, dedicating 16 antennas to the second receiver. The transmitter may adjust the phases for the second half of the antennas. Once the 16 antennas have gone through each of the 8 phases, the second receiver may be obtaining the maximum voltage in the most efficient manner to the receiver.

2. Determining Optimal Position for Pocket Forming

Figure 43:
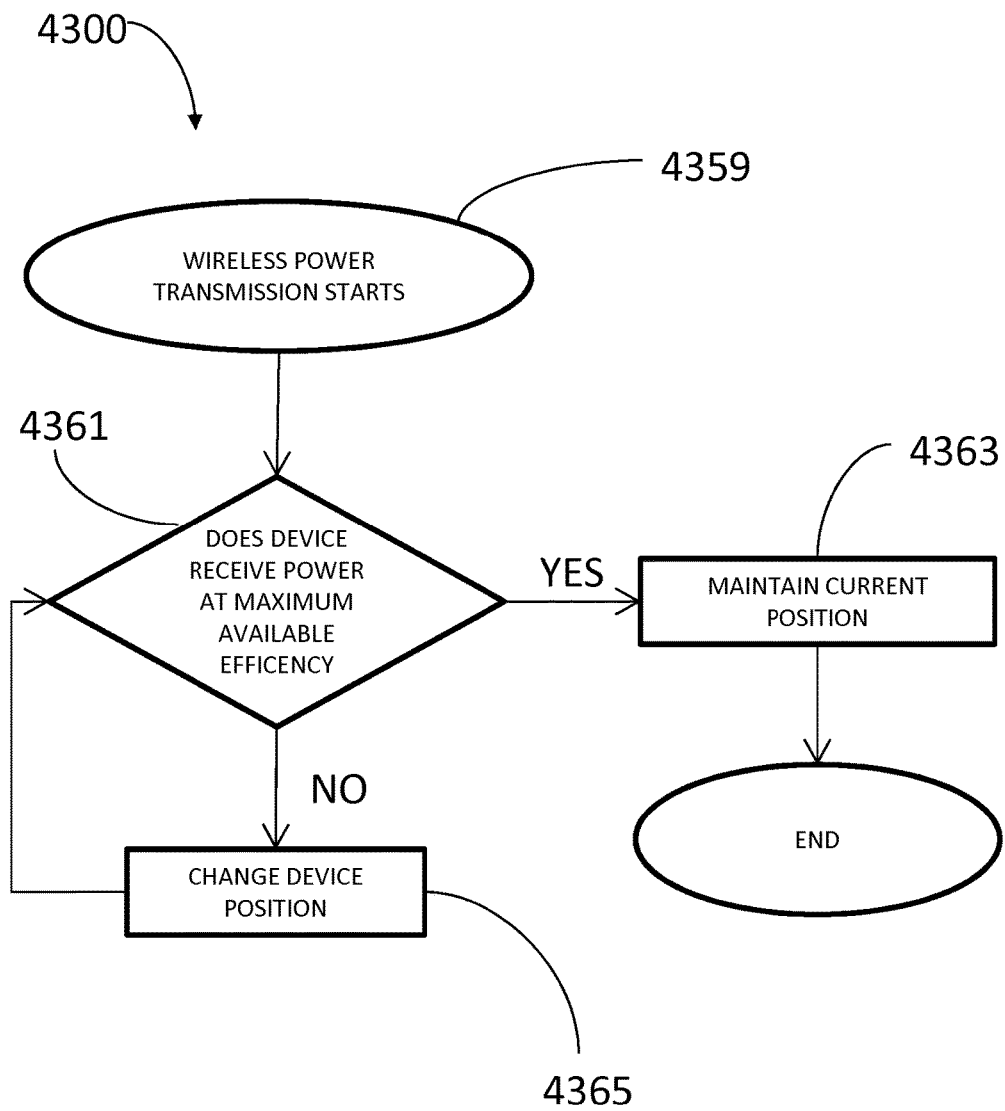
FIG. 43 illustrates a tracking and positioning flowchart, according to an exemplary embodiment.

FIG. 43 illustrates tracking and positioning flowchart 4300, which may be employed by an algorithm in a controller, CPU, processor, computer among others, for determining the optimal position and orientation of an electronic device which may receive power and/or charge through wireless power transmission. In order to achieve the optimal efficiency, electronic device may use a variety of sensors for determining the voltage level in battery and/or the power level received when wireless power transmission starts 4359. Such sensors may indicate whether the device is receiving power at the maximum available efficiency 4359. Examples of sensors and/or circuits to determine power efficiency may comprise one or more of: an accelerometer, an ambient light sensor, a GPS sensor, a compass, a proximity sensor, a pressure sensor, a gyroscope, an infrared sensor, a motion detector, OPS sensor circuit and/or any other type of sensor or circuit.

Maximum available efficiency may depend on distance from transmitter, obstacles, temperature, among others. If the device is receiving power at maximum available efficiency, then an application, software or program installed on the electronic device and/or in the receiver may aware and/or note user to maintain current position 4363. Moreover, if the device is receiving power at a lower efficiency than the maximum available efficiency, then software or program may use a variety of sensors for tracking and determining the optimal position of electronic device in relation with transmitter position and orientation. Sensors may include accelerometers, infrared, OPS, among others. Furthermore, a communication reciprocity may be used by the communication module for tracking and positioning. Communication module may include and combine Bluetooth technology, infrared communication, Wi-Fi, FM radio among others. By comparing voltage level and/or power received in each position and/or orientation of electronic device, the software and/or program may notify and/or guide user to change device position 4365 for looking the optimal position and/or orientation.

Figure 44B:
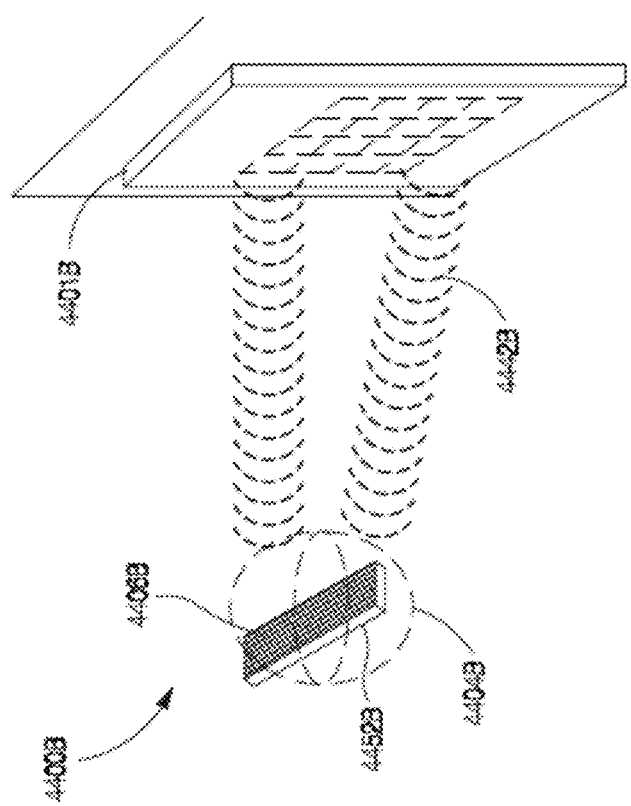
FIG. 44B illustrates wireless power transmission where a cellphones receives charge and/or power at low efficiency, according to an exemplary embodiment.
Figure 44A:
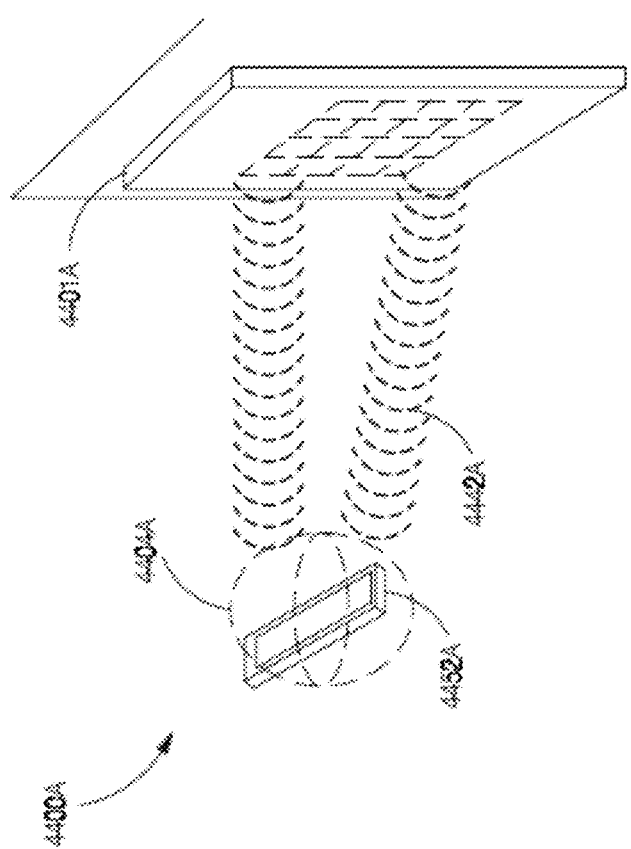
FIG. 44A illustrates wireless power transmission where a cellphones receives charge and/or power at low efficiency, according to an exemplary embodiment.

FIG. 44A illustrates wireless power transmission 4400A, where a transmitter 4401A may produce pocket-forming over plurality of cellphones 4452A. As depicted in FIG. 44A, wireless power transmission 4400A may charge and/or power cellphone 4452A at a low efficiency because antennas 4406B on the receiver may be faced to the same direction of the RF waves 4442B, thus pocket of energy 4404A may provide less charge and/or power to antennas 4406B.

FIG. 44B illustrates wireless power transmission where a cellphones receives charge and/or power at low efficiency, according to an exemplary embodiment. As shown in FIG. 44B, by turning cellphone 4452B 180° degrees, antennas 4406B may receive power at a higher efficiency, such efficiency may be achieved due the antennas 4406B orientation, which may be faced in the opposite direction of RF waves 4442B.

3. Receiver Initiating Charge

Figure 45:
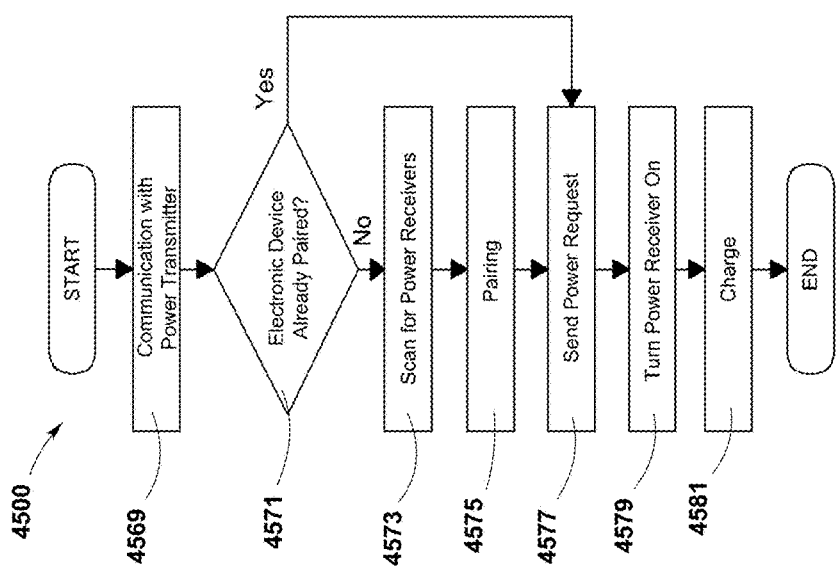
FIG. 45 illustrates a flowchart of a charge request process, according to an exemplary embodiment.

FIG. 45 is a flowchart of a charge request process 4500, according to an exemplary embodiment. Process 4500 may start when an electronic device, which includes a GUI for interacting with a wireless charging system, communicates 4569 with a power transmitter. During the communication the electronic device may send information to the power transmitter including device ID and charge status, amongst others. The power transmitter may update its database and may send a copy to the electronic device including the IDs of available power transmitters within the system. Then, the electronic device may check 4571 if its ID is already associated with the ID of a power receiver.

If the electronic device is not already paired, the electronic device may start scanning 4573 for power receivers. All the power receivers in the system may broadcast advertisement messages at any time. The advertisement messages may include a unique 32 bit device ID and a system ID or UUID (Universally Unique Identifier). In some embodiments, the advertisement messages may include additional information. The electronic device may be capable of monitoring the signal strength of the ads being broadcasted by the different power receivers and keep track of the proximity of the power receivers to the electronic device.

When the electronic device detects that a power receiver is within a range of proximity for a amount of time, it may proceed to check the database to determine if the power receiver is not already paired with another electronic device. If the power receiver is not already paired with another device the electronic device may update the database with the association of electronic device's ID with the ID of the power receiver during pairing 4575. Then, the electronic device may send a copy of the updated database to the power transmitter.

Once the electronic device is paired, a user, through the GUI in the electronic device, or the electronic may send a power request 4577 to the power transmitter. If the power transmitter finds it suitable to provide power to the electronic device, it may turn on 4579 the power receiver.

Afterwards, the power transmitter may aim the antenna array to the power receiver associated with the electronic device and start sending energy to the power receiver. The power receiver may then start charging 4581 the electronic device. Once the electronic device is charged, the process may end.

Figure 46:
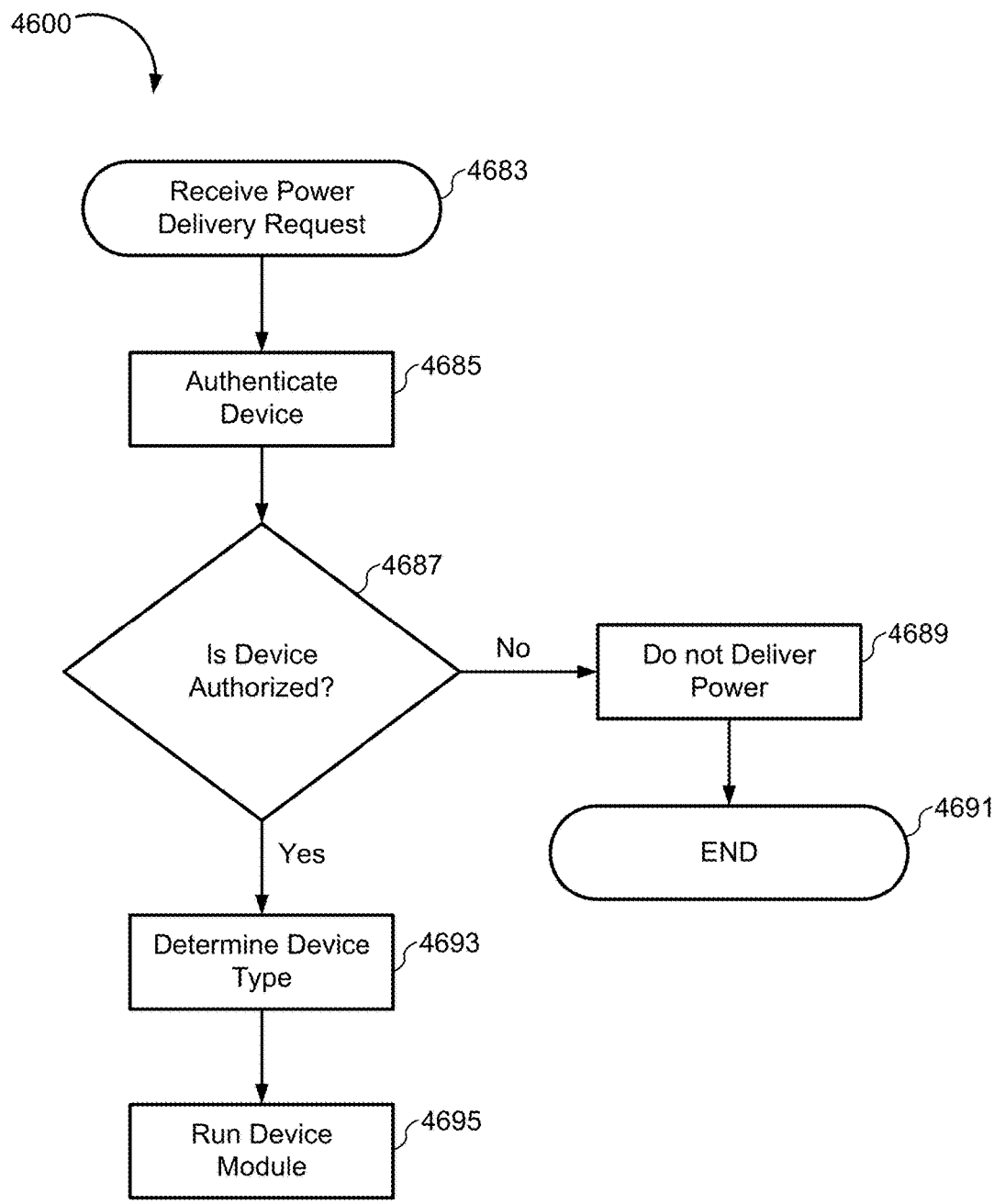
FIG. 46 illustrates an example routine that may be utilized by a micro-controller from transmitter to authenticate devices requiring wireless power transmission, according to an embodiment.

FIG. 46 illustrates an example routine 4600 that may be utilized by micro-controller from transmitter 4600 to control wireless power transmission. Routine 4600 may begin when transmitter 4600 receives a power delivery request 4683 from receiver. At power delivery request 4683, receiver may send a signature signal which may be coded using techniques such as delay encoding, orthogonal frequency-division multiplexing (OFDM), code division multiplexing (CDM) or other binary coding for identifying a given electronic device including receiver. At this stage, micro-controller may proceed to authenticate 4685 where it may evaluate the signature signal sent by receiver. Based on authenticate 4685, micro-controller may proceed to a decision 4687. If receiver is not authorized to receiver power, micro-controller may decide, at decision 4687, to not deliver power 4689, and thus end routine 4600 at end 4691. On the other hand, if receiver is authorized to receive power, micro-controller may proceed to determine device type 4693. At this step, micro-controller may obtain information from receiver such as type of device, manufacturer, serial number, total power required, battery level among other such information. Afterwards, micro-controller may proceed to run device module 4695, where it may run a routine suited to the authenticated device. In addition, if multiple receivers are requiring power, micro-controller may deliver power equally to all receivers or may utilize a priority status for each receiver. Such a priority status may be user defined. In some embodiments, the user may choose to deliver more power to its smartphone, than to its gaming device. In other cases, the user may decide to first power its smartphone and then its gaming device.

Figure 47:
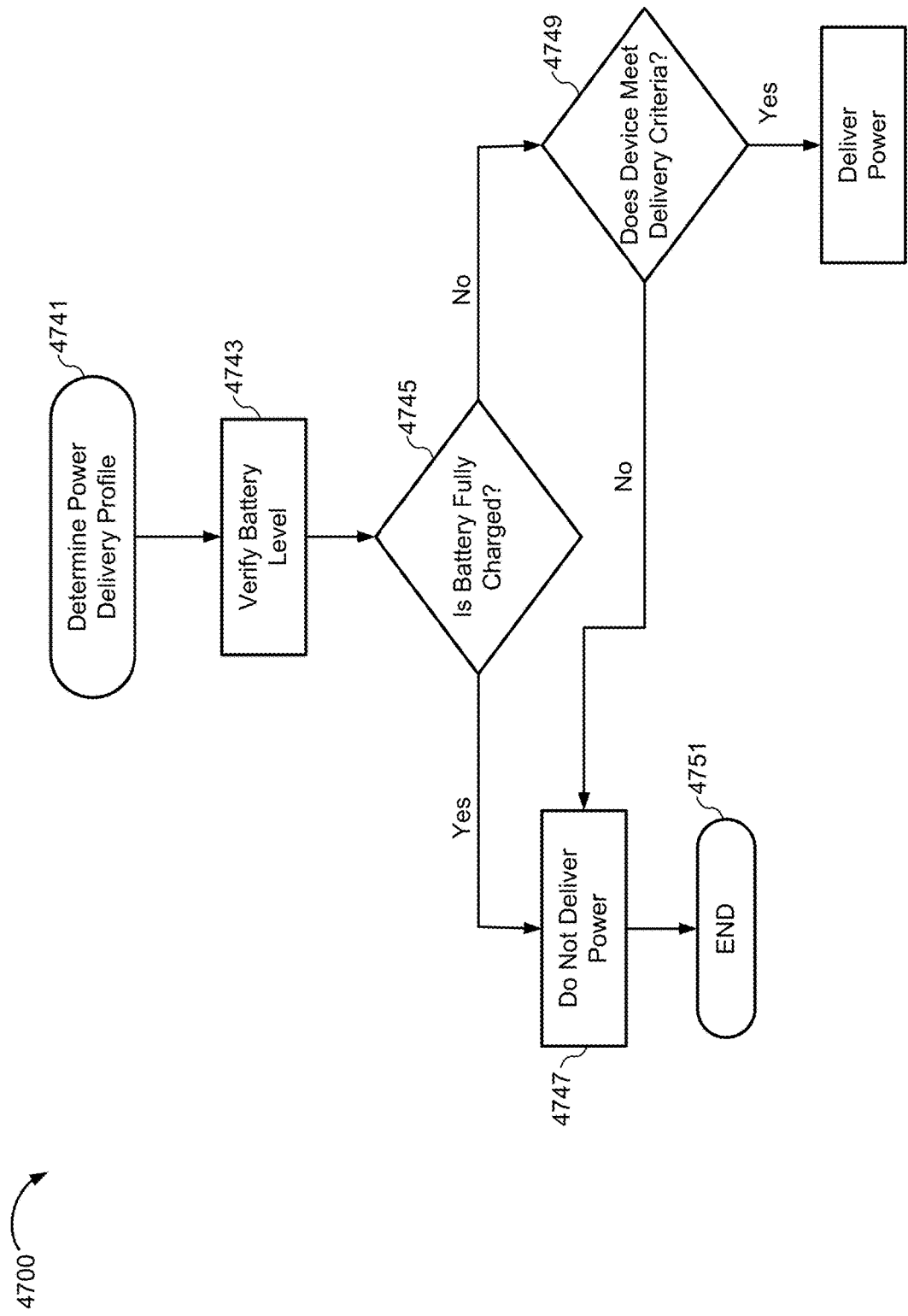
FIG. 47 illustrates an example routine that may be utilized by a micro-controller from transmitter to deliver power to devices previously authenticated in the routine, according to an embodiment.

FIG. 47 illustrates an example of a routine 4700 that may be utilized by micro-controller at device module. Routine 4700 may start at determine power delivery profile 4741 where it may decide to either run on a default power profile or a user custom profile. In the case of the former, micro-controller may proceed to verify battery level 4743 where it may determine power needs of the electronic device including receiver. Afterwards, micro-controller may proceed to a decision 4745. If the battery of the electronic device including receiver is fully charged, at decision 4745, micro-controller may proceed to don't deliver power 4747, and thus end routine 4700 at end 4751. On the other hand, if the battery of the electronic device including receiver is not fully charged, micro-controller may proceed to verify if such electronic device meets specific powering criteria at decision 4749. The foregoing powering criteria may depend on the electronic device requiring power. For example, smartphones may only receive power if are not being used, or maybe during usage but only if the user is not talking through it, or maybe during usage as long as Wi-Fi is not compromised among other such criteria. In the case of a user custom profile, the user may specify the minimum battery level its equipment can have before delivering power, or the user may specify the criteria for powering his or her device among other such options.

Alternatively, micro-controller may also record data on a processor on transmitter. Such data may include powering statistics related to how often does a device require power, at what times is the device requesting power, how long it takes to power the device, how much power was delivered to such device, the priority status of devices, where is the device mostly being powered (for example at home or in the workplace). In addition, such statistics could be uploaded to a cloud based server so that the user can look at all such statistics. In some embodiments, stores, coffee shops and the like providing wireless power as a secondary service may use the aforementioned statistics for charging a user the corresponding monetary amounts for the total power received. In some cases, users may buy powering time, for example, a user may pay for an hour of power. Thus, the aforementioned statistics can help micro-controller decide when to stop delivering power to such a user.

4. Transmitter Initiating Charge

Figure 48:
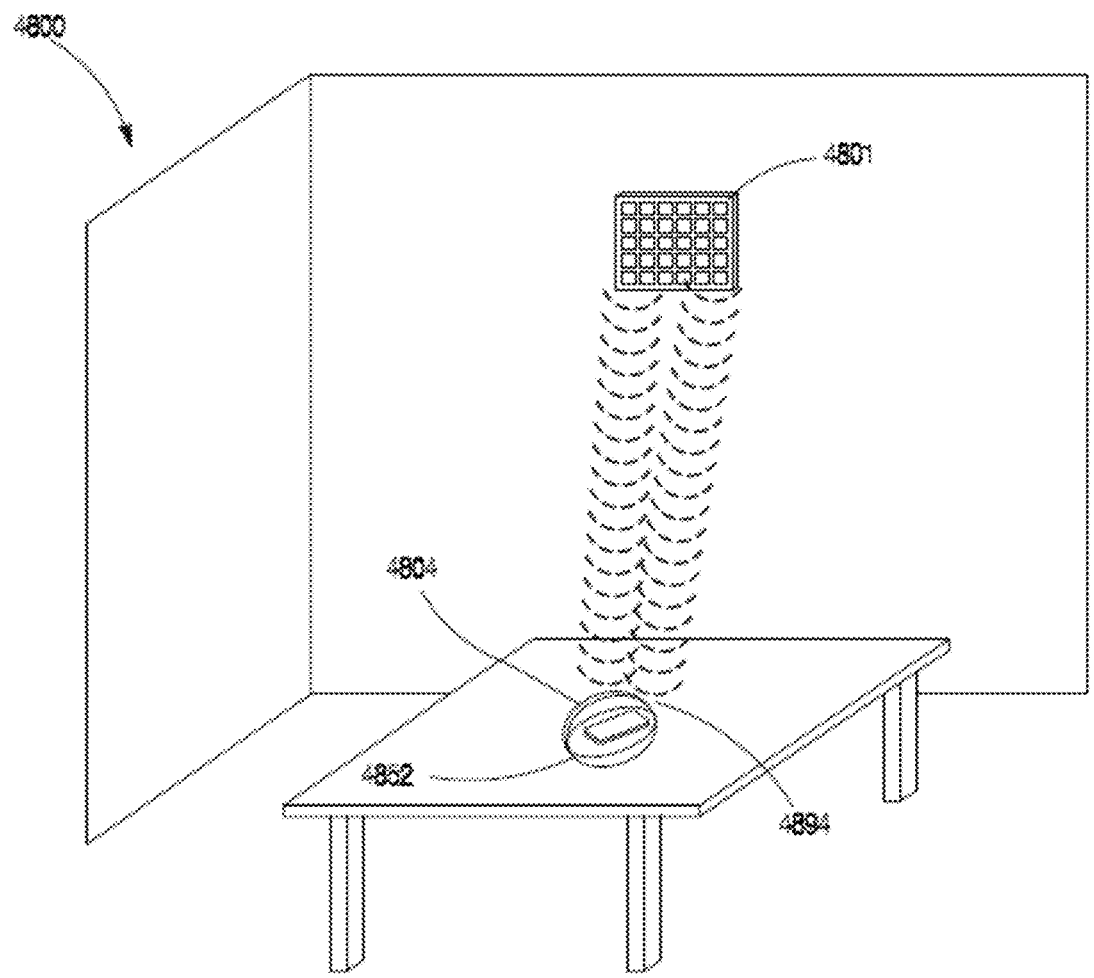
FIG. 48 illustrates a transmitter creating at least one pocket of energy on a portable mat which may further re-direct power to other receiving devices, according to an exemplary embodiment.

FIG. 48 illustrates a transmitter creating at least one pocket of energy on a portable mat which may further re-direct power to other receiving devices, according to an exemplary embodiment. FIG. 48 illustrates an alternative configuration to WPT in the form of a wireless power transmission 4800 where a transmitter 4801 may create at least one pocket of energy 4804 on a portable mat 4894. Mat 4894 may include at least one receiver and at least one transmitter (not shown) for receiving wireless power from transmitter 4801 and re-transmitting such power, through pocket-forming, to a device, for example a smartphone 4852 operatively coupled to a receiver (not shown). In some embodiments, mat 4894 may communicate to transmitter 4801 through short RF signals sent through its antenna elements or via standard communications protocol. The foregoing may allow transmitter 4801 to easily locate mat 4894. The disclosed configuration may be beneficial whenever smartphone 4852 may not be able to communicate directly to transmitter 4801. This configuration may also be beneficial because mat 4894 can be placed virtually in any desirable and easy to reach location. Lastly, transmitter 4801 may include a button (not shown) similar to that of transmitter 4801 which upon activation may produce pocket of energy 4804 upon mat 4894. The duration of pocket of energy 4804 upon mat 4894 can be custom defined to suit the needs of various users, An even further advantage of WPT can be that other devices may be placed in the vicinity of mat 4894 and can too receive power wirelessly, i.e. electronic devices requiring charge may not even be required to be placed upon mat 4894.

Figure 49B:
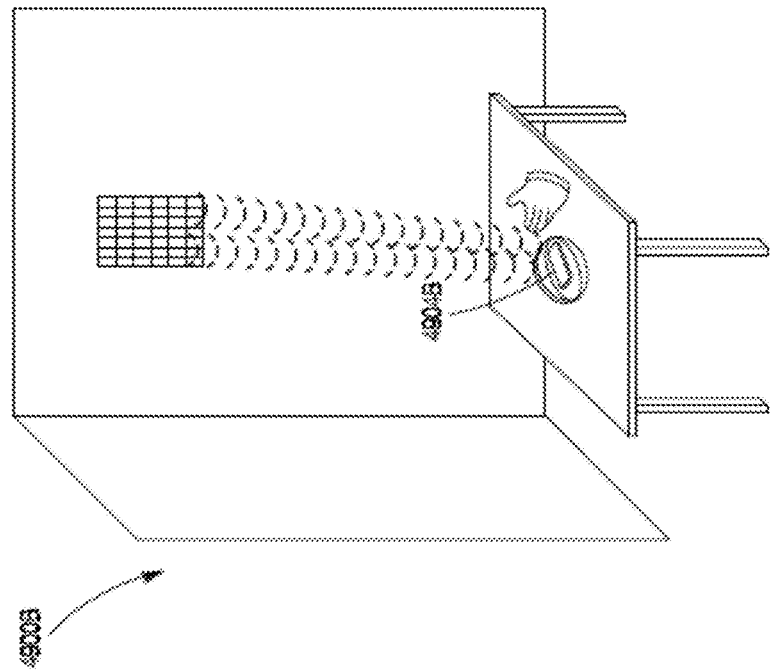
FIG. 49B illustrates a wireless power transmission including a tracer which may serve for establishing desired locations for the generation of pockets of energy over at least one receiving device, according to an exemplary embodiment.
Figure 49A:
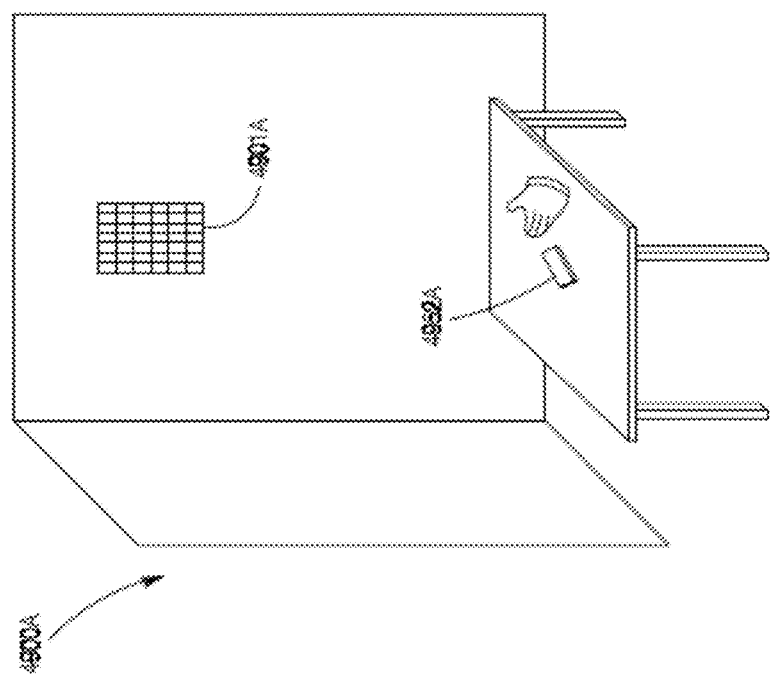
FIG. 49A illustrates a wireless power transmission system including a tracer which may serve for establishing desired locations for the generation of pockets of energy over at least one receiving device, according to an exemplary embodiment.

FIG. 49 includes FIG. 49A and FIG. 49B which depict a wireless power transmission 4900A. Referring first to FIG. 49A, a smartphone 4952A operatively coupled to a receiver (not shown) may be out of usable power and may not be able to communicate with a transmitter 4901A. In this embodiment, a tracer can be used to communicate to transmitter 4901A the locations at which power should be delivered. Tracer can include a communications component within it (not shown), as those described above for transmitters and receivers, for communicating the foregoing locations to a transmitter 4901A. Such communications component may become active at the user's request. For example, tracer can include an activation button (not shown) which after being pressed may activate the aforementioned communications component.

FIG. 49B illustrates a wireless power transmission including a tracer which may serve for establishing desired locations for the generation of pockets of energy over at least one receiving device, according to an exemplary embodiment.

Following this activation, communications component may send a request to transmitter 4901A for creating a pocket of energy 4904B at the location of tracer. In order to charge smartphone 4952A, users may activate tracer at the same or approximate location of smartphone 4952A (FIG. 49B). Upon building the necessary charge, smartphone 4952A may optionally communicate its location to transmitter 4901A (by its own means) to continue the wireless delivery of power. In other embodiments, pockets of energy 4904B can be created at areas or regions of space which may be beneficial or easy to reach for users but where no electronic devices may be present. In this case, electronic devices requiring charge such as smartphone 4952A can be moved to the foregoing locations for utilizing pockets of energy 4904B. The duration of pockets of energy 4904B, at the absence of electronic devices requiring charge, may be custom defined by users. In some other embodiments, the duration of pockets of energy 4904B can be given by the operation of tracer, for example, at least one pocket of energy 4904B can be generated upon activating tracer. Such pocket of energy 4904B may remain active until a second press of the activation button of tracer.

In the foregoing configuration of wireless power transmission, electronic devices such as smartphone 4952A can utilize smaller and cheaper receivers. The foregoing can be accomplished because receivers may not require a communications components on their own for communicating locations to transmitter 4901A. Rather, tracer can be used to perform such function. In some other embodiments, tracer can take the form of accessories which may connect to electronic via connections such as Universal Serial Bus (USB). In this case, tracer may become active upon being connected to a device, and may control the totality of the wireless delivery of power. In some embodiments, users may create as many pockets of energy 4904B as devices requiring charge.

Figure 50:
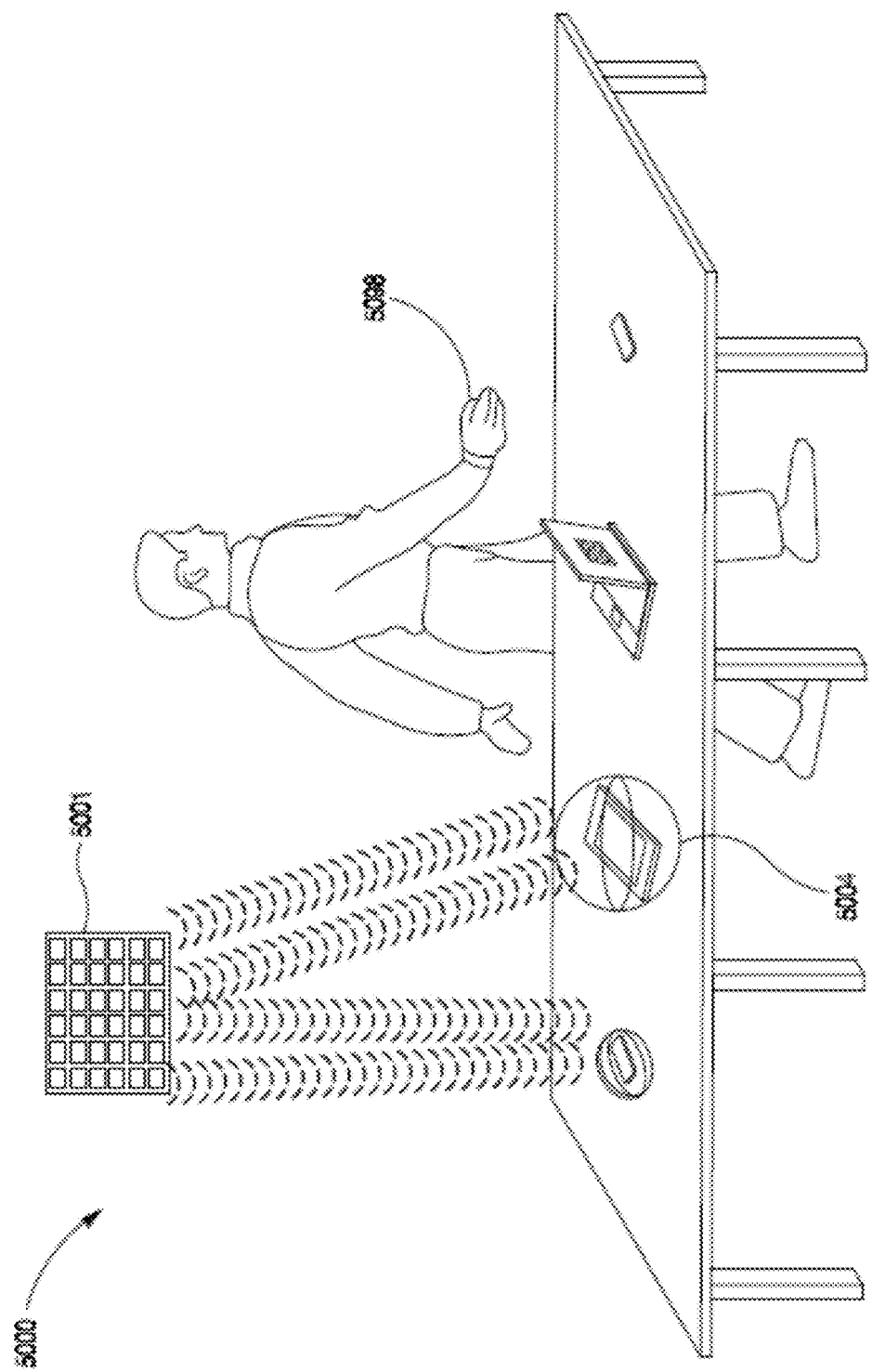
FIG. 50 illustrates a wireless power transmission including a tracer which may serve for establishing desired locations for the generation of pockets of energy over a plurality of receiving devices, according to an exemplary embodiment.

FIG. 50 illustrates a wireless power transmission 5000 where a user carrying a tracer 5098 may create various pockets of energy 5004 in different locations for powering various electronic devices which may include receivers for pocket-forming. Pockets of energy 5004 may be formed by a transmitter 5001, at the request and locations the user Specifies. In addition, once devices build up charge they may optionally communicate their location to transmitter 5001 (by their own means) to continue the wireless delivery of power.

5. Powering Multiple Devices Utilizing Time Division Multiplexing

Figure 51:
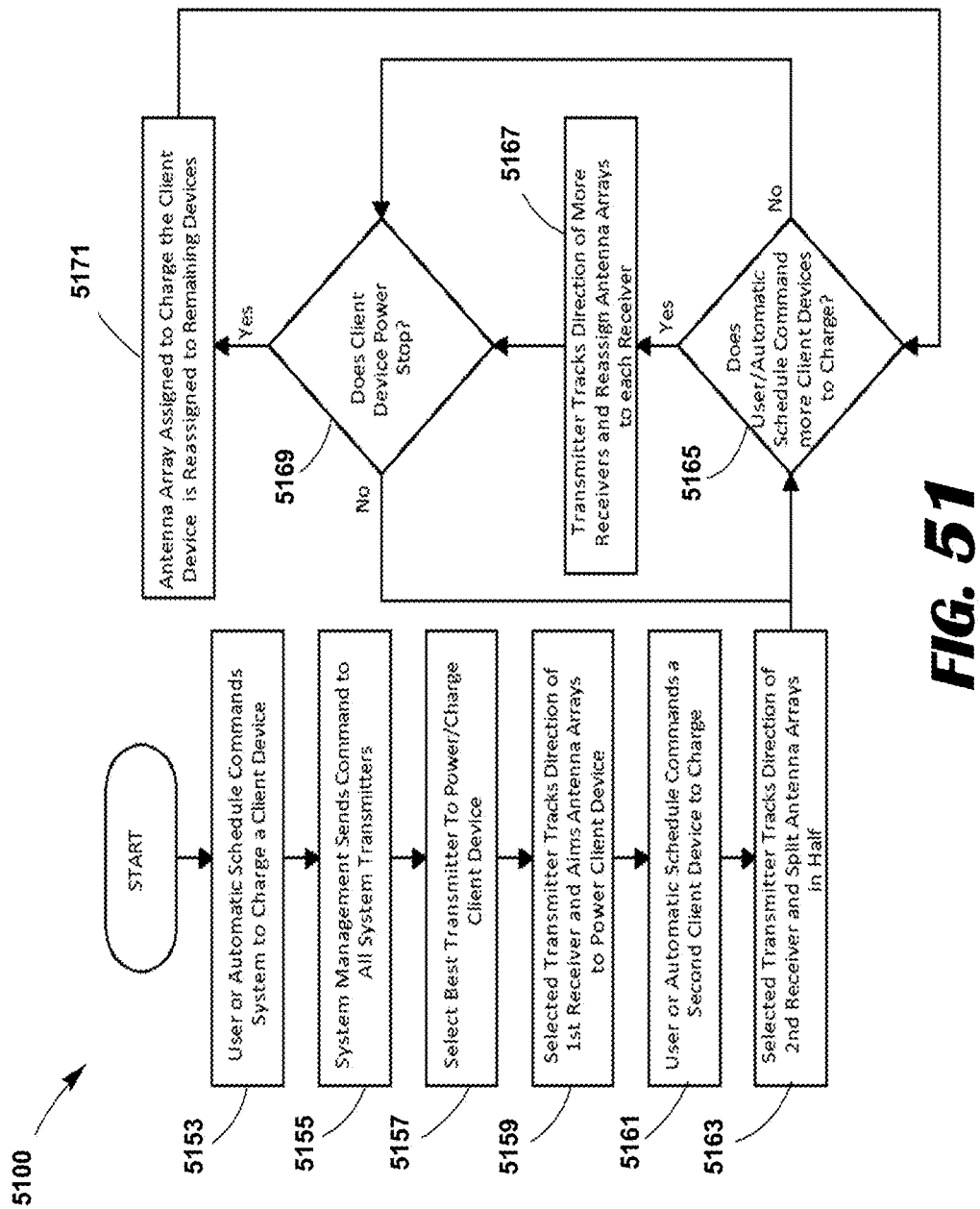
FIG. 51 illustrates a flowchart showing a method for automatically assigning subsets of antenna arrays for simultaneously powering two or more client devices, according to an exemplary embodiment.

FIG. 51 illustrates a flowchart showing a method for automatically assigning subsets of antenna arrays for simultaneously powering two or more client devices, according to an exemplary embodiment.

Method 5100 may start when a user or system operator accesses the system management GUI, through a web site or on a client computing device, to command 5153 the wireless power transmission system to charge a client device that may be paired with an adaptable paired receiver or a client device that may include a wireless power receiver built in as part of the hardware of the device. In other embodiments, the system automatic charge schedule may also command the wireless power transmission system to charge a client device. Subsequently, the system management may send charging command 5155 to all system transmitters. Each system transmitter may determine if it is within power range of said power receiver, and, if not, may select 5157 best transmitter to control wireless power receiver of client device to power, subsequently, selected transmitter may start real-time communication with wireless power receiver to track 5159 direction of wireless power receiver relative to transmission antenna array, aims entire power transmission antenna array at wireless power receiver, and starts power transmission. Wireless power receiver may then receive said power, and subsequently power client device.

Following method 5100, user or automatic schedule software may command 5161 a second client device to charge, subsequently, selected transmitter may start real-time communication with second client device's receiver to track direction of second wireless power receiver and split 5163 transmitter's antenna array in half so that the transmitter may aim and use half, or a subset of, the power antenna array to power first client device, and aim and use the remaining antennas to power second client device, so that both client devices may continually receive power. Then, if the user or automatic schedule software command more client devices to charge, at decision 5165, then selected transmitter may start real-time communication with a third or more client devices and reassign 5167 its antenna arrays by splitting said antenna arrays in subsets of antennas to aim and power each receiver. If there are no more client devices to charge, the system manager may check if any of the client devices being charged or powered stops powering, at decision 5169, subsequently, if one or more client devices stops power, then the subset of antenna arrays assigned to power said client device's receiver may be re-distributed 5171 among the remaining client devices' receivers to continue powering said receivers. This process may happen almost instantaneously for the devices being powered because the transmitter software is already tracking and immediately uses their exact direction relative to the antenna array. If no client device stops power, then the system manger may check again, at decision 5165, if there are more client devices to charge and follow the same steps previously described. This method may continue in a loop as long as the wireless power system is charging or powering one or more client device's receiver.

Figure 52:
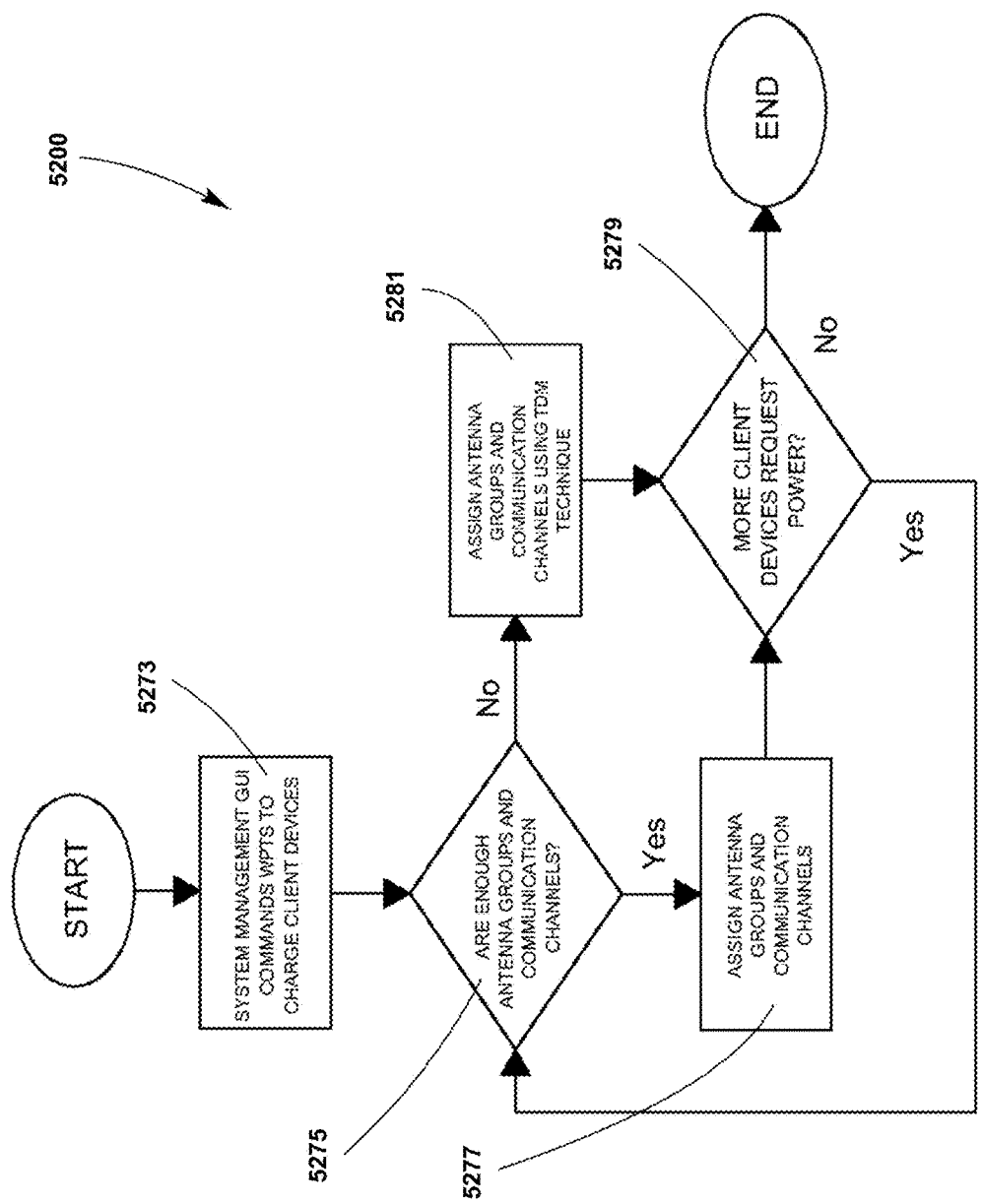
FIG. 52 illustrates a flowchart of an exemplary routine that may be utilized by wireless power management software, which may be initiated by system management GUI to command system to charge one or more client devices, according to an exemplary embodiment.

FIG. 52 illustrates a flowchart of an exemplary routine 5200 that may be utilized by wireless power management software, which may be initiated by system management GUI to command system to charge one or more client devices at step 5273. System management may distribute command to all system transmitters managed by wireless management software. Then, based on the number of client devices to be charged, management software may determine if there are enough antennas and communication channels available, at decision 5275. If there are enough antennas and communication channels for charging the client devices, then at step 5277, management software may assign the closest transmitter to charge client device and may assign a dedicated communication channel to start communication with the client device, which may be to continuously track client device direction from power transmission antenna array, or to monitor battery levels, or to receive measurements or other telemetry or meta data from receiver, or any other functionality to support wireless power transmission. Dedicated communication channel may be selected from available channels for communication with client devices.

Subsequently, wireless management software may continue charging client devices until more devices request power, at decision 5279. If there are no additional client devices requesting power, then routine 5200 may end. However, if more devices are requesting power, then at decision 5279, wireless power manager may determine if there are enough antennas and communication channels available for the new client devices. If there are not enough antennas and communication channels, then at step 5281, wireless power manager may assign all or groups of antennas from the antenna array and communication channels by employing Time Division Multiplexing (TDM).

TDM is used for transmitter communication with more power receivers than it has channels for, by sharing the available channels over time. It takes turn communicating to each receiver, communicating with each one for a finite amount of time, which may be a short amount of time such as 1 second or less. By allowing frequent communication with all receivers, by sharing the limited number of transmitter communication channels, the transmitter can then track and/or power all those receivers (and subsequently the client devices that power receivers transmit electrical power to).

TDM also supports sharing the power transmission from the entire transmitter antenna array between all the devices over time. That is, as the transmitter automatically switches communication throughout the receivers scheduled to receiver power, so that the transmitter can track receiver direction (angle) relative to transmitter antenna array, it also rapidly re-directs the antenna array from one receiver to another, so that each scheduled receiver periodically gets the antenna power, during its 'time slice.' The transmitter may also direct an individual group (sub-set) of antennas to a specific receiver while simultaneously directing one or more other groups to one or more other receivers.

TDM may be employed for allowing charge and more specifically communication between transmitters and power receivers of client devices, by using the existing communication channels, which may be shared by more than one device instead of being dedicated channels. By using TDM techniques wireless power transmitter may allow to re-assign one or more of its individual transmission antennas and communication channels to certain group of client devices, which may be in an online mode, consequently, being simultaneously powered. The remaining client devices may be turned in an offline mode, while online client devices are powered and hold a communication channel in a limited interval of time.

Subsequently, wireless power manager may continue charging client devices until more devices request power, at decision 5279. Finally, if there are no additional client devices requesting power at decision 5279, then routine 5200 may end.

Figure 53:
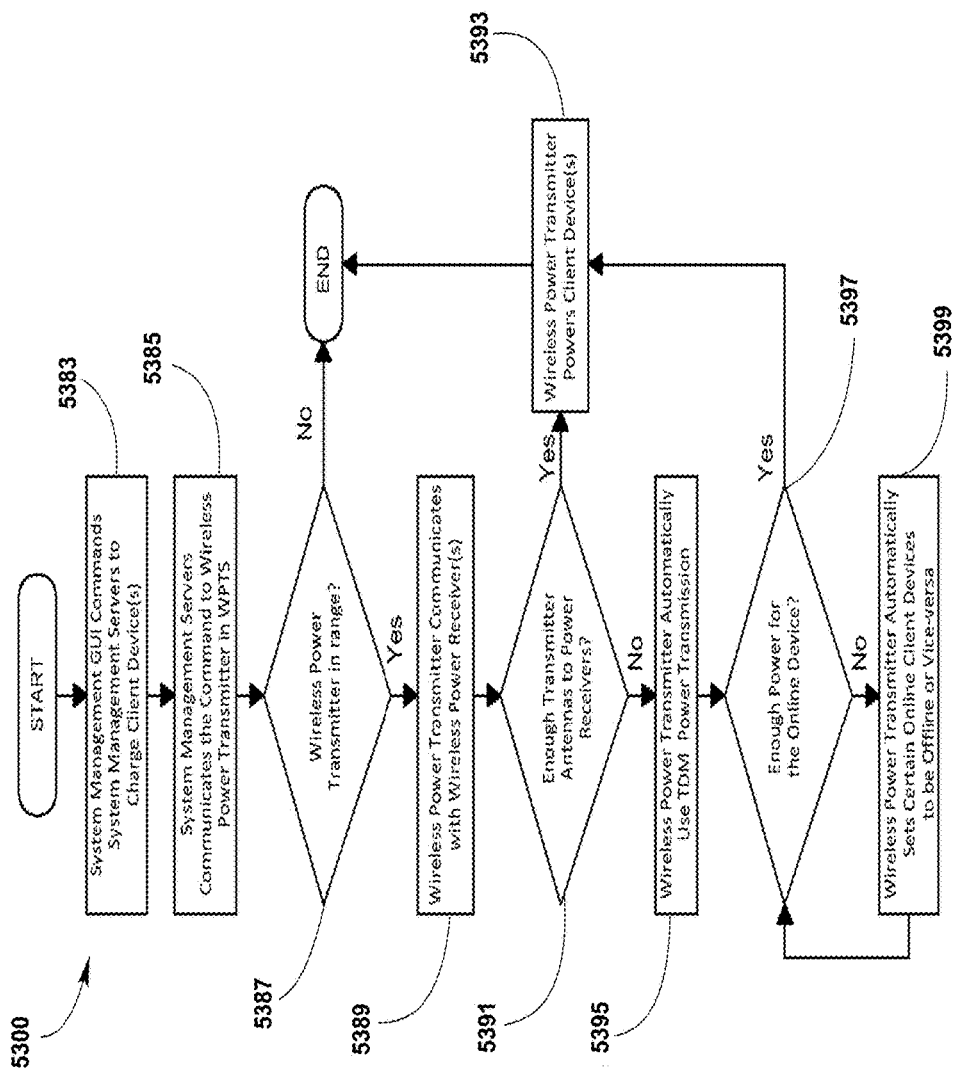
FIG. 53 illustrates a flowchart of a process to power a plurality of client devices using a time division multiplexing (TDM) method in a wireless power transmission system, according to an embodiment.

FIG. 53 is a flowchart of a process 5300 to power a plurality of client devices using a time division multiplexing (TDM) method in a wireless power transmission system, according to an embodiment. Process 5300 may start when a system management GUI operated by a user in a wireless power transmitter system may command a system management server to manually or automatically power one or more client devices from wireless power receivers, at step 5383. Subsequently, the system management server may communicate the commands to one or more wireless power transmitters in the wireless power transmission system, at step 5385.

Each wireless power transmitter may examine a local system distributed database or other storage means of system status, control and figuration to determine if the transmitter is within the power range of client device, at step 5387, and may control the wireless power receiver of the client device that has been commanded to receive power. If the wireless power receiver of the client device is not within the power range of wireless power transmitters then the process may end. However, if the wireless power receiver of the client device is within the power range of any wireless power transmitter, then said wireless power transmitter may start real-time communication with the wireless power receiver of the client device, at step 5389. Each time that there is one or more client devices commanded for wireless power transmitters to be powered, then wireless power transmitters may re-divide its power transmission antennas into groups, where each group may be assigned for each client device allowing to power all client devices at the same time.

Afterwards, system management server within the wireless power transmission system may command to wireless power transmitters if there are enough transmitter antennas to power all the wireless power receivers of the client devices within the power range, at step 5391. If transmitter antennas within the wireless power transmitters, are able to meet the power demand of all wireless power receivers, then the wireless power transmitters may continue powering all client devices, at step 5393. However, if the present power resources of wireless power transmitter do not meet the power demand of all wireless power receivers, then system management server may command to power transmitter manager to implement the TDM power transmission within the wireless power transmitters, at step 5395. The wireless power manager within the wireless power transmitter may receive the command about the client device to be powered, and may determine which wireless power receiver is associated with the client device.

Wireless power transmitter by using TDM power transmission groups or re-assigns one or more of its transmission antennas so that each group sends power to a different wireless power receiver, so that the client devices of the receivers simultaneously receiver power. The remaining client devices with wireless power receivers may be set to offline mode, while online client devices are powered. TDM power transmission system may determine if there is enough power for the online client devices, at step 5397. If there is not enough power for the online client devices, that is, one or more client devices may not be receiving enough power, then the wireless power transmitter will set one or more online client device to be offline, and try again, and then proceed by taking more devices offline until all the online client devices receive enough power.

The TDM power transmission process may allow wireless power transmitter to power all client devices enough at regular intervals of time (or time slots) using an automatic on/off line process, at step 5399.

Similarly, if there is not enough power for the present online client devices, then one by one the client devices that have been online for the longest may be turned offline until all online client devices get enough power. However, if the client devices that are in the online mode receive enough power, then the TDM power transmission may decide to keep the same amount of client devices in online mode and power them, at step 5393.

Figure 54:
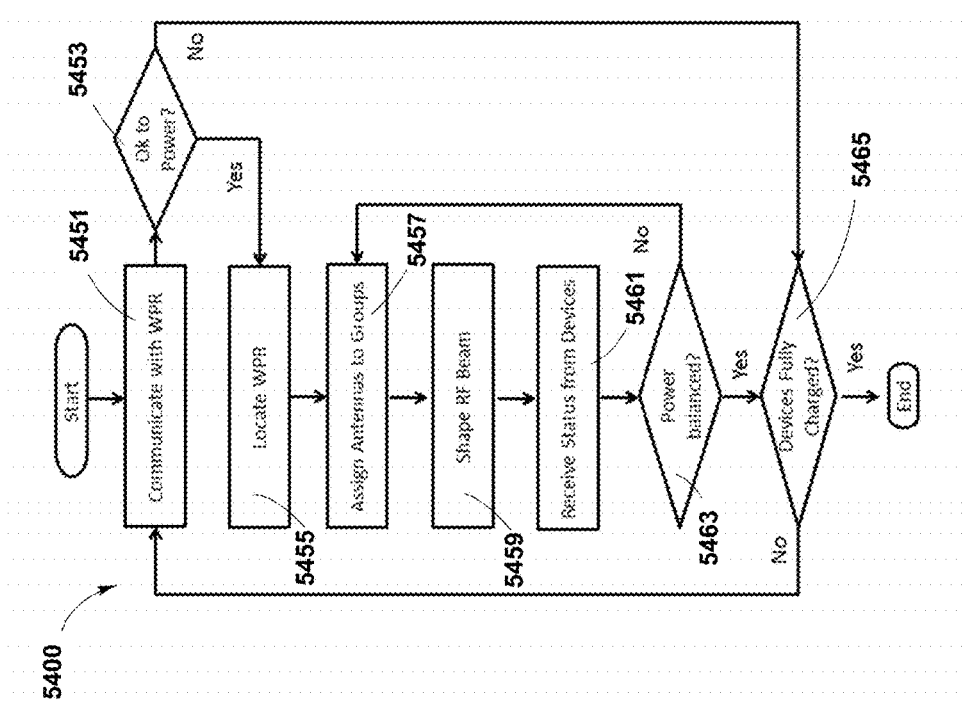
FIG. 54 illustrates a flowchart of a process for adjusting the numbers of antennas assigned to a wireless power receiver so power transmission from a wireless power transmitter to a receiver is more balanced, according to an exemplary embodiment.

FIG. 54 is a flowchart of a process 5400 for adjusting the numbers of antennas assigned to a wireless power receiver so power transmission from a wireless power transmitter to a receiver is more balanced. Process 5400 may be part of an overall process for wireless power transmission, and may performed by a microprocessor, that may be part of system architecture. Process 5400 may be performed by the processor by executing software code in a power transmission management application such as power transmitter manager app. In some embodiments, the processor may perform process 5400 by executing instructions laid out in a wireless power manager application, in yet other embodiments, the processor may perform process 5400 by executing instructions laid out in a software application that may not be part of system architecture.

The code executed by the microprocessor may cause several components included in system architecture to initiate or terminate an activity. Hardwired circuitry, alternative to those shown in system architecture, may be used in place of or in combination with software instructions to implement processes described here. Thus, implementations described here are not limited to any specific combination of hardware circuitry and software. While the blocks in the disclosed process 5400 are shown in a particular order, the actual order may differ. In some embodiments, some steps may be performed in parallel.

The process may begin at step 5451, when a processor commands a wireless power transmitter (WPT) communicates with a wireless power receiver (WPR) that is close enough to establish communication with the WPT. The WPR may communicate data to the WPT that may include the WPR's identification number, WPR's approximate spatial location, and WPR's power status, among others. At step 5453, the processor may determine from the received data and additional data that may be stored in a database, such as database, whether the WPT should transmit power to the WPR. If the processor determines that the WPT should not power the WPR, it may continue to look, at step 5465, for more wireless power receivers that are in range and should be powered. If the processor determines that the WPT should power the WPR, then at step 5455, the processor may calculate a better approximation of the location of the WPR by using the approximate spatial location data received from the WPR and additional metrics that may include signal strength, WPT type, and device type that the WPR may be attached to, among others.

At step 5457, the processor may command the WPT to assign a set of antennas, from the antenna array, which may be used to transmit RF waves to the WPR. At step 5459, the processor may command the WPT to modify amplitude, and phase, among other parameters of the transmitted RF waves to shape a beam that may be focused on the WPR. At step 5461, the processor may read status data that may come from the WPR. Status data coming from the WPR may include, measurement of energy being received by the WPR, power level of the WPR, the perceived spatial location of the WPR, and the minimum power that is enough to power the electronic device to which the WPR may be attached, among other operational parameters. In some embodiments, the minimum power setting may come from other source, such as look-up tables elsewhere in the system.

At step 5463, the processor may use the information read and determine if the power transmitted to a WPR is unbalanced compared to other WPR's, or if any WPR is getting too much or too little power. If the power received by the WPR is less than the minimum power, the processor may command the WPT, back at step 5457, to assign more antennas to the set of antennas that may be in use to power the WPR. In some embodiments, if the number of antennas available is not enough to power the WPR, the WPT may utilize techniques such as time division multiplexing, to share more antennas with the WPR to meet the power demand of the WPR that may be within the power range of one or more wireless power transmitters. A technique such as time division multiplexing may allow to charge multiple WPR's through regular intervals of time or slot time during an automatic online mode and offline mode sequence.

If the power received by a WPR is substantially more than its required minimum power, the processor may command the WPT, back at step 5457, to reduce the number of antennas assigned to the WPR, and use the de-assigned antennas to power other WPR's, allowing the first WPR to continue to be wirelessly powered simultaneously. At step 5465, the processor may look for another wirelessly powered receiver that is in range and should be powered, and if found, the process may initiate communication with the new WPR, back at step 5453, and process from step 5453 may repeat. When the processor determines from communication with the WPR, that the WPT is done transmitting power the WPR, it may communicate to the WPR, back at step 5451, that the power transmission has ended, and may disconnect communication at step 5453. The WPT may then, at step 5465, examine the database to determine which, if any, WPR is in range that the WPT should transmit power to.

Figure 55A:
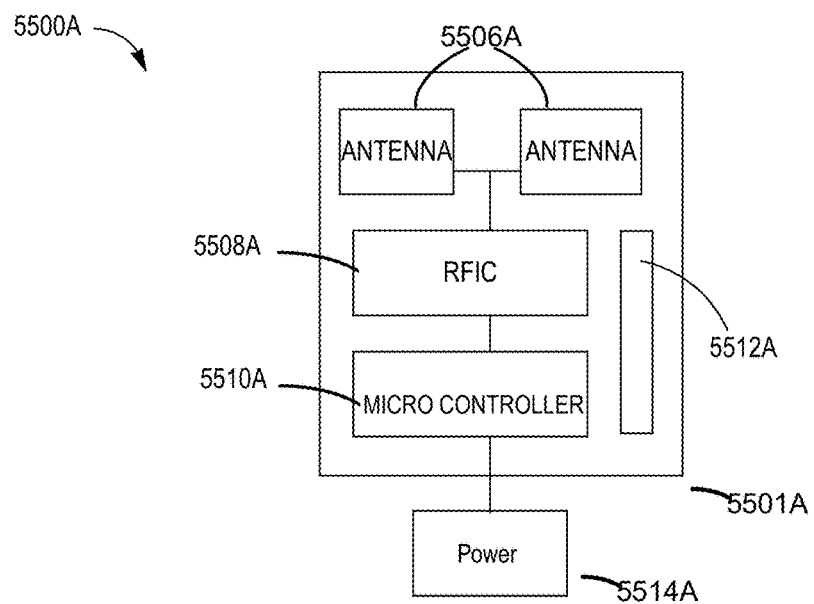
FIG. 55A illustrates a block diagram of a transmitter which may be utilized for wireless power transmission, according to an exemplary embodiment.

FIG. 55A depicts a block diagram of a transmitter 5500A which may be utilized for wireless power transmission. Such transmitter 5500A may include one or more antenna elements 5506A, one or more Radio frequency integrated circuit (RFIC) 5508A, one or more microcontroller 5510A, a communication component 5512A, a power source 5514A and a housing 5501A, which may allocate all the requested components for transmitter 5500A. Components in transmitter 5500A may be manufactured using meta-materials, micro-printing of circuits, nano-materials, and the like.

Transmitter 5500A may be responsible for the pocket-forming; adaptive pocket-forming and multiple pocket-forming through the use of the components mentioned in the foregoing paragraph. Transmitter 5500A may send wireless power transmission to one or more receivers in form of radio signals, such signals may include any radio signal with any frequency or wavelength.

Figure 55B:
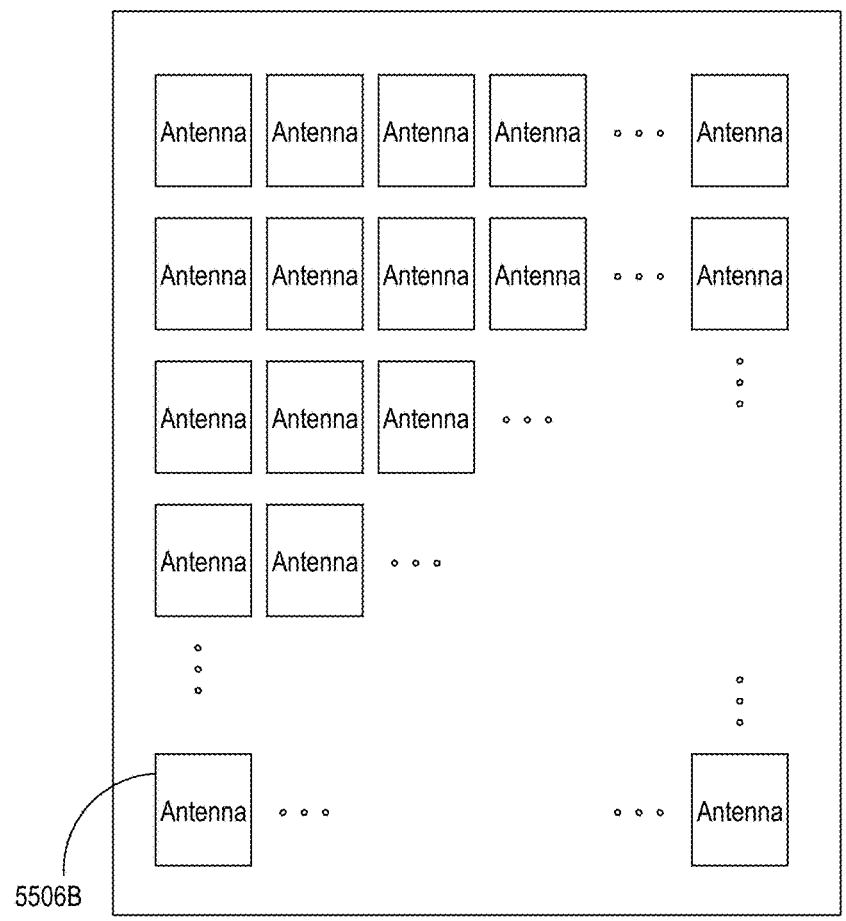
FIG. 55B illustrates an exemplary illustration of a flat panel antenna array that may be used in transmitter, according to an exemplary embodiment.

FIG. 55B is an exemplary illustration of a flat panel antenna array 5500B that may be used in transmitter 5500A. Flat panel antenna array 5500B may then include an N number of antenna elements 5506A where gain requirements for power transmitting may be from 64 to 256 antenna elements 5506A which may be distributed in an equally spaced grid. In one embodiment, flat panel antenna array 5500B may have a 8×8 grid to have a total of 64 antenna elements 5506A. In another embodiment, flat panel antenna array 5500B may have a 16×16 grid to have a total of 256 antenna elements 5506A. However, the number of antenna elements 5506A may vary in relation with the desired range and power transmission capability on transmitter 5500A, the more antenna elements 5506A, the wider range and higher power transmission capability. Alternate configurations may also be possible including circular patterns or polygon arrangements. Flat panel antenna array 5500B may also be broken into numerous pieces and distributed across multiple surfaces (multi-faceted).

Antenna elements 5506A may include flat antenna elements 5506A, patch antenna elements 5506A, dipole antenna elements 5506A and any suitable antenna for wireless power transmission. Suitable antenna types may include, for example, patch antennas with heights from about ½ inch to about 6 inches and widths from about ½ inch to about 6 inches. Shape and orientation of antenna elements 5506A may vary in dependency of the desired features of transmitter 5500A, orientation may be flat in X, Y, and Z axis, as well as various orientation types and combinations in three dimensional arrangements. Antenna elements 5506A materials may include any suitable material that may allow radio signal transmission with high efficiency, good heat dissipation and the like.

Antenna elements 5506A may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 5506A may operate in independent frequencies, allowing a multi-channel operation of pocket-forming.

In addition, antenna elements 5506A may have at least one polarization or a selection of polarizations. Such polarization may include vertical pole, horizontal pole, circularly polarized, left hand polarized, right hand polarized, or a combination of polarizations. The selection of polarizations may vary in dependency of transmitter 5500A characteristics. In addition, antenna elements 5506A may be located in various surfaces of transmitter 5500A.

Antenna elements 5506A may operate in single array, pair array, quad array and any other suitable arrangement, which may be designed in accordance with the desired application.

FIG. 56 shows antenna arrays 5686A according to various embodiments. Antenna arrays 5686A may include suitable antenna types for operating in frequency bands such as 900 MHz, 2.5 GHz, and 5.8 GHz, as these frequency bands may comply with the FCC regulations, part 18.

Figure 56C:
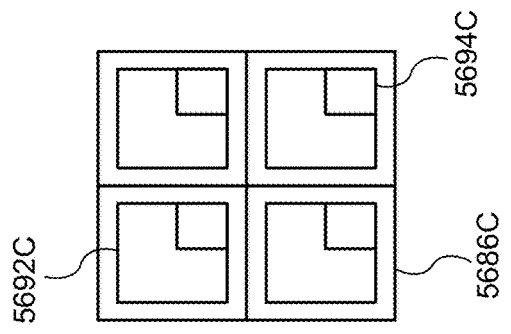
FIG. 56C illustrates a quad array where each antenna element may be virtually divided to avoid power losses during wireless power transmission, according to an exemplary embodiment.
Figure 56B:
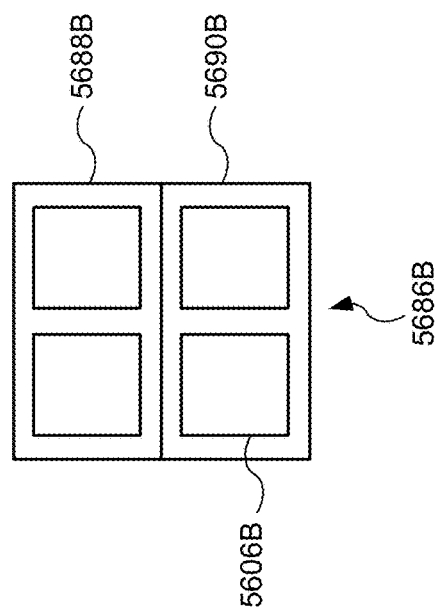
FIG. 56B illustrates pair array, where the top half of antenna elements may operate at 5.8 GHz and the bottom half may operate at 2.4 GHz, according to an exemplary embodiment.
Figure 56A:
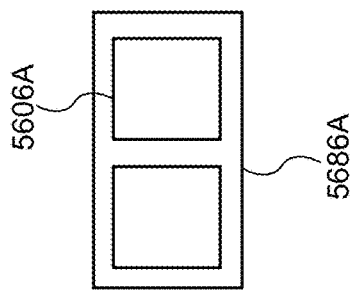
FIG. 56A illustrates a single array where all antenna elements may operate at 5.8 GHz, according to an exemplary embodiment.

FIG. 56A shows a single array 5686A where all antenna elements 5606B may operate at 5.80 hz. Thus single array 5686A may be used for charging or powering a single device.

FIG. 56B shows pair array 5686B, where the top half 5688B of antenna elements 5606B may operate at 5.8 GHz and the bottom half 5690B may operate at 2.4 GHz. Pair array 5686B may then be used to charge or power, at the same time, two receivers that may operate at different frequency bands such as the ones described above. As seen in FIG. 56B, antenna elements 5606B may vary in size according to the antenna type.

FIG. 56C shows a quad array 5686C where each antenna element may be virtually divided to avoid power losses during wireless power transmission. In this embodiment, each antenna element may be virtually divided in two antenna elements, antenna element 5694C and antenna element 5692C. Antenna element 5694C may be used for transmitting in 5.8 GHz frequency band and antenna element 5692C may be used for transmitting in 2.4 GHz frequency band. Quad array 5686C may then be used in situations where multiple receivers—operating at different frequency bands require to be charged or powered.

In a first exemplary embodiment, a portable electronic device that may operate at 2.4 GHz may be powered or charged. In this example, a transmitter may be used to deliver pockets of energy onto one electronic device. This transmitter may have a single array of 8×8 of flat panel antennas where all the antenna elements may operate in the frequency band of 2.4 GHz flat antennas may occupy less volume than other antennas, hence allowing a transmitter to be located at small and thin spaces, such as, walls, mirrors, doors, ceilings and the like. In addition, flat panel antennas may be optimized for operating to long distances into narrow hail of wireless power transmission, such feature may allow operation of portable devices in long areas such as, train stations, bus stations, airports and the like. Furthermore, flat panel antennas of 8×8 may generate smaller pockets of energy than other antennas since its smaller volume, this may reduce losses and may allow more accurate generation of pockets of energy, such accuracy may be employed for charging powering a variety of portable electronic devices near areas and/or objects which do not require pockets of energy near or over them.

In a second exemplary embodiment, two electronic devices that may operate at two different frequency bands may be powered or charged at the same time. In this example, the transmitter may be used to deliver pockets of energy onto two electronic devices. In this example, the transmitter may have a pair array with different type of antennas, flat panel antennas and dipole antennas, where ½ of the array may be formed by flat panel antennas and the other half by dipole antennas. As described in the first exemplary embodiment, flat panel antennas may be optimized to radiate power within narrow halls at considerable distances. On the other hand, dipole antennas may be employed for radiating power at nearer distances but covering more area because of their radiation pattern, Furthermore, dipole antennas may be manually adjusted, this feature may be beneficial when the transmitter is located at crowded spaces and transmission needs to be optimized.

Figure 57:
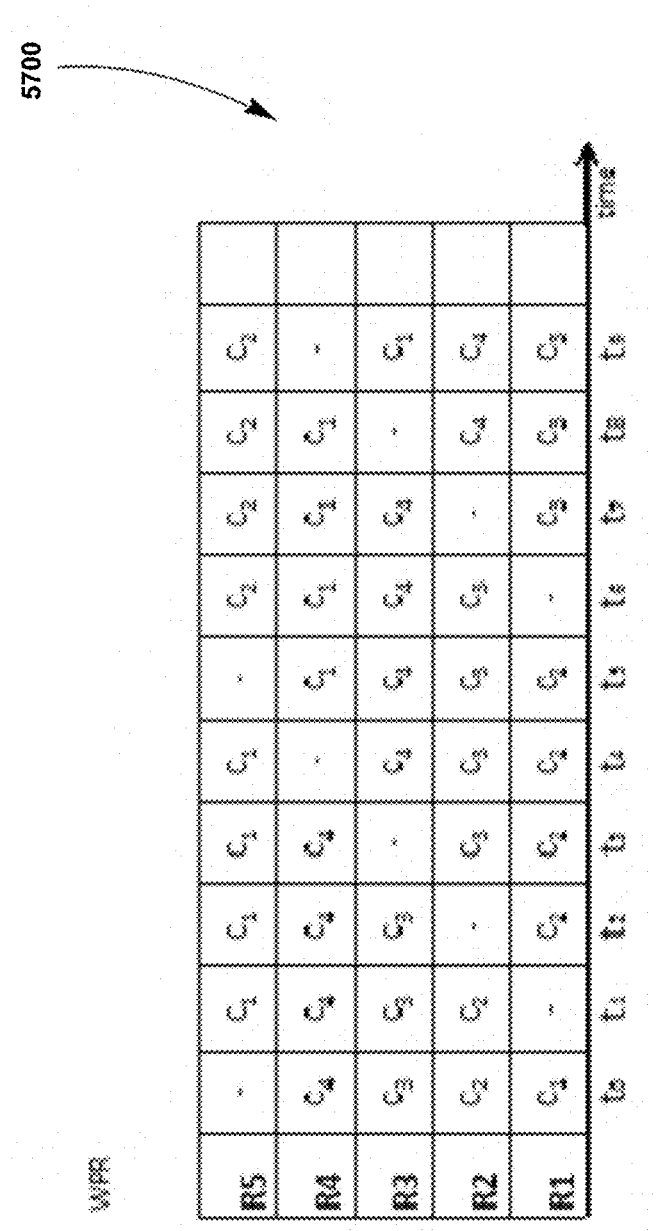
FIG. 57 illustrates a chart depicting an exemplary distribution of communication channels over time, employing TDM in wireless power transmission, according to an exemplary embodiment.

FIG. 57 is a chart depicting an exemplary distribution of communication channels 5700 over time, employing TDM in wireless power transmission. More specifically, FIG. 57 depicts a table with channels assignment for 5 client devices while the wireless power transmitter only allows 4 communication channels.

FIG. 57 chart shows over time how the transmitter's limited number of 4 communication channels may be used to communicate with 5 receivers—more receivers than the transmitter has channels for. Time advances from left to right, and 10 time slices are represented. Each time slice represents a finite amount of clock time, for example 1 second. Each 'Cn' denotes one of the transmitter's communication channels. Each 'Rn' denotes one of the wireless power receivers that receive power from wireless transmitter and then subsequently transmit electrical power to client devices.

During time-slice t0, transmitter uses channel C1 to communicate with receiver R1, channel C2 to communicate with receiver R2, C3 for R3, and C4 for R4, and there is no communication with receiver R5.

During time-slice t1, transmitter now uses channel C1 to communicate with receiver R5, so that R5 gets a turn receiving power, receiver R2 continues communication with transmitter through channel C2, receiver R3 continues with channel C3, and receiver R4 continues with channel C4. There is no communication with receiver R1.

During time-slice t2, transmitter now uses channel C2 to communicate with receiver R1, so that R1 gets a turn receiving power, receiver R3 continues communication with transmitter through channel C3, receiver R4 continues with channel C4, and receiver R5 continues with channel C1. There is no communication with receiver R2.

During a time slice while transmitter is in communication with a specific receiver, it may use that communication to get receiver power status from the receiver, which values transmitter uses to aim transmitter antennas at that receiver, to power receiver's client device. The system may use other methods to control aiming antennas at receivers, such as receiver beacon signal transmission and transmitter beacon signal reception. Transmitter may aim a sub-set of array antennas at each of the four receivers in communication.

The pattern continues through time while the receivers are schedule by the user to receiver power. More receivers may be added to those scheduled, or some may be removed. When there are more than the available transmitter channels (in this example 4), then the channels are shared over time (TDM) so that transmitter may communicate with any number of receivers. When there are not more, then the transmitter dedicates each channel to a specific receiver.

An exemplary distribution of communication channels employing TDM in wireless power transmission is depicted in a table with channels assignment for 5 client devices while the wireless power transmitter only allows 4 communication channels. Wireless power manager may employ TDM technique when a fifth client device R5 is commanded to begin charge at time stage t1. Subsequently, at time stage t1, wireless power manager may command wireless power transmitter to cease communication using first communication channel C1 with first client device R1, and starts real-time communication using first communication channel C1 with fifth client device R5. Afterwards, finite amount of time later at time stage t2, wireless power manager may order wireless power transmitter to cease communication using second communication channel C2 with second client device R2, and then wireless power transmitter may use second communication channel C2 to re-start communication with first client device R1, and aims an antenna group at first client device R1. Subsequently, finite amount of time later at time stage t3, wireless power manager may order wireless power transmitter to cease communication with third client device R3 which was using third communication channel C3. Wireless power transmitter may now use third communication channel C3 to restart communication with second client device R2, and aims an antenna group at second client device R2. This process may continue until the amount of client devices to be powered changes.

Figure 58:
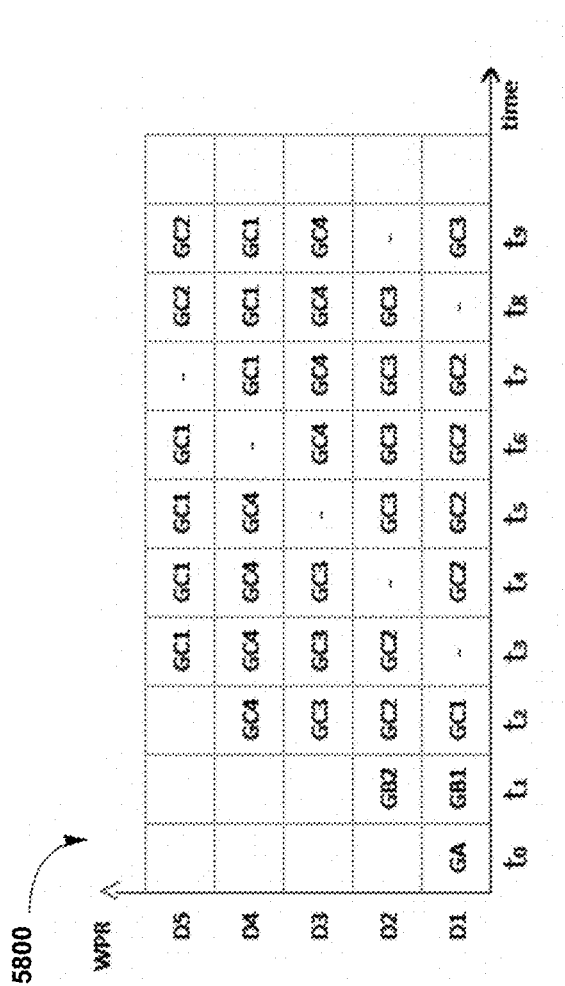
FIG. 58 illustrates a diagram of an exemplary potential interaction between wireless power receivers and wireless power transmitters, according to some embodiments.

FIG. 58 is a diagram 5800 of an exemplary potential interaction between wireless power receivers and wireless power transmitters, according to some embodiments. Diagram 5800 may describe a process about how TDM power transmission (software module) may operate in a wireless power transmitter. Specifically, the process may start at time $t_0$, where a wireless power device (D1) may be in reach of a wireless power transmitter, TDM power transmission may command the wireless power transmitters to assign an antenna group (GA) to power D1.

If D1 moves from the initial position, at time $t_1$, TDM power transmission may command the wireless power transmitter to change the numbers of antennas from the original group and assign an antenna group (GB1) to power D1. If at the same time another wireless power device (D2) comes in reach of a wireless power transmitter, the TDM power transmission may command the wireless power transmitter to assign another antenna group (GB2) to power D2. The wireless power transmitter may now be powering two wireless power receivers.

If both D1 and D2 move from their position, at time $t_3$, TDM power transmission may command the wireless power transmitter to change the numbers of antennas from the original group and assign an antenna group (GB1) to power D1, and assign another antenna group (GC2) to power D2. If two more wireless power devices (D3 and D4) come in reach of the wireless power transmitter, the TDM power transmission may command the wireless power transmitter to assign two more antenna groups (GC3 and GC4) to power D3 and D4. The wireless power transmitter may now be powering four devices and may have no more transmitting antennas available for additional wireless power receivers.

If an additional wireless power receiver (D5) comes in range of the wireless power transmitter, at time $t_3$ and no additional antennas are available for dedicating a new group to power D5, TDM power transmission may employ an antenna sharing techniques to make sure that all devices are receiving power. For example, TDM power transmission may switch antenna groups from one device to another at regular time intervals. If no other changes in location occur, for example from times $t_4$ to $t_9$, TDM power transmission may continue to switch groups from the wireless power receiver being transmitted power the most of the time, to the wireless power receiver being transmitted the least of the time.

Figure 59:
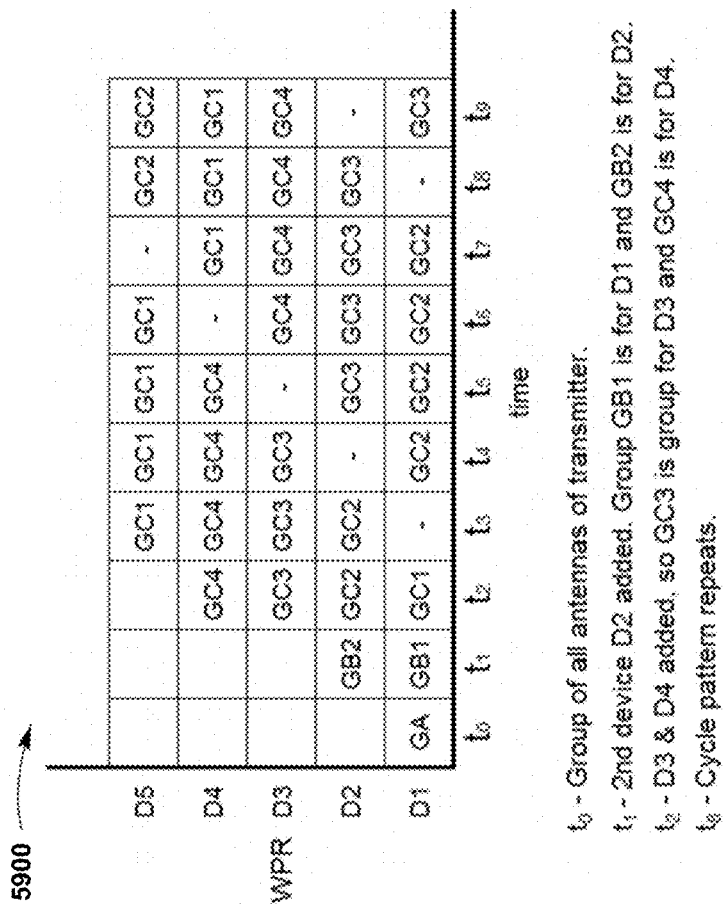
FIG. 59 illustrates a diagram or exemplary potential interaction of wireless power receivers and wireless power transmitters that may be part of wireless power transmission system architecture, according to an exemplary embodiment.

FIG. 59 illustrates a diagram 5900 or exemplary potential interaction of wireless power receivers and wireless power transmitters that may be part of wireless power transmission system architecture. Diagram 5900 may provide an example of a wireless power receiver being served by a wireless power transmitter. Additional wireless power receivers may be served as they come in reach of the wireless power transmitter, according to some embodiments.

According to another embodiment, multiple wireless power transmitters may power together one or more receivers. At time $t_0$, a wireless power device (D1) may come in range of the wireless power transmitter. A processor may command the wireless power transmitter to assign an antenna group (GA) of all transmitter antennas to power client device D1.

At time $t_1$, the system begins to also power client device D2, and so transmitter replaces previous antenna group $G_A$ with two new antenna groups $G_{B1}$ for D1, which continues to be powered, and group $G_{B2}$ for newly powered device D2. Since there are two groups, each gets half of the entire transmitter antenna array.

At time $t_2$, two more devices D3 and D4 begin to receiver power, so transmitter replaces previous two antenna groups $G_{B1}$ and $G_{B2}$ with four antenna groups, one for each client device (D1 D2 D3 D4) presently being powered: $G_{C1}$ $G_{C2}$ $G_{C3}$ $G_{C4}$.

At time $t_3$, a fifth client device D5 is configured to receive power. However, the maximum allowed simultaneous antenna groups is 4. So, to power the 5 devices, Time Division Multiplexing must be used to simultaneously power 4 devices at once using the 4 antenna groups, with one of the 5 devices being not powered during each subsequent time interval $t_n$. Thus, at time $t_3$ the maximum of four antenna groups $G_{C1}$ $G_{C2}$ $G_{C3}$ $G_{C4}$ power client devices D5, D2, D3, D4 respectively. At time $t_4$, power stops to D2, power re-starts to D1, and D3, D4, D5 continue to receive power. The cycle pattern continues indefinitely until devices are charged.

6. Power Transmission Management

Figure 60:
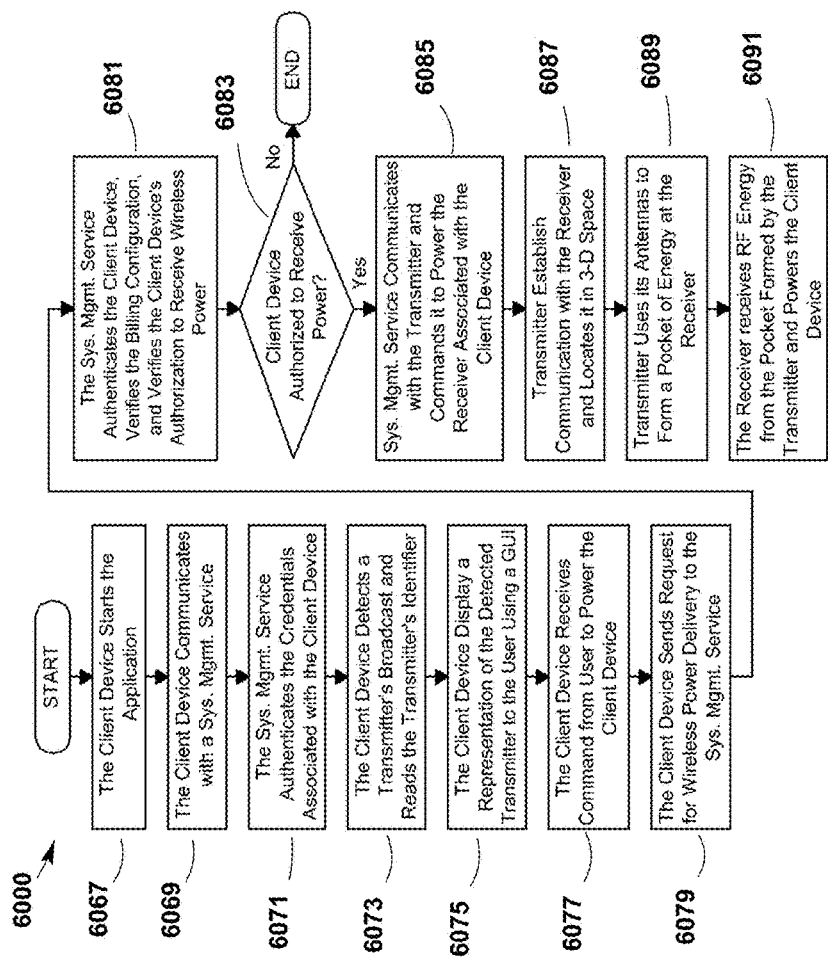
FIG. 60 illustrates a flow diagram generally illustrating an exemplary method for transmitting wireless power to a device, according to an exemplary embodiment.

FIG. 60 is a flow diagram 6000 generally illustrating an exemplary method for transmitting wireless power to a device. The steps of this exemplary method are embodied in a computer readable medium containing computer readable code such that the steps are implemented when the computer readable code is executed by a computing device. In some implementations, certain steps of the method can be combined, performed simultaneously, performed in a different order, or omitted, without deviating from the objective of the method.

In FIG. 60, the process begins when the client device starts 6067 the application on request from the user. In some embodiments, client device detects a receiver it is coupled to, and reads from receiver an identifier associated with receiver. In other embodiments, receiver is an inherent to client device and consequent client device already includes the identifier associated with receiver. In yet other embodiments, client device broadcasts or otherwise advertises the identifier associated with receiver to other devices in range.

Next client device communicates 6069 with a system management service through a suitable network connection, including intranets, local area networks (LAN), virtual private networks (VPN), wireless area networks (WAN), Bluetooth, Bluetooth Low Energy, Wi-Fi, ZigBee, and the like. In some embodiments, client device communicates the credentials associated with the user of client device, the identifier of receiver associated with the client device, and the like. system management service then authenticates 6071 the credentials associated with client device. In some embodiments, if the credentials cannot be authenticated the user is directed to register. In other embodiments, if the authentication fails the system management service denies access to the user.

Client device then detects 6073 a broadcast from transmitter and reads an identifier associated with transmitter. In some embodiments, transmitter broadcasts its presence and an identifier associated with it using Bluetooth, Bluetooth low energy (BTLE), Wi-Fi, or the like. Identifiers associated with transmitter can include the transmitter's MAC address, network address, serial number, and the like. client device displays 6075 a representation of transmitter to the mobile device user via GUI. In some embodiments, GUI produces the representation of transmitter allowing a mobile device user to request power transmission from transmitter to client device. In other embodiments, GUI displays additional information, such as, for example the distance from transmitter to client device, the cost associated with receiving power from transmitter, and the like.

Next, client device receives 6077 a command from the mobile device user to being powering client device. client device sends request 6079 for wireless power delivery to system management service. In some embodiments, the request sent by client device includes credentials (e.g., user account credentials) associated with client device, an identifier associated with one or more nearby Transmitters, an identifier associated with client device, an identifier associated with a receiver coupled to the client device (if not integral to the device), billing instructions, and the like.

System management service then authenticates 6081 client device, verifies the billing configuration, and verifies if client device is authorized to receive wireless power. In some embodiments, system management service authenticates client device by comparing credentials contained within the request (e.g. user account credentials) and the identifier associated with client device to data stored in a database within cloud service provider. In other embodiments, system management service additionally verifies that the user's billing configuration is valid. system management service then determines 6083 if client device is authorized to receive power. In some embodiments, if the client device is not authorized the process ends. In other embodiments, the process continues to another process allowing the mobile device user to authorize the client device by adding additional funding to the account, request authorization from a third party, or the like.

System management service communicates 6085 with transmitter and commands it to power receiver associated with client device. In some embodiments, the system management service communicates with the transmitter using a suitable network connection, including intranets, local area networks (LAN), virtual private networks (VPN), wireless area networks (WAN), Bluetooth, Bluetooth Low Energy, Wi-Fi, ZigBee, and the like. In other embodiments, the command includes any number of suitable parameters for carrying out a desired method of charging, including desired power output, amount of time to charge, amount of power to transmit, and the like. In some embodiments, receiver is integral to client device. In other embodiments, receiver is a wireless receiver coupled and in electrical communication with one or more client devices.

Transmitter establishes 6087 communication with receiver and locates it in 3-D space. transmitter then uses its antennas to form a pocket of energy at the receiver 6089. Next, receiver receives 6091 RF energy from the pocket formed by the transmitter and powers the client device.

Figure 61:
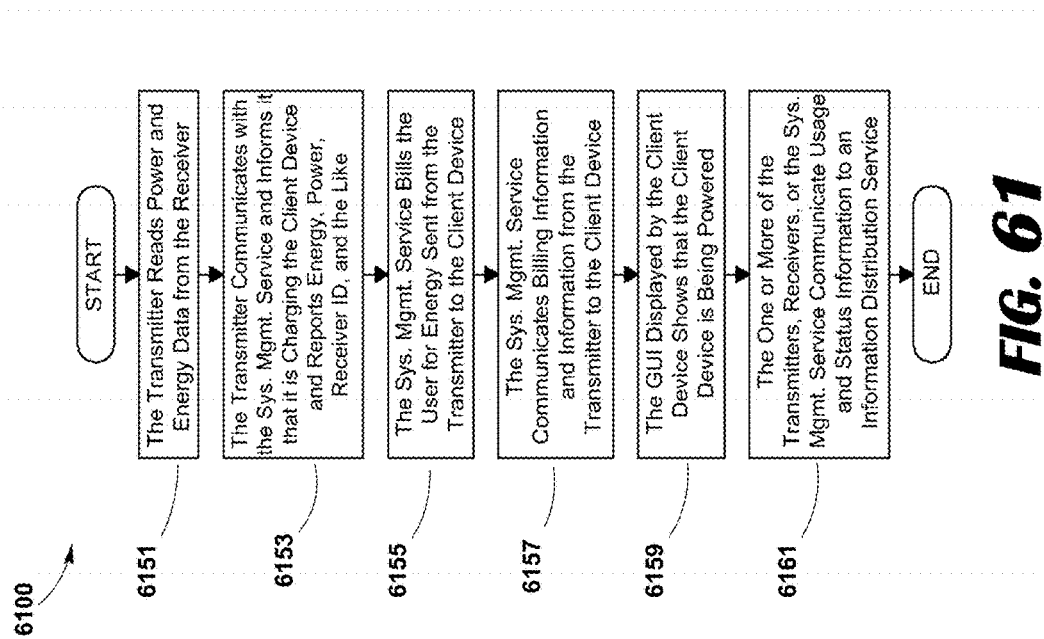
FIG. 61 illustrates a flow diagram generally illustrating an exemplary method for monitoring wireless power transmitted to a device, according to an exemplary embodiment.

FIG. 61 is a flow diagram 6100 generally illustrating an exemplary method for monitoring wireless power transmitted to a device. The steps of this exemplary method are embodied in a computer readable medium containing computer readable code such that the steps are implemented when the computer readable code is executed by a computing device. In some implementations, certain steps of the method can be combined, performed simultaneously, performed in a different order, or omitted, without deviating from the objective of the method.

In FIG. 61, the process begins with transmitter reading 6151 power and energy data from receiver. In some embodiments, receiver is integral to client device. In other embodiments, receiver is a wireless receiver coupled and in electrical communication with one or more client devices. In some embodiments, the data includes the rate of power delivered from Wireless Power transmitter to receiver, the total energy transferred from Wireless Power transmitter to receiver, the current battery power level of client device, and the like.

Transmitter then communicates 6153 with system management service and informs it that it is charging client device. In some embodiments, transmitter additionally reports energy/power transmitted to fulfill the charging request for client device, the identifier of receiver, and the like.

Next, system management service bills 6155 the mobile device user for the energy sent from transmitter to client device, if required. system management service then communicates 6157 account information to client device. In some embodiments, account information includes billing information and other information associated with the current charging session, information from previous charging sessions, account balance information, charges associated with receiving wireless power during the current charging session, rate of power transmission from transmitter, and the like.

GUI displayed by client device shows 6159 that client device is being powered. In some embodiments, GUI displays the aforementioned account balance information, account information, and the like.

One or more of the wireless power transmitters, receivers, and/or the system management service then communicate 6161 usage and status information to information distribution service. In some embodiments, the usage and status information is used for running analytics on customer behavior, demographics, service quality, and the like. In some embodiments, information distribution service is hosted in a remote cloud. In other embodiments, information distribution service is hosted in a local network.

For example, a user having a smartphone walks into a coffee shop. The smartphone detects a wireless power transmitter operated by the coffee shop and reads transmitter's ID. The user then notices that the smartphone is low on power, and proceeds to command a mobile app to request local wireless power. The user may also have configured wireless power system management to do this automatically whenever and/or wherever wireless power is available. The smartphone then communicates its ID, its receiver's ID, and the transmitter's ID to the system management service. The system management service reviews its system database and finds the smartphone or its receiver, as well as the transmitter. The system management service then communicates with the transmitter and commands it to power the user's smartphone receiver. Transmitter then communicates with the receiver to determine the receiver's location, and transmits wireless energy to the receiver using pocket-forming techniques. The receiver proceeds to power the smartphone with this energy.

In another example, a user with a wearable device having a built-in wireless power receiver visits a friend's house, where the house equipped with a wireless power transmitter. The wearable device detects the house's wireless power transmitter and reads the transmitter's ID, and the homeowner's transmitter has configured the system management service to automatically power any wireless power receiver. The wearable device's receiver communicates its ID and transmitter's ID to the system management service, and the system management service then reviews its system database and finds the wearable device, its receiver, and the transmitter. The system management service then communicates with the transmitter and commands it to power the wearable device's receiver. The transmitter then communicates with the receiver to determine receiver's location, and transmits wireless energy to the receiver using adaptive 3-D pocket-forming techniques. The receiver then powers the wearable device with this energy.

7. Measuring and Reporting Power Level

Figure 62:
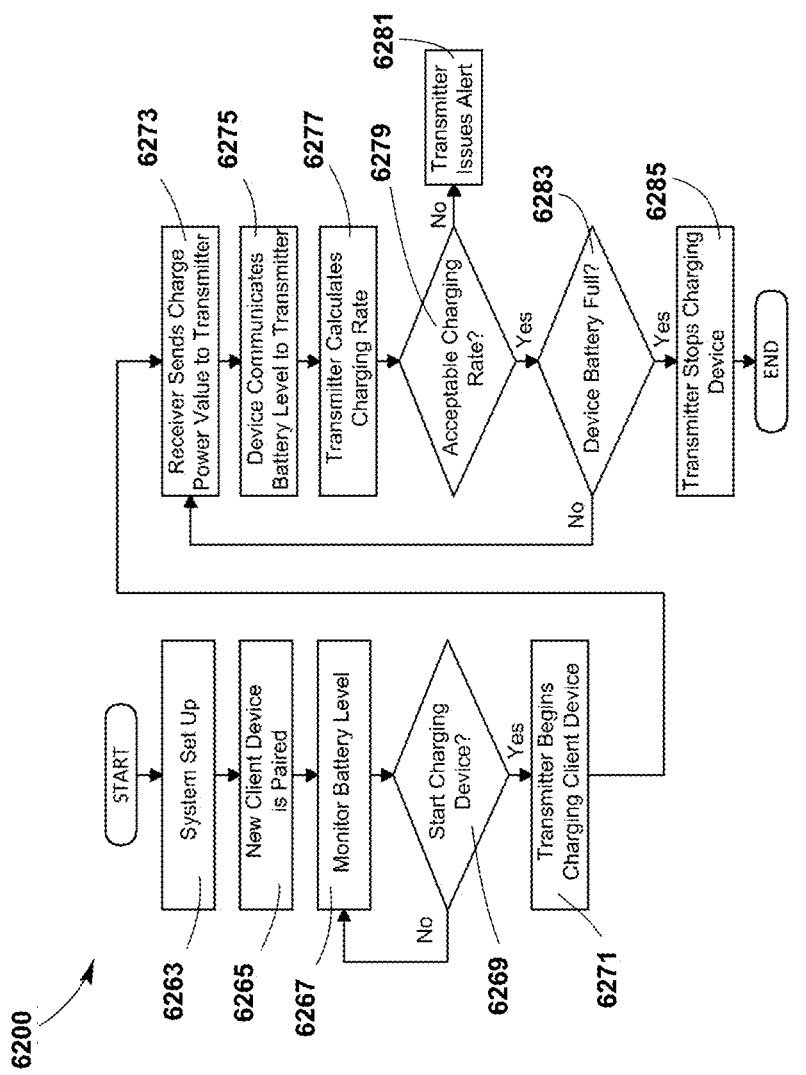
FIG. 62 illustrates a flowchart of a method for monitoring battery performance in a wireless power transmission system, according to an exemplary embodiment.

FIG. 62 is a flowchart of a method for monitoring battery performance 6200 in a wireless power transmission system, according to an embodiment. In some exemplary embodiments, the Wireless Power transmission system is capable of determining the present or actual rate at which the battery of an electronic device is charging, and compare that value with the expected reference rate. If the present rate is significantly less than the expected reference rate then the battery or related charging circuit within the electronic device may be malfunctioning and causing significantly less charging efficiency or performance.

When the Wireless Power transmission system detects this error condition, the system may then alert the system operator or user of the client device, or any other suitable party, so that the problem may be corrected and the electronic device battery charging system may no longer waste power when charging or stops taking longer periods of time to charge than it should.

In an alternative embodiment, the wireless power transmission system to monitors the charging rate of the client device from when the device was first put into service with the system, and then use this as a reference to compare against the present rate of charge for the device, so that if ever the present rate of charging for the device becomes less than the reference rate that was based on the initial rate of charge, then alerts would be generated by the system indicating that something is wrong with the device and it is taking too long to charge or wasting power when it is being charged.

In some exemplary embodiments, method for monitoring battery performance 6281 may start with step 6263, where an operator or user installs and operates a wireless Power transmission system. Then, a client device may be paired with a wireless power receiver within the system, at step 6265. Pairing may occur when a client electronic device detects that a power receiver is within a suitable range of proximity for a suitable amount of time. Then, it may proceed to check an internal database to determine if the power receiver is not already paired with another electronic device. If the power receiver is not already paired with another device, the client electronic device may associate its ID with the ID of the power receiver and update the internal database. Then, the electronic device may send a copy of the updated database record to the power transmitter. In this way the device may be ready to start changing wirelessly.

At step 6267, the wireless power transmitter may continuously monitor the battery level of the client device to determine, at step 6269, if the battery needs to be charged. In other embodiments, the wireless power transmitter may charge the client device according to a predefined schedule. The wireless power transmission system may automatically charge the battery of the client device whenever it is time to do so, or if the battery level is below full and the battery needs to be charged, or system may automatically charge battery in response to some other condition or situation that may be built into the system, or configured by the operator or user, or other.

If the wireless power transmitter determines that the client device needs to be charged, it may start transmitting power to the wireless power receiver connected to the client device, at step 6271. To do so, the wireless power transmitter continuously communicate in real-time with the wireless power receiver.

During the charging period, at step 6273, the receiver constantly sends the charge power values to the wireless power transmitter. Additionally, the client device may constantly send the battery level values to the wireless power transmitter, at step 6275.

Using the values received at steps 6273 and 6275, the wireless power transmitter is capable of calculating the charging rate of the client device, at step 6277. In some embodiments, the wireless power transmitter will monitor his own real time clock circuit or other, to measure present real-time or clock time, in order to calculate the charging rate of the client device battery.

Then, at step 6279, the wireless power transmitter may determine if the rate of charge of the client device is within an acceptable range or if its not. In some exemplary embodiments, the wireless power transmitter will look up in a reference table the expected charging rate for the particular client device; the unique identification or category of the device previously made known to the system either by operator, or user, or automatically by the client device communication of said categories from client device directly to the wireless power transmitter or other system computer of the wireless power transmission system. Said reference table is located within transmitter memory, or local database, or downloaded or communicated to transmitter from remote management or information service on a remote server.

In some embodiments, the reference charging rate expected of a particular client device is already stored in the transmitter's memory. Also, the rate of each category or model of client device that the transmitter is expected to charge, are all also stored in memory. These rates may have been already stored in memory of transmitter at the time of transmitter manufacture, or may have been uploaded to or communicated to transmitter from another system computer, such as a system management server that contains updated rates for all types, categories, or models of client devices that the wireless power transmission system is expected to charge.

If the wireless power transmitter detects that actual charging performance of device is below expected charging performance, then transmitter may alert a system operator, or the client device user, that battery or charging circuit or other of client devices is malfunctioning, may be losing power, may be taking too long to charge, and needs to be investigated or repaired or replaced, at step 6281. In some embodiments, the wireless power transmitter is also capable of determining the root cause of the system malfunction, when the battery of the client device is not causing the low charging rate or loss of power.

In some embodiments, the wireless power transmitter communicates this information through automatic database replication, sending message across the system network between the transmitter and other system computers or through other suitable communication means. Furthermore, the operator or user may receive the alert and respond by configuring the wireless system to no longer wirelessly charge the client device, and then removing the client device from service so that it may be investigated, repaired or replaced or other suitable solutions.

If the wireless power transmitter determines that no evidence of a system or component fault is found in the data analyzed, the wireless power transmitter may continue to charge the client device, and continuously check, at step 6283, if the battery level of the client device is full. If the battery of the client device is not full, the wireless power transmitter may continue to transmit wireless power to the wireless power receiver connected to the client device to keep charging the client device. If the battery of the client device is already full or its time to stop charging the device, the wireless power transmitter stops charging the device, at step 6285, and the process may end.

Figure 63:
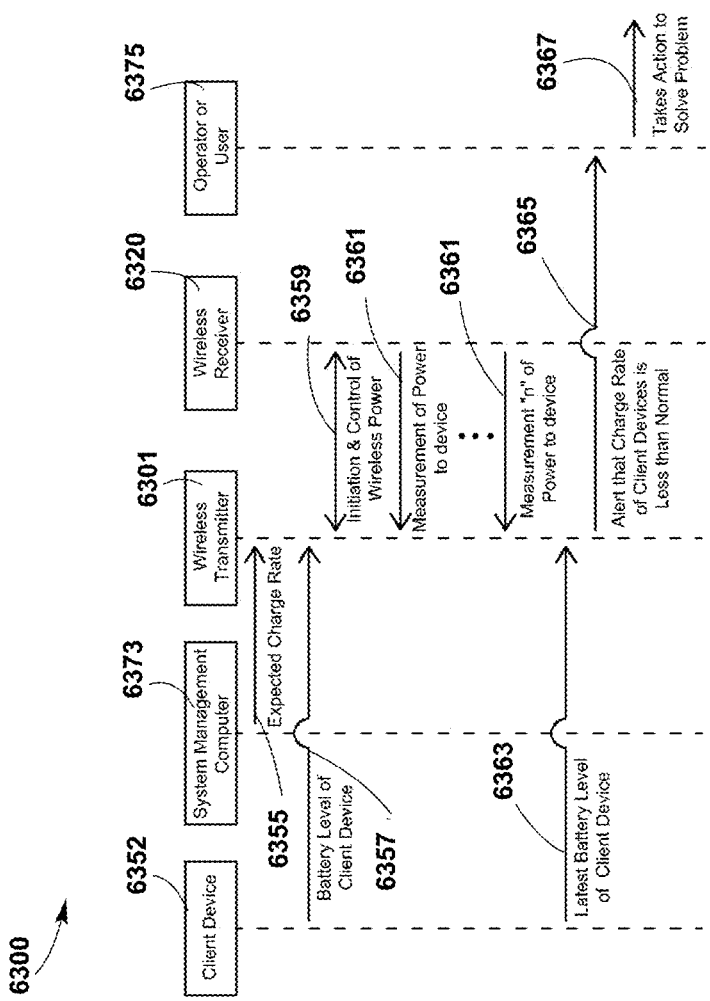
FIG. 63 illustrates a sequence diagram of a method for monitoring battery performance, according to an exemplary embodiment.

FIG. 63 is a sequence diagram 6300 of a method for monitoring battery performance, according to exemplary aspects of the present disclosure. Sequence diagram 6300 includes a client device 6352, a system management computer 6373, wireless power transmitter 6301, wireless power receiver 6320 and user or operator 6375.

System management computer first sends the expected charge rate 6355 of client device 6352 to the wireless power transmitter 6301. Then, client device 6352 sends information about client device's 6373 battery level 6357. Afterwards, wireless power transmitter 6301 starts delivering wireless power 6359 to wireless power receiver 6320, which is connected to client device 6352. Then, wireless power receiver constantly sends measurements 6361 of the amount power delivered to client device 6352. Subsequently, client device 6352 sends latest battery level 6363 to wireless power transmitter 6301. Using the measurements 6361 of the amount power delivered to client device 6352 and latest battery level 6363, wireless power transmitter 6301 calculates the rate of charge of client device 6352. In case the rate of charge of client device 6352 is bellow the threshold, wireless power transmitter sends and alert 6365 to user or operator 6375. Then, user or operator 6375 takes an action 6367 in order to correct the error.

For example, a family has a wireless power transmission system installed in their home. One member of their family configures the system to wirelessly power and charge a smartphone. The smartphone is several years old. The system automatically charges the smartphone whenever the smartphone is within power range of the system and the battery level of the smartphone is low enough to warrant charge. The family has installed into the smartphone the software app downloaded from a public app store, which is the system management app for the wireless power transmission system. This app automatically communicates value of the battery level of the smartphone to the system. After charging the smartphone, the system observes that the smartphone took three times longer than it should have to completely charge up. The system then communicates an alert of this problem to the owner of the family system by sending the owner a text message with the name of the smartphone and a brief description of the problem. The owner subsequently purchases a replacement smartphone.

In another example, a user purchases a wearable product that goes on user's wrist. The product contains wireless power receiver. The wireless power transmitter is in user's bedroom, and each night user goes to bed wearing product the wearable on the wrist of user. The wireless power transmission system then automatically charges the battery within the wearable by transmitting power from the transmitter in the bedroom a distance away from the power receiver, to the power receiver within the wearable on the wrist of the user. Each night, the wearable battery charges back up.

Beginning with the first time that the transmitter charged the wearable client device, the transmitter computed the charge rate of the wearable's battery. The wireless power transmission system has no reference information about the battery's charge rate for this particular wearable product.

After over a year, the wireless power transmission system detects that the amount of time to charge the wearable battery is now longer than it took when the user first began wirelessly charging the wearable with the system. Subsequently, the system issues an alert to the user by sending an e-mail containing a message that the wearable of the user is now taking longer to charge. Subsequently, the user replaces the wearable product with the latest model.

8. Safely Transmitting Power

Figure 64:
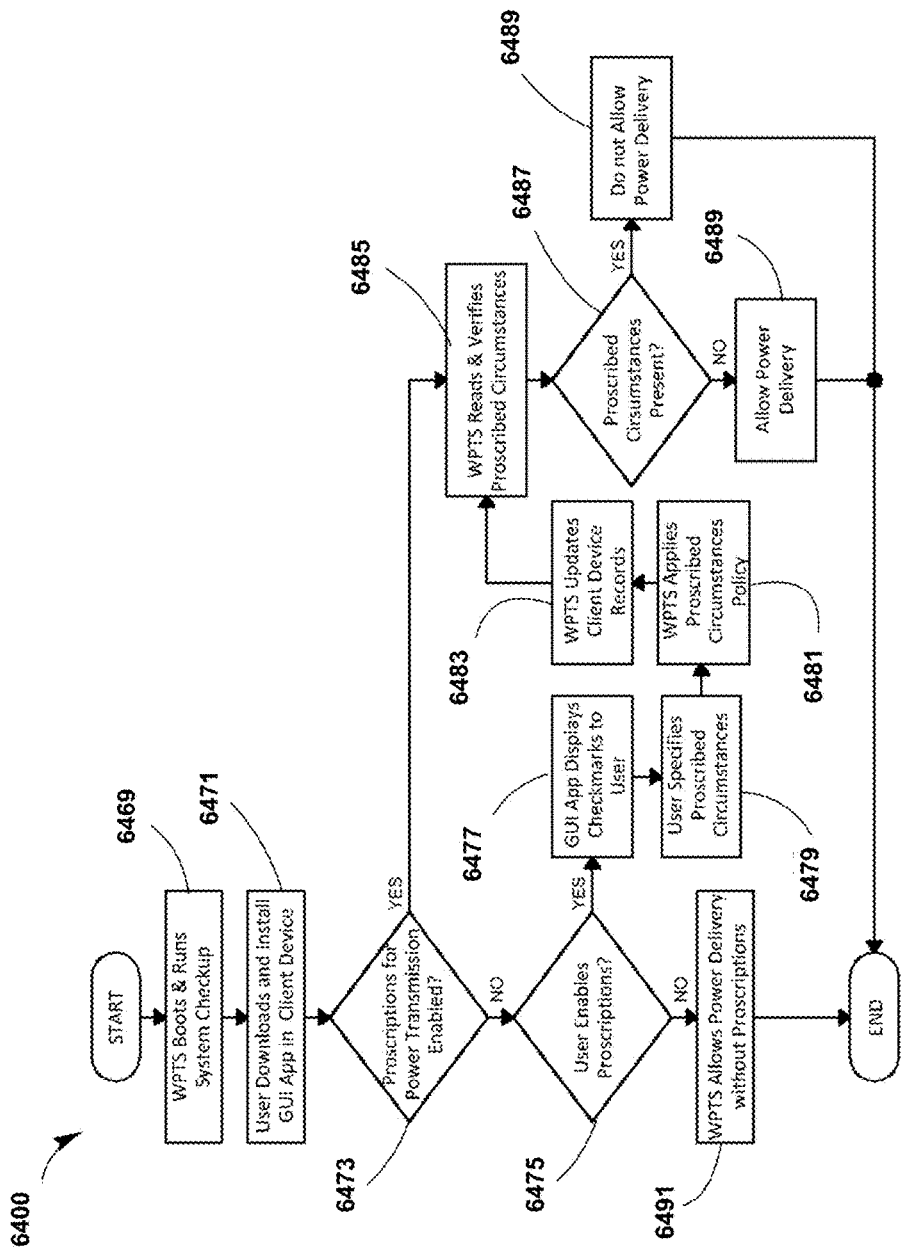
FIG. 64 illustrates a flowchart of a method for proscribing client devices from receiving power from a wireless power transmission system, based on proscribed circumstances of health safety, according to an exemplary embodiment.

FIG. 64 shows a flowchart of a method 6400 for proscribing client devices from receiving power from a wireless power transmission system, based on proscribed circumstances of heath safety. The disclosed method may operate in one or more components of a wireless power transmission system. The wireless power transmission system may include one or more system computers, GUI system management software running on client devices, one or more remote information service servers, and one or more system management servers, among others. System computer may refer to one of the computers of a wireless power transmission system and is part of the communication network between all computers of the wireless power transmission system. The system computer may communicate through said network to any other system computer, and may be a wireless power transmitter, a wireless power receiver, a client device, a system management service server, and/or any other computing device. Examples of client devices may include smartphones, tablets, and music players, among others.

The remote information service server may be coupled to a system database which may be duplicated or distributed across all network computers operating in the wireless power transmission system. Said distributed system database along with the database distribution management software operating within all network computers may allow instant communication in the wireless power transmission system. Network computer may refer to any system computer, or the active remote information server, that is online and has a connection to the network of a particular wireless power transmission system.

The process may start at step 6469 when the wireless power transmission system (WPTS) boots up and runs a system checkup to make sure all communication channels work properly. Subsequently, at step 6471 the user may download and install the system management software app (GUI App) in client device for the WPTS, if this step has not already been done. This app may be made available at, downloaded, and installed from a public software app store or digital application distribution platform, such as Apple's iTunes, Google's Play Store, Amazon's App store, and the like. In other embodiments, the user may browse to a web page hosted by a computer or server where the user may command, control, or configure the WPTS. The app or web page may have a user interface that includes, but is not limited to, industry standard checkmark controls, or any other user interface control for specifying or controlling health safety operational parameters, displayed and described on the view screen of a client device, or web page served by a computer that manages the wireless power transmission system.

Following the process, at decision 6473, the GUI app verifies if there are any proscriptions for power transmission enabled in the WPTS. If proscriptions for power transmission have been enabled, continues to step 6485 below, otherwise proscriptions for power transmission have not yet been enabled, then at decision 6475, GUI may display a message to the user asking if the user desires to enable health safety operational parameters for wireless power transmission. If the user does not accept to enable proscriptions, then WPTS allows power delivery without proscriptions, at step 6491, and the process ends. If at decision 508 the user accepts to enable proscriptions, then at step 6477, the GUI app may display a check list to user where be or she may specify the circumstances when wireless power should not be transmitted to the device in use by the user. Then, at step

6479, the user specifies the proscribed circumstances which may include, but are not limited to, the following criteria:

1) If the client device is presently in movement, indicating that the user has the device on the user's person or is holding or wearing the device. Motion or movement of a client device may refer to a physical, 3-D movement of a client device relative to the transmitter transmitting power to the device, or relative to the spatial location of the transmitter, such that while in motion the client device may change its physical distance from the transmitter or may change its angle from with the antenna array in the transmitter.

2) If the client device is presently physically oriented in any attitude that is an indication that it is in use. For example, if the device is a mobile cell phone that is presently vertically oriented.

3) If the client device presently detects that it is within proximity to a user, such as if the device is being held to the user's face.

4) If the client device presently is placing a telephone call.

5) If the user is presently touching, tapping, or making finger gestures such as swiping, pinching, twirling, or interacting with the client device in any way.

6) If the client device is presently connected with a headset or any other external device.

Subsequently, at step 6487, after the user specifies proscribed circumstances or criteria, applies proscribed circumstances policy throughout all system computers. Then, at step 6483, WPTS updates Client device data records in its distributed database. The WPTS reads and verifies proscribed circumstances associated with the client device. Subsequently, at step 6485, the WPTS reads and verifies proscribed circumstances associated with the client device. Next, at decision 6487, if proscribed circumstances are present, then at step 6489, power delivery is disabled, or if at decision 6487, proscribed circumstances are not present, then power delivery is enabled at step 6489. The process ends.

GUI app running on said client device may continually monitor the client device to detect if the present operation of said client device matches any of the proscribed circumstances of health safety. Monitoring the client device may include, but is not limited to, reading measurement hardware within said device that determines device's present velocity, yaw, pitch, or roll, or attitude by using accelerometers or gyroscopes internal to said client device, or a sensor that indices if device is help to face, or sensing any other aspect of the device that indicates if a proscribed circumstance is present The health safety determination, of whether or not the client device is presently in a circumstance proscribed from receiving power from said transmission system, may be stored by the GUI app within the data record that describes control and configuration of said client device. Said record may be part of the WPTS's distributed database, a copy of which resides within said client device's memory. GUI app and other computers within the wireless power transmission system then automatically distribute said updated record throughout said system to keep all copies of said database, throughout the WPTS, identical.

An exemplary embodiment describes how a decision is made to transmit power to a client device. Within the system database, the record of a paired client device is associated with the record of the wireless power receiver attached or built within said client device.

If the user uses any user interface (GUI or web page) of a WPTS to manually command said client device be charged (from power received by said wireless power receiver), or if the user has used said user interface to configure the record of said wireless power receiver to automatically charge said client device, such as by time, name, or physical location, or other method, then, the record of said wireless power receiver will be updated by the wireless power transmitter that has present control of the database record of said wireless power receiver because it is the nearest wireless power transmitter to said wireless power receiver, to indicate that said wireless power receiver should presently close its output switch to allow power to output to said client device. Said record of said wireless power receiver is also distributed, by said wireless power transmitter, throughout said system for other wireless power transmitters to read.

Once said wireless power transmitter that controls said wireless power receiver determines it should transmit power to said wireless power receiver, it next examines the record of the client device associated or paired with said wireless power receiver, and will only transmit power to said wireless power receiver if said health safety determination does not presently proscribe transmission of power to said client device. If power transmission is not proscribed, then power transmitter may take the following actions:

A) Begins real-time communication with said receiver to get continuous feedback of amount of power received, in order to keep transmission antennas aimed at said receiver.

B) Begins power transmission to said receiver.

C) Commands receiver to close its electrical relay switch to connect and transmit electrical energy to client device.

If user changes said safety proscriptions, then said wireless power transmitter will re-determine if said wireless power receiver should receive power or not.

F. Wireless Power Transmission with Selective Range

1. Constructive Interference

FIG. 6A is an exemplary system representing wireless power transmission principles that may be implemented during exemplary pocket-forming processes. A transmitter 601 comprising a plurality of antennas in an antenna array, may adjust the phase and amplitude of a power transmission waves 607, among other attributes, being transmitted from each antenna of the transmitter 601. In absence of any phase or amplitude adjustment, power transmission waves 607 may be transmitted from each of the antennas. In this case the waves being transmitted will arrive at different locations, with different phases; due to the different distances from each antenna element of the transmitter to receivers located at each location.

A receiver may receive multiple signals 607*a* from multiple antenna elements and the composite of those signal may be essentially zero, if the signals add destructively. Antenna elements of the transmitter may transmit the exact same power transmission signal (i.e., comprising power transmission waves having the same features), but however each of the power transmission signals 607*a* may arrive at the receiver, offset from each other by 180 degrees, and therefore these power transmission signals may "cancel" one another. Signals offsetting one another in this way may be referred to as "destructive interference." In contrast, in so-called "constructive interference," signals 607*b* arrive at the receiver exactly "in phase" with one another, and therefore increase the amplitude of the signal, as shown in FIG. 6B. In the illustrative example in FIG. 6A, note that the phase of the transmit signals are the same at transmission and they ad up destructively at the receiver; whereas, in FIG. 6B, the phase of the transmit signals are adjusted at transmit such that they arrive at the receiver in phase alignment and add constructively. In this illustrative example, there will be a pocket of energy located around the receiver in FIG. 6B, and there will be a transmit null located around receiver in FIG. 6A.

Figure 7:
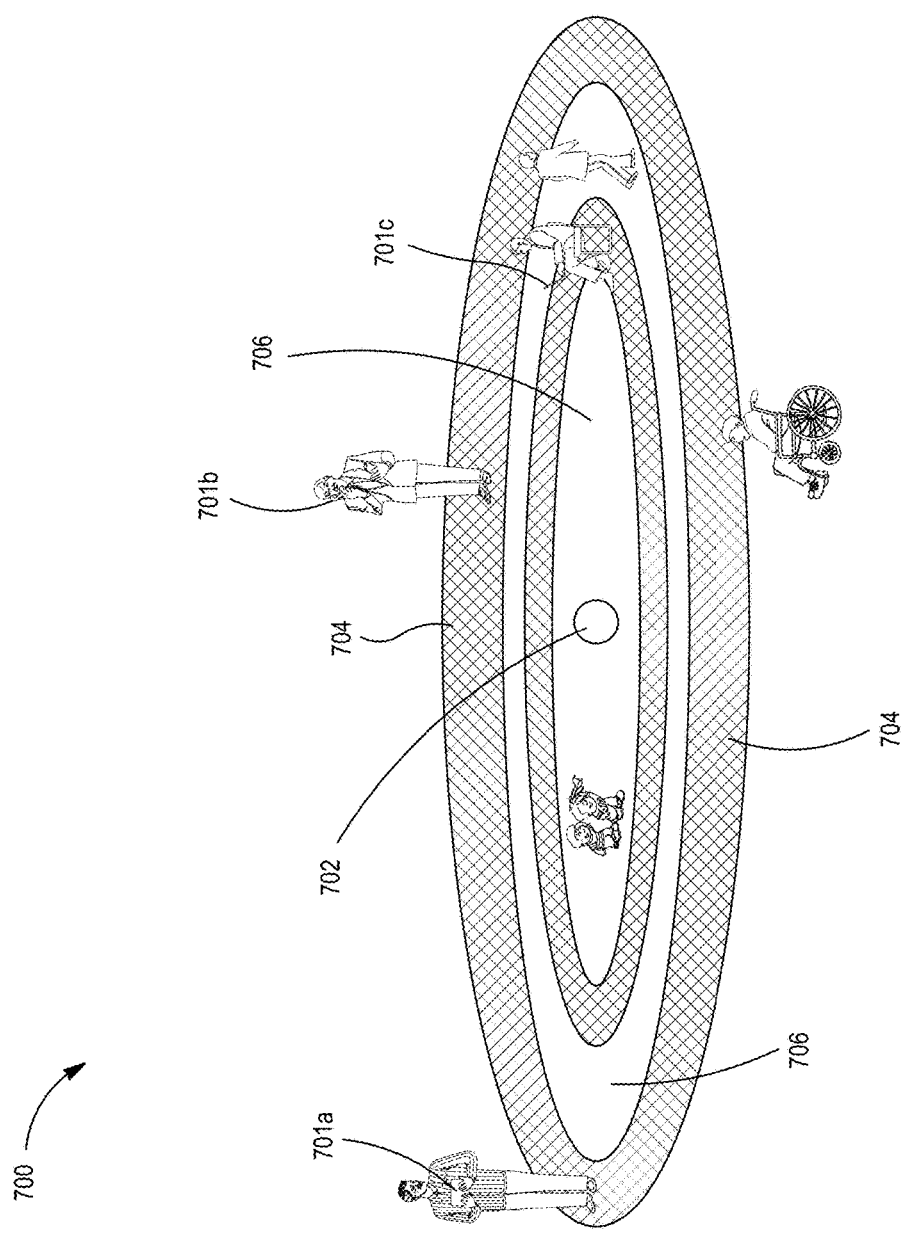
FIG. 7 illustrates wireless power transmission with selective range, where a plurality of pockets of energy may be generated along various radii from transmitter.

FIG. 7 depicts wireless power transmission with selective range 700, where a transmitter 702 may produce pocket-forming for a plurality of receivers associated with electrical devices 701. Transmitter 702 may generate pocket-forming through wireless power transmission with selective range 700, which may include one or more wireless charging radii 704 and one or more radii of null in a particular physical location 706. A plurality of electronic devices 701 may be charged or powered in wireless charging radii 704. Thus, several spots of energy may be created, such spots may be employed for enabling restrictions for powering and charging electronic devices 701. As an example, the restrictions may include operating specific electronics in a specific or limited spot, contained within wireless charging radii 704. Furthermore, safety restrictions may be implemented by the use of wireless power transmission with selective range 700, such safety restrictions may avoid pockets of energy over areas or zones where energy needs to be avoided, such areas may include areas including sensitive equipment to pockets of energy and/or people which do not want pockets of energy over and/or near them. In embodiments such as the one shown in FIG. 7, the transmitter 702 may comprise antenna elements found on a different plane than the receivers associated with electrical devices 701 in the served area. For example the receivers of electrical devices 701 may be in a room where a transmitter 702 may be mounted on the ceiling. Selective ranges for establishing pockets of energy using power transmission waves, which may be represented as concentric circles by placing an antenna array of the transmitter 702 on the ceiling or other elevated location, and the transmitter 702 may emit power transmission waves that will generate 'cones' of energy pockets. In some embodiments, the transmitter 701 may control the radius of each charging radii 704, thereby establishing intervals for service area to create pockets of energy that are pointed down to an area at a lower plane, which may adjust the width of the cone through appropriate selection of antenna phase and amplitudes.

Figure 8:
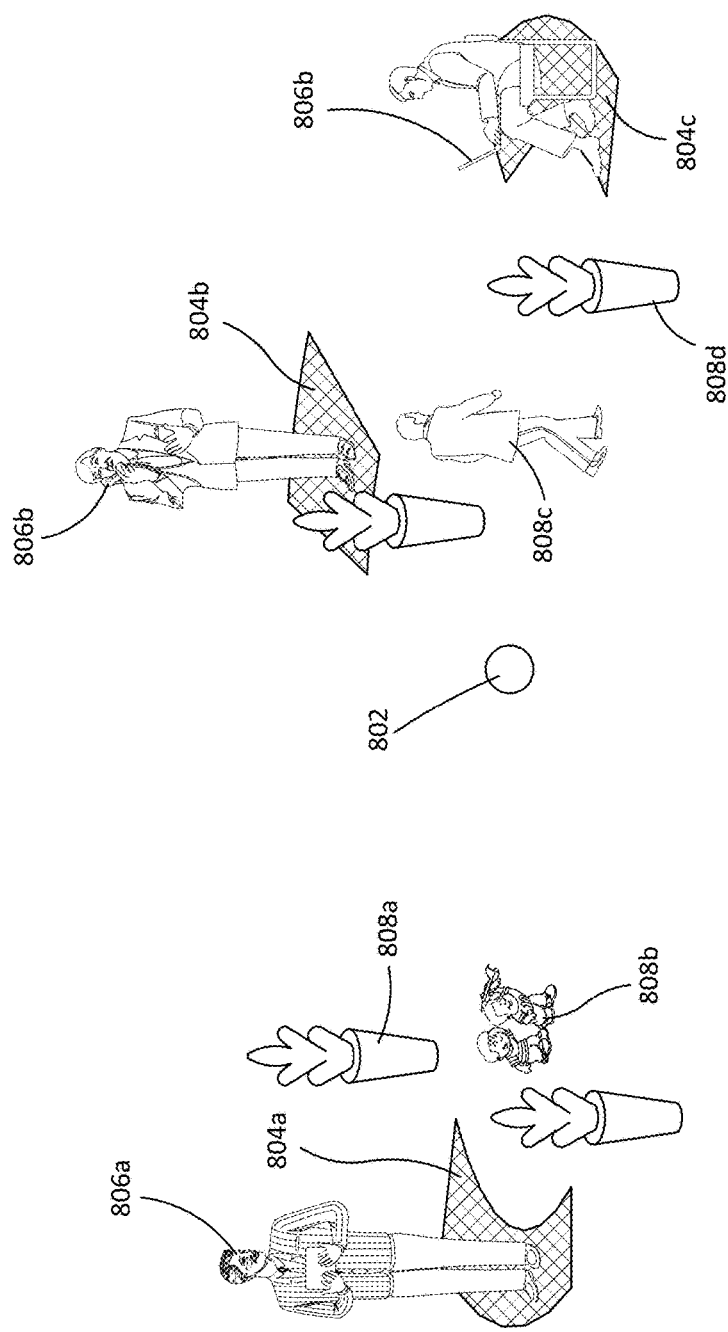
FIG. 8 illustrates wireless power transmission with selective range, where a plurality of pockets of energy may be generated along various radii from transmitter.

FIG. 8 depicts wireless power transmission with selective range 800, where a transmitter 802 may produce pocket-forming for a plurality of receivers 806. Transmitter 802 may generate pocket-forming through wireless power transmission with selective range 800, which may include one or more wireless charging spots 804. A plurality of electronic devices may be charged or powered in wireless charging spots 804. Pockets of energy may be generated over a plurality of receivers 806 regardless the obstacles 804 surrounding them. Pockets of energy may be generated by creating constructive interference, according to the principles described herein, in wireless charging spots 804. Location of pockets of energy may be performed by tacking receivers 806 and by enabling a plurality of communication protocols by a variety of communication systems such as, Bluetooth® technology, infrared communication, Wi-Fi, FM radio, among others.

G. Exemplary System Embodiment Using Heat Maps

Figure 9A:
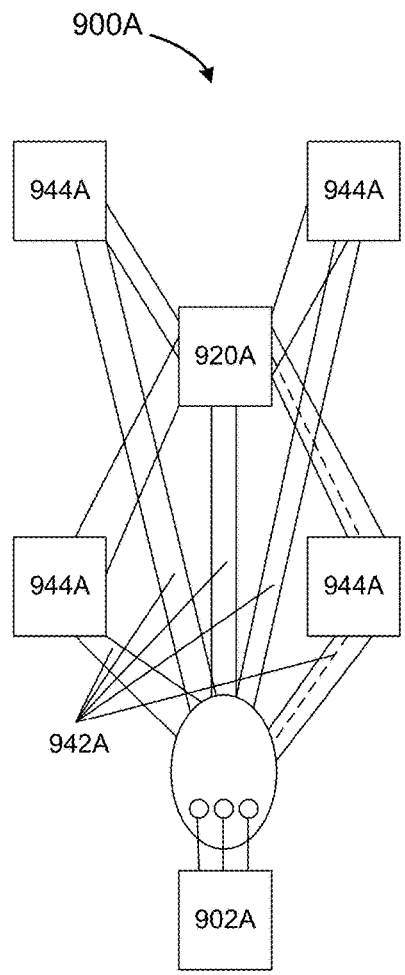
FIGS. 9A and 9B illustrate a diagram of an architecture for wirelessly charging client computing platform, according to an exemplary embodiment
Figure 9B:
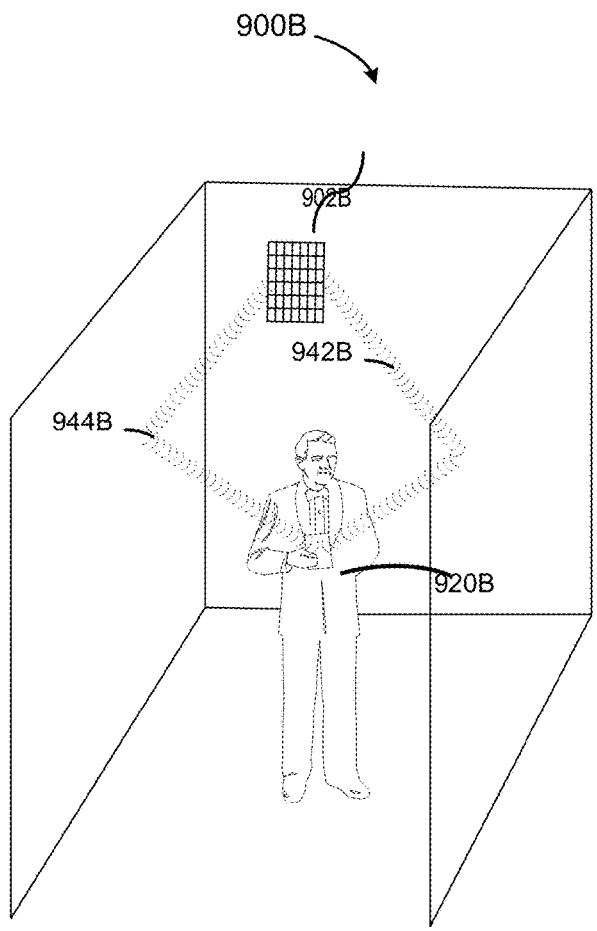

FIGS. 9A and 9B illustrate a diagram of architecture 900A, 900B for a wirelessly charging client computing platform, according to an exemplary embodiment. In some implementations, a user may be inside a room and may hold on his hands an electronic device (e.g. a smartphone, tablet). In some implementations, electronic device may be on furniture inside the room. The electronic device may include a receiver 920A, 920B either embedded to the electronic device or as a separate adapter connected to electronic device. Receivers 920A, 920B may include all the components described in FIG. 11. A transmitter 902A, 902B may be hanging on one of the walls of the room right behind user. Transmitters 902A, 902B may also include all the components described in FIG. 11.

As user may seem to be obstructing the path between receivers 920A, 920B and transmitters 902A, 902B, RF waves may not be easily aimed to the receivers 920A, 920B in a linear direction. However, since the short signals generated from receivers 920A, 920B may be omni-directional for the type of antenna element used, these signals may bounce over the walls 944A, 944B until they reach transmitters 902A, 902B. A hot spot 944A, 944B may be any item in the room which will reflect the RF waves. For example, a large metal clock on the wall may be used to reflect the RF waves to a user's cell phone.

A micro controller in the transmitter adjusts the transmitted signal from each antenna based on the signal received from the receiver. Adjustment may include forming conjugates of the signal phases received from the receivers and further adjustment of transmit antenna phases taking into account the built-in phase of antenna elements. The antenna element may be controlled simultaneously to steer energy in a given direction. The transmitter 902A, 902B may scan the room, and look for hot spots 944A, 944B. Once calibration is performed, transmitters 902A, 902B may focus RF waves in a channel following a path that may be the most efficient paths. Subsequently, RF signals 942A, 942B may form a pocket of energy on a first electronic device and another pocket of energy in a second electronic device while avoiding obstacles such as user and furniture. When scanning the service area, the room in FIGS. 9A and 9B, the transmitter may employ different methods. As an illustrative example, but without limiting the possible methods that can be used, the transmitter may detect the phases and magnitudes of the signal coming from the receiver and use those to form the set of transmit phases and magnitudes, for example by calculating conjugates of them and applying them at transmit. As another illustrative example, the transmitter may apply all possible phases of transmit antennas in subsequent transmissions, one at a time, and detect the strength of the pocket of energy formed by each combination by observing the signal from the receiver. Then the transmitter repeats this calibration time to time. Note that the transmitter does not have to search through all possible phases and can search through a set of phases that are more likely to result in strong pockets of energy based on prior calibration values. In yet another illustrative example, the transmitter may use preset values of transmit phases for the antennas to form pockets of energy directed to different locations in the room. The transmitter may for example scan the physical space in the room from top to bottom and left to right by using preset phase values for antennas in subsequent transmissions. The transmitter then detects the phase values that result in the strongest pocket of energy around the receiver by observing the signal from the receiver. There are other methods possible, without deviating from the spirit of what's described herein. Result of the scan, whichever the method is used, is a heat-map of the room where the transmitter identifies the hot spots that indicate the best phase and magnitude values to use for transmit antennas in order to maximize the pocket of energy around the receiver.

The transmitters 902A, 902B, may use the Bluetooth connection to determine the location of the receivers 920A, 920B, and may use different non-overlapping parts of the RF band to to channel the RF waves to different receivers 920A, 920B. In some implementations, the transmitters 902A, 902B, may conduct a scan of the room to determine the location of the receivers 920A, 920B and forms pockets of energy that are orthogonal to each other, by virtue of non-overlapping RF transmission bands. Using multiple pockets of energy to direct energy to receivers may inherently be safer than some alternative power transmission methods since no single transmission is very strong, while the aggregate power transmission signal received at the receiver is strong.

H. Exemplary System Embodiment

Figure 10A:
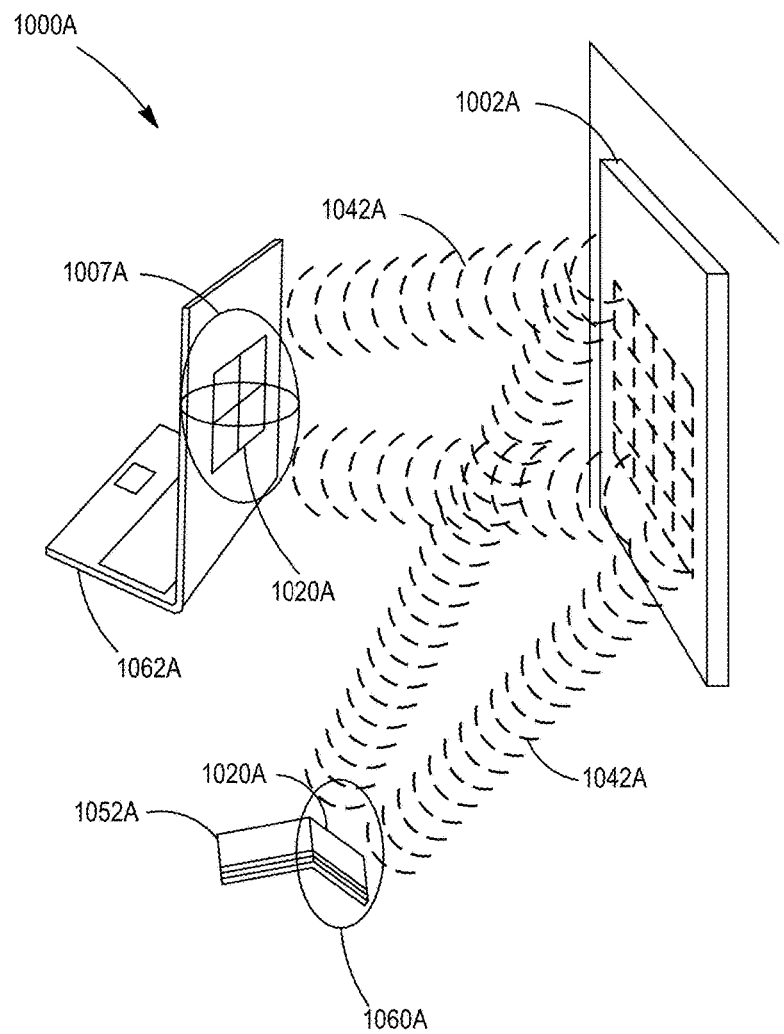
FIG. 10A illustrates wireless power transmission using multiple pocket-forming, according to an exemplary embodiment.

FIG. 10A illustrates wireless power transmission using multiple pocket-forming 1000A that may include one transmitter 1002A and at least two or more receivers 1020A. Receivers 1020A may communicate with transmitters 1002A, which is further described in FIG. 11. Once transmitter 1002A identifies and locates receivers 1020A, a channel or path can be established by knowing the gain and phases coming from receivers 1020A. Transmitter 1002A may start to transmit controlled RF waves 1042A which may converge in three-dimensional space by using a minimum of two antenna elements. These RF waves 1042A may be produced using an external power source and a local oscillator chip using a suitable piezoelectric material. RF waves 1042A may be controlled by RFIC, which may include a proprietary chip for adjusting phase and/or relative magnitudes of RF signals that may serve as inputs for antenna elements to form constructive interference patterns (pocket-forming). Pocket-forming may take advantage of interference to change the directionality of the antenna elements where constructive interference generates a pocket of energy 1060A and deconstructive interference generates a null. Receivers 1020A may then utilize pocket of energy 1060A produced by pocket-forming for charging or powering an electronic device, for example, a laptop computer 1062A and a smartphone 1052A and thus effectively providing wireless power transmission.

Multiple pocket forming 1000A may be achieved by computing the phase and gain from each antenna of transmitter 1002A to each receiver 1020A. The computation may be calculated independently because multiple paths may be generated by antenna element from transmitter 1002A to antenna element from receivers 1020A.

I. Exemplary System Embodiment

Figure 10B:
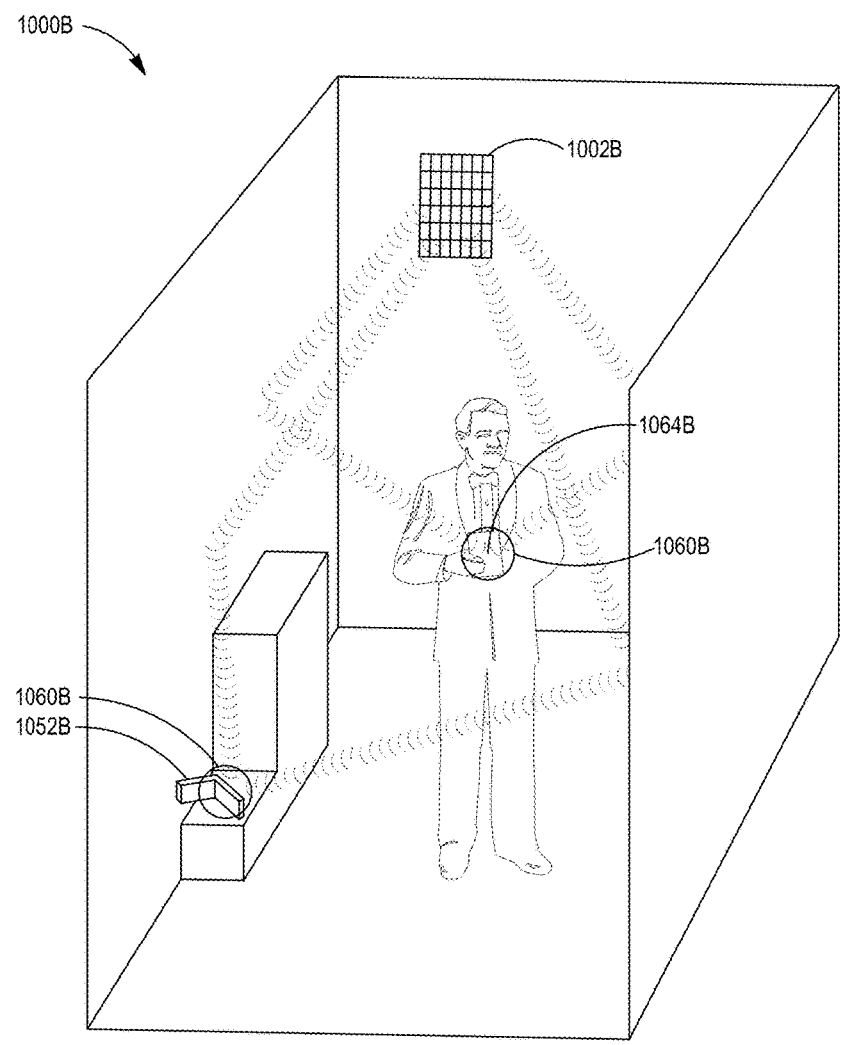
FIG. 10B illustrates multiple adaptive pocket-forming, according to an exemplary embodiment.

FIG. 10B is an exemplary illustration of multiple adaptive pocket-forming 1000B. In this embodiment, a user may be inside a room and may hold on his hands an electronic device, which in this case may be a tablet 1064B. In addition, smartphone 1052B may be on furniture inside the room. Tablet 1064B and smartphone 1052B may each include a receiver either embedded to each electronic device or as a separate adapter connected to tablet 1064B and smartphone 1052B. Receiver may include all the components described in FIG. 11. A transmitter 1002B may be hanging on one of the walls of the room right behind user. Transmitter 1002B may also include all the components described in FIG. 11. As user may seem to be obstructing the path between receiver and transmitter 1002B, RF waves 1042B may not be easily aimed to each receiver in a line of sight fashion. However, since the short signals generated from receivers may be omni-directional for the type of antenna elements used, these signals may bounce over the walls until they find transmitter 1002B. Almost instantly, a micro-controller which may reside in transmitter 1002B, may recalibrate the transmitted signals, based on the received signals sent by each receiver, by adjusting gain and phases and forming a convergence of the power transmission waves such that they add together and strengthen the energy concentrated at that location—in contrast to adding together in a way to subtract from each other and diminish the energy concentrated at that location, which is called "destructive interference" and conjugates of the signal phases received from the receivers and further adjustment of transmit antenna phases taking into account the built-in phase of antenna elements. Once calibration is performed, transmitter 1002B may focus RF waves following the most efficient paths. Subsequently, a pocket of energy 1060B may form on tablet 1064B and another pocket of energy 1060B in smartphone 1052B while taking into account obstacles such as user and furniture. The foregoing property may be beneficial in that wireless power transmission using multiple pocket-forming 1000B may inherently be safe as transmission along each pocket of energy is not very strong, and that RF transmissions generally reflect from living tissue and do not penetrate.

Once transmitter 1002B identities and locates receiver, a channel or path can be established by knowing the gain and phases coming from receiver. Transmitter 1002B may start to transmit controlled RF waves 1042B that may converge in three-dimensional space by using a minimum of two antenna elements. These RF waves 1042B may be produced using an external power source and a local oscillator chip using a suitable piezoelectric material. RF waves 1042B may be controlled by RFIC that may include a proprietary chip for adjusting phase and/or relative magnitudes of RF signals, which may serve as inputs for antenna elements to form constructive and destructive interference patterns (pocket-forming). Pocket-forming may take advantage of interference to change the directionality of the antenna elements where constructive interference generates a pocket of energy and deconstructive interference generates a null in a particular physical location. Receiver may then utilize pocket of energy produced by pocket-forming for charging or powering an electronic device, for example a laptop computer and a smartphone and thus effectively providing wireless power transmission.

Multiple pocket-forming 1000B may be achieved by computing the phase and gain from each antenna of transmitter to each receiver. The computation may be calculated independently because multiple paths may be generated by antenna elements from transmitter to antenna elements from receiver.

An example of the computation for at least two antenna elements may include determining the phase of the signal from the receiver and applying the conjugate of the receive parameters to the antenna elements for transmission.

In some embodiments, two or more receivers may operate at different frequencies to avoid power losses during wireless power transmission. This may be achieved by including an array of multiple embedded antenna elements in transmitter 1002B. In one embodiment, a single frequency may be transmitted by each antenna in the array. In other embodiments some of the antennas in the array may be used to transmit at a different frequency. For example, ½ of the antennas in the array may operate at 2.4 GHz while the other ½ may operate at 5.8 GHz. In another example, ⅓ of the antennas in the array may operate at 900 MHz, Another ⅓ May operate at 2.4 GHz, and the remaining antennas in the array may operate at 5.8 GHz.

In another embodiment, each array of antenna elements may be virtually divided into one or more antenna elements during wireless power transmission, where each set of antenna elements in the array can transmit at a different frequency. For example, an antenna element of the transmitter may transmit power transmission signals at 2.4 GHz, but a corresponding antenna element of a receiver may be configured to receive power transmission signals at 5.8 GHz. In this example, a processor of the transmitter may adjust the antenna element of the transmitter to virtually or logically divide the antenna elements in the array into a plurality patches that may be fed independently. As a result, ¼ of the array of antenna elements may be able to transmit the 5.8 GHz needed for the receiver, while another set of antenna elements may transmit at 2.4 GHz. Therefore, by virtually dividing an array of antenna elements, electronic devices coupled to receivers can continue to receive wireless power transmission. The foregoing may be beneficial because, for example, one set of antenna elements may transmit at about 2.4 GHz and other antenna elements may transmit at 5.8 GHz, and thus, adjusting a number of antenna elements in a given array when working with receivers operating at different frequencies. In this example, the array is divided into equal sets of antenna elements (e.g., four antenna elements), but the array may be divided into sets of different amounts of antenna elements. In an alternative embodiment, each antenna element may alternate between select frequencies.

The efficiency of wireless power transmission as well as the amount of power that can be delivered (using pocket-forming) may be a function of the total number of antenna elements 1006 used in a given receivers and transmitters system. For example, for delivering about one watt at about 15 feet, a receiver may include about 80 antenna elements while a transmitter may include about 256 antenna elements. Another identical wireless power transmission system (about 1 watt at about 15 feet) may include a receiver with about 40 antenna elements, and a transmitter with about 512 antenna elements. Reducing in half the number of antenna elements in a receiver may require doubling the number of antenna elements in a transmitter. In some embodiments, it may be beneficial to put a greater number of antenna elements in transmitters than in a receivers because of cost, because there will be much fewer transmitters than receivers in a system-wide deployment. However, the opposite can be achieved, e.g., by placing more antenna elements on a receiver than on a transmitter as long as there are at least two antenna elements in a transmitter 1002B.

II. Transmitters—Systems and Methods for Wireless Power Transmissions

Transmitters may be responsible for the pocket-forming, adaptive pocket-forming and multiple pocket-forming using the components described below. Transmitters may transmit wireless power transmission signals to receivers in the form of any physical media capable of propagating through space and being converted into useable electrical energy; examples may include RF waves, infrared, acoustics, electromagnetic fields, and ultrasound. It should be appreciated by those skilled in the art that power transmission signals may be most any radio signal, having any frequency or wavelength. Transmitters are described within with reference to RF transmissions, only as an example, and not to limit the scope to RF transmission only.

Transmitters may be located in number of locations, surfaces, mountings, or embedded structures, such as, desks, tables, floors, walls, and the like. In some cases, transmitters may be located in a client computing platforms, which may be any computing device comprising processors and software modules capable of executing the processes and tasks described herein. Non-limiting examples of client computing platforms may include a desktop computer, a laptop computer, a handheld computer, a tablet computing platform, a netbook, a smartphone, a gaming console, and/or other computing platforms. In other embodiments, the client computing platforms may be a variety of electronic computing devices. In such embodiments, each of the client computing platforms may have distinct operating systems, and/or physical components. The client computing platforms may be executing the same operating system and/or the client computing platforms may be executing different operating systems. The client computing platforms and or devices may be capable of executing multiple operating systems. In addition, box transmitters may contain several arrangements of printed circuit board (PCB) layers, which may be oriented in X, Y, or Z axis, or in any combination of these.

It should be appreciated that wireless charging techniques are not limited to RF wave transmission techniques, but may include alternative or additional techniques for transmitting energy to a receiver converting the transmitted energy to electrical power. Non-limiting exemplary transmission techniques for energy that can be converted by a receiving device into electrical power may include: ultrasound, microwave, resonant and inductive magnetic fields, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power.

A. Components of Transmitter Devices

Figure 11:
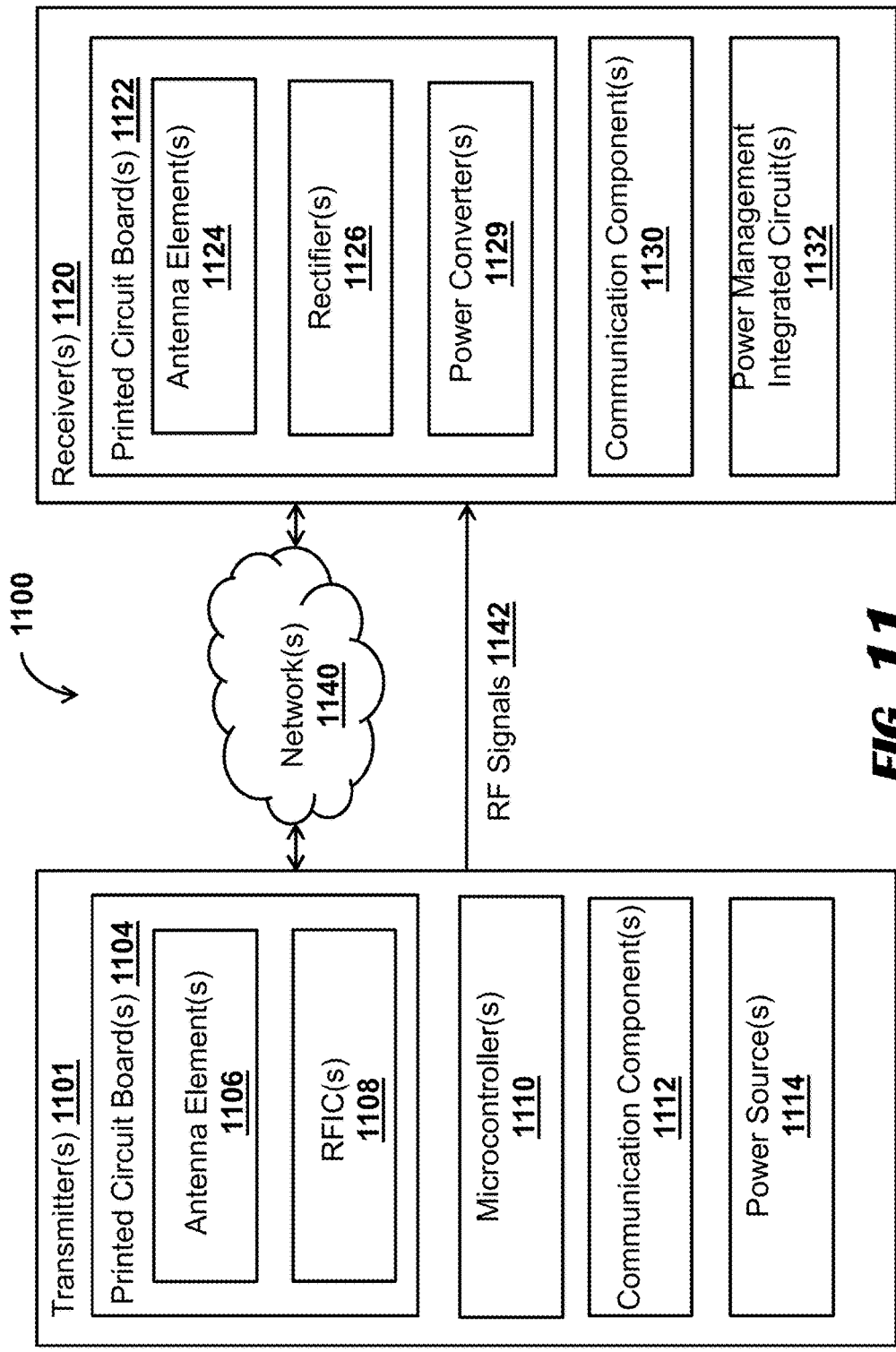
FIG. 11 illustrates a diagram of a system architecture for wirelessly charging client devices, according to an exemplary embodiment.

FIG. 11 illustrates a diagram of a system 1100 architecture for wirelessly charging client devices, according to an exemplary embodiment. The system 1100 may comprise a transmitter 1101 and a receiver 1120 that may each comprise an application-specific integrated circuit (ASIC). The transmitter 1101 ASIC may include one or more printed circuit boards (PCB) 1104, one or more antenna elements 1106, one or more radio frequency integrated circuits (RFIC) 1108, one or more microcontrollers (MCs) 1110, a communication component 1112, a power source 1114. The transmitter 1101 may be encased in a housing, which may allocate all the requested components for transmitter 1101. Components in transmitter 1101 may be manufactured using meta-materials, micro-printing of circuits, nano-materials, and/or any other materials. It should be obvious to someone skilled in the art that the entire transmitter or the entire receiver can be implemented on a single circuit board, as well as having one or more of the functional blocks implemented in separate circuit boards.

1. Printed Circuit Boards 1104

In some implementations, the transmitter 1101 may include a plurality of PCB 1104 layers, which may include antenna element 1106 and/or RFIC 1108 for providing greater control over pocket-forming and may increase response for targeting receivers. The PCB 1104 may mechanically support and electrically connect the electronic component described herein using conductive tracks, pads and/or other features etched from copper sheets laminated onto a non-conductive substrate. PCBs may be single sided (one copper layer), double sided (two copper layers), and/or multi-layer. Multiple PCB 1104 layers may increase the range and the amount of power that could be transferred by transmitter 1101. PCB 1104 layers may be connected to a single MC 1110 and/or to dedicated MCs 1110. Similarly, RFIC 1108 may be connected to antenna element 1106 as depicted in the foregoing embodiments.

In some implementations, a box transmitter, including a plurality of PCB 1104 layers inside it may include antenna element 1108 for providing greater control over pocket-forming and may increase the response for targeting receivers. Furthermore, range of wireless power transmission may be increased by the box transmitter. Multiple PCB 1104 layers may increase the range and the amount of power waves (e.g., RF power waves, ultrasound waves) that could be transferred and/or broadcasted wirelessly by transmitter 1101 due the higher density of antenna element 1106. The PCB 1104 layers may be connected to a single microcontroller 1110 and/or to dedicated microcontroller 1110 for each antenna element 1106. Similarly, RFIC 1108 may control antenna element 1101 as depicted in the foregoing embodiments. Furthermore, box shape of transmitter 1101 may increase action ratio of wireless power transmission.

2. Antenna Elements

Antenna element 1106 may be directional and/or omnidirectional and include flat antenna elements, patch antenna elements, dipole antenna elements, and any other suitable antenna for wireless power transmission. Suitable antenna types may include, for example, patch antennas with heights from about ⅛ inch to about 6 inches and widths from about ⅛ inch to about 6 inches. The shape and orientation of antenna element 1106 may vary in dependency of the desired features of transmitter 1101; orientation may be flat in X, Y, and Z axis, as well as various orientation types and combinations in three dimensional arrangements. Antenna element 1106 materials may include any suitable material that may allow RF signal transmission with high efficiency, good heat dissipation and the like. The amount of antenna elements 1106 may vary in relation with the desired range and power transmission capability on transmitter 1101; the more antenna elements 1106, the wider range and higher power transmission capability.

Antenna element 1106 may include suitable antenna types for operating in frequency bands such as 900 MHz, 2.5 GHz or 5.8 GHz as these frequency bands conform to Federal Communications Commission (FCC) regulations part 18 (industrial, scientific, and medical equipment). Antenna element 1106 may operate in independent frequencies, allowing a multichannel operation of pocket-forming.

In addition, antenna element 1106 may have at least one polarization or a selection of polarizations. Such polarization may include vertical polarization, horizontal polarization, circularly polarized, left hand polarized, right hand polarized, or a combination of polarizations. The selection of polarizations may vary in dependency of transmitter 1101 characteristics. In addition, antenna element 1106 may be located in various surfaces of transmitter 1101. Antenna element 1106 may operate in single array, pair array, quad array and any other suitable arrangement that may be designed in accordance with the desired application.

In some implementations, the entire side of the printed circuit board PCB 1104 may be closely packed with antenna element 1106. The RFIC 1108 may connect to multiple antenna elements 1106. Multiple antenna elements 1106 may surround a single RFIC 1108.

3. Radio Frequency Integrated Circuits

The RFIC 1108 may receive an RF signal from the MC 1110, and split the RF signal into multiple outputs, each output linked to an antenna element 1106. For example, each RFIC 1108 may be connected to four antenna elements 1106. In some implementations, each RFIC 1108 may be connected to eight, sixteen, and/or multiple antenna elements 1106.

The RFIC 1104 may include a plurality of RF circuits that may include digital and/or analog components, such as, amplifiers, capacitors, oscillators, piezoelectric crystals and the like. RFIC 1104 may control features of antenna element 1106, such as gain and/or phase for pocket-forming and manage it through direction, power level, and the like. The phase and the amplitude of pocket-forming in each antenna element 1106 may be regulated by the corresponding RFIC 1108 in order to generate the desired pocket-forming and transmission null steering. In addition, RFIC 1108 may be connected to MC 1110, which may utilize digital signal processing (DSP), ARM, PIC-Class microprocessor, central processing unit, computer, and the like. The lower number of RFICs 1108 present in the transmitter 1101 may correspond to desired features such as lower control of multiple pocket-forming, lower levels of granularity, and a less expensive embodiment. In some implementations, RFIC 1108 may be coupled to one or more MCs 1110, and MC 1110 may be included into an independent base station or into the transmitter 1101.

In some implementations of transmitter 1101, the phase and the amplitude of each pocket-forming in each antenna element 1106 may be regulated by the corresponding RFIC 1108 in order to generate the desired pocket-forming and transmission null steering. RFIC 1108 singled coupled to each antenna element 1106 may reduce processing requirement and may increase control over pocket-forming, allowing multiple pocket-forming and a higher granular pocket-forming with less load over MC 1110, and a higher response of higher number of multiple pocket-forming may be allowed. Furthermore, multiple pocket-forming may charge a higher number of receivers and may allow a better trajectory to such receivers.

RFIC 1108 and antenna element 1106 may operate in any suitable arrangement that may be designed in accordance with the desired application. For example, transmitter 1101 may include antenna element 1106 and RFIC 1108 in a flat arrangement. A subset of 4, 8, 16, and/or any number of antenna elements 1106 may be connected to a single RFIC 1108. RFIC 1108 may be directly embedded behind each antenna element 1106; such integration may reduce losses due the shorter distance between components. In some implementations, a row or column of antenna elements 1106 may be connected to a single MC 1110. RFIC 1108 connected to each row or column may allow a less expensive transmitter 1101 that may produce pocket-forming by changing phase and gain between rows or columns. In some implementations, the RFIC 1108 may output between 2-8 volts of power for the receiver 1120 to obtain.

In some implementations, a cascade arrangement of RFICs 1108 may be implemented. A flat transmitter 1101 using a cascade arrangement of RFICs 1108 may provide greater control over pocket-forming and may increase response for targeting receivers 1106, as well as a higher reliability and accuracy may be achieved because multiple redundancy of RFICs 1108.

4. Microcontrollers

The MC 1110 may comprise a processor running ARM and/or DSP. ARM is a family of general purpose microprocessors based on a reduced instruction set computing (RISC). A DSP is a general purpose signal processing chip may provide a mathematical manipulation of an information signal to modify or improve it in some way, and can be characterized by the representation of discrete time, discrete frequency, and/or other discrete domain signals by a sequence of numbers or symbols and the processing of these signals. DSP may measure, filter, and/or compress continuous real-world analog signals. The first step may be conversion of the signal from an analog to a digital form, by sampling and then digitizing it using an analog-to-digital converter (ADC), which may convert the analog signal into a stream of discrete digital values. The MC 1110 may also run Linux and/or any other operating system. The MC 1110 may also be connected to Wi-Fi in order to provide information through a network 1140.

MC 1110 may control a variety of features of RFIC 1108 such as, time emission of pocket-forming, direction of the pocket-forming, bounce angle, power intensity and the like. Furthermore, MC 1110 may control multiple pocket-forming over multiple receivers or over a single receiver. Transmitter 1101 may allow distance discrimination of wireless power transmission. In addition, MC 1110 may manage and control communication protocols and signals by controlling communication component 1112. MC 1110 may process information received by communication component 1112 that may send and receive signals to and from a receiver in order to track it and concentrate radio frequency signals 1142 (i.e., pockets of energy) on it. Other information may be transmitted from and to receiver 1120; such information may include authentication protocols among others through a network 1140.

The MC 1110 may communicate with the communication component 1112 through serial peripheral interface (SPI) and/or inter-integrated circuit (I²C) protocol. SPI communication may be used for short distance, single master communication, for example in embedded systems, sensors, and SD cards. Devices communicate in master/slave mode where the master device initiates the data frame. Multiple slave devices are allowed with individual slave select lines. I²C is a multi-master, multi-slave, single-ended, serial computer bus used for attaching low-speed peripherals to computer motherboards and embedded systems 5. Communications Component Communication component 1112 may include and combine Bluetooth technology, infrared communication, Wi-Fi, FM radio among others. MC 1110 may determine optimum times and locations for pocket-forming, including the most efficient trajectory to transmit pocket forming in order to reduce losses because obstacles. Such trajectory may include direct pocket-forming, bouncing, and distance discrimination of pocket-forming. In some implementations, the communication component 1112 may communicate with a plurality of devices, which may include receivers 1120, client devices, or other transmitters 1101.

6. Power Source 1101

Transmitters 1101 may be fed by a power source 1114 that may include AC or DC power supply. Voltage, power, and current intensity provided by power source 1114 may vary in dependency with the required power to be transmitted. Conversion of power to radio signal may be managed by MC 1110 and carried out by RFIC 1108 that may utilize a plurality of methods and components to produce radio signals in a wide variety of frequencies, wavelength, intensities, and other features. As an exemplary use of a variety of methods and components for radio signal generation, oscillators and piezoelectric crystals may be used to create and change radio frequencies in different antenna elements 1106. In addition, a variety of filters may be used for smoothing signals as well as amplifiers for increasing power to be transmitted.

Transmitter 1101 may emit RF power waves that are pocket-forming with a power capability from few watts to a predetermined number of watts required by a particular chargeable electronic device. Each antenna may manage a certain power capacity. Such power capacity may be related with the application 7. Housing In addition to a housing, an independent base station may include MC 1110 and power source 1114, thus, several transmitters 1101 may be managed by a single base station and a single MC 1110. Such capability may allow the location of transmitters 1101 in a variety of strategic positions, such as ceiling, decorations, walls, and the like. Antenna elements 1106, RFIC 1108, MC 1110, communication component 1112, and power source 1114 may be connected in a plurality of arrangements and combinations, which may depend on the desired characteristics of transmitter 1101.

Figure 23:
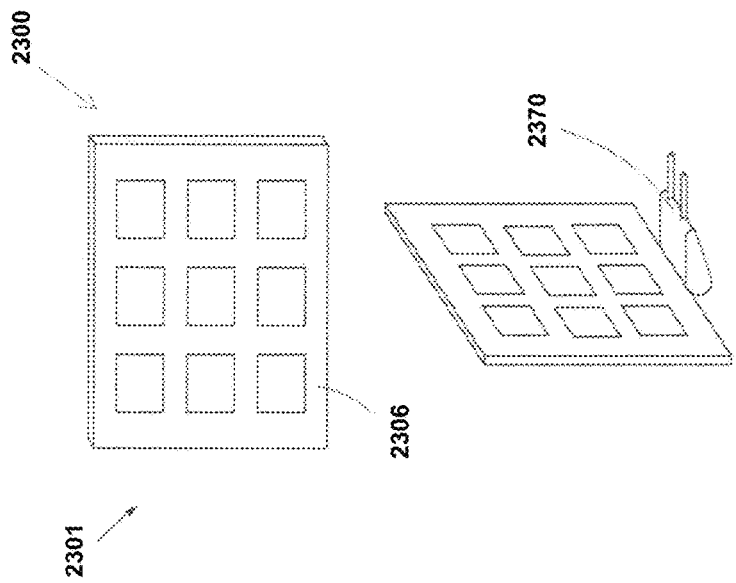
FIG. 23 illustrates a portable transmitter with a power plug which may connect a portable wireless transmitter to one or more power outlets, according to an exemplary embodiment.

FIG. 23 illustrates wireless power transmission system 2300 comprising a portable transmitter 2301 with a power plug which may connect a portable wireless transmitter to one or more power outlets, according to an exemplary embodiment. Portable wireless transmitter 2301 may include antenna elements in a flat arrangement. Portable wireless transmitter 2301 may be connected to a power source through one or more power plug 2370, such power plug 2370 may comply with the standard of each country and/or region. Power plug 2370 may be intended to connect portable wireless transmitter 2301 to one or more power outlet on the walls, floors, ceilings and/or electric adapters.

In order to increase portability of portable wireless transmitter 2301, power plug 2370 may be foldable, telescopic, ultra-compact and the like. Such features may reduce size for transportation and for pocketing. Portable wireless transmitter 2301 may be built into a housing 2306, which may provide additional protection against water, high temperature, sand, bugs, shocks, vibration and other rough conditions which may be a threat to the integrity of portable wireless transmitter 2301. Thus, housing 2306 may be made using a plurality of materials which may provide the forgoing characteristics.

Figure 24:
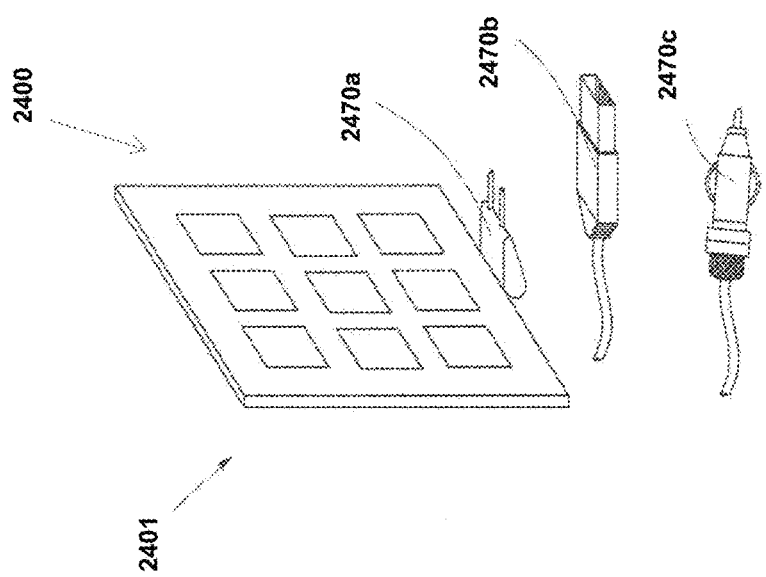
FIG. 24 illustrates a transmitter where a plurality of power plugs connect a portable wireless transmitter to a variety of power sources and/or electric adapters, according to an exemplary embodiment.

FIG. 24 illustrates a wireless power transmission system 2400 comprising a transmitter 2401 where a plurality of power plugs connect a portable wireless transmitter to a variety of power sources and/or electric adapters, according to an exemplary embodiment. FIG. 24 depicts a portable wireless transmitter 2401 showing different power plugs, such power plug may include a USB adapter 2470b, and a cigarette lighter plug 2470c. USB adapter 2470b may be used for receive power from any device having a USB port. These devices may include, laptops, Smart TVs, tablets and the like. Cigarette lighter plug 2470c may be used for receive power from any cigarette lighter socket, such as the used in cars. In addition, portable wireless transmitter 2401 may include a variety of power plugs 2470a, such power plugs 2470a may vary in dependency with the final application.

Figure 25:
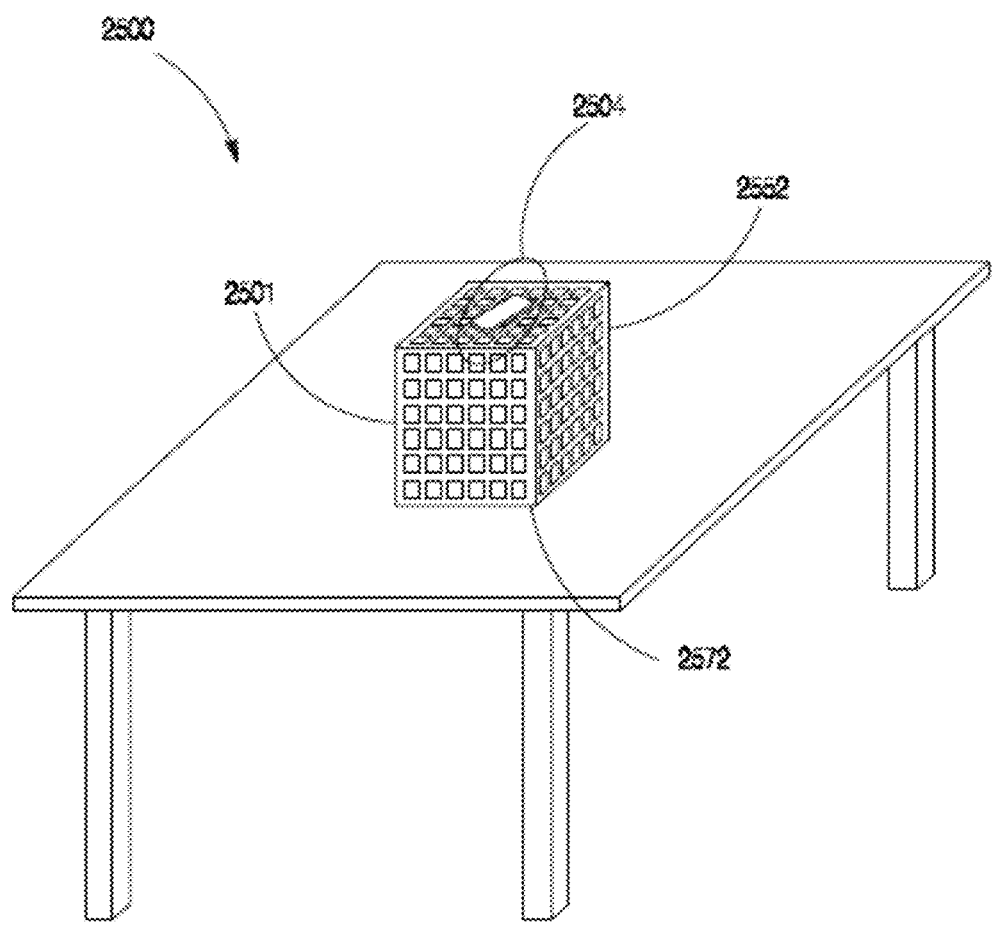
FIG. 25 illustrates a wireless power transmission system where a transmitter may include a button which upon activation may create at least one pocket of energy, according to an exemplary embodiment.

FIG. 25 illustrates a wireless power transmission system 2500 where a transmitter 2501 may include a button 2572 which upon activation may create at least one pocket of energy 2504 in its top surface. A smartphone 2552 operatively coupled to a receiver (not shown), upon being placed atop such surface, may receive power wirelessly by utilizing the aforementioned pocket of energy 2504. This configuration for wireless power transmission 2500 can be beneficial whenever smartphone 2552 cannot communicate its location by to transmitter 2501, for example whenever smartphone 2552 runs out of power completely. Communication may refer to the information represented as data sent from one computer to one or more computers or processors of the wireless power transmission system. The data takes the form of a series of bytes, where each byte is 8 binary bits, and each binary bit is the numerical value of either '0' or '1.' A bit is communicated from one computer to another electrically or electronically by representing the '0' and the '1' as discreet or different electrical voltage or current or phase or frequency values. A bit is communicated from one computer to another wirelessly by representing the '0' and the '1' as radio frequency (RF) energy. In addition, smartphone 2552 may charge faster because of its proximity to transmitter 2501. An even further advantage of this configuration is that if the user decides to remove smartphone 2552 (after smartphone 2552 has built the minimum charge for establishing communication with transmitter 2501) from the surface of transmitter 2501, smartphone 2552 may still receive power wirelessly through pocket-forming. Thus, the mobility of smartphone 2552 may not be compromised.

B. Exemplary Method of Transmitting Power

Figure 12:
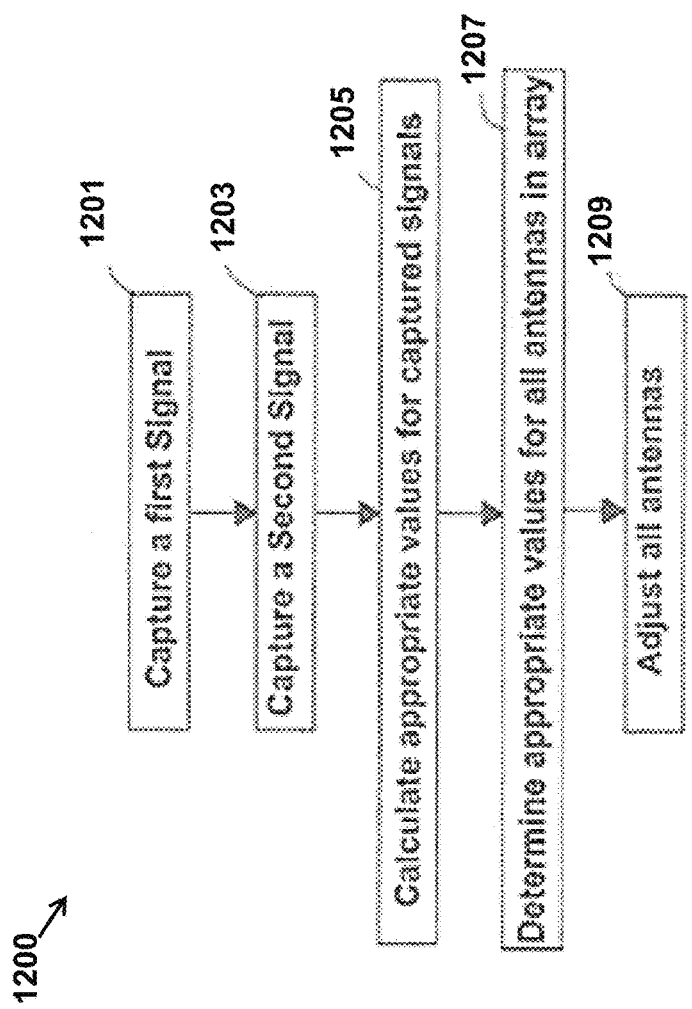
FIG. 12 illustrates a method for determining receiver location using antenna element, according to an exemplary embodiment.

FIG. 12 is a method for determining receiver location 1200 using antenna element. Method for determining receiver location 1200 may be a set of programmed rules or logic managed by MC. The process may begin step 1201 by capturing first signal with a first subset of antennas from the antenna array. The process may follow immediately by switching to a different subset of antenna element and capturing, at a next step 1203, a second signal with a second subset of antennas. For example, a first signal may be captured with a row of antennas and the second capturing may be done with a column of antennas. A row of antennas may provide a horizontal degree orientation such an azimuth in a spherical coordinate system. A column of antennas may provide a vertical degree orientation such as elevation. Antenna elements used for capturing first signal and capturing second signal may be aligned in straight, vertical, horizontal, or diagonal orientation. The first subset and second subset of antennas may be aligned in a cross like structure in order to cover degrees around transmitter.

Once both vertical and horizontal values have been measured, the MC may, in a next step 1205, determine the appropriate values of phase and gain for the vertical and horizontal antenna elements used to capture the signal. Appropriate values for phase and gain may be determined by the relationship of the position of the receiver to the antenna. The values may be used by MC in order to adjust antenna elements to form pockets of energy that may be used by a receiver in order to charge an electronic device.

Data pertaining to initial values of all antenna elements in transmitter may be calculated and stored previously for use by MC in order to assist in the calculation of appropriate values for antenna elements. In a next step, 1207, after the appropriate values for the vertical and horizontal antennas used for capturing the signal have been determined, the process may continue by using the stored data to determine appropriate values for all the antennas in the array. Stored data may contain initial test values of phase and gain for all antenna elements in the array at different frequencies. Different sets of data may be stored for different frequencies and MC may select the appropriate data set accordingly. In a next step 1209, MC may then adjust all antennas through RFIC in order to form pockets of energy at the appropriate locations.

C. Array Subset Configuration

Figure 13A:
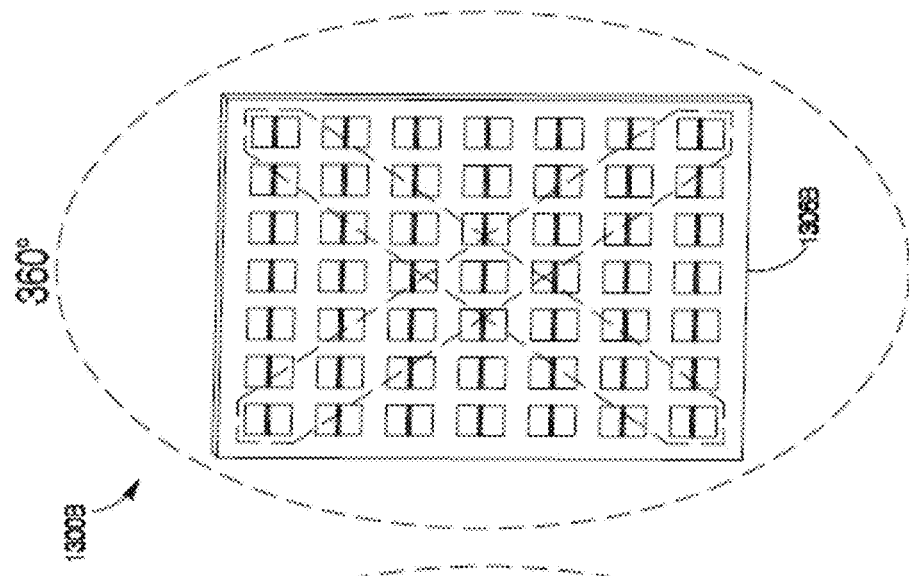
FIG. 13A illustrates an array subset configuration, according to an exemplary embodiment.

FIG. 13A illustrates an example embodiment of an array subset configuration 1300A that may be used in method for determining receiver location. Transmitter may include an array of antennas 1306A. A row of antennas 1368A may be used first for capturing a signal sent by a receiver. Row of antennas 1368A may then transfer the signal to the RFIC, where the signal may be converted from a radio signal to a digital signal and passed on to MC for processing. MC may then determine appropriate adjustments for phase and gain in row of antennas 1368A in order to form pockets of energy at the appropriate locations based on the receiver locations. A second signal may be captured by a column of antennas 1370A. Column of antennas 1370A may then transfer the signal to the RFIC, where the signal may be converted from a radio signal to a digital signal and passed on to MC for processing. MC may then determine appropriate adjustments for phase and gain in column of antennas 1370A in order to form pockets of energy at the appropriate locations based on the receiver locations. Once the appropriate adjustments have been determined for row of antennas 1368A and column of antennas 1370A MC may determine the appropriate values for the rest of antenna elements 1306A in array of antennas 1368A by using previously stored data about the antennas and adjusting accordingly with the results from row of antennas 1368A and column of antennas 1370A.

Figure 13B:
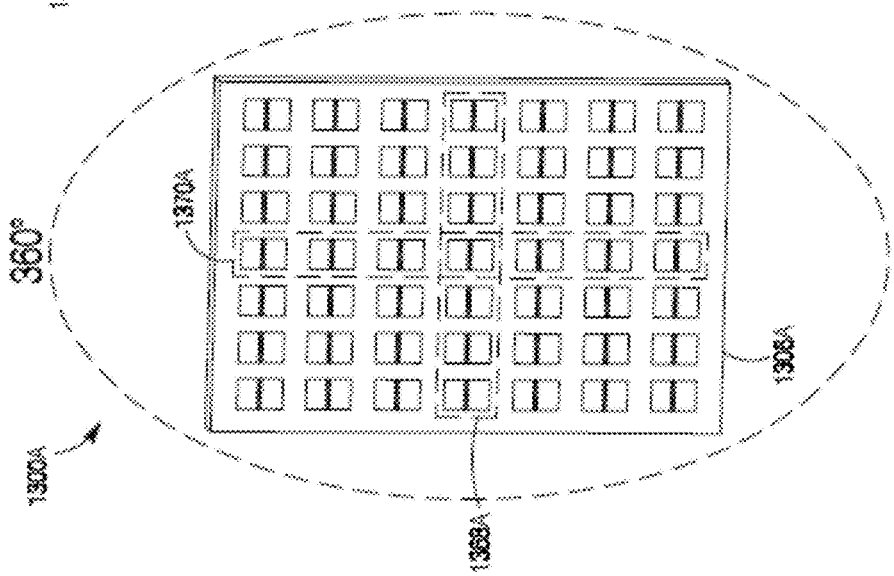
FIG. 13B illustrates an array subset configuration, according to an exemplary embodiment.

D. Configurations for Transmitters, Transmitter Components, Antenna Tiles, and Systems Related to Transmitters 1. Exemplary System FIG. 13B illustrates another example embodiment of an array subset configuration 1300B. In array subset configuration 1300B, both initial signals are captured by two diagonal subsets of antennas. The process follows the same path, such that each subset is adjusted accordingly. Based on adjustments made and the previously stored data, the rest of antenna elements 1306B in array of antennas are adjusted.

2. Flat Transmitter

Figure 14:
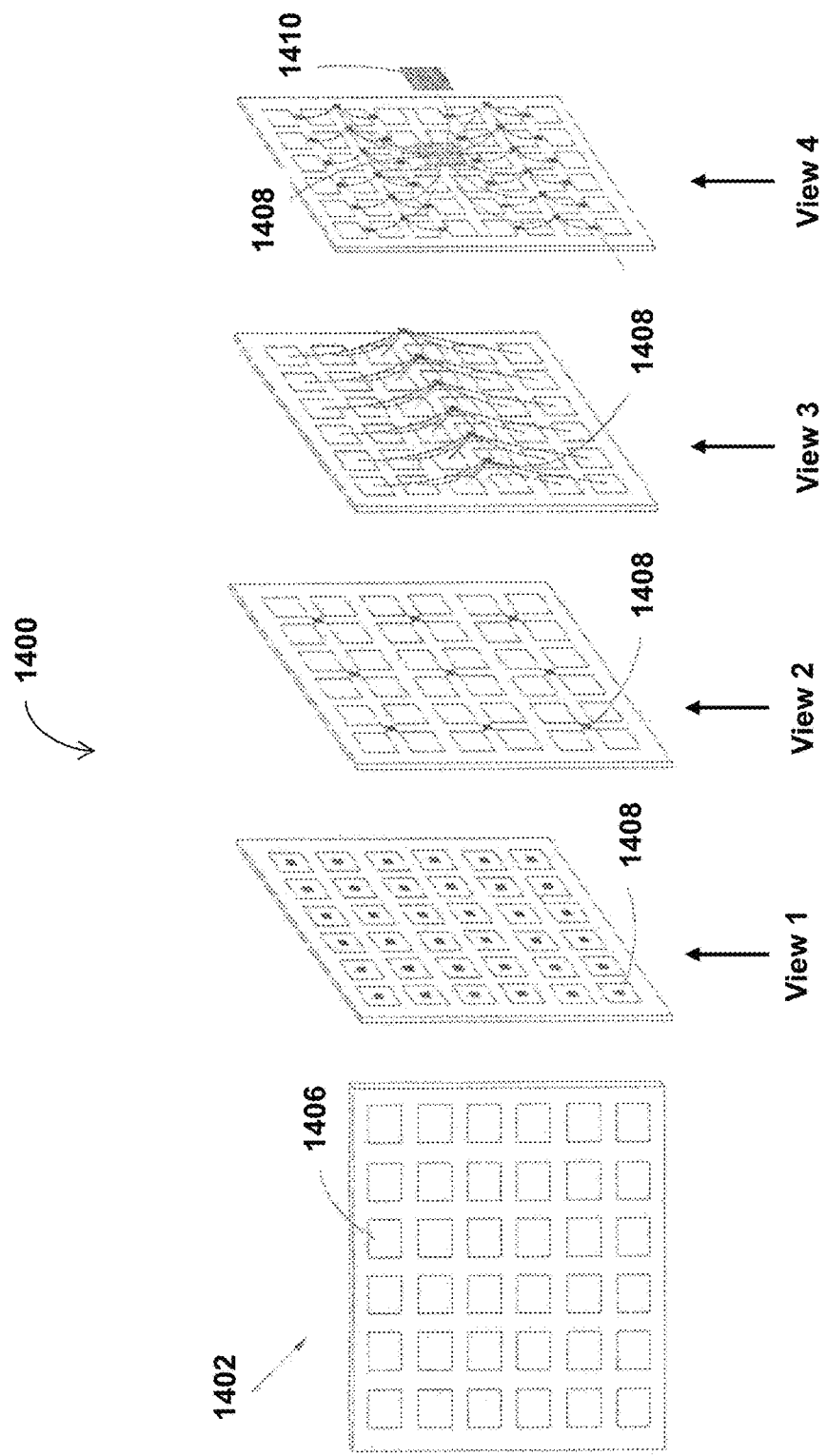
FIG. 14 illustrates a flat transmitter, according to an exemplary embodiment.

FIG. 14 depicts a flat transmitter 1402 in a front view and a several embodiments of rear views. Transmitter 1402 may include antenna element 1406 and RFIC 1408 in a flat arrangement. RFIC 1408 may be directly embedded behind each antenna element 1406; such integration may reduce losses due the shorter distance between components.

In one embodiment (i.e., View 1) in transmitter 1402, the phase and the amplitude of the pocket-forming for each antenna element 1406 may be regulated by the corresponding RFIC 1408 in order to generate the desired pocket-forming and transmission null steering. RFIC 1408 singled coupled to each antenna element 1406 may reduce processing requirement and may increase control over pocket-forming, allowing multiple pocket-forming and a higher granular pocket-forming with less load over MC 1410; thus, a higher response of higher number of multiple pocket-forming may be allowed. Furthermore, multiple pocket-forming may charge a higher number of receivers and may allow a better trajectory to such receivers. As described in the embodiment of FIG. 11, RFIC 1408 may be coupled to one or more MCs 1410, and microcontroller 1410 may be included into an independent base station or into the transmitter 1402.

In another embodiment (i.e., View 2), a subset of 4 antenna elements 1406 may be connected to a single RFIC 1408. The lower number of RFICs 1408 present in the transmitter 142 may correspond to desired features such as: lower control of multiple pocket-forming, lower levels of granularity and a less expensive embodiment. As described in the embodiment of FIG. 11, RFIC 1408 may be coupled to one or more MCs 1410, and microcontroller 1410 may be included into an independent base station or into the transmitter 1402.

In yet another embodiment (i.e., View 3), transmitter 1402 may include antenna element 1406 and RFIC 1408 in a flat arrangement. A row or column of antenna elements 1406 may be connected to a single MC 1410. The lower number of RFICs 1408 present in the transmitter 1402 may correspond to desired features such as: lower control of multiple pocket-forming, lower levels of granularity and a less expensive embodiment. RFIC 1408 connected to each row or column may allow a less expensive transmitter 1402, which may produce pocket-forming by changing phase and gain between rows or columns. As described in the embodiment of FIG. 11, RFIC 1408 may be coupled to one or more MCs 1410, and microcontroller 1410 may be included into an independent base station or into the transmitter 1402.

In some embodiments (i.e., View 4), transmitter 1402 may include antenna element 1406 and RFIC 1408 in a flat arrangement. A cascade arrangement is depicted in this exemplary embodiment. Two antenna elements 1406 may be connected to a single RFIC 1408 and this in turn to a single RFIC 1408, which may be connected to a final RFIC 1408 and this in turn to one or more MCs 1410. Flat transmitter 1402 using a cascade arrangement of RFICs 1408 may provide greater control over pocket-forming and may increase response for targeting receivers. Furthermore, a higher reliability and accuracy may be achieved because multiple redundancy of RFICs 1408. As described in the embodiment of FIG. 11, RFIC 1408 may be coupled to one or more MCs 1410, and microcontroller 1410 may be included into an independent base station or into the transmitter 1402.

3. Multiple Printed Circuit Board Layers

Figure 15:
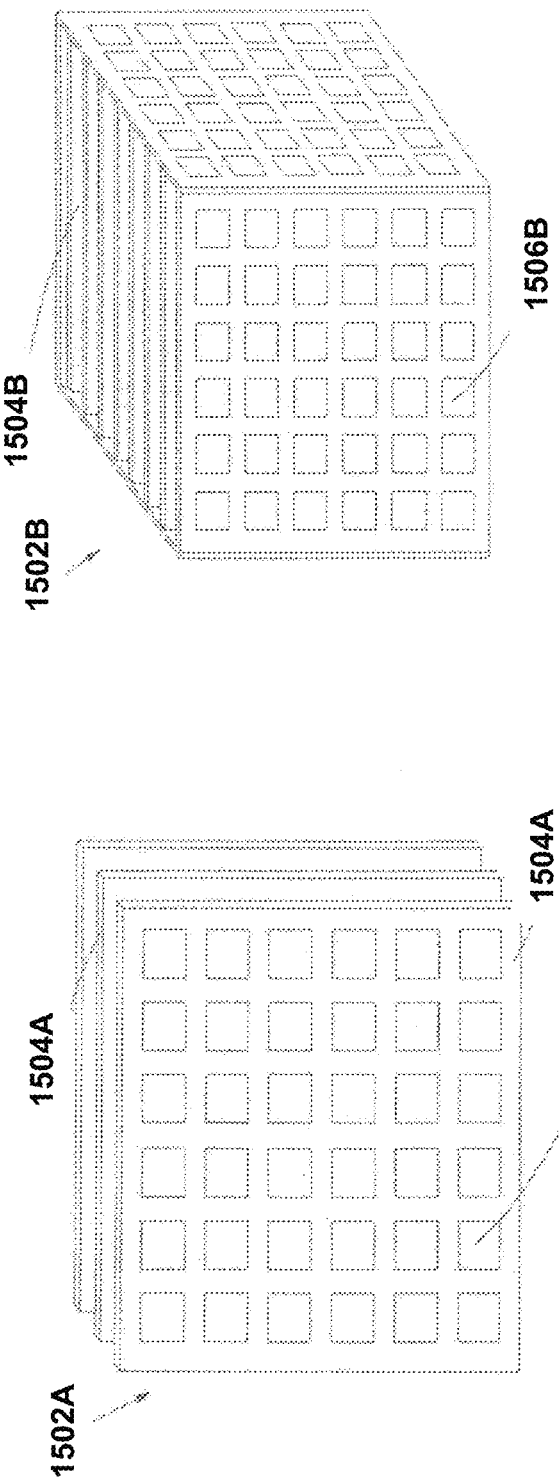
FIG. 15A illustrates a transmitter, according to an exemplary embodiment.
FIG. 15B illustrates a box transmitter, according to an exemplary embodiment.

FIG. 15A depicts a transmitter 1502A, which may include a plurality of PCB layers 1204A that may include antenna element 1506A for providing greater control over pocket-forming and may increase response for targeting receivers. Multiple PCB layers 1504A may increase the range and the amount of power that could be transferred by transmitter 1502A. PCB layers 1504A may be connected to a single MC or to dedicated MC. Similarly, RFIC may be connected antenna element 1506A as depicted in the foregoing embodiments. RFIC may be coupled to one or more MCs. Furthermore, MCs may be included into an independent base station or into the transmitter 1502A.

4. Box Transmitter

FIG. 15B depicts a box transmitter 1502B, which may include a plurality of PCB layers 1504B inside it, which may include antenna element 1506B for providing greater control over pocket-forming and may increase response for targeting receivers. Furthermore, range of wireless power transmission may be increased by the box transmitter 1502B. Multiple PCB layers 1504B may increase the range and the amount of RF power waves that could be transferred or broadcasted wirelessly by transmitter 1502B due the higher density of antenna element 1506B. PCB layers 1504B may be connected to a single MC or to dedicated MC for each antenna element 1506B. Similarly, RFIC may control antenna element 1506B as depicted in the foregoing embodiments. Furthermore, box shape of transmitter 800 may increase action ratio of wireless power transmission; thus, box transmitter 1502B may be located on a plurality of surfaces such as, desks, tables, floors, and the like. In addition, box transmitter 1502B may comprise several arrangements of PCB layers 1504B, which may be oriented in X, Y, and Z axis, or any combination these. The RFIC may, be coupled to one or more MCs. Furthermore, MCs may be included into an independent base station or into the transmitter 1502B.

5. Irregular Arrays for Various Types of Products

Figure 16:
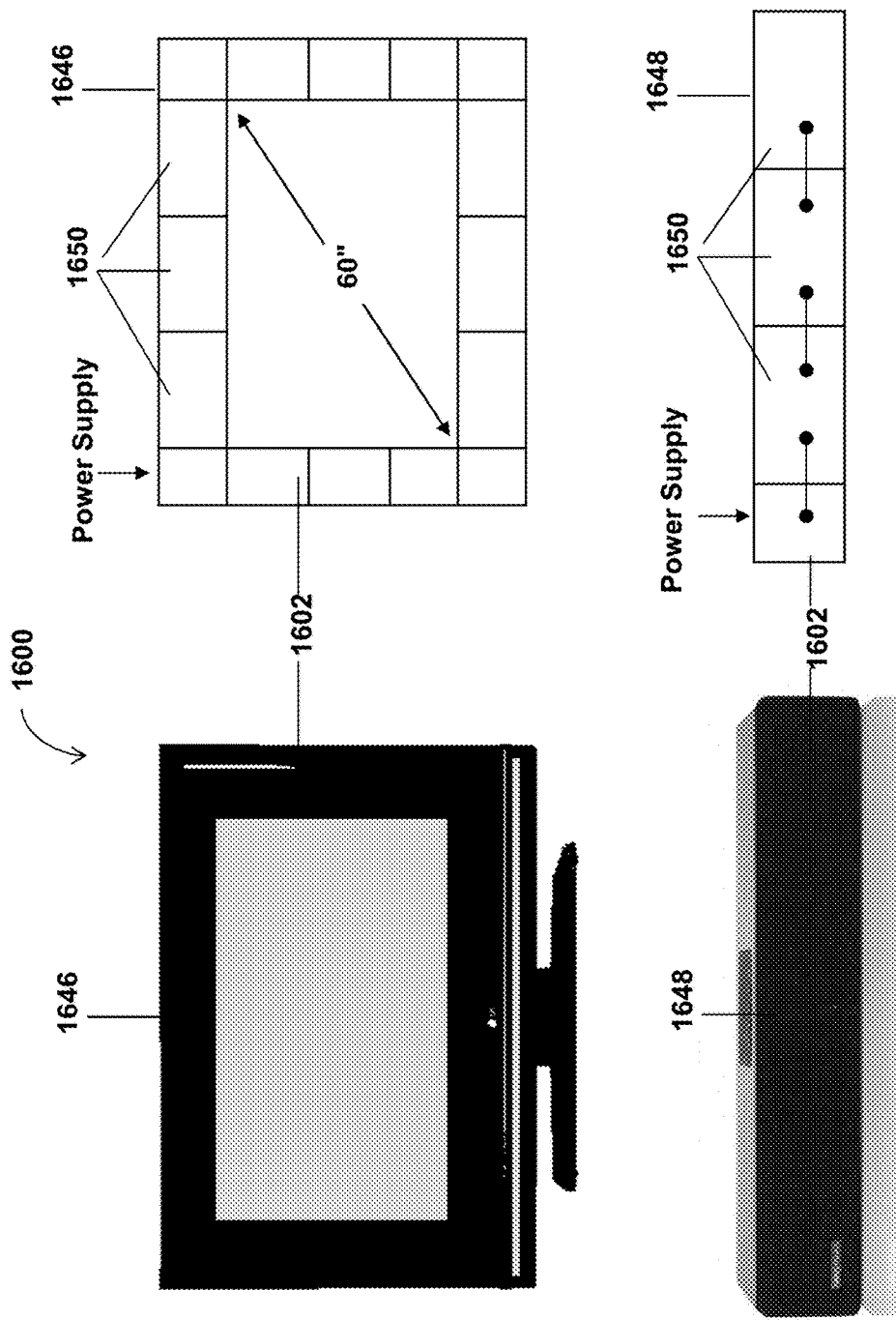
FIG. 16 illustrates a diagram of an architecture for incorporating transmitter into different devices, according to an exemplary embodiment.

FIG. 16 depicts a diagram of architecture 1600 for incorporating transmitter 1602 into different devices. For example, the flat transmitter 1602 may be applied to the frame of a television 1646 or across the frame of a sound bar 1648. Transmitter 1602 may include multiple tiles 1650 with antenna elements and RFICs in a flat arrangement. The RFIC may be directly embedded behind each antenna elements; such integration may reduce losses due the shorter distance between components.

For example, a television 1646 may have a bezel around a television 1646, comprising multiple tiles 1650, each tile comprising of a certain number of antenna elements. For example, if there are 20 tiles 1650 around the bezel of the television 1646, each tile 1650 may have 24 antenna elements and/or any number of antenna elements.

In tile 1650, the phase and the amplitude of each pocket-forming in each antenna element may be regulated by the corresponding RFIC in order to generate the desired pocket-forming and transmission null steering. RFIC singled coupled to each antenna element may reduce processing requirement and may increase control over pocket-forming, allowing multiple pocket-forming and a higher granular pocket-forming with less load over microcontroller, thus, a higher response of higher number of multiple pocket-forming may be allowed. Furthermore, multiple pocket-forming may charge a higher number of receivers and may allow a better trajectory to such receivers.

RFIC may be coupled to one or more microcontrollers, and the microcontrollers may be included into an independent base station or into the tiles 1650 in the transmitter 1602. A row or column of antenna elements may be connected to a single microcontroller. In some implementations, the lower number of RFICs present in the transmitters 1602 may correspond to desired features such as: lower control of multiple pocket-forming, lower levels of granularity and a less expensive embodiment. RFICs connected to each row or column may allow reduce costs by having fewer components because fewer RFICs are required to control each of the transmitters 1602. The RFICs may produce pocket-forming power transmission waves by changing phase and gain, between rows or columns.

In some implementations, the transmitter 1602 may use a cascade arrangement of tiles 1650 comprising RFICs that may provide greater control over pocket-forming and may increase response for targeting receivers. Furthermore, a higher reliability and accuracy may be achieved from multiple redundancies of RFICs.

In one embodiment, a plurality of PCB layers, including antenna elements, may provide greater control over pocket-forming and may increase response for targeting receivers. Multiple PCB layers may increase the range and the amount of power that could be transferred by transmitter 1602. PCB layers may be connected to a single microcontroller or to dedicated microcontrollers. Similarly, RFIC may be connected to antenna elements.

A box transmitter 1602 may include a plurality of PCB layers inside it, which may include antenna elements for providing greater control over pocket-forming and may increase response for targeting receivers. Furthermore, range of wireless power transmission may be increased by the box transmitter 1602. Multiple PCB layers may increase the range and the amount of RF power waves that could be transferred or broadcasted wirelessly by transmitter 1602 due the higher density of antenna elements. PCB layers may be connected to a single microcontroller or to dedicated microcontrollers for each antenna element. Similarly, RFIC may control antenna elements. The box shape of transmitter 1602 may increase action ratio of wireless power transmission. Thus, box transmitter 1602 may be located on a plurality of surfaces such as, desks, tables, floors, and the like. In addition, box transmitter may comprise several arrangements of PCB layers, which may be oriented in X, Y, and Z axis, or any combination these.

6. Plurality of Antenna Elements

Figure 17:
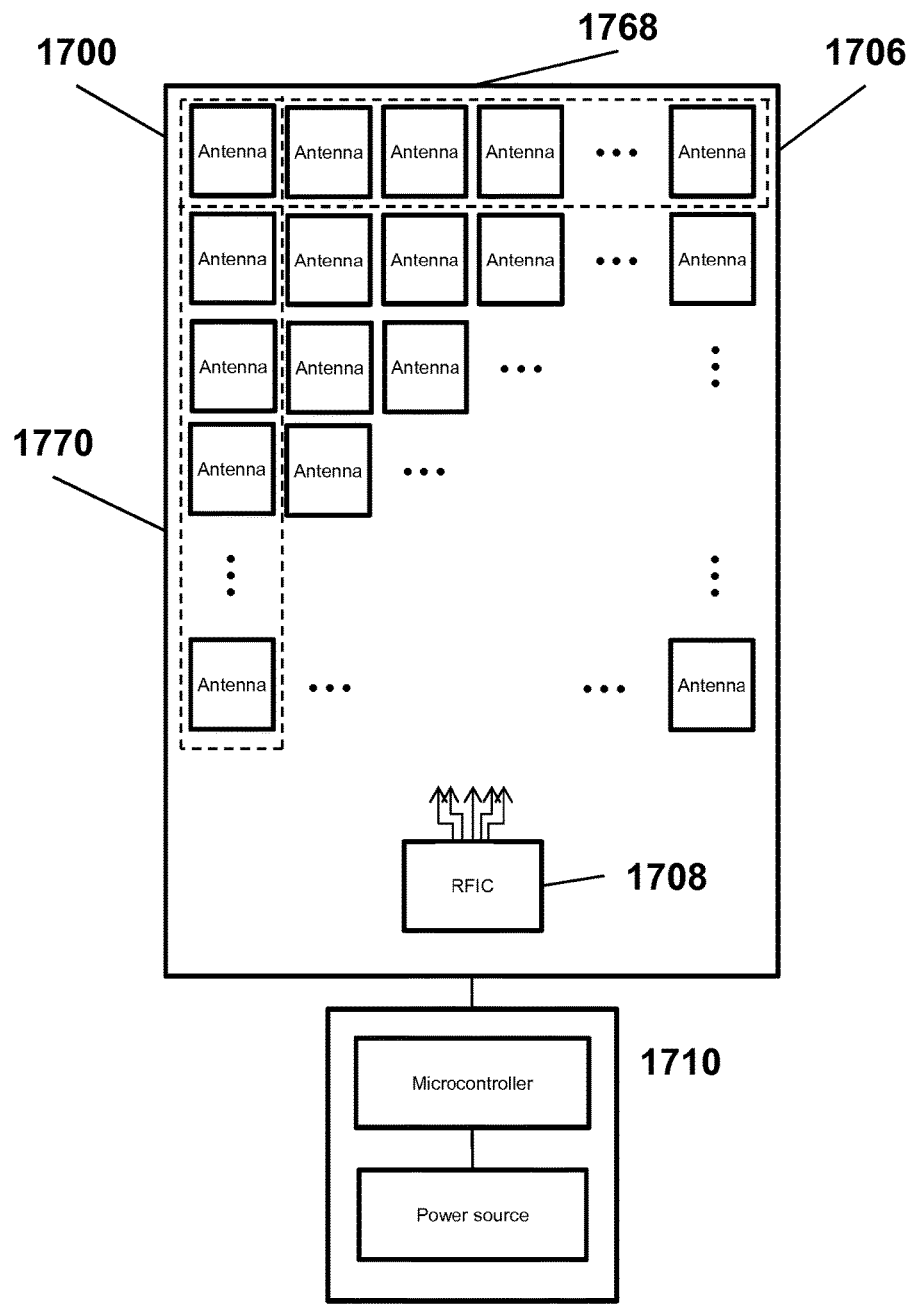
FIG. 17 illustrates a transmitter configuration according to an exemplary embodiment.

FIG. 17 is an example of a transmitter configuration 1700 that includes a plurality of antenna elements 1706. Antenna element 1706 may form an array by arranging rows of antennas 1768 and columns of antennas 1770. Transmitter configuration may include at least one RFIC 1708 to control features of antenna element 1706, such as gain and/or phase for pocket-forming and manage it through direction, power level, and the like. The array of antenna elements 1706 may be connected to a MC 1710, which may determine optimum times and locations for pocket-forming, including the most efficient trajectory to transmit pocket forming in order to reduce losses because of obstacles. Such trajectory may include direct pocket-forming, bouncing, and distance discrimination of pocket-forming.

A transmitter device may utilize antenna element 1706 to determine the location of a receiver in order to determine how to adjust antenna element 1706 to form pockets of energy in the appropriate location. A receiver may send a train signal to transmitter in order to provide information. The train signal may be any conventional know signals that may be detected by antenna element 1706. The signal sent by receiver may contain information such as phase and gain.

7. Enhanced Wireless Power Transmitter Configurations

Figure 26:
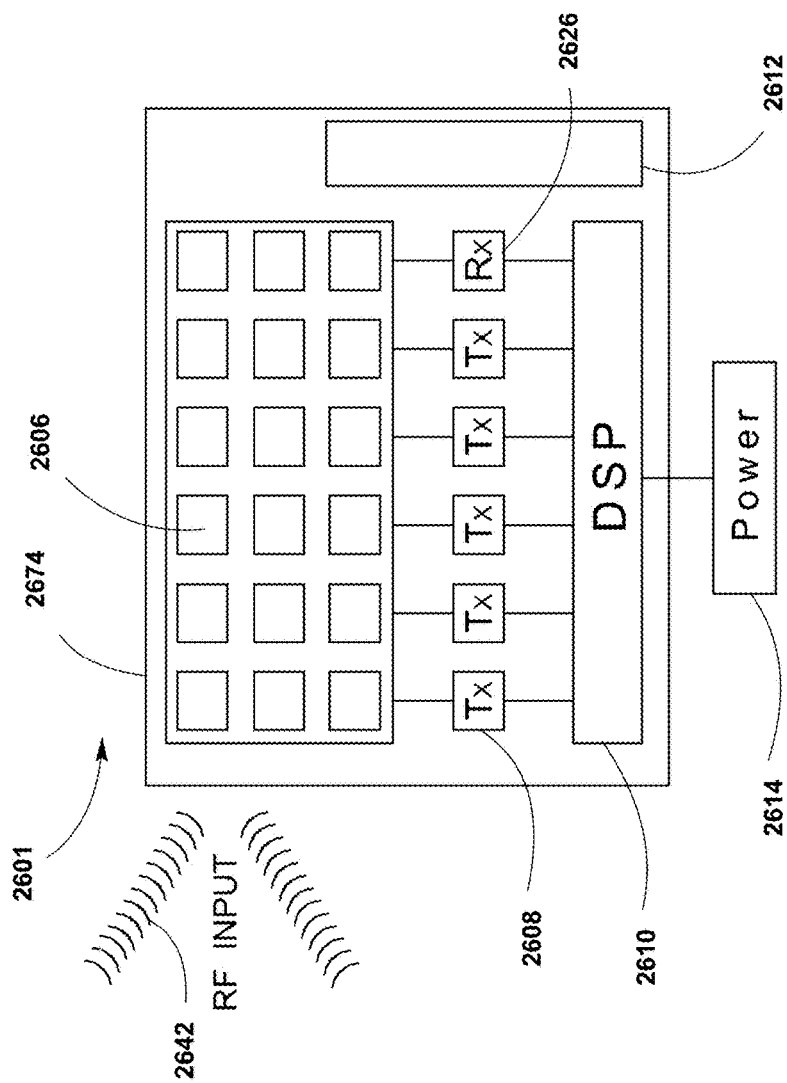
FIG. 26 illustrates a block diagram of an enhanced wireless power transmitter which may be used for wireless power transmission, according to an embodiment.

FIG. 26 illustrates a block diagram of an enhanced wireless power transmitter 2601 which may be used for wireless power transmission, according to an embodiment. Transmitter 2601 may include a housing 2674, at least two or more antenna elements 2606, at least one receiving (Rx) RF integrated circuit (RFIC) 2626, a plurality of transmitting (Tx) RF integrated circuit (RFIC) 2608, at least one digital signal processor (DSP) and/or micro-controller 2610, and/or one communications component 2612. Micro-controller 2610 may be included into an independent base station or into the transmitter 2601. RF input signals 2642 may be produced using a power source 2614 and a local oscillator chip (not shown) using a piezoelectric material, or may be from other wireless sources (not shown), such as from a frequency chip, Bluetooth, and Wi-Fi.

Housing 2674 may be made of any material which may allow for signal or wave transmission and/or reception, for example plastic or hard rubber. Antenna elements 2606 may include antenna types for operating in frequency bands such as 900 MHz, 2.5 GHz or 5.8 GHz as these frequency bands conform to Federal Communications Commission (FCC) 47 CFR Part 18—Industrial, Scientific, and Medical Equipment. Antenna elements 2606 may include vertical or horizontal polarization, right hand or left hand polarization, elliptical polarization, and/or other polarizations as well as polarization combinations. Antennas may be omnidirectional and/or directional antennas. Omnidirectional antennas are a class of antenna which radiates radio wave power uniformly in all directions in one plane. Directional antennas may be antennas or an array of antennas at a wireless power transmitter that can have their direction or phase adjusted to control where the wireless pockets of energy will be available in 3-D physical space within power range of the transmitter. Antenna types may include, for example, patch antennas with heights from about ⅛ of an inch to about 8 inches and widths from about ⅛ of an inch to about 6 inches. Other antenna elements 2606 types that may be used include meta-materials based antennas, dipole antennas, and planar inverted-F antennas (PIFAs), amongst others.

Transmitter 2601 may include a plurality of arrangements in which antenna elements 2606 may be connected to dedicated Rx RFIC 2626 or to Tx RFICs 2608. Arrangements may include different configurations, such as a dedicated row or column of antenna elements 2606 coupled to Rx RFIC 2626, and at least two or more rows or columns of antenna elements 2606 coupled to Tx RFICs 2608. Rx RFIC 2626 may include a proprietary chip for adjusting phases and/or relative magnitudes of frequency of RF input signals 2642 collected from the dedicated set/configuration antenna elements 2606 for reception of RF input signals 2642. Rx RFIC may be designed to include hardware and logic elements specifically dedicated for reception and processing of RF input signals 2642, which are not included as components of TX RFICs 2608.

In present embodiment of the enhanced wireless transmitter 24 RFICs may be connected to 2674 antenna elements 2606 and configured to allow operation of Rx RFIC as the dedicated receiver of RF input signals 2642 operatively coupled to a dedicated column of at least two or more antenna elements 2606, depending on the transmitter 2601 configuration and operation, for example, eight antenna elements 2606. The remaining 23 Tx RFICs 2608 may be operatively coupled to a set/configuration of antenna elements 2606, other than those used to receive RF input signals 2642 by Rx RFIC. Tx RFICs may be coupled to transmitting antenna elements 2606 depending on control signals from micro-controller 2610.

Micro-controller 2610 may include a proprietary algorithm to implement control of Rx RFIC 2626 and to allow operation of Rx RFIC 2626 using a switching control which enables monitoring of reception separately from transmission without overlapping in the operation of Rx RFIC 2626 and Tx RFICs 2608. RF input signals 2642 may be sampled at once after Rx RFIC 2626 may be allowed to receive by switching control in micro-controller 2610.

After the operation of Rx RFIC 2626, Tx RFICs 2608 may implement wireless power transmission to receiver. Micro-controller 2601 may select a column of antenna elements 2606, a row of antenna elements 2606, or any interpolation of arrangement of antenna elements 2606 to couple with Tx RFICs 2608, depending on location from which wireless power is to be transmitted.

Micro-controller 2610 may also process information sent by receiver through communications component 2612 for determining optimum times and locations for pocket-forming. Communications component 2612 may be based on standard wireless communication protocols which may include Bluetooth, Wi-Fi or ZigBee. In addition, communications component 2612 may be used to transfer other information, such as an identifier for the device or user, battery level, location, or other such information. Other communications component 2612 may be possible, including radar, infrared cameras or sound devices for sonic triangulation of electronic device position.

Figure 27:
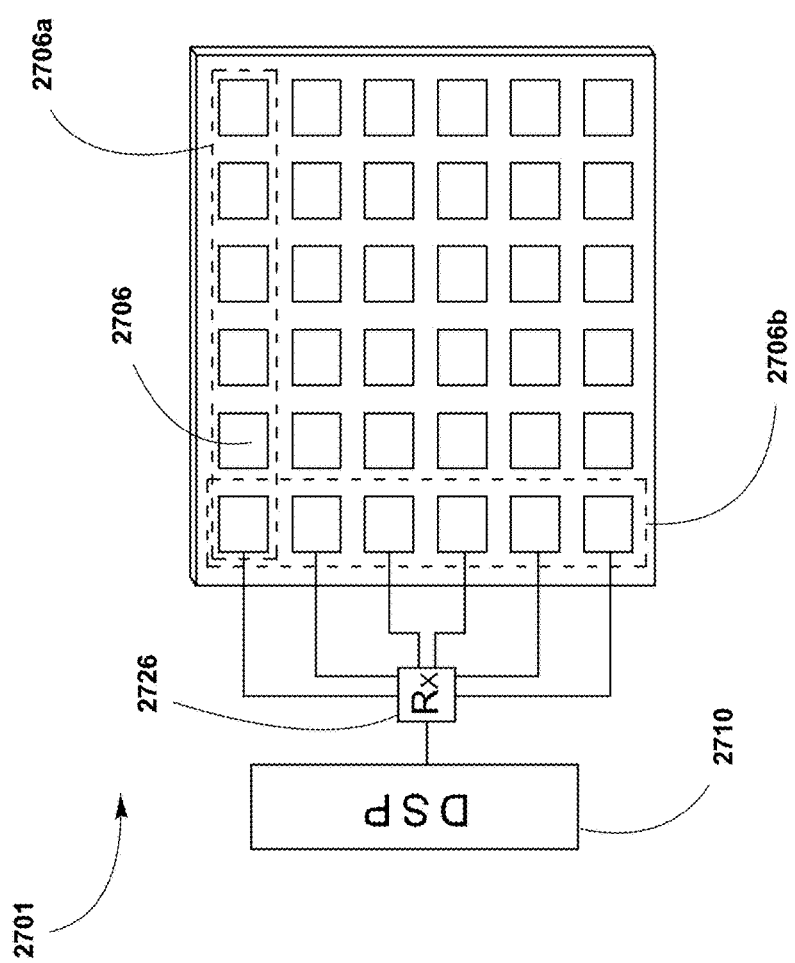
FIG. 27 illustrates a transmitter arrangement of antenna elements which may be coupled to a dedicated receiving radio frequency integrated circuit (RFIC), according to an embodiment.

FIG. 27 represents a transmitter arrangement 2701 of antenna elements 2706 which may be coupled to dedicated Rx RFICs 2726, according to an embodiment. Depending on the location from which RF input signals may be received and information sent by receiver to be processed by communications component regarding determination of optimum times and locations for pocket-forming, which may enhance efficiency of wireless power transmission, micro-controller 2710 may select Tx RFICs and the arrangement of antenna elements 2706 to maximize the transmission operation of transmitter. Micro-controller 2710 may send switching control signals to Rx RFIC 2726 coupled to either antenna column 2706b or antenna row 2706a to include the antenna elements 2706 receiving RF input signals. After reception and processing of signals by Rx RFIC 2726, the remaining antenna elements 2706 may be coupled to Tx RFICs using a plurality of configurations of antenna elements 2706 as a result of an interpolation step which may be performed by micro-controller 2710 to control operation of Tx RFICs using the ARM micro-processor in micro-controller 2710 to enhance wireless power transmission performance of transmitter, directing transmission of wireless power to the appropriate location.

Antenna elements 2706 to connected to Rx RFIC 2726 may reduce processing requirement and may increase control over pocket-forming, allowing multiple pocket-forming and a higher granular pocket-forming with less load over micro-controller 2710, thus, a higher response of higher number of multiple pocket-forming may be allowed for transmission. Furthermore, multiple pocket-forming may charge a higher number of receivers and may allow a better trajectory to such receivers to provide a less expensive embodiment.

Figure 28:
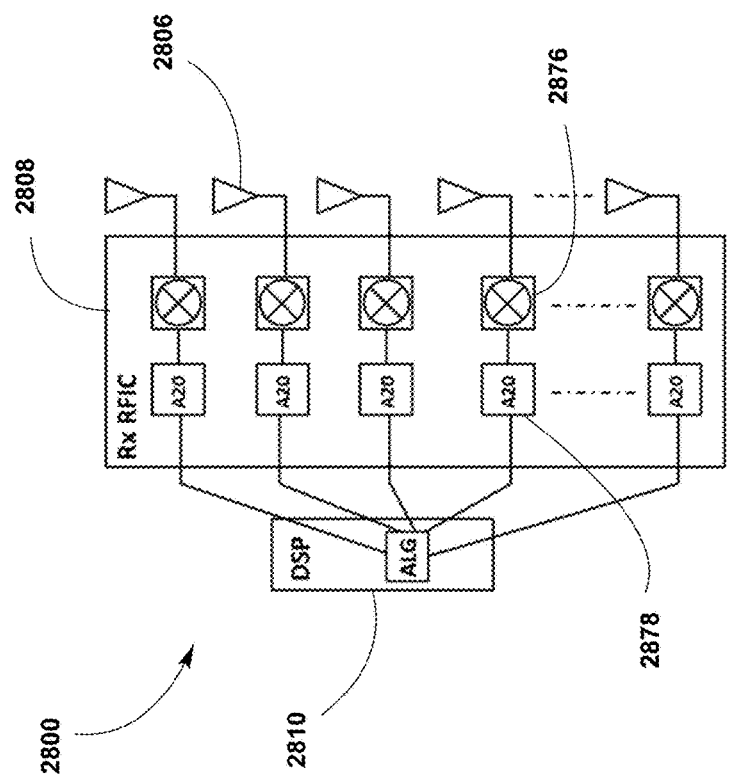
FIG. 28 illustrates a block diagram of a dedicated receiving RFIC in an enhanced wireless power transmitter, according to an embodiment.

FIG. 28 illustrates a block diagram 2800 of Rx RFIC 2808 in an enhanced wireless power transmitter, according to an embodiment. RF input signals received by antenna elements 2806 dedicated for reception and operatively coupled to Rx RFIC 2808, depending on the location from which they may be radiated to transmitter, enable micro-controller 2810. RF input signal may then be subject to frequency sampling by an array of down-converters included in Rx RFIC 2808 in which the range of frequencies of RF input signals of about 2.4 GHz or about 5.6 GHz may be shifted into RF signals of a new frequency range.

Down-converters 2876 may include a local oscillator (not shown) providing a signal of pre-determined frequency to mix with the RF input signals creating a sum heterodyne and a difference heterodyne from which one of the heterodyne may be filtered to provide the desired output frequency. In present embodiment a signal of about 5.8 GHz may be down-converted to an output signal of about 5.0 GHz. Output signal of 5.0 GHz from down-converters 2876 may then be fed to addressing lines (A20) 2878 at 10 MHz for processing by micro-controller 2810. Enhanced wireless power transmitter may be receiving at one frequency, for example 2.4 GHz, and transmitting at a higher frequency, for example 5.7 GHz.

Micro-controller 2810 may be enabled to send control signals of about 1 msec or about 100 µsec to Rx RFIC 2808 and depending on how fast the RF input signals may being received, control may be enabled every msec or about 10 times/sec for 1 msec. If RF input signals may be constantly received, for example every 10 µsec, updating may be implemented to about 1,000 times/sec.

In micro-controller 2810, the proprietary algorithm may enable sampling of the incoming signals from each A20 2878 and may use an ARM micro-processor (not shown) to drive the required Tx RFICs coupled to the determined set/configuration of antenna elements 2806 to transmit wireless power to the appropriate location of receiver. The use of an ARM micro-processor may reduce cost, heat and power use, as it may be desirable for electronic devices to be powered or charged using wireless power transmission. The instruction set architecture of the ARM micro-processor may allow higher processing power and energy efficiency for micro-controller 2810.

8. Multiple Transmitters Configuration

Figure 29:
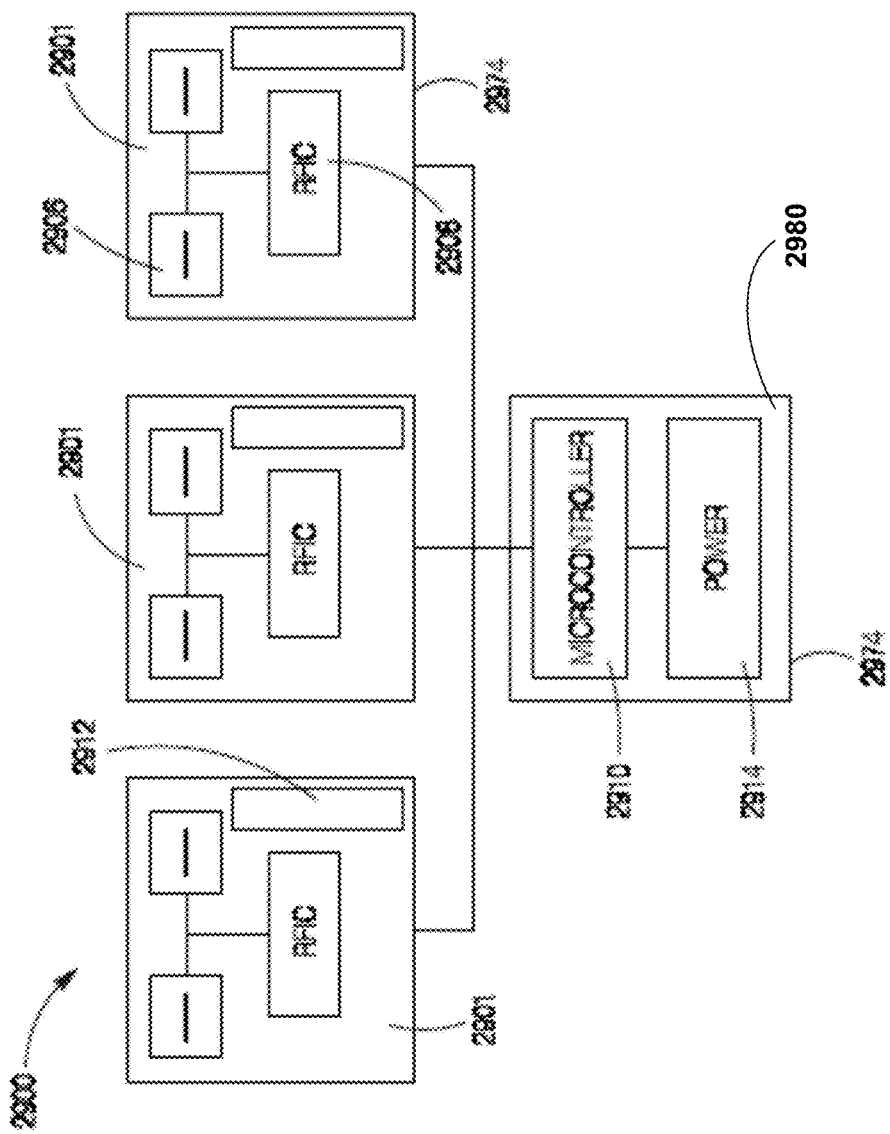
FIG. 29 illustrates a component level embodiment for a wireless power system including three transmitters, according to an exemplary embodiment.

FIG. 29 depicts a block diagram of a wireless power system 2900, which may include a plurality of wireless power transmitter 2901 connected to a single base station 2980. transmitters 2901 may include one or more antenna elements 2906, one or more radio frequency integrated circuit (RFIC) 2908, a communication component 2912 and a housing 2974, which may allocate all the components previously mentioned. Base station 2980 may include one or more microcontroller 2910, a power source 2914 and a housing 2974 which may allocate all the components previously mentioned. Components in wireless power system 2900 and base station—may be manufactured using metamaterials, micro-printing of circuits, nano-materials, and the like.

Base station 2980 may be located in variety of locations where transmitters 2910 may stay connected to it. Such connection may include a variety of connections, which may include coaxial cable, phone cable, LAN cable, wireless connection among others. The connection between base station 2980 and transmitters 2910 aims to establish a link between RFIC 2908 and microcontroller 2910, as well as the power source 2914 connection.

Microcontroller 2910 may control a variety of features of RFIC 2908 such as, time emission of pocket-forming, direction of the pocket-forming, bounce angle, power intensity and the like. Furthermore, microcontroller 2910 may control multiple pocket-forming over multiple receivers or over a single receiver. In addition, microcontroller 2910 may manage and control communication protocols and signals by controlling communication component 2912. Protocol may refer to a method and of translating between low level information data, such as binary bits or bytes, and higher level information data, such as numerical digits, alphanumeric characters, letters, punctuation, numerals, or characters in ASCII table. A protocol may also have an expected format or pattern of information data across time. Thus microcontroller 2910 may drive the foregoing features in several transmitters 2901 at the same time.

Base station 2980 may be fed by a power source 2914 which in turn may feed to transmitters 2901. Power source 2914 may include AC or DC power supply. Voltage, power and current intensity provided by power source 2914 may vary in dependency with the required power to be transmitted. Conversion of power to radio signal may be managed by microcontroller 2910 and carried out by RFIC 2908, which may utilize a plurality of methods and components to produce radio signals in a wide variety of frequencies, wavelength, intensities and other features.

As an exemplary use of a variety of methods and components for radio signal generation, oscillators and piezoelectric crystals may be used to create and change radio frequencies in different antenna elements 2906. In addition, a variety of filters may be used for smoothing signals as well as amplifiers for increasing power to be transmitted. In some implementations, the wireless charging techniques of the present invention are not, however, limited to RF transmission techniques and include additional techniques for transmitting energy to a receiving device, wherein the receiving device converts the transmitted energy to electrical power. Exemplary forms of energy that can be converted by a receiving device into electrical power include ultrasound, microwave, resonant and inductive magnetic fields, laser light or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. Furthermore, RFIC 2908, microcontroller 2910, communication component 2914 and the rest of electronic components may be built in solid state circuits for increasing reliability in wireless power system 2900. Others techniques for increasing reliability of electronic components may be used.

Figure 30:
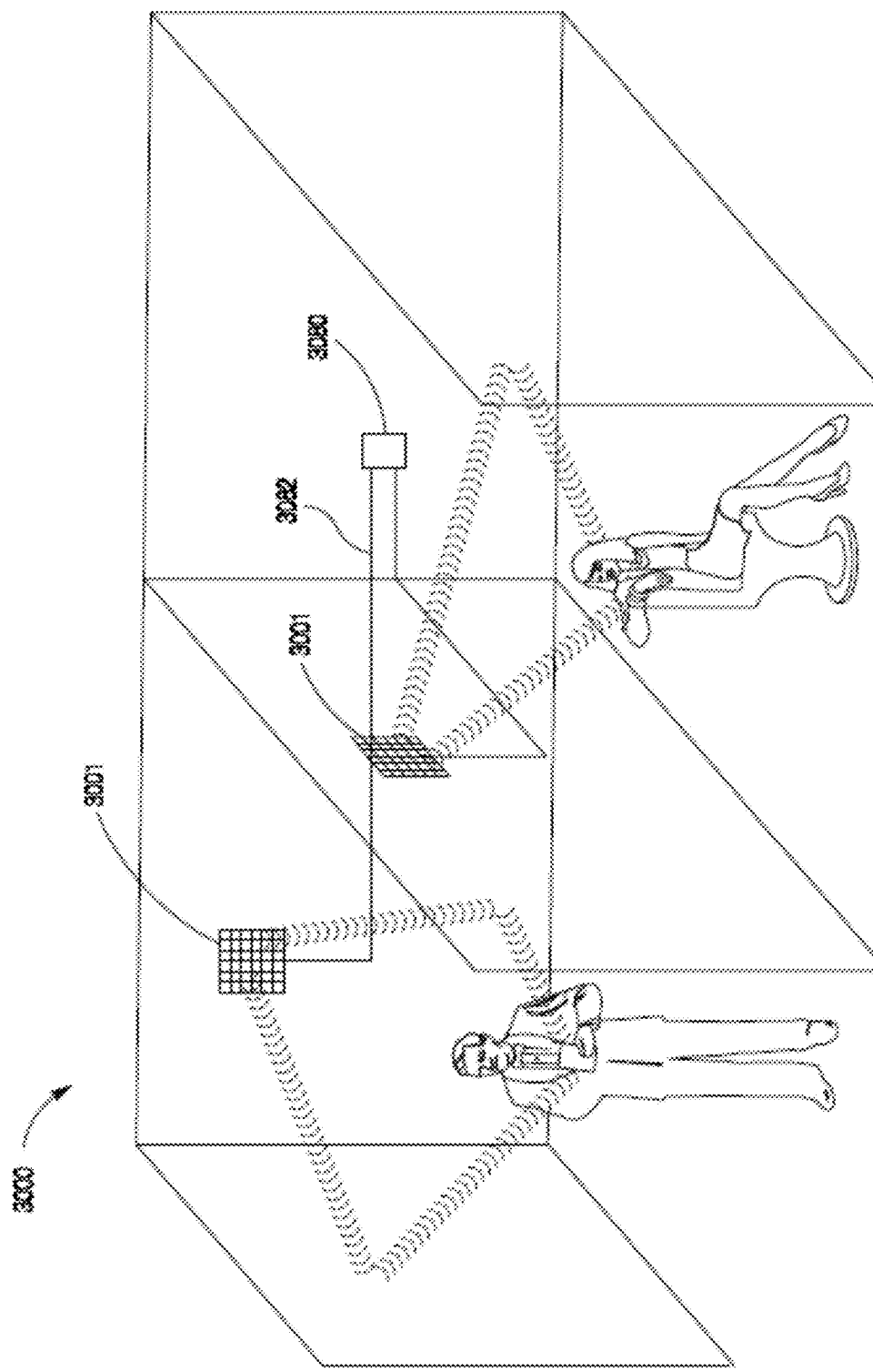
FIG. 30 illustrates a wireless power system including two transmitters in two different rooms, according to an exemplary embodiment.

FIG. 30 depicts a wireless power system 3000, which may include two transmitters 3001, a base station 3080 and connections 3082. Base station 3080 may enable operation of different transmitters 3001 in different rooms or area coverage. Each transmitter 3001 may operate at different frequencies, power intensities and different ranges. In addition, each transmitter 3001 may provide power to a plurality of receivers. Furthermore, base station 3080 may enable a single operation of all transmitter 3001, thus may provide a higher capability for wireless charging by the use of each transmitter 3001 as a single one.

Figure 31:
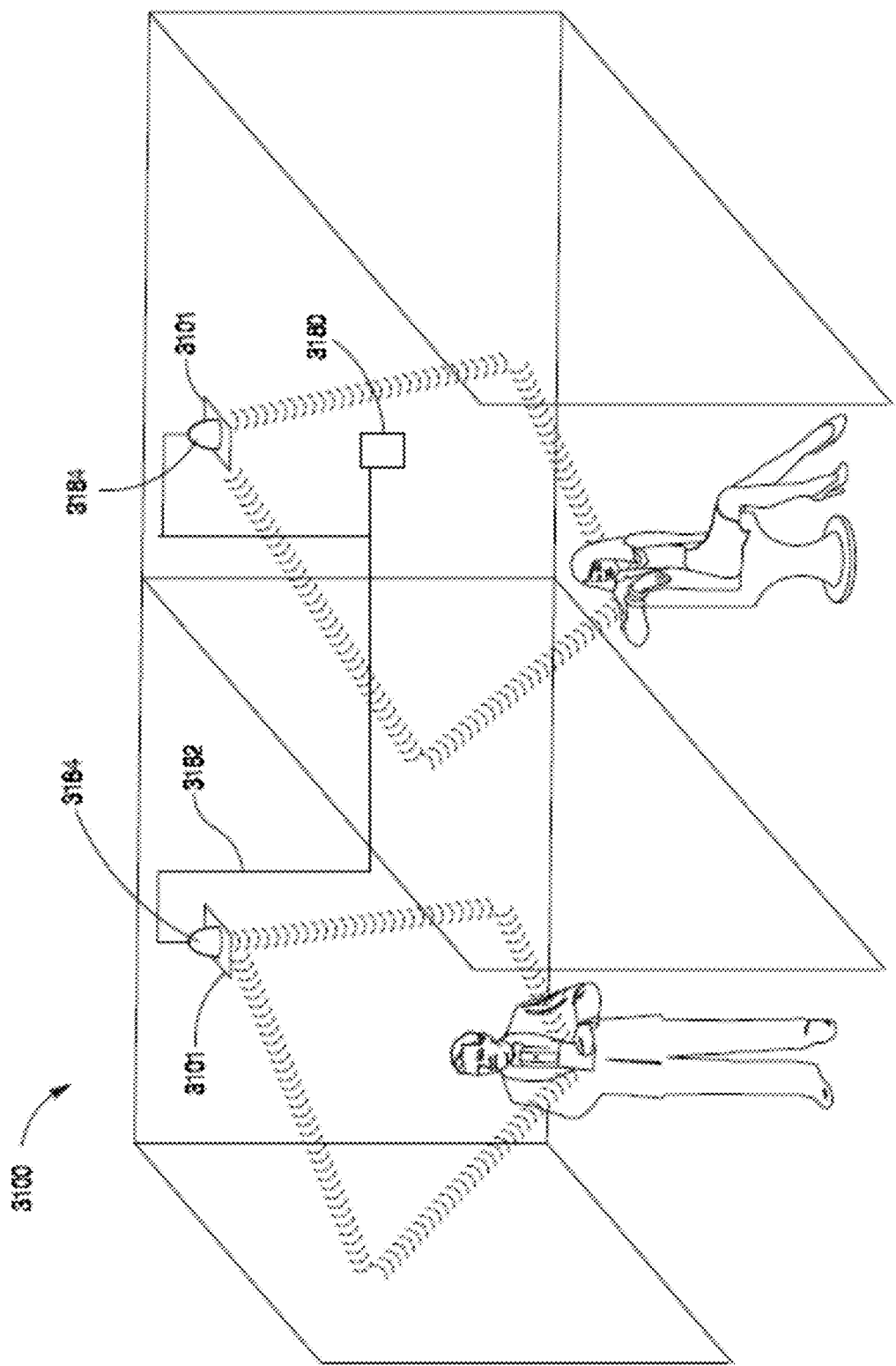
FIG. 31 illustrates a wireless power system including two transmitters plugged into light sockets in two different rooms, according to an exemplary embodiment.

FIG. 31 depicts a wireless power system 3100, which may include two transmitters 3101, a base station 3180 and connections 3182. Base station 3180 may enable operation of different transmitters 3101 in different rooms or area coverage. Each transmitter 3101 may operate at different frequencies, power intensities and different ranges. In addition, each transmitter 3101 may provide power to a plurality of receivers. Furthermore, base station 3180 may enable a single operation of all transmitter 3101, thus may provide a higher capability for wireless charging by the use of each transmitter 3101 as single one. In addition, transmitters 3101 may be plugged into light sockets 3184. Such light sockets 3184 may increase the places where transmitters 3101 may be installed.

III. Receivers—Systems and Methods for Receiving and Utilizing Wireless Power Transmissions A. Components of Receiver Devices Returning to FIG. 11, which illustrates a diagram of a system 1100 architecture for wirelessly charging client devices, according to an exemplary embodiment, the system 1100 may comprise transmitter 1101 and receivers 1120 that may each comprise an application-specific integrated circuit (ASIC). The ASIC of the receivers 1120 may include a printed circuit board 1122, an antenna element 1124, a rectifier 1126, a power converter 1129, a communications component 1130, and/or a power management integrated circuit (PMIC) 1132. Receivers 1120 may also comprise a housing that may allocate all the requested components. The various components of receivers 1120 may comprise, or may be manufactured using, meta-materials, micro-printing of circuits, nano-materials, and the like.

1. Antenna Elements

Antenna elements 1124 may include suitable antenna types for operating in frequency bands similar to the bands described for antenna elements 1106 of a transmitter 1101. Antenna element 1124 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example a smartphone or portable gaming system. On the contrary, for devices with well-defined orientations, for example a two-handed video game controller, there might be a preferred polarization for antennas, which may dictate a ratio for the number of antennas of a given polarization. Suitable antenna types may include patch antennas with heights from about 118 inch to about 6 inches and widths from about ⅛ inch to about 6 inches. Patch antennas may have the advantage that polarization may depend on connectivity, i.e., depending on which side the patch is fed, the polarization may change. This may further prove advantageous as a receiver, such as receiver 1120, may dynamically modify its antenna polarization to optimize wireless power transmission. Different antenna, rectifier, or power converter arrangements are possible for a receiver, as is described in the embodiments herein.

2. Rectifiers

A rectifier 1126 may convert alternating current (AC), which periodically reverses direction, to direct current (DC), which takes non-negative values. Because of the alternating nature of the input AC sine wave, the process of rectification alone produces a DC current that, though non-negative, consists of pulses of current. The output of the rectifier may be smoothed by an electronic filter to produce a steady current. The rectifier 1126 may include diodes and/or resistors, inductors and/or capacitors to rectify the alternating current (AC) voltage generated by antenna element 1124 to direct current (DC) voltage.

In some implementations, the rectifier 1126 may be a full-wave rectifier. A full-wave rectifier may convert the whole of the input waveform to one of constant polarity (positive or negative) at its output. Full-wave rectification may convert both polarities of the input waveform to pulsating DC (direct current), and yield a higher average output voltage. Two diodes and a center tapped transformer and/or four diodes in a bridge configuration and any AC source (including a transformer without center tap) may be utilized for a full-wave rectifier. For single-phase AC, if the transformer is center-tapped, then two diodes back-to-back (cathode-to-cathode or anode-to-anode, depending upon output polarity required) may be utilized to form a full-wave rectifier. Twice as many turns may be required on the transformer secondary to obtain the same output voltage than for a bridge rectifier, but the power rating is unchanged. Rectifier 1126 may be placed as close as is technically possible to antenna element 1124 to minimize losses. After rectifying AC voltage, DC voltage may be regulated using power converter 1129.

3. Power Converters

Power converter 1129 can be a DC-to-DC converter that may help provide a constant voltage output and/or to help boost the voltage to the receiver 1120. In some implementations, the DC-to-DC converter may be a maximum power point tracker (MPPT). A MPPT is an electronic DC-to-DC converter that converts a higher voltage DC output down to the lower voltage needed to charge batteries. Typical voltage outputs can be from about 5 volts to about 10 volts. In some embodiments, power converter 1129 may include electronic switched mode DC-to-DC converters, which can provide high efficiency. In such a case, a capacitor may be included before power converter 1129 to ensure sufficient current is provided for the switching device to operate. When charging an electronic device, for example a phone or laptop computer, initial high-currents that can exceed the level needed to activate operation of an electronic switched mode DC-to-DC converter, may be required. In such a case, a capacitor may be added at the output of receiver 1120 to provide the extra energy required. Afterwards, lower power can be provided, as required to provide the appropriate amount electric current; for example, ⅟80 of the total initial power used while having the phone or laptop still building-up charge.

In one embodiment, multiple rectifiers 1126 can be connected in parallel to antenna element 1124. For example, four rectifiers 1126 may be connected in parallel to antenna element 1124. However, several more rectifiers 1126 can be used. This arrangement may be advantageous because each rectifier 1126 may only need to handle ¼ of the total power. If one watt is to be delivered to an electronic device, then each rectifier 1126 may only need to handle a quarter of a watt. The arrangement may greatly diminish cost because using a plurality of low-power rectifiers 1126 can be cheaper than utilizing one high-power rectifier 1126 while handling the same amount of power. In some embodiments, the total power handled by rectifier 1126 can be combined into a power converter 1129. In other embodiments, there may a power converter 1129 per each rectifier 1126.

In other embodiments, multiple antenna elements 1124 may be connected in parallel to a rectifier 1126, after which DC voltage may be regulated through a power converter 1129. In this example, four antenna elements 1124 may be connected in parallel to a single rectifier 1126. This arrangement may be advantageous because each antenna element 1124 may only handle ¼ of the total power. In addition, the arrangement may enable usage of antenna element 1124 of different polarizations with a single rectifier 1126 because signals may not cancel each other. Because of the foregoing property, the arrangement may be suitable for electronic client devices with an orientation that is not well-defined or otherwise varies over time. Lastly, the arrangement may be beneficial when using antenna element 1124 of equal polarization and configured for phases that do not differ greatly. In some embodiments, however, there can be a rectifier 1126 per antenna element 1124 and/or multiple rectifiers 1126 per antenna element 1124.

In an exemplary implementation, an arrangement where multiple antenna elements 1124 outputs can be combined and connected to parallel rectifiers 1126 whose output may further be combined in one power converter 1129 may be implemented. There may be 16 antenna elements 1124 whose output may be combined at four parallel rectifiers 1126. In other embodiments, antenna elements 1124 may be subdivided in groups (of four for example) and may connect to independent rectifiers 1126.

In yet another embodiment, an arrangement where groups of antenna elements 1124 may be connected to different rectifiers 1126 which may in turn also be connected to different power converters 1129 may be implemented. In this embodiment, four groups of antenna elements 1124 (each containing four antenna elements 1124 in parallel) may each connect independently to four rectifiers 1126. In this embodiment, the output of each rectifier 1126 may connect directly to a power converter 1129 (four in total). In other embodiments, the output of all four rectifiers 1126 can be combined before each power converter 1129 to handle the total power in parallel. In some embodiments, the combined outputs of each rectifier 1126 may connect to a single power converter 1129. This arrangement may be beneficial in that it allows great proximity between rectifier 1126 and antenna element 1124. This property may be desirable as it may keep losses at a minimum.

4. Communications Component

A communications component 1130, similar to that of transmitter 1101, may be included in receiver 1120 to communicate with a transmitter or to other electronic equipment. In some implementations, receiver 1120 can use a built-in communications component of the device (for example, Bluetooth) for communicating to a given transmitter 1120 based on requirements provided by processor such as battery level, user predefined charging profile or others transmitters 1101 include one or more printed circuit boards (PCB) 1104, one or more antenna elements 1106, one or more radio frequency integrated circuits (RFIC) 1108, one or more microcontrollers (MCs) 1110, a communication component 1112, and a power source 1114. The transmitter 1101 may be encased in a housing, which may allocate all the requested components for transmitter 1101. Components in transmitter 1101 may be manufactured using meta-materials, micro-printing of circuits, nano-materials, and/or any other materials. The types of information communicated by the communications components between the receiver and the transmitter include but not limited to the present power levels in the batteries, signal strength and power level being received at the receiver, timing information, phase and gain information, user identification, client device privileges, security related signaling, emergency signaling, and authentication exchanges, among other things.

5. PMICs

A power management integrated circuit (PMIC) 1132 is an integrated circuit and/or a system block in a system-on-a-chip device for managing power requirements of the host system. The PMIC 1132 may include battery management, voltage regulation, and charging functions. It may include a DC-to-DC converter to allow dynamic voltage scaling. In some implementations, the PMIC 1132 may provide up to a 95% power conversion efficiency. In some implementations, the PMIC 1132 may integrate with dynamic frequency scaling in a combination. The PMIC 1132 may be implemented in a battery-operated device such as mobile phones and/or portable media players. In some implementations, the battery may be replaced with an input capacitor and an output capacitor. The PMIC 1132 may be directly connected to the battery and/or capacitors. When the battery is being charged directly, a capacitor may not be implemented. In some implementations, the PMIC 1132 may be coiled around the battery. The PMIC 1132 may comprise a power management chip (PMC) that acts as a battery charger, and is connected to the battery. The PMIC 1132 can use pulse-frequency modulation (PFM) and pulse-width modulation (PWM). It can use switching amplifier (Class-D electronic amplifier). In some implementations, an output converter, a rectifier, and/or a BLE may also be included in the PMIC 1132.

6. Housing

Housing can be made of any suitable material that may allow for signal or wave transmission and/or reception, for example plastic or hard rubber. Housing may be an external hardware that may be added to different electronic equipment, for example in the form of cases, or can be embedded within electronic equipment as well.

7. Network

The network 1140 may comprise any common communication architecture that facilitates communication between transmitter 1101 and the receiver 1120. One having ordinary skill in the art would appreciate that the network 1140 may be the Internet, a private intranet, or some hybrid of the two. It should also be obvious to one skilled in the art that the network components may be implemented in dedicated processing equipment, or alternatively in a cloud processing network.

Figures 18A, 18B:
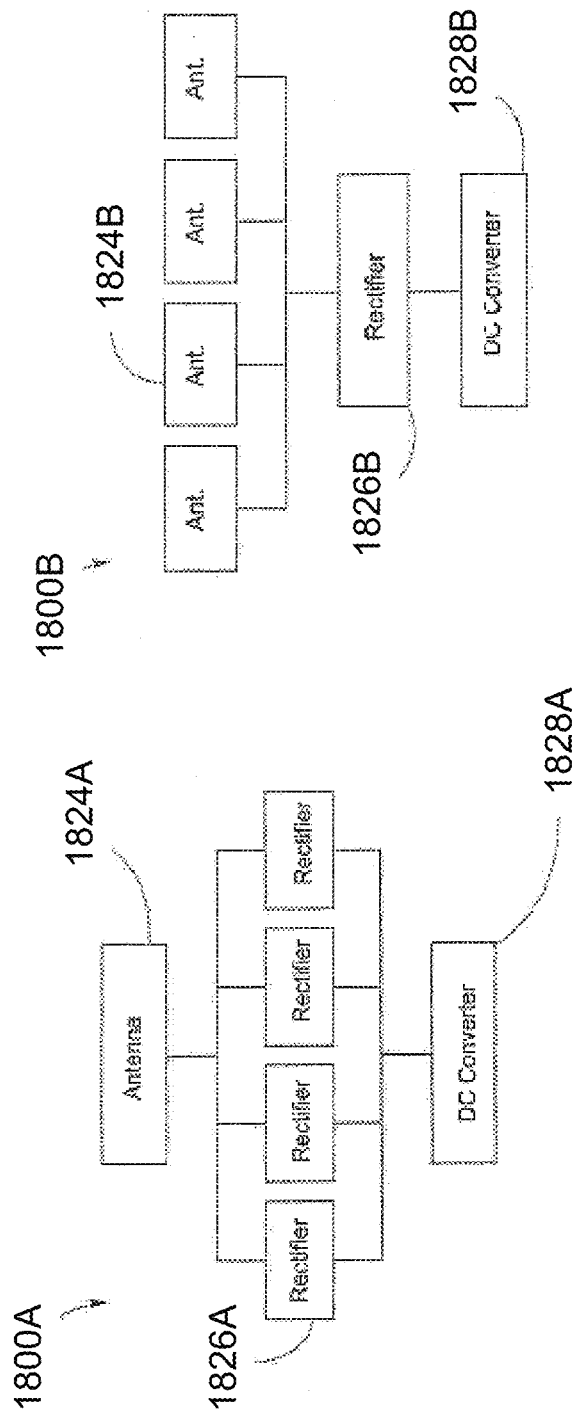
FIG. 18A illustrates multiple rectifiers connected in parallel to an antenna element, according to an exemplary embodiment.
FIG. 18B illustrates multiple antenna elements connected in parallel to a rectifier, according to an exemplary embodiment.

A. Configurations for Receivers, Receiver Components, and Systems Related to Receivers 1. Multiple Rectifiers Connected in Parallel to an Antenna Element FIG. 18A illustrates an arrangement 1800A where multiple rectifiers 1826A can be connected in parallel to an antenna element 1824A. In this example, four rectifiers 1826A may be connected in parallel to an antenna elements 1824A. However, several more rectifiers 1826A may be used. Arrangement 1800A may be advantageous because each rectifier 1826A may only need to handle ¼ of the total power. If one watt is to be delivered to an electronic device, then each rectifier 1826F may only need to handle a quarter of a watt. Arrangement 1800A may greatly diminish cost because using a plurality of low-power rectifiers 1826A can be cheaper than utilizing one high-power rectifier 1826A while handling the same amount of power. In some embodiments, the total power handled by rectifier 1826A can be combined into one DC-DC converter 1828A. In other embodiments, there may a DC-DC converter 1828A per rectifier 1826A.

2. Multiple Antenna Elements Connected in Parallel to a Rectifier

FIG. 18B illustrates an arrangement 1800B where multiple antenna elements 1824B may be connected in parallel to a rectifier 1826B, after which DC voltage may be regulated through a DC-DC converter 1828B. In this example, four antenna elements 1824B may be connected in parallel to a single rectifier 1826B. Arrangement 1800B may be advantageous because each antenna element 1824B may only handle ¼ of the total power. In addition, arrangement 1800B may enable usage of antenna element 1824B of different polarizations with a single rectifier 1826B because signals may not cancel each other. Because of the foregoing property, arrangement 1800B may be suitable for electronic devices with an orientation that is not well-defined or otherwise varies over time. Lastly, arrangement 1800B may be beneficial when using antenna element 1824B of equal polarization and configured for phases that do not differ greatly. In some embodiments, however, there can be a rectifier 1826B per antenna element 1824B or multiple rectifiers 1826B (as described in FIG. 18A) per antenna element 1824B.

3. Multiple Antenna Elements Connected in Parallel to Multiple Rectifiers

Figure 19B:
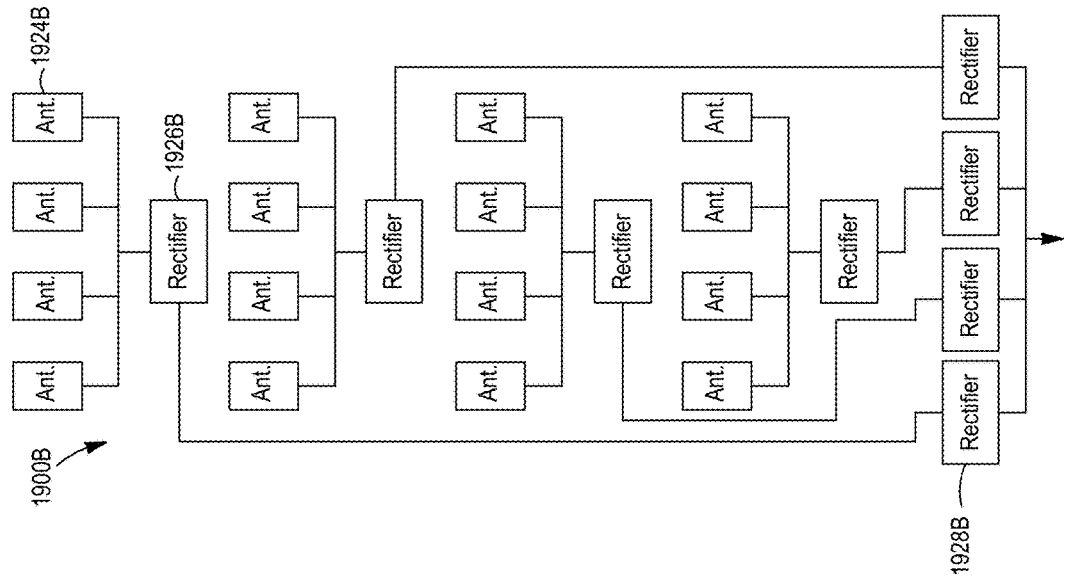
FIG. 19B illustrates groups of antenna elements connected to different rectifiers, according to an exemplary embodiment.
Figure 19A:
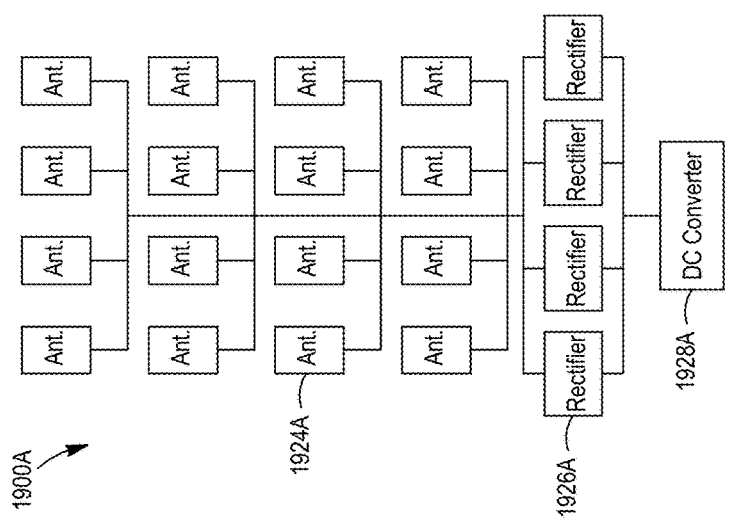
FIG. 19A illustrates multiple antenna elements outputs combined and connected to parallel rectifiers, according to an exemplary embodiment.

FIG. 19A illustrates an arrangement 1900A where multiple antenna elements 1924A outputs can be combined and connected to parallel rectifier 1926A whose output may further be combined in one DC converter 1928A. Arrangement 1900A shows, by way of exemplification, 16 antenna elements 1924A whose output may be combined at four parallel rectifiers 1926A. In other embodiments, antenna elements 1924A may be subdivided in groups (e.g., four groups) and may connect to independent rectifiers as shown in FIG. 19B below.

4. Permutations of Groupings

FIG. 19B illustrates an arrangement 1900B where groups of antenna elements 1624B may be connected to different rectifiers 1926B, which may in turn also be connected to different DC converters 1928B. In arrangement 1900B, four groups of antenna elements 1924B (each containing four antenna elements 1924B in parallel) may each connect independently to four rectifiers 1926B. In this embodiment, the output of each rectifiers 1926B may connect directly to a DC converter 1928B (four in total). In other embodiments, the output of all four rectifiers 1926B can be combined, before each DC converter 1928B, to handle the total power in parallel. In other embodiments, the combined outputs of each rectifier 1926B may connect to a single DC converter 1928B. Arrangement 1900B may be beneficial in that it allows great proximity between rectifier 1926B and antenna element 1924B. This property may be desirable as it may keep losses at a minimum.

A receiver may be implemented on, connected to or embedded in electronic devices or equipment that may rely on power for performing its intended functions, for example a phone, laptop computer, a television remote, a children's toys or any other such devices. A receiver utilizing pocket-forming can be used to fully charge a device's battery while being "On" or "Off," or while being used or not. In addition, battery lifetime can be greatly enhanced. For example, a device operating on two watts utilizing a receiver that may deliver one watt may increase its battery duration up to about 50%. Lastly, some devices currently running on batteries can fully be powered using a receiver after which a battery may no longer be required. This last property may be beneficial for devices where replacing batteries can be tedious or hard to accomplish such as in wall-clocks. Embodiments below provide some examples of how integration of receivers may be carried out on electronic devices.

5. Enhanced Wireless Power Receiver Configuration

Figure 33:
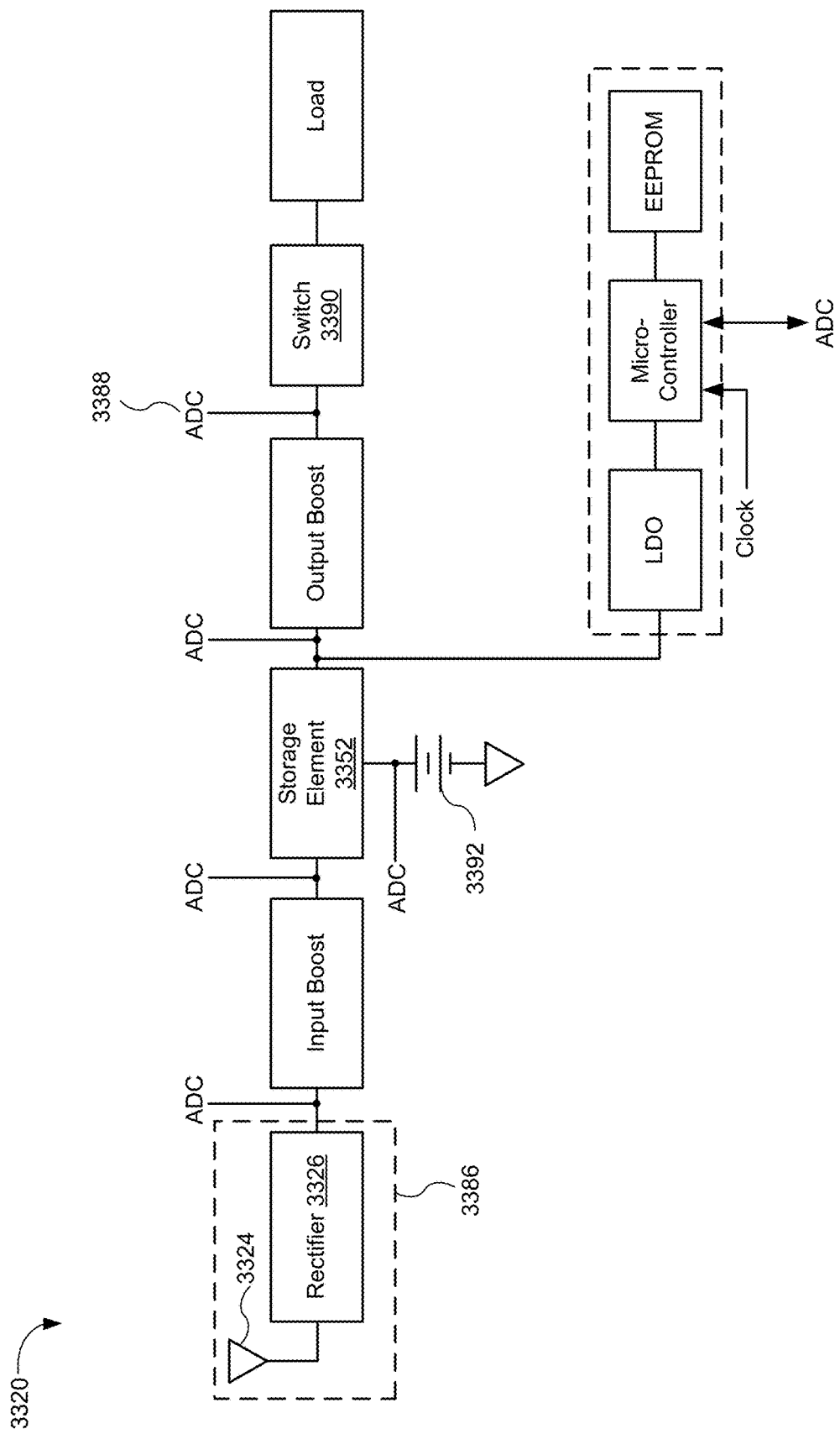
FIG. 33 illustrates a block diagram of receiver which can be used for wireless powering or charging one or more electronic devices, according to an exemplary embodiment.

FIG. 33 shows a block diagram of receiver 3320 which can be used for wireless powering or charging one or more electronic devices. According to some aspects of this embodiment, receiver 3320 may operate with the variable power source generated from transmitted RF waves to deliver constant and stable power or energy to electronic device. In addition, receiver 3320 may use the variable power source generated from RF waves to power up electronic components within receiver 3320 for proper operation.

Receiver 3320 may be integrated in electronic device and may include a housing that can be made of any suitable material to allow for signal or wave transmission and/or reception, for example plastic or hard rubber. This housing may be an external hardware that may be added to different electronic equipment, for example in the form of cases, or can be embedded within electronic equipment as well.

Receiver 3320 may include an antenna array 3386 which may convert RF waves or pockets of energy into electrical power. Antenna array 3386 may include one or more antenna elements 3324 operatively coupled with one or more rectifiers 3326. RF waves may exhibit a sinusoidal shape within a voltage amplitude and power range that may depend on characteristics of transmitter and the environment of transmission. The environment of transmission may be affected by changes to or movement of objects within the physical boundaries, or movement of the boundaries themselves. It may be also affected by changes to the medium of transmission; for example, changes to air temperature or humidity. As a result, the voltage or power generated by antenna array 3386 at receiver 3320 may be variable. As an illustrative embodiment, and not by way of limitation, the alternating current (AC) voltage or power generated by antenna element 3324 from transmitted RF waves or pocket of energy may vary from about 0 volts or 0 watts to about 5 volts at 3 watts.

Antenna element 3324 may include suitable antenna types for operating in frequency bands similar to the bands described for transmitter. Antenna element 3324 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example electronic device. On the contrary, for devices with well-defined orientations, for example a two-handed video game controller, there might be a preferred polarization for antennas which may dictate a ratio for the number of antennas of a given polarization. Suitable antenna types may include patch antennas with heights from about ⅛ inches to about 6 inches and widths from about ⅛ inches to about 6 inches. Patch antennas may have the advantage that polarization may depend on connectivity, i.e. depending on which side the patch is fed, the polarization may change. This may further prove advantageous as receiver 3320 may dynamically modify its antenna polarization to optimize wireless power transmission.

Rectifier 3326 may include diodes or resistors, inductors or capacitors to rectify the AC voltage generated by antenna element 3324 to direct current (DC) voltage. Rectifier 3326 may be placed as close as is technically possible to antenna element 3324 to minimize losses. In one embodiment, rectifier 3326 may operate in synchronous mode, in which case rectifier 3326 may include switching elements that may improve the efficiency of rectification. As an illustrative embodiment, and not by way of limitation, output of rectifier 3326 may vary from about 0 volts to about 5 volts.

An input boost converter can be included in receiver 3320 to convert the variable DC output voltage of rectifier 3326 into a more stable DC voltage that can be used by components of receiver 3320 and/or electronic device. Input boost converter 3258 may operate as a step-up DC-to-DC converter to increase the voltage from rectifier 3326 to a voltage level suitable for proper operation of receiver 3320. As an illustrative embodiment, and not by way of limitation, input boost converter 3258 may operate with input voltages of at least 0.4 volts to about 5 volts to produce an output voltage of about 5 volts. In addition, input boost converter may reduce or eliminate rail-to-rail deviations. In one embodiment, input boost converter may exhibit a synchronous topology to increase power conversion efficiency.

As the voltage or power generated from RF waves may be zero at some instants of wireless power transmission, receiver 3320 can include a storage element 3352 to store energy or electric charge from the output voltage produced by input boost converter. In this way, storage element 3352, through an output boost converter, may deliver continuous voltage or power to a load, where this load may represent the battery or internal circuitry of electronic device requiring continuous powering or charging. For example, load may be the battery of a mobile phone requiring constant delivery of 5 volts at 2.5 watts.

Storage element 3352 may include a battery 3392 to store power or electric charge from the power received from input boost converter 3258. Battery 3392 may be of different types, including but not limited to, alkaline, nickel-cadmium (NiCd), nickel-metal hydride (NiHM), and lithium-ion, among others. Battery 3392 may exhibit shapes and dimensions suitable for fitting receiver 3320, while charging capacity and cell design of battery 3392 may depend on load requirements. For example, for charging or powering a mobile phone, battery 3392 may deliver a voltage from about 3 volts to about 4.2 volts.

In another embodiment, storage element 3352 may include a capacitor instead of battery 3392 for storing and delivering electrical charge as required by the receiver. As a way of example, in the case of charging or powering a mobile phone, receiver 3320 may include a capacitor with operational parameters suitable for matching load requirements.

Receiver 3320 may also include output boost converter operatively coupled with storage element 3352 and input boost converter, where this output boost converter may be used for matching impedance and power requirements of load. As an illustrative embodiment, and not by way of limitation, output boost converter may increase the output voltage of battery 3392 from about 3 or 4.2 volts to about 5 volts which may be the voltage required by the battery or internal circuitry of electronic device. Similarly to input boost converter, output boost converter may be based on a synchronous topology for enhancing power conversion efficiency.

Storage element 3352 may provide power or voltage to a communication subsystem which may include a low-dropout regulator (LDO), a microcontroller, and an electrically erasable programmable read-only memory (EEPROM). LDO may function as a DC linear voltage regulator to provide a steady voltage suitable for low energy applications as in microcontroller. Microcontroller may be operatively coupled with EEPROM to store data pertaining the operation and monitoring of receiver 3320. Microcontroller may also include a clock (CLK) input and general purpose inputs/outputs (GPIOs).

In one embodiment, microcontroller in conjunction with EEPROM may run an algorithm for controlling the operation of input and output boost converters, according to load requirements. Microcontroller may actively monitor the overall operation of receiver 3320 by taking one or more power measurements 3388 (ADC) at different nodes. For example, microcontroller may measure how much voltage or power is being delivered at rectifier 3326, input boost converter, battery 3392, output boost converter, communication subsystem, and/or load. Microcontroller may communicate these power measurements 3388 to load so that electronic device may know how much power it can pull from receiver 3320. In another embodiment, microcontroller, based on power measurements 3388, may control the power or voltage delivered at load by adjusting the load current limits at output boost converter. Yet in another embodiment, a maximum power point tracking (MPPT) algorithm may be executed by microcontroller to control and optimize the amount of power that input boost converter can pull from antenna array 3386.

In another embodiment, microcontroller may regulate how power or energy can be drained from storage element 3352 based on the monitoring of power measurements 3388. For example, if the power or voltage at input boost converter runs too low, then microcontroller may direct output boost converter to drain battery 3392 for powering load.

Receiver 3320 may include a switch 3390 for resuming or interrupting power being delivered at load. In one embodiment, microcontroller may control the operation of switch 3390 according to terms of services contracted by one or more users of wireless power transmission or according to administrator policies.

Figure 34:
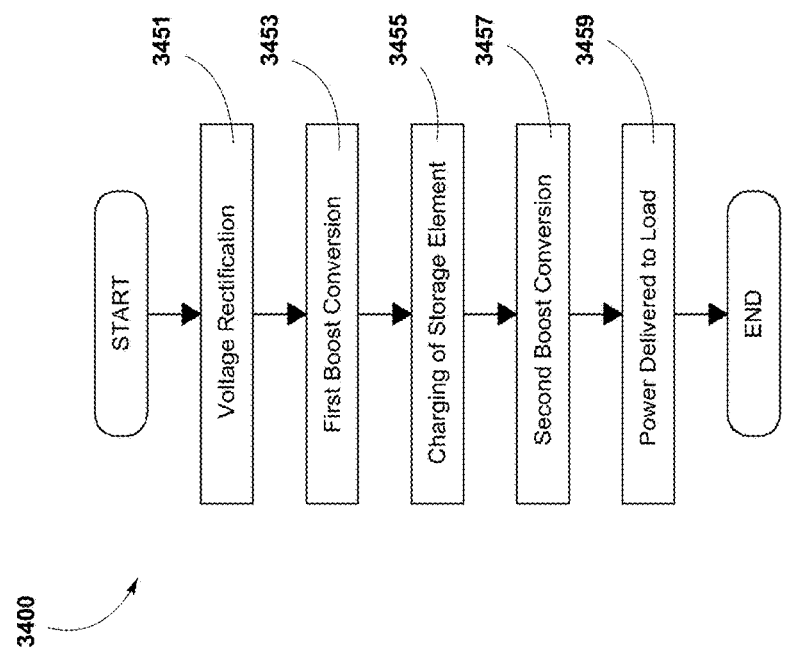
FIG. 34 illustrates a power conversion process that may be implemented in a receiver during wireless power transmission, according to an exemplary embodiment.

FIG. 34 shows a power conversion process 3400 that may be implemented in receiver during wireless power transmission. According to some aspects of this embodiment, power conversion process 3400 may allow power extraction from RF waves and/or pockets of energy—to provide suitable voltage or power to internal components of receiver 108 and electronic device.

Power conversion process 3400 may start when antenna element 3324 may convert RF waves and/or pockets of energy into AC voltage or power. At step 3451, rectifier may rectify this AC voltage or power into DC voltage or power. At this stage, the DC voltage or power generated at rectifier may be variable depending on conditions for extracting power from RF waves and/or pockets of energy. Subsequently at step 3453, input boost converter may step up the DC voltage or power obtained from rectifier to a voltage or power level that may be used by storage element or other internal components of receiver. In one embodiment, input boost converter may receive an input (based on a MPPT algorithm) from microcontroller for adjusting and optimizing the amount of power that can be pulled from antenna array. At this stage, the stabilized and increased voltage at input boost converter may be directly utilized by load, but it may not be continuous at all times given the inherently characteristics of RF waves.

The stabilized DC voltage produced by input boost converter may be used to charge storage element, where storage element may be in the form of a battery or a capacitor, at step 3455. Storage element may maintain suitable charging levels at all times for delivering continuous power to load. In addition, storage element may provide suitable power or voltage to communication subsystem.

The voltage or power generated by storage element can be step up by output boost converter to match impedance and power requirements of load, at step 3457. In one embodiment, microcontroller may set up current limits at output boost converter to adjust the amount of power being delivered at load according to the application.

After the second boost conversion, output boost converter may now supply stable and continuous power or voltage to load within suitable electrical specifications for charging or powering electronic device which may be operatively coupled with receiver, at step 3459.

Microcontroller may control switch to interrupt or resume the delivery of power or voltage at load according to terms of services contracted by users of wireless power transmission. For example, if wireless power transmission is a service provided to a user of receiver, then microcontroller, through the use of switch, can interrupt or resume the powering or charging of electronic device according to the status of user's contract. Furthermore, microcontroller may regulate the operation of switch based on charging or powering priorities established for one or more electronic devices. For example, microcontroller may open switch if the electronic device coupled with receiver has a lower powering or charging priority compared to another electronic device coupled with a suitable receiver that may require charging and that may have a higher priority for charging. In this case, transmitter may direct RF waves towards the receiver coupled with the electronic device with higher charging or powering priority.

6. Embedded Receiver

Figure 20A:
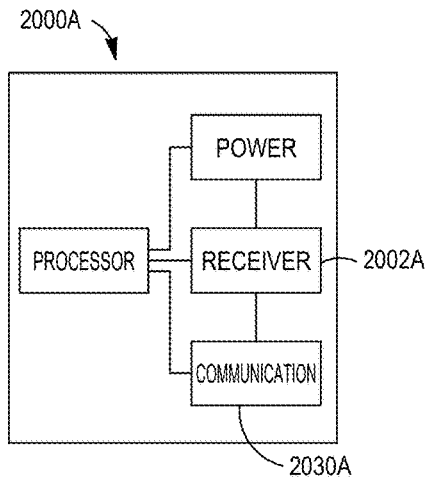
FIG. 20A illustrates a device with an embedded receiver, according to an exemplary embodiment.

FIG. 20A illustrates an implementation scheme where a device 2000A that may represent a typical phone, computer or other electronic device may include an embedded receiver 2020A. Device 2000A may also include a power source, a communications component 2030A, and a processor. Receiver 2020A way utilize pocket-forming for providing power to power source from device 2000A. In addition, receiver 2020A can use built-in communications component 2030A of device 2000A (for example, Bluetooth) for communicating to a given transmitter based on requirements provided by processor such as battery level, user predefined charging profile or others.

7. Battery with an Embedded Receiver

Figure 20C:
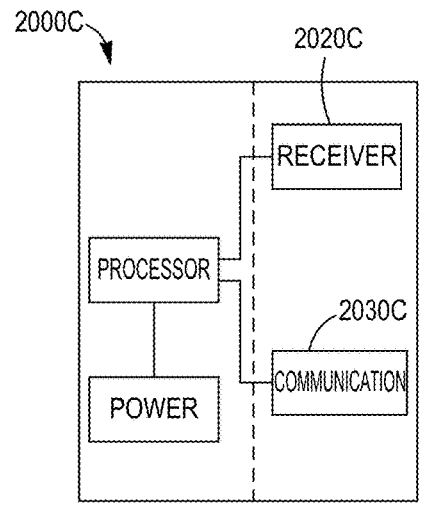
FIG. 20C illustrates external hardware that may be attached to a device, according to an exemplary embodiment.
Figure 20B:
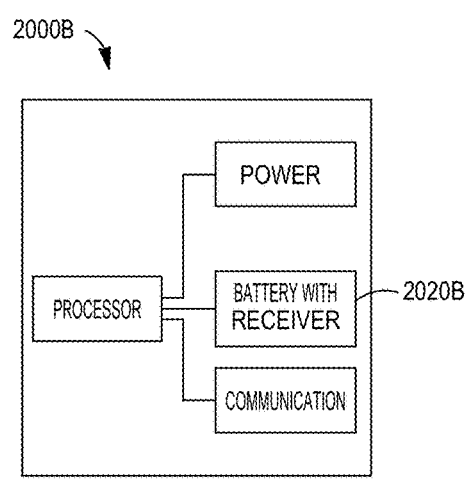
FIG. 20B illustrates a battery with an embedded receiver, according to an exemplary embodiment.

FIG. 20B illustrates another implementation scheme where a device 2000B may include a battery with an embedded receiver 2020B. Battery may receive power wirelessly through pocket-forming and may charge through its embedded receiver 2020B. Battery may function as a supply for power source, or may function as back-up supply. This configuration may be advantageous in that battery may not need to be removed for charging. This may particularly be helpful in gaming controllers, or gaming devices where batteries, typically AA or AAA may be continuously replaced.

8. External Communication Component

FIG. 20C illustrates an alternate implementation scheme 2000C where receiver 2020C and a communications component 2030C may be included in an external hardware that may be attached to a device. Hardware can take appropriate forms such as cases that may be placed on phones, computers, remote controllers and others, which may connect thorough suitable interfaces such as Universal Serial Bus (USB). In other embodiments, hardware may be printed on flexible films, which may then be pasted or otherwise attached to electronic equipment. This option may be advantageous as it may be produced at low cost and can easily be integrated into various devices. As in previous embodiments, a communications component 2030C may be included in hardware that may provide communication to a transmitter or to electronic equipment in general.

9. Casing or Housing of Receiver Connecting to USB

Figure 21B:
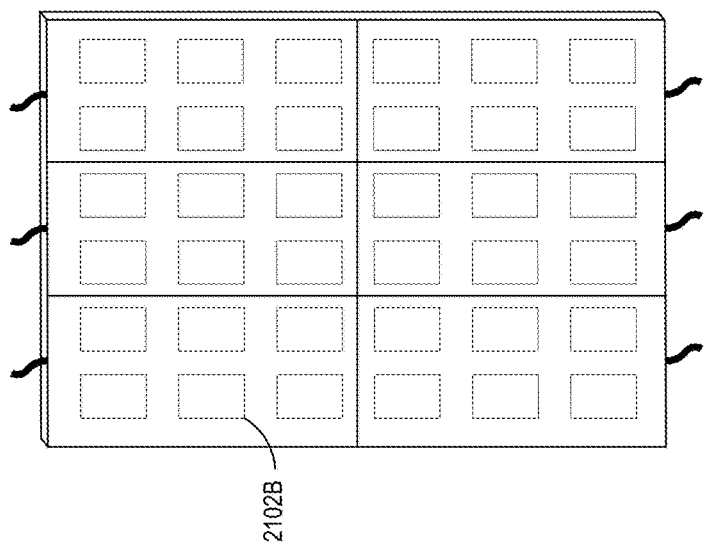
FIG. 21B illustrates hardware in the form of a printed film or flexible printed circuit board, according to an exemplary embodiment.
Figure 21A:
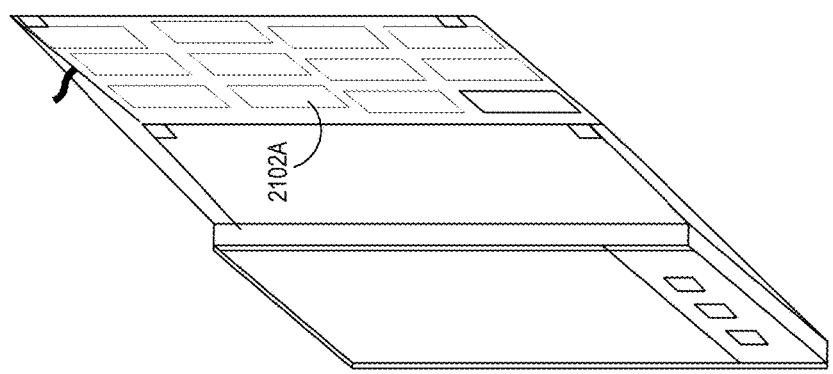
FIG. 21A illustrates hardware in the form of case, according to an exemplary embodiment.

FIG. 21A illustrates hardware in the form of case including a receiver 2102A that may connect through flex cables or USB to a smartphone and/or any other electronic device. In other embodiments, the housing or case can be a computer case, phone case, and/or camera case among other such options.

10. PCB on Printed Film

FIG. 21B illustrates hardware in the form of a printed film or flexible printed circuit board (PCB) which may include a plurality of printed receivers 2102B. Printed film can be pasted or otherwise attached to electronic devices and can connect trough suitable interfaces such as USB. Printed film may be advantageous in that sections can be cut from it to meet specific electronic device sizes and/or requirements. The efficiency of wireless power transmission as well as the amount of power that can be delivered (using pocketforming) may be a function of the total number of antenna elements used in a given receiver and transmitter system. For example, for delivering about one watt at about 15 feet, a receiver may include about 80 antenna elements while a transmitter may include about 256 antenna elements. Another identical wireless power transmission system (about 1 watt, at about 15 feet) may include a receiver with about 40 antenna elements, and a transmitter with about 512 antenna elements. Reducing in half the number of antenna elements in a receiver may require doubling the number of antenna elements in a transmitter. In some cases, it may be cost-effective to put a greater number of antenna elements in a transmitter than in a receiver. However, the opposite can be achieved (placing more antenna elements on a receiver than on a transmitter), as long as there are at least two antenna elements in a transmitter.

II. Antenna Hardware and Functionality

A. Spacing Configuration

Figure 22:
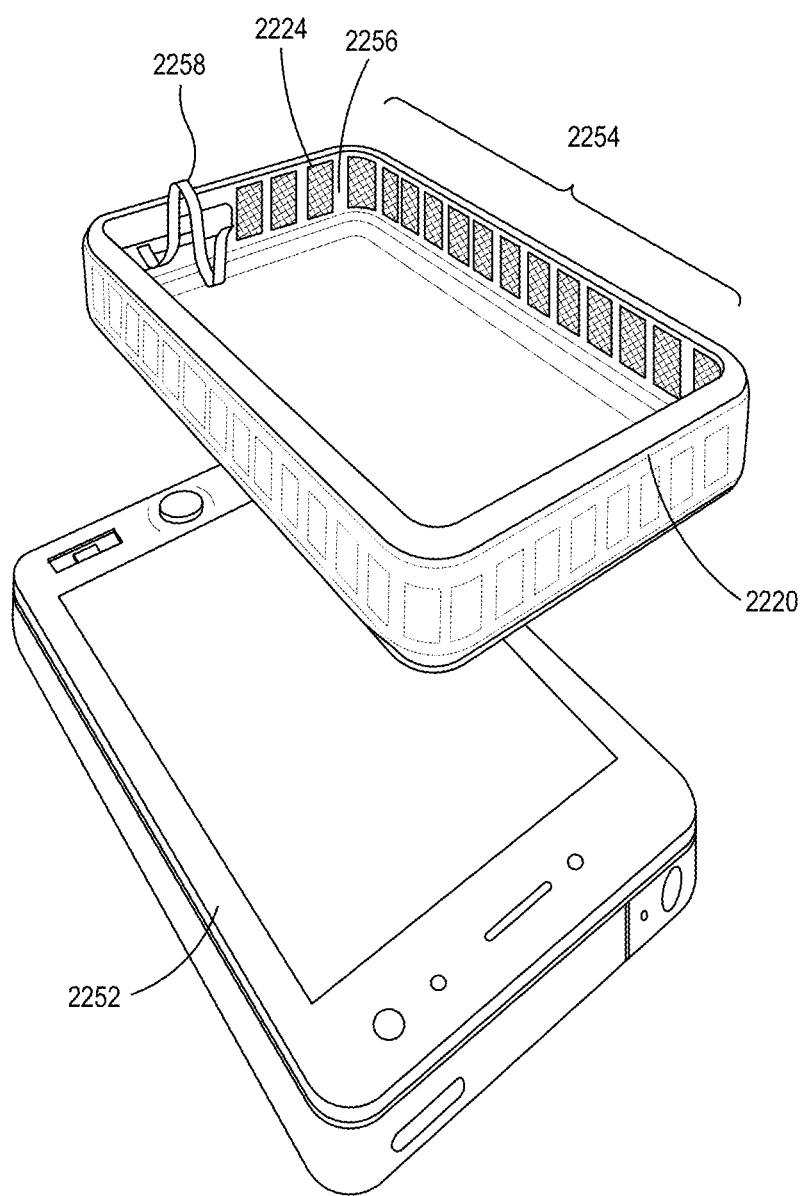
FIG. 22 illustrates internal hardware according to an exemplary embodiment.

FIG. 22 illustrates internal hardware, where receiver 2220 may be used for receiving wireless power transmission in an electronic device 2252 (e.g., smartphone). In some implementations, the electronic device 2252 may include receiver 2220, which may be embedded around the internal edge of the case 2254 (e.g., smartphone case) of the electronic device 2252. In other embodiments, the receiver 2220 may be implemented covering the back side of the case 2254. The case 2254 may be one or more of: a smartphone cover, a laptop cover, camera cover, GPS cover, a game controller cover and/or tablet cover, among other such options. The case 2254 may be made out of plastic, rubber and/or any other suitable material.

Receiver 2220 may include an array of antenna elements 2224 strategically distributed on the grid area shown in FIG. 22. The case 2254 may include an array of antenna elements 2224 located around the edges and/or along the backside of case 2254 for optimal reception. The number, spacing, and type of antenna elements 2224 may be calculated according to the design, size, and/or type of electronic device 2252. In some embodiments, there may be a spacing (e.g., 1 mm-4 mm) and/or a meta-material between the case 2254 containing the antenna element 2224 and the electronic device 2252. The spacing and/or meta-material may provide additional gain for RF signals. In some implementations, the meta-materials may be used in creating a multi-layer PCB to implement into the case 2254.

B. Metamaterial

The internal hardware may be in the form of a printed film 2256 and/or flexible PCB may include different components, such as a plurality of printed antenna elements 2224 (connected with each other in serial, parallel, or combined), rectifier, and power converter elements. Printed film 2256 may be pasted or otherwise attached to any suitable electronic devices, such as electronic device 2252 and/or tablets. Printed film 2256 may be connected through any suitable interfaces such as flexible cables 2258. Printed film 2256 may exhibit some benefits; one of those benefits may be that sections can be cut from it to meet specific smart mobile device sizes and/or requirements. According to one embodiment, the spacing between antenna elements 2224 for receiver 2220 may range from about 2 nm to about 12 nm, being most suitable about 7 nm. Additionally, in some implementations, the optimal amount of antenna elements 2224 that may be used in receiver 2220 for an electronic device 2252 such as a smartphone may range from about 20 to about 30. However, the amount of antenna elements 2224 within receiver 2220 may vary according to electronic device 2252 design and size. Antenna element 2224 may be made of different conductive materials such as cooper, gold, and silver, among others. Furthermore, antenna element 2224 may be printed, etched, or laminated onto any suitable non-conductive flexible substrate, such as flexible PCB, among others. The disclosed configuration and orientation of antenna element 2224 may exhibit a better reception, efficiency, and performance of wireless charging.

C. Internal Hardware

Figure 32:
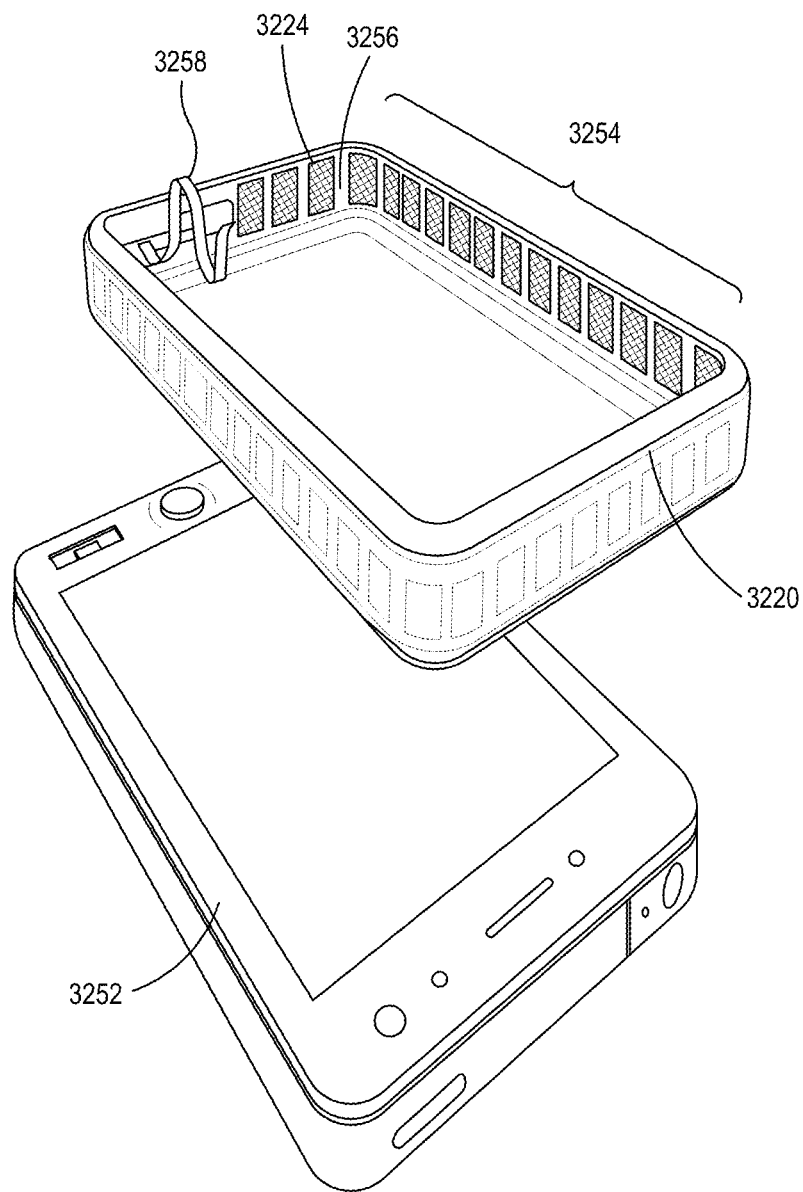
FIG. 32 illustrates an internal hardware used as a receiver and embedded within a smartphone case, according to an exemplary embodiment.

FIG. 32 illustrates internal hardware 3200, where receiver 3220 may be used for wireless power transmission in smartphones 3252. FIG. 32 shows a first embodiment where smartphone 3252 may include receiver 3220 embedded around the internal edge of smartphone 3252's case. Receiver 3220 may include an array of antenna elements 3224 strategically distributed on the grid area. Receiver may refer to a device including at least one antenna element, at least one rectifying circuit and at least one power converter, which may utilize pockets of energy for powering, or charging a client device.

The number and type of antenna elements 3224 may be calculated according to smartphone 3252's design. When charging an electronic device, for example a phone (smartphone) or laptop computer, initial high currents which can exceed the minimum voltage needed to activate the operation of an electronic switched mode DC-DC converter may be required. In such a case, a capacitor (not shown) may be added at the output of receiver 3220 to provide the extra energy required. Afterwards, lower power can be provided, for example 1/80 of the total initial power while having the phone or laptop still build-up charge. Charge may refer to the conversion of RF energy into electrical energy by a receiver, using an antenna, where the electrical energy may be transmitted through an electrical circuit connection from the receiver to an electrically connected client device, where the transmitted energy may be used by the device to charge its battery, to power its functions, and/or any combination. Client device may refer to any device that is to receive wireless power, through an electrical connection with a wireless power receiver, from a wireless transmitter, in a wireless power transmission system. The client device may be a computer, a laptop computer, a mobile electronic device such as a smart phone, an electronic toy, a remote control for a television or other consumer device, or any electronic device or electrical device to be powered wirelessly.

Lastly, communications component, may be included in receiver 3220 to communicate with transmitter or to other electronic equipment. Transmitter may refer to a device, including a chip which may generate two or more RF signals, at least one RF signal being phase shifted and gain adjusted with respect to other RF signals, substantially all of which pass through one or more RF antenna such that focused RF signals are directed to a target.

Different antenna, rectifier or power converter arrangements are possible for a receiver as will be explained in following embodiments. Particularly, internal hardware 3200 in the form of a printed film 3256 or flexible printed circuit board (PCB) may include different components, such as a plurality of printed antenna elements 3224 (connected with each other in serial, parallel, or combined), rectifier 206, and power converter 3229 elements. Printed film 3256 may be pasted or otherwise attached to any electronic devices, such as smartphones 3252 or tablets and may be connected through any interfaces such as flexible cables. Printed film 3256 may exhibit some benefits, one of those benefits may be that sections can be cut from it to meet specific smart mobile device sizes and/or requirements.

According to one embodiment, the spacing between antenna elements 3224 for receivers 3220 may range from about 5 nm to about 12 nm. However, the amount of antennas within receivers 3220 may vary according to smartphone 3252's design and size. Antenna elements 3224 may be made of different conductive materials such as cooper, gold, and silver, among others. Furthermore, antenna elements 3224 may be printed, etched, or laminated onto any non-conductive flexible substrate, such as flexible printed circuit board (PCB), among others. The disclosed configuration and orientation of antenna elements 3224 may exhibit a better reception, efficiency, and performance of wireless charging.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," and the like, are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module that may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A far-field wireless power transmission system comprising:
    a base station comprising a controller connected to a power source; and
    a plurality of far-field transmitters connected to the base station, each of the far-field transmitters comprising respective one or more integrated circuits, and a respective set of antenna elements, wherein each of the plurality of far-field transmitters is assigned to a respective coverage area,
    wherein:
        the controller of the base station is configured to (i) determine one or more particular far-field transmitters of the plurality of far-field transmitters to use to transmit wirelessly delivered power to a receiver located in a respective coverage area assigned to the one or more particular far-field transmitters, and (ii) provide an instruction to the one or more particular far-field transmitters to begin delivering wireless power to the receiver, and
        after receiving the instruction:
            the one or more particular far-field transmitters are configured to generate far-field power transmission waves via respective one or more integrated circuits and respective sets of antenna elements of the one or more particular far-field transmitters, the far-field power transmission waves forming a constructive interference pattern as a pocket of energy from which the receiver receives energy that is used to power an electronic device coupled with the receiver.

2. The far-field wireless power transmission system of claim 1, wherein the base station includes a housing for the controller and the power source.

3. The far-field wireless power transmission system of claim 1, wherein each of the plurality of far-field transmitters includes a communication component configured for communicating with the electronic device within range to determine powering levels.

4. The far-field wireless power transmission system of claim 3, wherein each of the far-field transmitters includes a housing for respective one or more integrated circuits and a respective set of antenna elements.

5. The far-field wireless power transmission system of claim 1, wherein the base station is linked to each of the plurality of far-field transmitters through a connection comprising a coaxial cable, phone cable, Local Area Network (LAN) cable, or Wi-Fi.

6. The far-field wireless power transmission system of claim 3, wherein the receiver communicates with the one or more particular far-field transmitters via respective communication components of the one or more particular far-field transmitters through wireless communication protocols to provide power level information for the electronic device.

7. The far-field wireless power transmission system of claim 1, wherein respective far-field transmitters of the plurality of far-field transmitters are capable of powering multiple receivers connected to electronic devices, wherein the respective far-field transmitters of the plurality of far-field transmitters are configured to provide different powering or charging levels corresponding to each of the electronic devices.

8. The far-field wireless power transmission system of claim 4, wherein components of the base station and the plurality of far-field transmitters are manufactured from meta-materials, micro-printing of circuits, or nano-materials.

9. The far-field wireless power transmission system of claim 1, wherein the generation of far-field power transmission waves by the one or more particular far-field transmitters is controlled by the respective one or more integrated circuits utilizing components including oscillators and piezoelectric crystals configured to create and change radio frequencies in different antenna elements of the respective sets of antenna elements connected to the respective one or more integrated circuits.

10. The far-field wireless power transmission system claim 1, wherein the controller in the base station is configured to instruct a different far-field transmitter of the plurality of far-field transmitters to begin transmitting wirelessly delivered power when an additional receiver is within a respective coverage area assigned to the different far-field transmitter, wherein the different far-field transmitter is configured to operate at a different frequency, a different power intensity, and a different range to power an additional electronic device that is coupled with the additional receiver.

11. The far-field wireless power transmission system of claim 1, wherein at least one of the plurality of far-field transmitters is plugged into a light socket.

12. The far-field wireless power transmission system of claim 1, wherein each of the plurality of far-field transmitters is configured to operate at different frequencies, power intensities, and different ranges.

13. The far-field wireless power transmission system of claim 1, wherein the respective sets of one or more antenna elements of the one or more particular far-field transmitters are regulated by the controller of the base station via the respective one or more integrated circuits of the one or more particular far-field transmitters to form a plurality of desired constructive interference patterns near different locations as the receiver moves within the respective coverage area.

14. The far-field wireless power transmission system of claim 1, wherein the power source is used by the base station to feed generation of the far-field power transmission waves by the one or more particular far-field transmitters.

15. The far-field wireless power transmission system of claim 1, wherein the controller is further configured to determine a time and location to form the constructive interference pattern.

16. The far-field wireless power transmission system of claim 1, wherein the respective coverage area assigned to the one or more far-field transmitters corresponds to a room within a structure.

17. A method, comprising:

providing a base station that comprises a controller connected to a power source, and the base station is connected to a plurality of far-field transmitters, wherein each of the far-field transmitters comprises respective one or more integrated circuits and a respective set of antenna elements, and each of the plurality of far-field transmitters is assigned to a respective coverage area;

determining, by the controller of the base station, one or more particular far-field transmitters of the plurality of far-field transmitters to use to transmit wirelessly delivered power to a receiver located in a respective coverage area assigned to the one or more particular far-field transmitters; and providing, by the controller of the base station, an instruction to the one or more particular far-field transmitters to begin delivering wireless power to the receiver; and after receiving the instruction, generating, by the one or more particular far-field transmitters, far-field power transmission waves via respective one or more integrated circuits and respective sets of antenna elements of the one or more particular far-field transmitters, the far-field power transmission waves forming a constructive interference pattern from which the receiver receives energy that is used to power an electronic device coupled with the receiver.

18. The method of claim 17, further comprising:

determining by the controller of the base station, an additional far-field transmitter of the plurality of far-field transmitters to use to transmit wirelessly delivered power to an additional receiver that is in a different coverage area assigned to the additional far-field transmitter; and providing, by the controller of the base station, a new instruction to the additional far-field transmitter to begin delivering wireless power to the additional receiver.

19. The method of claim 17, further comprising:

regulating, by the controller of the base station, the respective sets of one or more antenna elements of the one or more particular far-field transmitters via the respective one or more integrated circuits of the one or more particular far-field transmitters to form a plurality of desired constructive interference patterns near different locations as the receiver moves within the respective coverage area.

20. The method of claim 18, wherein:

the respective coverage area assigned to the one or more far-field transmitters corresponds to a room within a structure, and the different coverage area assigned to the additional far-field transmitter corresponds a different room, distinct from the room, within the structure.

* * * * *

UNITED STATES PATENT AND TRADEMARK OFFICE
CERTIFICATE OF CORRECTION

PATENT NO. : 9,941,707 B1
APPLICATION NO. : 14/584449
DATED : April 10, 2018
INVENTOR(S) : Leabman Page 1 of 1

It is certified that error appears in the above-identified patent and that said Letters Patent is hereby corrected as shown below:

In the Claims

Claim 20, Column 88, Line 57, delete "corresponds a different" and insert --corresponds to a different--.

Signed and Sealed this
Twenty-ninth Day of May, 2018

Andrei Iancu
*Director of the United States Patent and Trademark Office*